United States Patent [19]

Nagai et al.

[11] Patent Number: 5,840,454
[45] Date of Patent: Nov. 24, 1998

[54] AROMATIC POLYCARBONATE AND ELECTROPHOTOGRAPHIC PHOTOSENSITIVE MEDIUM USING SAME

[75] Inventors: Kazukiyo Nagai, Numazu; Masaomi Sasaki; Hiroshi Tamura, both of Susono; Tetsuro Suzuki, Fuji; Tomoyuki Shimada, Sunto-gun; Chihaya Adachi, Numazu; Chiaki Tanaka, Tagata-gun; Nozomu Tamoto, Numazu; Kouji Kishida, Sunto-gun; Akira Katayama, Tagata-gun; Mitsutoshi Anzai, Ushiku; Akihiro Imai, Sagamihara, all of Japan

[73] Assignees: Ricoh Company, Ltd., Tokyo; Hodogaya Chemical Co., Ltd., Kawasaki, both of Japan

[21] Appl. No.: 666,947

[22] Filed: Jun. 20, 1996

[30] Foreign Application Priority Data

| Jun. 21, 1995 | [JP] | Japan | 7-178194 |
| Jun. 23, 1995 | [JP] | Japan | 7-180794 |
| Jun. 30, 1995 | [JP] | Japan | 7-165962 |
| Sep. 21, 1995 | [JP] | Japan | 7-267786 |
| Feb. 7, 1996 | [JP] | Japan | 8-045555 |
| Feb. 7, 1996 | [JP] | Japan | 8-045556 |
| Mar. 4, 1996 | [JP] | Japan | 8-045995 |

[51] Int. Cl.$^6$ ................................................. G03G 5/047
[52] U.S. Cl. ............................................. 430/59; 430/96
[58] Field of Search .................................. 430/58, 59, 96

[56] References Cited

U.S. PATENT DOCUMENTS

| 5,248,579 | 9/1993 | Terrell et al. | 430/96 |
| 5,418,098 | 5/1995 | Mayama et al. | 430/96 |
| 5,506,081 | 4/1996 | Terrell et al. | 430/96 |

*Primary Examiner*—John Goodrow
*Attorney, Agent, or Firm*—Oblon, Spivak, McClelland, Maier & Neustadt, P.C.

[57] ABSTRACT

An aromatic polycarbonate containing a structural unit of the formula:

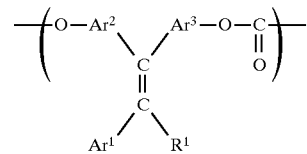

wherein $R^1$ is a hydrogen atom, a substituted or unsubstituted alkyl group or a substituted or unsubstituted aryl group, $Ar^1$ is a substituted or unsubstituted aryl group and $Ar^2$ and $Ar^3$ are independently a substituted or unsubstituted arylene group. The aromatic polycarbonate is capable of transferring charges and is used for forming a photosensitive layer of an electrophotographic photosensitive medium.

15 Claims, 78 Drawing Sheets

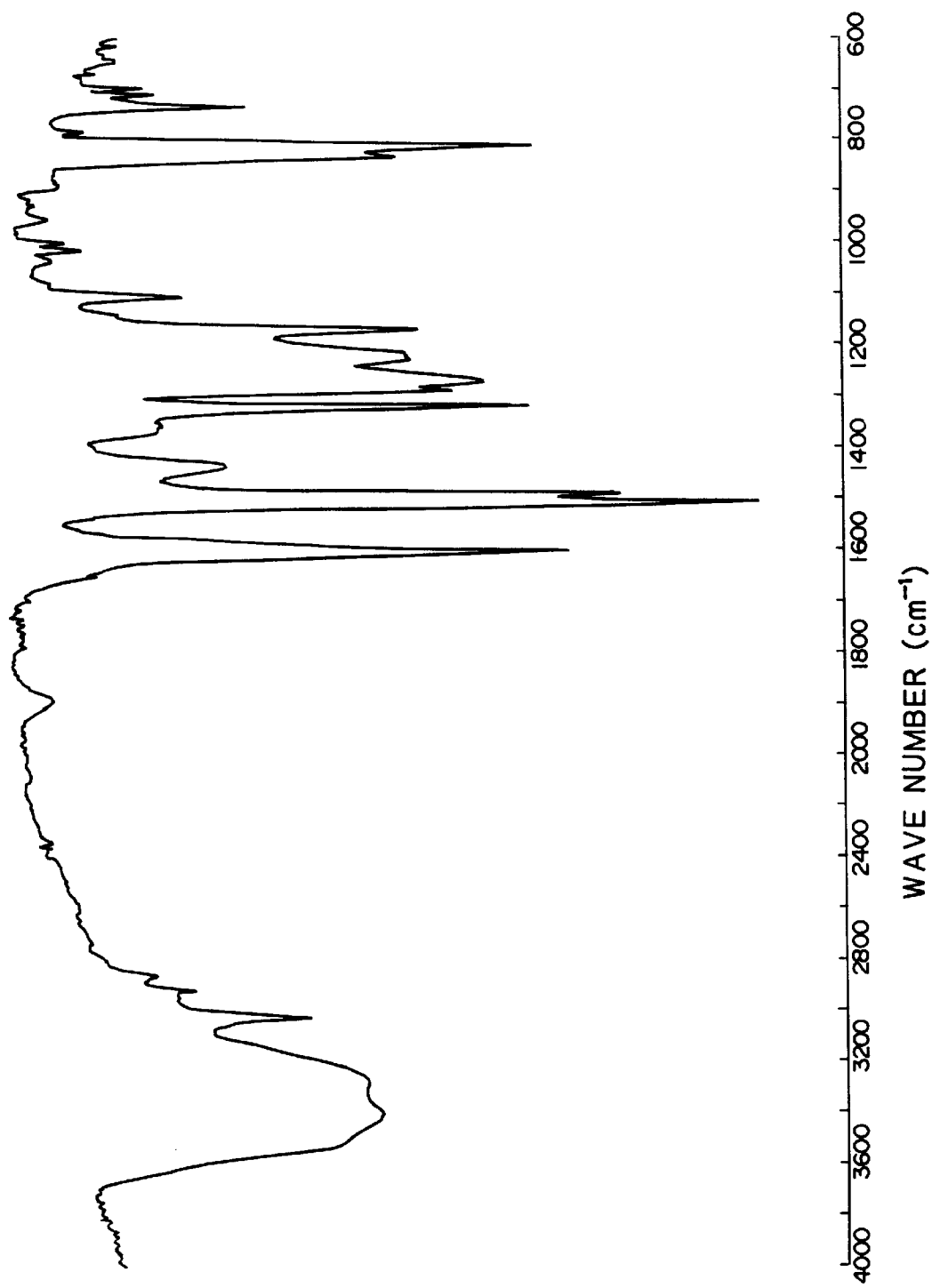
F I G. 41

AROMATIC POLYCARBONATE AND ELECTROPHOTOGRAPHIC PHOTOSENSITIVE MEDIUM USING SAME

BACKGROUND OF THE INVENTION

1. Field of the Invention

This invention relates to a novel aromatic polycarbonate and to an electrophotographic photosensitive medium having a photosensitive layer containing the aromatic polycarbonate.

2. Description of the Prior Art

As is known in the art, aromatic polycarbonates have been prepared from 2,2-bis(4-hydroxyphenyl)propane (hereinafter referred to as "bisphenol A"), phosgene or biphenyl carbonate. Such aromatic polycarbonates have been utilized in various fields due to their superior transparency, heat resistance, dimensional stability and mechanical strength. For example, various studies have been made to apply these aromatic polycarbonates to binder resins for an organic photoconductor (OPC) which has been recently utilized in electrophotographic copying apparatuses, printers, etc. Typically, the organic photoconductor has a laminated structure composed of a conductive substrate, a charge-generating layer (CGL) provided over the conductive substrate and a charge-transport layer (CTL) provided over the charge-generating layer. The charge-transport layer is composed of a low-molecular charge-transport material (CTM) and a binder resin. Many aromatic polycarbonate resins have been proposed so as to be applied to the binder resin for the charge-transport layer. However, when the low-molecular charge-transport material is incorporated into the binder resin for the charge-transport layer, there occurs deterioration of an inherent mechanical strength of the binder resin. Consequently, the photosensitive member is likely to exhibit low wear resistance and poor durability, and suffer from scratches or cracks.

There have been hitherto proposed photoconductive polymers including vinyl polymers such as polyvinyl anthracene, polyvinyl pyrene, poly-N-vinyl carbazole or the like. These polymers all are of a so-called charge-transport complex type. These photoconductive polymers are however unsatisfactory in sensitivity to light.

On the other hand, attempts have been made to improve properties of the aforementioned laminate-type photosensitive member. As a result, many polymer materials having a high charge-transport capacity have been proposed. Examples of the polymer materials include acryl resins having a triphenylamine structure (M. Stolka et al. "J. Polym. Sci.," Vol. 21, p.969 (1983)), vinyl polymers having a hydrazone structure ("Japan Hard Copy," (1989) p.67), polycarbonate resins having a triarylamine structure (U.S. Pat. Nos. 4,801,517, 4,806,443, 4,806,444, 4,937,165, 4,959,288, 5,030,532, 5,034,296 and 5,080,989, Japanese patent application laid-open publications Nos. 64-9964 (1989), 3-221522(1991), 2-304456(1990), 4-11627(1992), 4-175337(1992), 4-18371(1992), 4-31404(1992) and 4-133065(1992), or the like). However, these polymer materials have not yet been put into practical use.

M. A. Abkowitz et al compare high molecular weight polycarbonate with low molecular weight one using a tetraarylbenzidine derivative as a model compound and conclude that high molecular weight polycarbonate shows the smallest drift mobility (Physical Review, B46, 6705(1992)). This conclusion suggests that high molecular weight polycarbonate has a problem in electrical characteristics such as sensitivity and residual potential.

SUMMARY OF THE INVENTION

It is an object of the present invention to provide a novel aromatic polycarbonate useful for a charge-transport polymer material for an electrophotographic photosensitive medium.

Another object of the present invention is to provide an electrophotographic photosensitive medium having excellent sensitivity to visible light and excellent durability.

In accomplishing the foregoing objects, the present invention provides an aromatic polycarbonate containing the following structural unit (I):

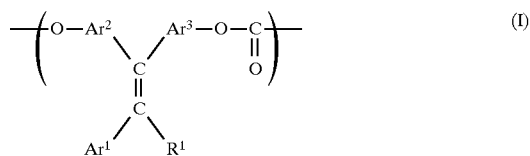

wherein $R^1$ is selected from the group consisting of a hydrogen atom, substituted and unsubstituted alkyl groups and substituted and unsubstituted aryl groups; $Ar^1$ is selected from the group consisting of substituted and unsubstituted aryl groups and $Ar^2$ and $Ar^3$ are independently selected from the group consisting of substituted and unsubstituted arylene groups.

In another aspect, the present invention provides an electrophotographic photosensitive medium which includes a conductive substrate, and a photosensitive layer formed on the conductive substrate and containing the above aromatic polycarbonate.

The aromatic polycarbonate according to the present invention preferably additionally contains the following structural unit (II):

wherein X is an organic divalent group such as (a) a divalent aliphatic group, (b) a divalent alicyclic group, (c) a divalent aromatic group, (d) a divalent group of the formula:

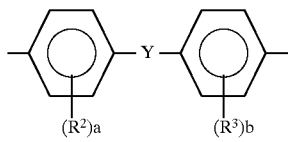

where $R^2$ and $R^3$ are independently selected from substituted and unsubstituted alkyl groups, substituted and unsubstituted aryl groups and a halogen atom, a and b are each an integer of 0 to 4 and Y is selected from the group consisting of a direct bond, a linear alkylene group having 2 to 12 carbon atoms, —O—, —S—, —SO—, —SO$_2$—, —CO—, —CO—O—$Z^1$—O—CO— where $Z^1$ is selected from the group consisting of substituted and unsubstituted divalent aliphatic groups and substituted and unsubstituted divalent arylene groups, —CO—$Z^2$—CO— where $Z^2$ is selected from the group consisting of substituted and unsubstituted divalent aliphatic groups and substituted and unsubstituted divalent arylene groups,

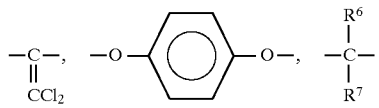

where $R^6$ and $R^7$ are independently selected from the group consisting of a hydrogen atom, a halogen atom, substituted and unsubstituted alkyl groups having 1–5 carbon atoms, substituted and unsubstituted alkoxy groups having 1–5 carbon atoms, substituted and unsubstituted aryl groups and a group coupled with at least one of $R^2$ and $R^3$ to form a cyclic or heterocyclic structure and may link with each other to form a cyclic or heterocyclic structure,

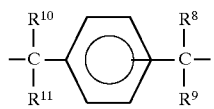

where $R^8$, $R^9$, $R^{10}$ and $R^{11}$ are independently selected from the group consisting of a hydrogen atom, a halogen atom, substituted and unsubstituted alkyl groups having 1–5 carbon atoms, substituted and unsubstituted alkoxy groups having 1–5 carbon atoms and substituted and unsubstituted aryl groups,

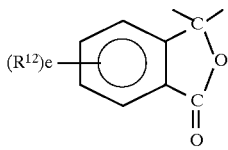

where $R^{12}$ is selected from the group consisting of a hydrogen atom, a halogen atom, substituted and unsubstituted alkyl groups having 1–5 carbon atoms, substituted and unsubstituted alkoxy groups having 1–5 carbon atoms and substituted and unsubstituted aryl groups and e is an integer of 0–4,

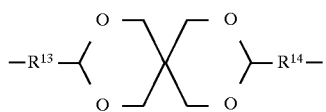

where $R^{13}$ and $R^{14}$ are independently selected from the group consisting of a direct bond and an alkylene group having 1–4 carbon atoms and

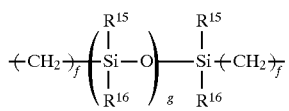

where $R^{15}$ and $R^{16}$ are independently selected from the group consisting of substituted and unsubstituted alkyl groups having 1–5 carbon atoms and substituted and unsubstituted aryl groups, f is an integer of 0–20 and g is an integer of 0–2,000, and (e) a divalent group of the formula:

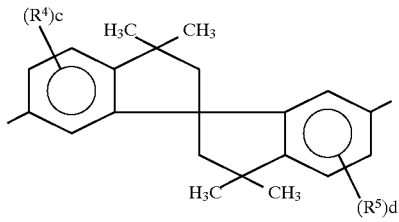

where $R^4$ and $R^5$ are independently selected from substituted and unsubstituted alkyl groups, substituted and unsubstituted aryl groups and a halogen atom, c and d are each an integer of 0 to 3.

In a preferred embodiment, the polycarbonate of the present invention contains a recurring unit of the following formula (III):

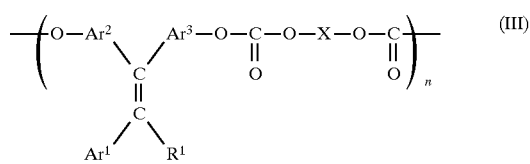

wherein $R^1$, $Ar^1$, $Ar^2$, $Ar^3$ and X are as defined above and n is an integer of 2–5,000.

In one preferred embodiment, the structural unit (I) is as follows:

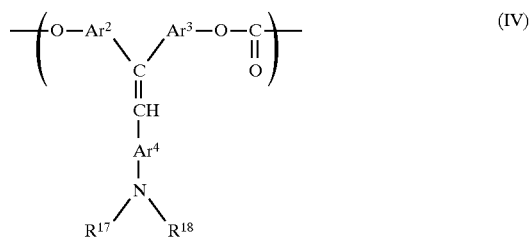

wherein $Ar^2$ and $Ar^3$ are as defined above, $Ar^4$ represents a substituted or unsubstituted arylene group and $R^{17}$ and $R^{18}$ are independently an acyl group, a substituted and unsubstituted alkyl group or a substituted and unsubstituted aryl group.

In a further preferred embodiment, the polycarbonate contains the following recurring unit:

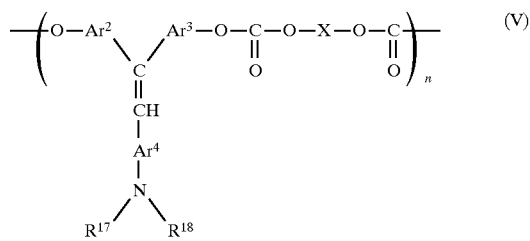

wherein $Ar^2$, $Ar^3$, $Ar^4$, $R^{17}$ and $R^{18}$ are as defined above and n is an integer of 2–5000.

In a further preferred embodiment, the polycarbonate contains the following structural unit:

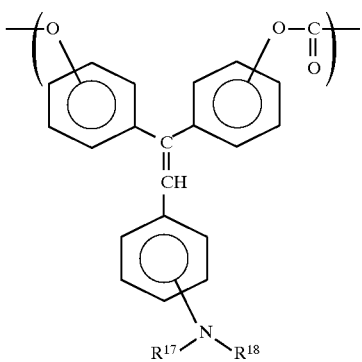

(VI)

wherein $R^{17}$ and $R^{18}$ are as defined above.

In a further preferred embodiment, the polycarbonate contains the following recurring unit:

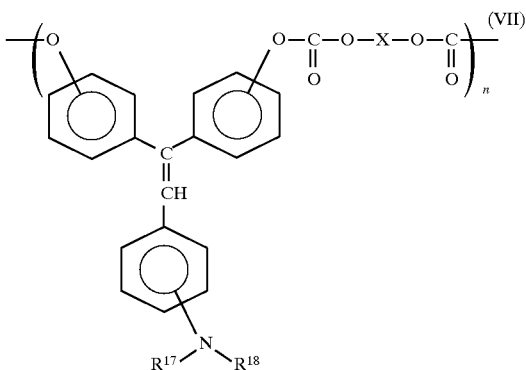

(VII)

wherein $R^{17}$ and $R^{18}$ are as defined above.

The polycarbonate according to the present invention has charge transporting properties and exhibits excellent mechanical properties. In particular, the polycarbonate shows good electrical, optical and mechanical properties and is suitably used for forming a charge transfer layer of an electrophotographic photosensitive medium.

BRIEF DESCRIPTION OF THE DRAWINGS

Other objects, features and advantages of the present invention will become apparent from the detailed description of the preferred embodiments of the invention which follows, when considered in light of the accompanying drawings, in which:

FIG. 41 is an IR spectrum (according to KBr tablet method) of a OH-containing amine (compound No. 27) obtained in Synthesis Example 27;

DETAILED DESCRIPTION OF THE PREFERRED EMBODIMENTS OF THE INVENTION

Figure 1:
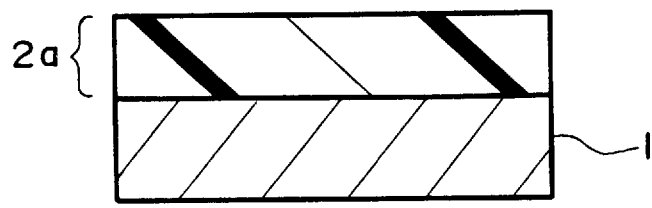
FIG. 1 is a sectional view showing the structure of an electrophotographic photosensitive medium according to a first embodiment of the present invention.

Aromatic polycarbonates according to the present invention can be produced by using known methods for the preparation of polycarbonates, in which bisphenol is polymerized with a carbonate derivative. For example, the aromatic polycarbonate may be prepared by using at least one diol which has charge transporting property and which is represented by the following formula (VIII), (IX) or (X):

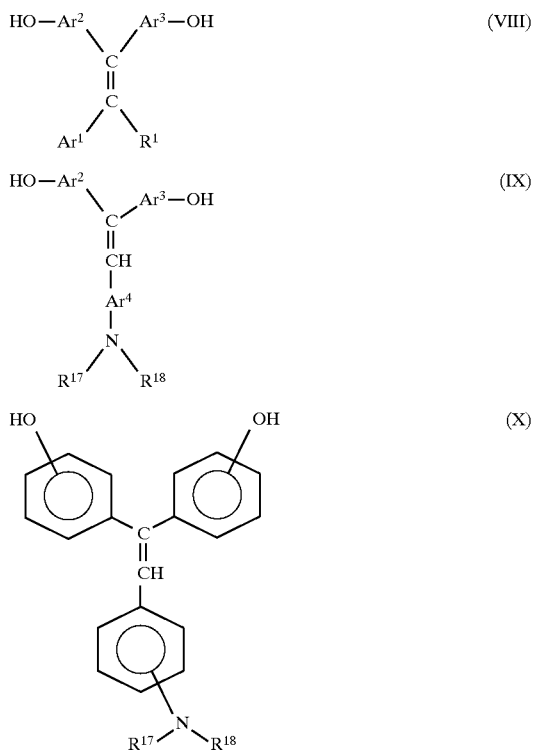

The above diol is subjected to ester interchange with a bisarylcarbonate, to a solution- or interfacial-polymerization reaction with a halogenated carbonyl compound such as phosgene, or to polymerization in the form of a chloroformate such as bischloroformate derived from the diol. As the halogenated carbonyl compound, not only phosgene but also trichloromethyl chloroformate which is a dimer of phosgene and bis(trichloromethyl)carbonate which is a trimer of phosgene are suitably used. Additionally, other halogenated carbonyl compounds such as carbonyl chloride, carbonyl iodide and carbonyl fluoride may also be used. Methods of producing polycarbonates are described in detail in, for example, Handbook of Polycarbonates (edited by Seiichi Honma and published by Nikkan Kogyo Shinbunsha).

If desired, a diol of the formula (XI):

wherein X has the same meaning as above, may be used in conjunction with at least one of the diols of the above formulas (VIII), (IX) and (X).

The aromatic polycarbonate of the present invention may include homopolymers, random copolymers, alternating copolymers, block copolymers, random alternating copolymers or random block copolymers. When a homogeneous mixture containing a diol of the formula (XI) and a diol of the above formula (VIII), (IX) or (X) is subjected to condensation reaction with phosgene, a random copolymer having a structural unit of the formula (I), (IV) or (VI) and a structural unit of the formula (II) may be obtained. When one or more different diols are added after polymerization has proceeded, a random block copolymer may be obtained. When a bischloroformate derived from a diol of the formula (XI) is reacted with a diol of the above formula (VIII), (IX) or (X), an alternating copolymer having a recurring unit of the formula (III), (V) or (VII) may be obtained. An alternating copolymer having a recurring unit of the formula (III), (V) or (VII) may be also obtained by the condensation of a diol of the formula (XI) with a bischloroformate derived from a diol of the formula (VIII), (IX) or (X). By using a plurality of different bischloroformates and diols, a random alternating copolymer may be obtained.

The interfacial polymerization is generally performed by contacting, in the presence of a carbonate compound and a catalyst, an aqueous alkaline solution containing diols with an organic solvent which is substantially immiscible with water and which is capable of dissolving a polycarbonate. When the reaction medium is emulsified with an emulsifier and vigorous stirring, it is possible to obtain a polycarbonate having a narrow molecular weight distribution within a short period of time. An alkali metal or alkaline earth metal compound is generally used for forming the aqueous alkaline solution. Illustrative of suitable alkali metal or alkaline earth metal compound are hydroxides such as sodium hydroxide, potassium hydroxide and calcium hydroxide, and carbonates such as sodium carbonate, potassium carbonate, calcium carbonate and sodium hydrogen carbonate. These compounds may be used by singly or in combination with two or more thereof. Sodium hydroxide and potassium hydroxide are preferably used. The organic solvent may be an aliphatic or aromatic halogenated hydrocarbon such as dichloromethane, 1,2-dichloroethane, 1,2-dichloroethylene, trichloroethane, tetrachloroethane, dichloropropane, chlorobenzene or dichlorobenzene. These solvents may be used singly, in combination with two or more thereof or in conjunction with other aliphatic or aromatic solvent such as toluene, xylene, ethylbenzene, hexane or cyclohexane. Dichloromethane or chlorobenzene is preferably used.

The catalyst for the above reaction may be a tertiary amine, a quaternary ammonium salt, tertiary phosphine, a quaternary phosphonium salt, a nitrogen-containing heterocyclic compound or a salt thereof, iminoether or a salt thereof or an amide-containing compound. Illustrative of suitable catalysts are triethylamine, trimethylamine, tri-n-propylamine, tri-n-hexylamine, N,N,N',N'-tetramethyl-1,4-tetramethylenediamine, 4-pyrrolidinopyridine, N,N'-dimethylpyperidine, N-ethylpyperidine, benzyltrimethylammonium chloride, benzyltriethylammonium chloride, tetramethylammonium chloride, tetraethylammonium bromide, phenyltriethylammonium chloride, triethylphosphine, triphenylphosphine, diphenylbutylphosphine, tetra(hydroxymethyl)phosphonium chloride, benzyltriethylphosphonium chloride, benzyltriphenylphophonium chloride, 4-methylpyridine, 1-methylimidazole, 1,2-dimethylimidazole, 3-methylpyridazine, 4,6-dimethylpyrimidine, 1-cyclohexyl-3,5-dimethylpyrazole and 2,3,5,6-tetramethylpyrazine. These catalysts may be used singly or in combination with two or more thereof. Triethylamine is preferably used.

A polymerization stopper is suitably used for adjusting the molecular weight of the polycarbonate. In this case, the polycarbonate has a terminal end group derived from the stopper. The polymerization stopper may be a monovalent aromatic hydroxy compound, a haloformate of a monovalent aromatic hydroxy compound, a monovalent carboxylic acid or a halide derivative of a monovalent carboxylic acid. Illustrative of monovalent aromatic hydroxy compounds are phenol, p-cresol, o-ethylphenol, p-ethylphenol, p-isopropylphenol, p-tert-butylphenol, p-cumenylphenol, p-cyclohexylphenol, p-octylphenol, p-nonylphenol, 2,4-xylenol, p-methoxyphenol, p-hyxyloxyphenol, p-decyloxyphenol, o-chlorophenol, m-chlorophenol, p-chlorophenol, p-bromophenol, pentabromophenol, pentachlorophenol, p-phenylphenol, p-isopropenylphenol, 2,4-di(1'-methyl-1'-phenylethyl)phenol, α-naphthol, β-naphthol, p-(2',4',4'-trimethylchromanyl)phenol, 2-($'methoxyphenyl)-2-("-hydroxyphenyl)propane and alkali metal and alkaline earth metal salts thereof. Illustrative of suitable monovalent carboxylic acid are fatty acids such as acetic acid, propionic acid, butyric acid, valeric acid, caproic acid, heptanoic acid, caprylic acid, 2,2-dimethylpropionic acid, 3-methylbutyric acid, 3,3-dimethylbutyric acid, 4-methylvaleric acid, 3,3-dimethylvaleric acid, 4-methylcarproic acid and 3,5-dimethylcaproic acid phenoxyacetic acid, alkali metal and alkaline earth metal salts thereof, benzoic acid compounds such as benzoic acid, p-methylbenzoic acid, p-tert-butylbenzoic acid, p-butoxybenzoic acid, p-octyloxybenzoic acid, p-phenylbenzoic acid, p-benzylbenzoic acid and p-chlorobenzoic acid, and alkali metal and alkaline earth metal salts thereof. These stoppers may be used singly or in combination with two or more thereof. The use of phenol, p-tert-butylphenol or p-cumenylphenol is preferred. The number average molecular weight of the aromatic polycarbonate of the present invention is preferably 1,000–500,000, more preferably 10,000–200,000.

A branching agent may be added into the polymerization reaction mixture to improve the mechanical properties of the resulting polycarbonate. The branching agent may be a compound having three or more reactive groups (which may be the same or different) such as aromatic hydroxyl groups, haloformate groups, carboxylic acid groups, carboxylic acid halide groups and active halogen atoms. Illustrative of suitable branching agents are fluoroglucitol, 4,6-dimethyl-2,4,6-tris(4'-hydroxyphenyl)-2-heptene, 4,6-dimethyl-2,4,6-tris(4'-hydroxyphenyl)heptane, 1,3,5-tris(4'-hydroxyphenyl)benzene, 1,1,1-tris(4'-hydroxyphenyl)ethane, 1,1,2-tris(4'-hydroxyphenyl)propane, α,α,α'-tris(4'-hydroxyphenyl)-1-ethyl-4-isopropylbenzene, 2,4-bis[α-methyl-α-(4'-hydroxyphenyl)ethyl]phenol, 2-(4'-hydroxyphenyl)-2-(2", 4"-dihyroxyphenyl)propane, tris(4-hydroxyphenyl) phosphine, 1,1,4,4-tetrakis(4'-hydroxyphenyl)cyclohexane, 2,2-bis[4',4'-bis(4"-hydroxyphenyl)cyclohexyl]propane, α,α,α',α'-tetrakis-1,4-diethylbenzene, 2,2,5,5-tetrakis(4'-hydroxyphenyl)hexane, 1,1,2,3-tetrakis(4'-hydroxyphenyl) propane, 1,4-bis(4',4"-dihydroxyphenylmethyl)benzene, 3,3',5,5'-tetrahydroxydiphenyl ether, 3,5-dihydroxybenzoic acid, 3,5-bis(chlorocarbonyloxy)benzoic acid, 4-hydroxyisophthalic acid, 4-chlorocarbonyloxyisophthalic acid, 5-hydroxyphthalic acid, 5-chlorocarbonyloxyphthalic acid, trimesyl trichloride and cyanuryl chloride. These branching agents may be used singly or in combination with two or more thereof.

If desired, an anti-oxidant such as hydrosulfite may be used for preventing the oxidation of the diols in the alkaline aqueous solution. The polymerization is generally performed at a temperature of 0°–40° C., at a pH of 10 or more for 2 minutes to 5 hours.

The solution polymerization is generally carried out by reacting a solvent solution of diols with bischloroformate, phosgene or a dimer or trimer of phosgene in the presence of an deacidification agent such as trimethylamine, triethylamine, tripropylamine or the like tertiary amine or pyridine. The solvent may be a halogenated hydrocarbon such as dichloromethane, dichloroethane, trichloroethane, tetrachloroethane, trichloroethylene or choloroform, a cyclic ether such as tetrahydrofuran or dioxane or pyridine. If desired, a polymerization stopper and/or a branching agent such as those described above with reference to the interfacial polymerization may be used. The solution polymerization is generally performed at a temperature of 0°–40° C. for 2 minutes to 5 hours.

In the case where the aromatic carbonate is prepared according to the ester interchange method, a mixture of the diol compound with a bisarylcarbonate is reacted in an inert gas atmosphere at a temperature of 120°–350° C. under a reduced pressure. During the reaction, the degree of vacuum in the reaction system is stepwise increased up to a final pressure of 1 mmHg or lower so that the phenol produced in situ is removed from the reaction system. The reaction time is normally 1 to 4 hours. Further, a polymerization stopper or an antioxidant may be added to the reaction mixture, if desired. Examples of the suitable bisarylcarbonates may include diphenylcarbonate, di-p-tolylcarbonate, phenyl-p-tolylcarbonate, di-p-chlorophenylcarbonate and dinaphtyl-carbonate.

The aromatic polycarbonate obtained by the foregoing polymerization methods is preferably used after the removal of the catalyst, antioxidizing agent, unreacted diol, polymerization stopper and by-products such as inorganic salts by any known method such as disclosed in the above-mentioned Handbook of Polycarbonates (edited by Seiichi Honma and published by Nikkan Kogyo Shinbunsha). The polycarbonate product may be mixed with one or more additives such as an antioxidant, a light stabilizer, a heat stabilizer, a lubricant and a plasticizer, if desired.

The structural unit of the formula (I) of the aromatic polycarbonate according to the present invention is described in more detail below.

In the formula (I), $R^1$ is a hydrogen atom, an alkyl group, a substituted alkyl group, an aryl group or a substituted aryl group.

The alkyl group and substituted alkyl group represented by $R^1$ may be a branched or linear alkyl group having 1–5 carbon atoms, such as methyl, ethyl, n-propyl, i-propyl, t-butyl, s-butyl, n-butyl, i-butyl, trifluoromethyl, 2-cyanoethyl, benzyl, 4-chlorobenzyl or 4-methylbenzyl.

The aryl group and substituted aryl group represented by $R^1$ may be, for example, phenyl, naphthyl, biphenylyl, terphenylyl, pyrenyl, fluorenyl, 9,9-dimethyl-2-fluorenyl, azrenyl, anthryl, triphenylenyl, crycenyl, fluorenylidenephenyl, 5H-dibenzo[a,d] cycloheptenylidenephenyl, thienyl, benzothienyl, furyl, benzofuranyl, carbazolyl, pyridinyl, pyrrolidyl or oxazolyl. These aryl groups may contain one or more substituents such as (1) alkyl and substituted alkyl groups as exemplified above, (2) alkoxy groups having alkyl and substituted alkyl groups as exemplified above, (3) halogen atoms such as a fluorine atom, a chlorine atom, a bromine atom and an iodine atom and (4) an amine of the formula —$NR^{19}R^{20}$ wherein $R^{19}$ and $R^{20}$ independently represent alkyl group and substituted alkyl group as defined with respect to $R^1$ or aryl group and substituted aryl group as defined with respect to $R^1$. In this case, $R^{19}$ and $R^{20}$ may be bonded to each other to form a cyclic group such as a piperidino group, a morpholino group or julolidino group.

In the formula (I), $Ar^1$ is an aryl group or a substituted aryl group such as a group represented by the formula (XII) below or a monovalent group derived from a heterocyclic group with an amine structure. The heterocyclic group-derived monovalent group may be for example pyrrole, pyrazole, imidazole, triazole, dioxazole, indole, iso-indole, benzimdazole, benzotriazole, benzoisoxazine, carbazole or phenoxazine. These heterocyclic group-derived monovalent groups may have substituents such as an alkyl group and a substituted alkyl group as defined with respect to $R^1$, an aryl group and a substituted aryl group as defined with respect to $R^1$ or a halogen atom such as a fluorine atom, a chlorine atom, a bromine atom and an iodine atom.

wherein $R^{17}$ and $R^{18}$ independently an acyl group, a substituted and unsubstituted alkyl group or a substituted and unsubstituted aryl group, $Ar^4$ represents a substituted or unsubstituted arylene group and h is an integer of 1–3. The acyl group of $R^{17}$ and $R^{18}$ may be an acetyl group, a propionyl group or a benzoyl group. The substituted and unsubstituted alkyl and aryl groups of $R^{17}$ and $R^{18}$ may be similar to those defined with respect to $R^1$. Further, the aryl group of $R^{17}$ and $R^{18}$ may be a group of the formula (XIII):

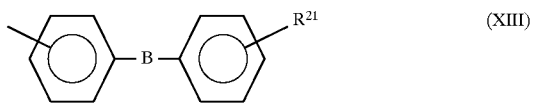

wherein $R^{21}$ represents a hydrogen atom, a halogen atom, an alkoxy group, a substituted or unsubstituted alkyl group similar to that defined with respect to $R^1$, a substituted or unsubstituted aryl group similar to that defined with respect to $R^1$, an amino group, a nitro group or a cyano group, and B is a divalent group such as —O—, —S—, —SO—, —SO$_2$—, —CO—, —(CH$_2$)$_i$— where i is an integer of 1–12, or —(CH=CR$^{22}$)$_j$— where $R^{22}$ represents a hydrogen atom, a substituted or unsubstituted alkyl group similar to that defined with respect to $R^1$ or a substituted or unsubstituted aryl group similar to that defined with respect to $R^1$ and j is an integer of 1–3.

Examples of the alkoxy groups of $R^{21}$ include methoxy, ethoxy, n-propoxy, i-propoxy, t-butoxy, n-butoxy, s-butoxy, i-butoxy, 2-hydroxyethoxy, 2-cyanoethoxy, benzyloxy, 4-methylbenzyloxy and trifluoromethoxy. Examples of the halogen atoms of $R^{21}$ include a fluorine atom, a chlorine atom, a bromine atom and an iodine atom. The amino group of $R^{21}$ may be —NR$^{19}$R$^{20}$ wherein $R^{19}$ and $R^{20}$ are as defined above. The arylene group $Ar^4$ may be a group derived from the substituted or unsubstituted aryl group defined with respect to $R^1$.

In the formula (I), $Ar^2$ and $Ar^3$ are independently selected from substituted and unsubstituted arylene groups. The substituted and unsubstituted arylene groups may be those derived from the substituted and unsubstituted aryl groups defined with respect to $R^1$.

Illustrative of suitable structural units represented by the formula (I) are as follows:

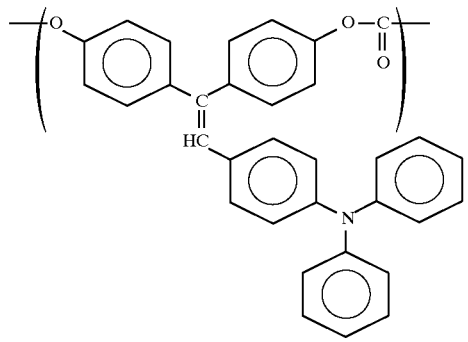

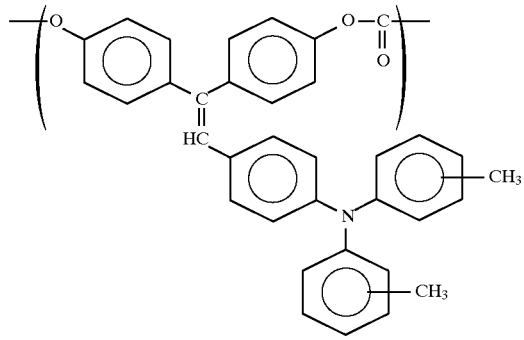

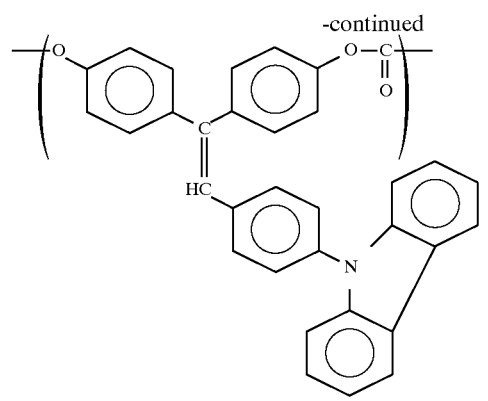
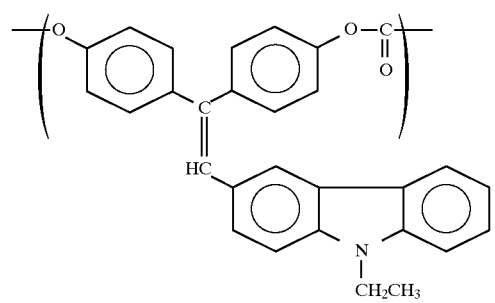
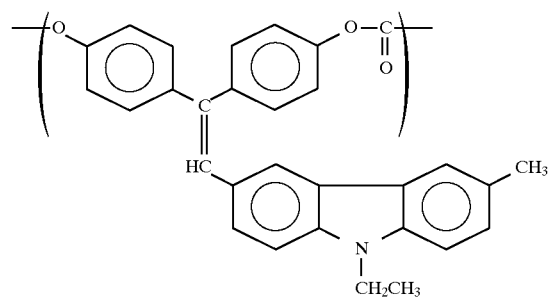
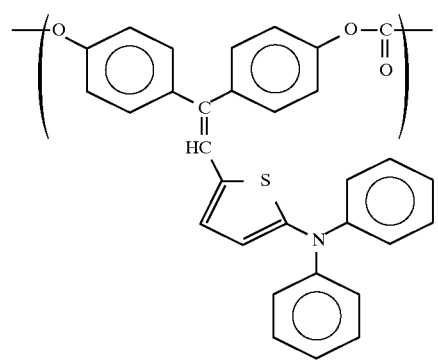
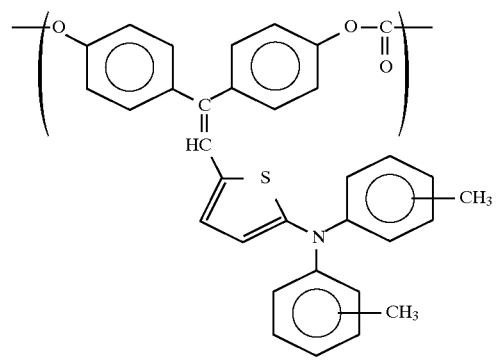

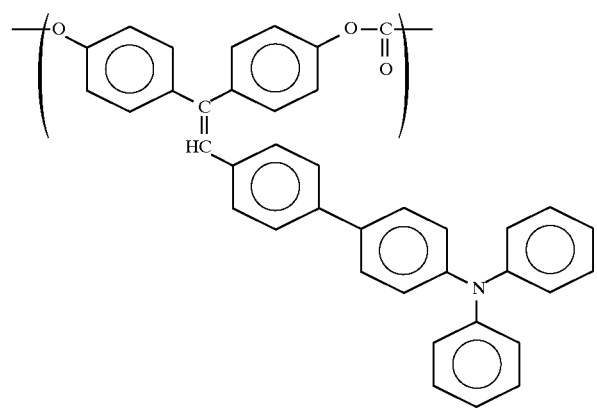
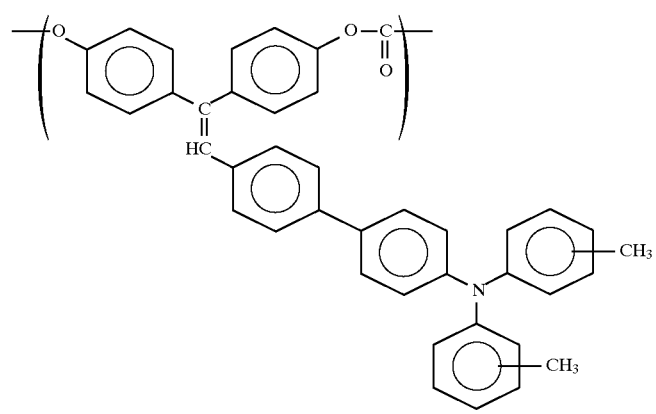
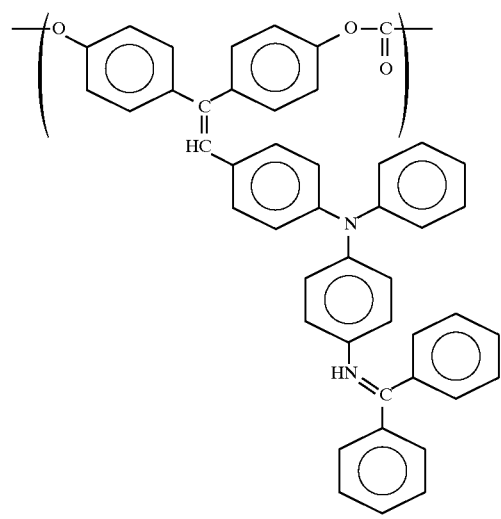

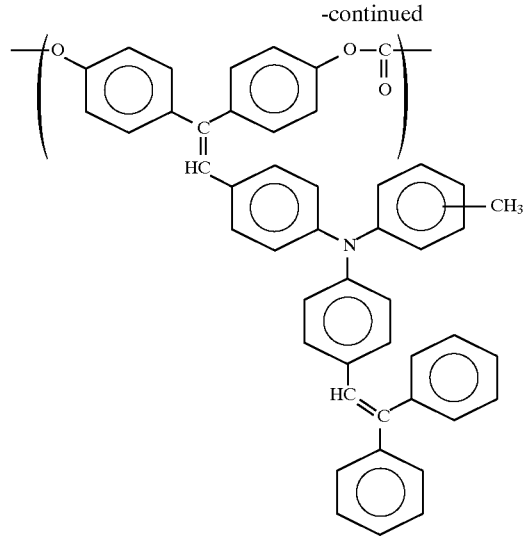
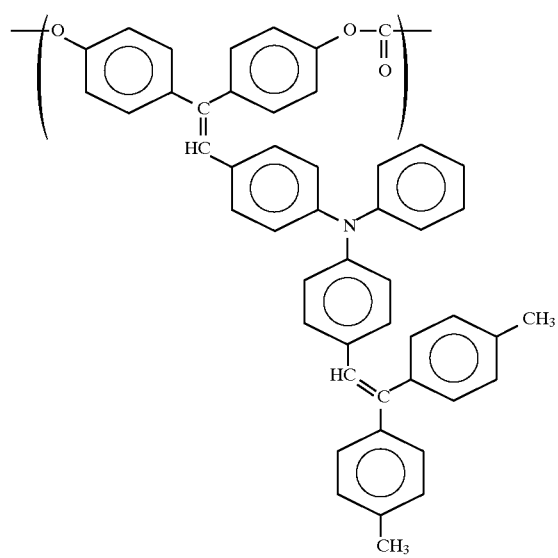
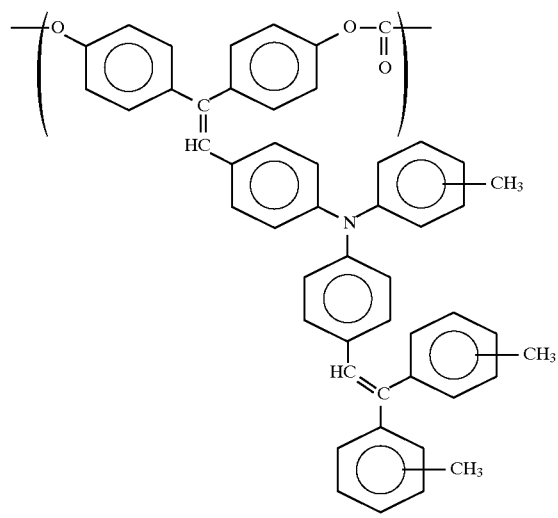

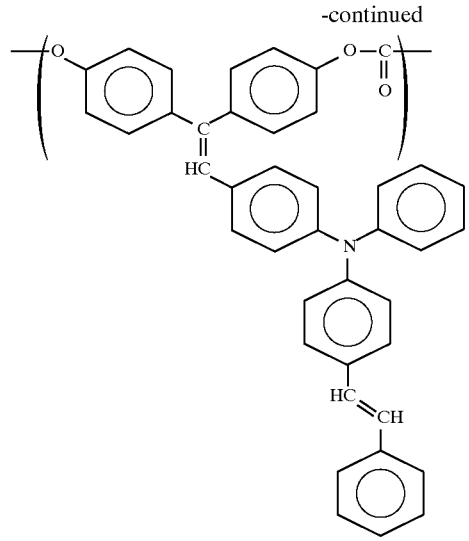
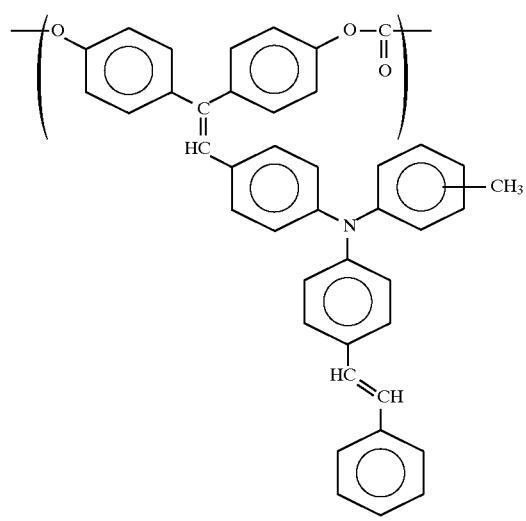
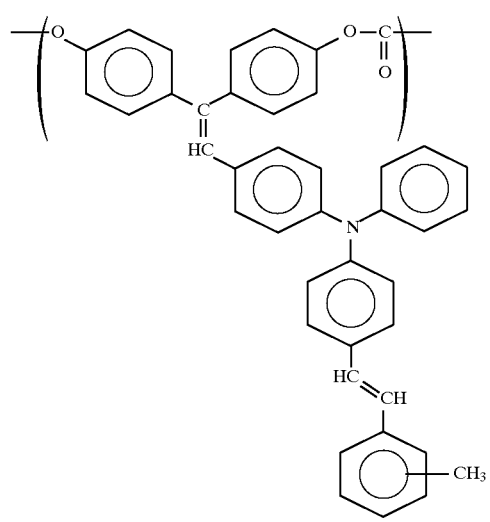

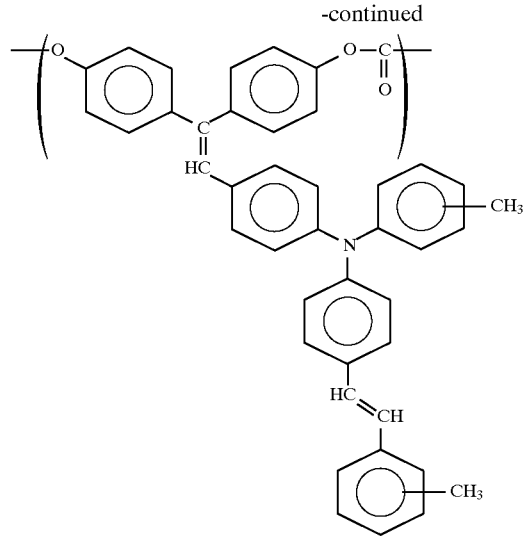
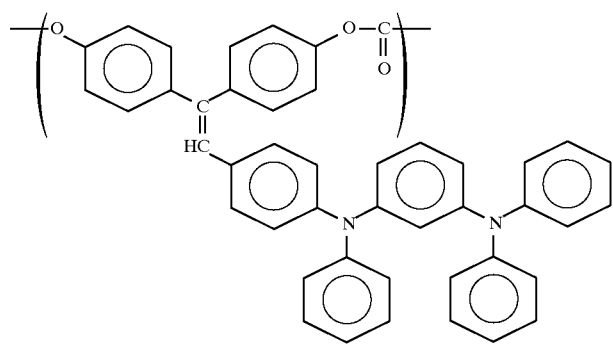
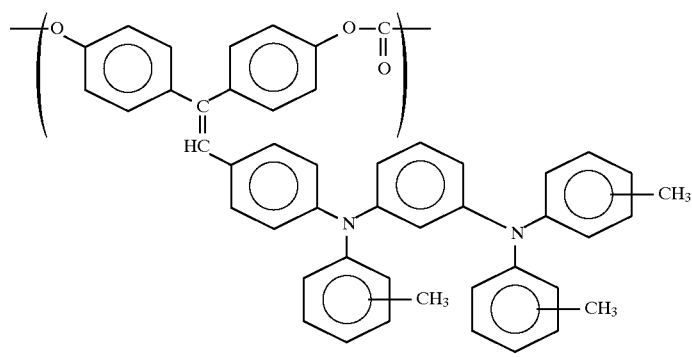

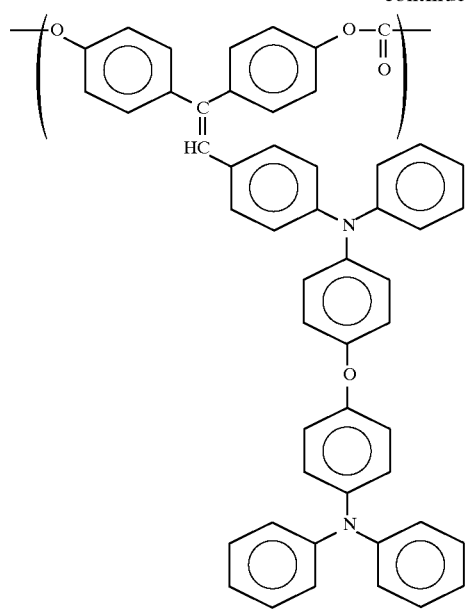
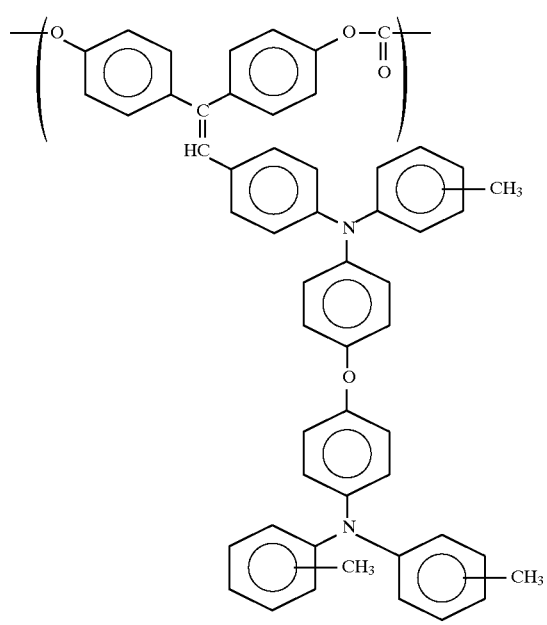
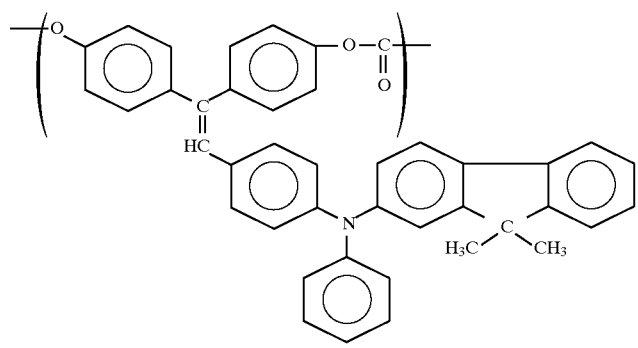

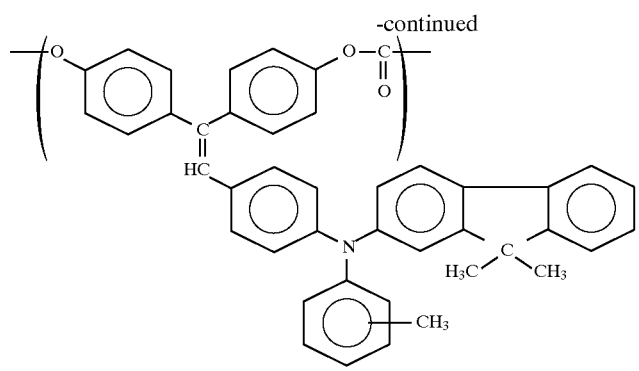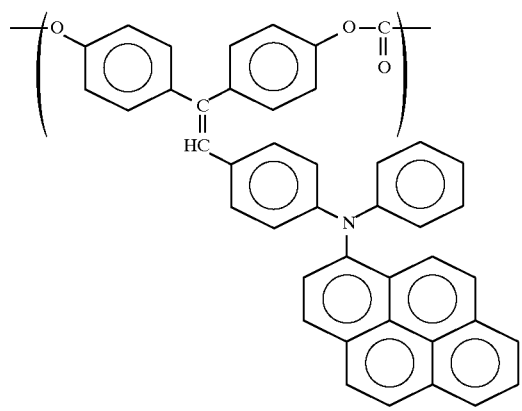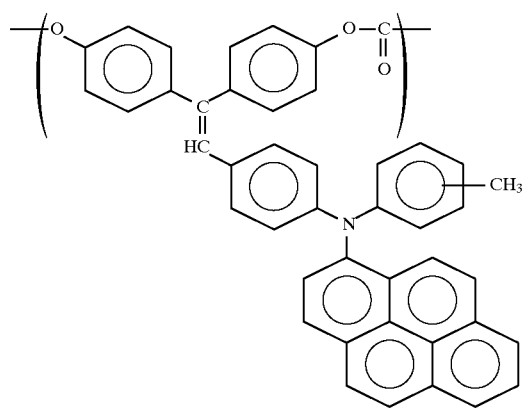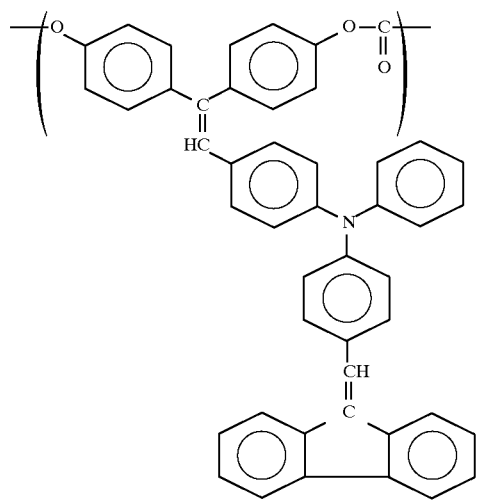

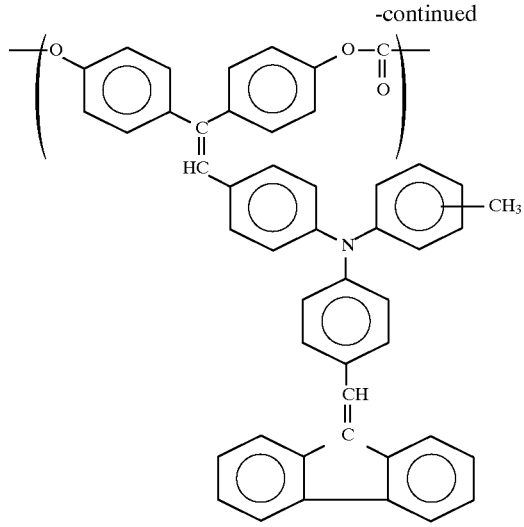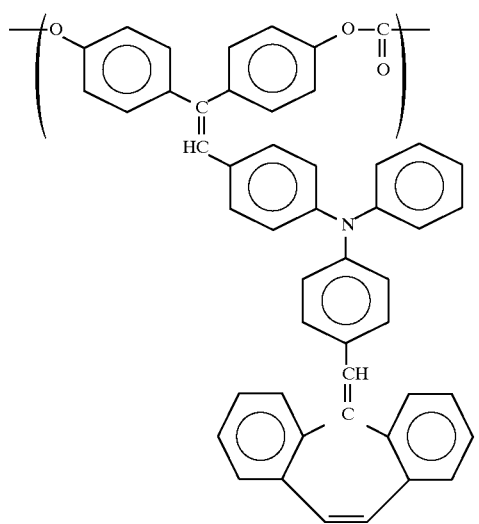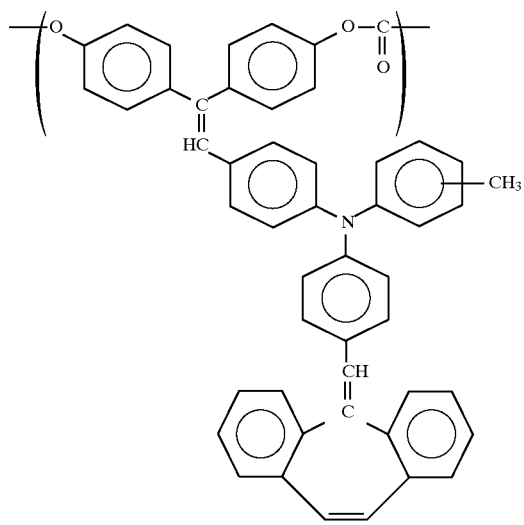

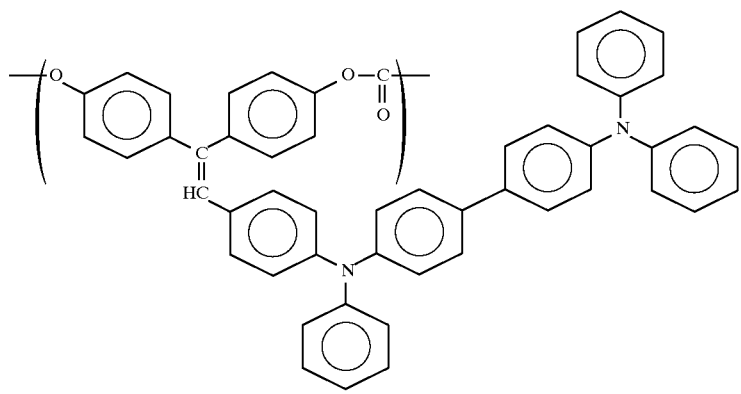
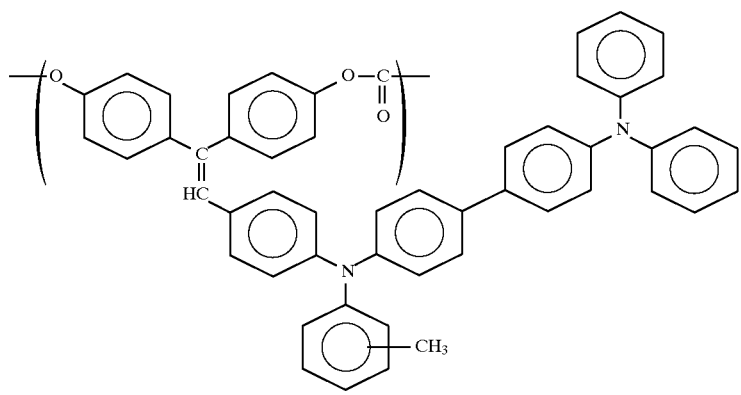
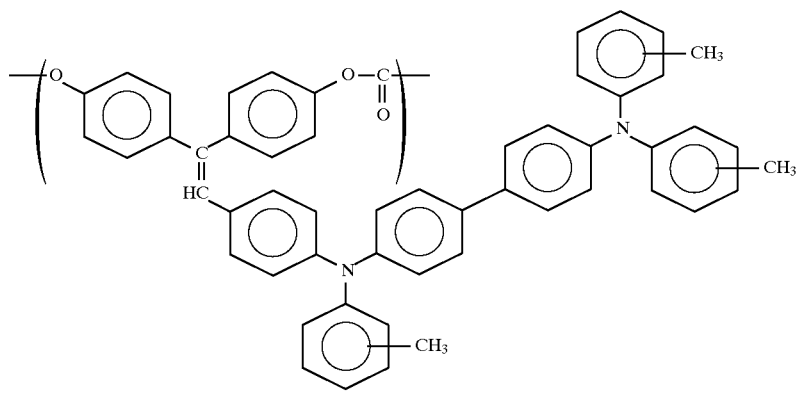
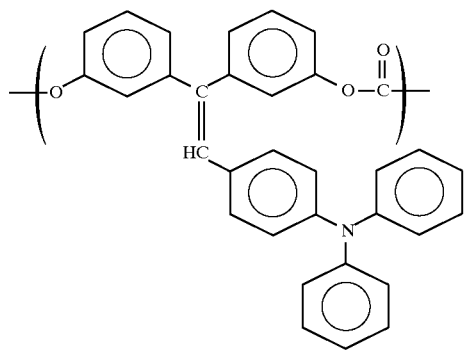

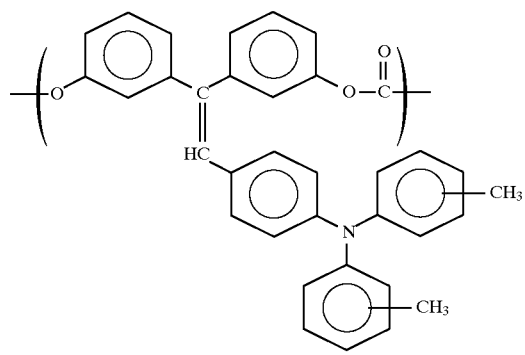
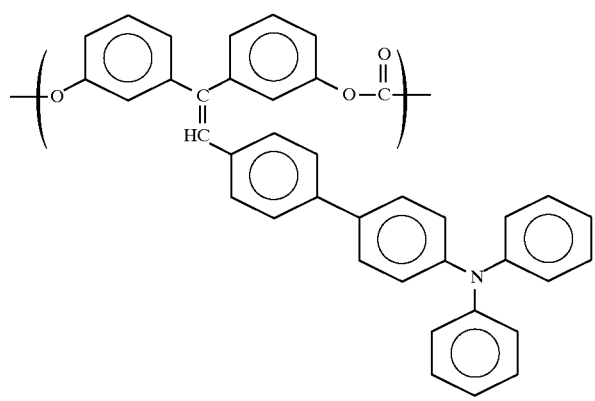
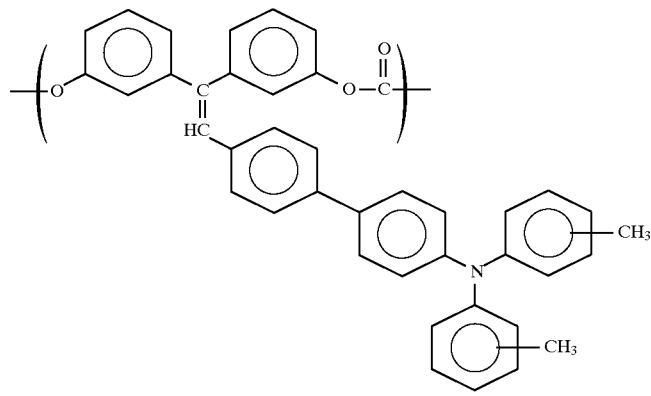
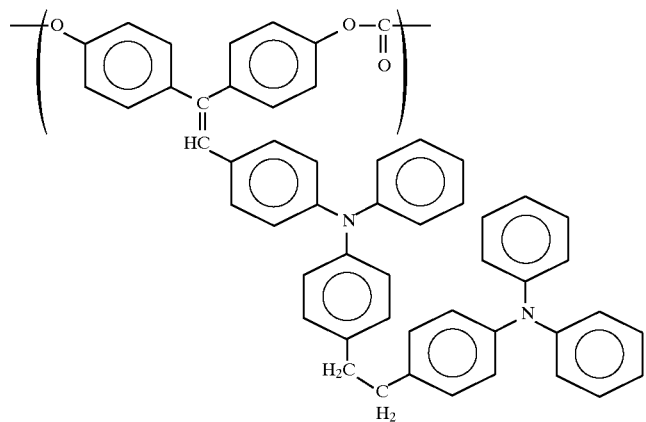

-continued

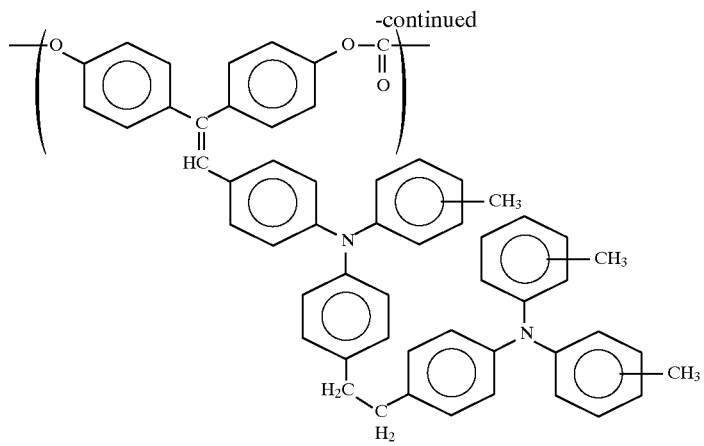

The diol compounds of the general formula (VIII), (IX) and (X) which are used as raw material monomers for the novel aromatic polycarbonate according to the present invention are also novel compounds. The diol of the general formula (VIII) can be produced by a cleavage reaction of an ether or ester group of a stilbene compounds of the formula (XVI) obtained by the reaction of a phosphonic acid ester of the formula (XIV) with a carbonyl compound of the formula (XV):

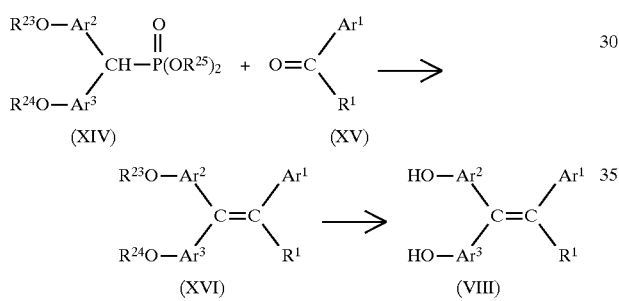

wherein $Ar^1$, $Ar^2$ and $Ar^3$ have the same meanings as defined above, $R^{23}$ and $R^{24}$ are independently an unsubstituted or substituted alkyl group similar to that defined with respect to $R^1$, or the same acyl group as defined with respect to $R^{17}$ and $R^{18}$ and R25 is a lower alkyl, preferably a linear or branched alkyl having 1–5 carbon atoms such as methyl, ethyl, n-propyl, i-propyl, t-butyl, s-butyl, i-butyl or n-pentyl.

Diols expressed by the above formulas (IX) and (X) may be prepared using the corresponding phosphonic ester and the corresponding carbonyl compound in the same manner as that for the production of the diol of the formula (VIII).

As described above, in conduction with the monomer of the formula (VIII), (IX) or (X), the known monomer of the formula (XI) may be used for the production of the aromatic polycarbonate represented by the formula (II) of the present invention.

Examples of diols of the formula (XI) in which X is (a) a divalent aliphatic or (b) alicyclic group include ethylene glycol, diethylene glycol, triethylene glycol, polyethylene glycol, polytetramethylene ether glycol, 1,3-propane diol, 1,4-butane diol, 1,5-pentane diol, 1,6-hexane diol, 1,8-octane diol, 1,10-decane diol, 2-methyl-1,3-propane diol, 2,2-dimethyl-1,3-propane diol, 2-ethyl-1,3-propane diol, diethylene glycol, triethylene glycol, polyethylene glycol or polytetramethylene ether glycol, alicyclic diols such as 1,4-cyclohexane diol, 1,3-cyclohexane diol, cyclohexane-1,4-dimethanol, 2,2-bis(4-hydroxycyclohexyl)propane, xylylene diol, 1,4-bis(2-hydroxyethyl)benzene, 1,4-bis(3-hydroxypropyl)benzene, 1,4-bis(4-hydroxybutyl)benzene, 1,4-bis(5-hydroxypentyl)benzene and 1,4-bis(6-hydroxyhexyl)benzene.

Examples of diols of the formula (XI) in which X is (c) a divalent aromatic group include those derived from the substituted and unsubstituted aryl groups defined with respect to $R^1$. The divalent aromatic group represented by X may also be (d) a divalent group of the formula:

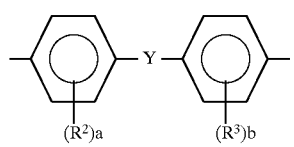

where $R^2$ and $R^3$ are independently selected from substituted and unsubstituted alkyl groups, substituted and unsubstituted aryl groups and a halogen atom, a and b are each an integer of 0 to 4 and Y is selected from the group consisting of a direct bond, a linear alkylene group having 2 to 12 carbon atoms, —O—, —S—, —SO—, —SO$_2$—, —CO—, —CO—O—$Z^1$—O—CO— where $Z^1$ is selected from the group consisting of substituted and unsubstituted divalent aliphatic groups and substituted and unsubstituted divalent arylene groups, —CO—$Z^2$—CO— where $Z^2$ is selected from the group consisting of substituted and unsubstituted divalent aliphatic groups and substituted and unsubstituted divalent arylene group,

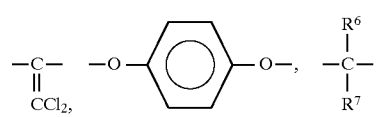

where $R^6$ and $R^7$ are independently selected from the group consisting of a hydrogen atom, a halogen atom, substituted and unsubstituted alkyl groups having 1–5 carbon atoms, substituted and unsubstituted alkoxy groups having 1–5 carbon atoms, substituted and unsubstituted aryl groups and a group coupled with at least one of $R^2$ and $R^3$ to form a cyclic or heterocyclic structure and may link with each other to form a cyclic or heterocyclic structure with 5–12 carbon atoms,

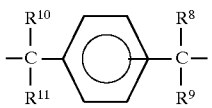

where $R^8$, $R^9$, $R^{10}$ and $R^{11}$ are independently selected from the group consisting of a hydrogen atom, a halogen atom, substituted and unsubstituted alkyl groups having 1–5 carbon atoms, substituted and unsubstituted alkoxy groups having 1–5 carbon atoms and substituted and unsubstituted aryl groups,

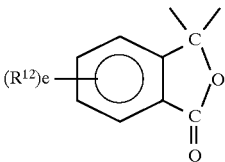

where $R^{12}$ is selected from the group consisting of a hydrogen atom, a halogen atom, substituted and unsubstituted alkyl groups having 1–5 carbon atoms, substituted and unsubstituted alkoxy groups having 1–5 carbon atoms and substituted and unsubstituted aryl groups and e is an integer of 0–4,

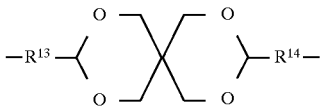

where $R^{13}$ and $R^{14}$ are independently selected from the group consisting of a direct bond and an alkylene group having 1–4 carbon atoms and

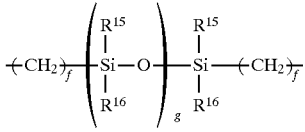

where $R^{15}$ and $R^{16}$ are independently selected from the group consisting of substituted and unsubstituted alkyl groups having 1–5 carbon atoms and substituted and unsubstituted aryl groups, f is an integer of 0–20 and g is an integer of 0–2,000, and (e) a divalent group of the formula:

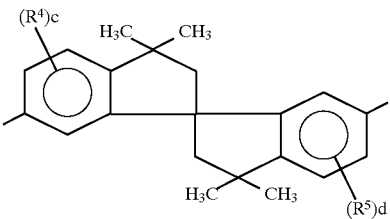

where $R^4$ and $R^5$ are independently selected from substituted and unsubstituted alkyl groups, substituted and unsubstituted aryl groups and a halogen atom, c and d are each an integer of 0 to 3.

In the divalent aromatic groups (d) and (e) above, the alkyl group, substituted alkyl group, aryl group and substituted aryl group may be those as defined with respect to $R^1$ and the halogen atom may be a fluorine atom, a chlorine atom, a bromine atom or an iodine atom. The substituted and unsubstituted aliphatic groups represented by $Z^1$ and $Z^2$ may be similar to those defined with respect to X. The substituted and unsubstituted arylene groups represented by $Z^1$ and $Z^2$ may be those derived from the substituted and unsubstituted aryl groups defined with respect to $R^1$.

Examples of diols of the formula (XI) in which X is an aromatic divalent group include bis(4-hydroxyphenyl) methane, bis(2-methyl-4-hydroxyphenyl)methane, bis(3-methyl-4-hydroxyphenyl)methane, 1,1-bis(4-hydroxyphenyl)ethane, 1,2-bis(4-hydroxyphenyl)ethane, bis (4-hydroxyphenyl)phenylmethane, bis(2-methyl-4-hydroxyphenyl)diphenylmethane, 1,1-bis(4-hydroxyphenyl)-1-phenylethane, 1,3-bis(4-hydroxyphenyl)-1,1-dimethylpropane, 2,2-bis(4-hydroxyphenyl)propane, 2-(4-hydroxyphenyl)-2-(3-hydroxyphenyl)propane, 1,1-bis (4-hydroxyphenyl)-2-methylpropane, 2,2-bis(4-hydroxyphenyl)butane, 1,1-bis(4-hydroxyphenyl)-3-methylbutane, 2,2-bis(4-hydroxyphenyl)pentane, 2,2-bis(4-hydroxyphenyl)-4-methylpentane, 2,2-bis(4-hydroxyphenyl)hexane, 2,2-bis(4-hydroxyphenyl)heptane, 2,2-bis(4-hydroxyphenyl)nonane, bis(3,5-dimethyl-4-hydroxyphenyl)methane, 2,2-bis(3-methyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-tert-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-phenyl-4-hydroxyphenyl)propane, 2,2-bis(3,5-dimethyl-4-hydroxyphenyl)propane, 2,2-bis(3-chloro-4-hydroxyphenyl)propane, 2,2-bis(3,5-dichloro-4-hydroxyphenyl)propane, 2,2-bis(3-bromo-4-hydroxyphenyl)propane, 2,2-bis(3,5-dibromo-4-hydroxyphenyl)propane, 2,2-bis(4-hydroxyphenyl) hexafluoropropane, 1,1-bis(4-hydroxyphenyl)cyclopentane, 1,1-bis(4-hydroxyphenyl)cyclohexane, 1,1-bis(3-methyl-4-hydroxyphenyl)cyclohexane, 1,1-bis(3,5-dimethyl-4-hydroxyphenyl)cyclohexane, 1,1-bis(3,5-dichloro-4-hydroxyphenyl)cyclohexane, 1,1-bis(4-hydroxyphenyl)-3,3,5-trimethylcyclohexane, 1,1-bis(4-hydroxyphenyl) cycloheptane, 2,2-bis(4-hydroxyphenyl)norbornane, 2,2-bis (4-hydroxyphenyl)adamantane, 4,4'-dihydroxydiphenyl ether, 4,4'-dihydroxy-3,3'-dimethyldiphenyl ether, ethylene glycol bis(4-hydroxyphenyl) ether, 4,4'-dihydroxydiphenylsulfide, 3,3'-dimethyl-4,4'-dihydroxydiphenylsulfide, 3,3',5,5'-tetramethyl-4,4'-dihydroxydiphenylsulfide, 4,4'-dihydroxydiphenylsulfoxide, 3,3'-dimethyl-4,4'-dihydroxydiphenylsulfoxide, 4,4'-dihydroxydiphenylsulfone, 3,3'-dimethyl-4,4'-dihydroxydiphenylsulfone, 3,3'-dichloro-4,4'-dihydroxydiphenylsulfone, bis(4-hydroxyphenyl) ketone, bis(3-methyl-4-hydroxyphenyl) ketone, 3,3,3',3'-tetramethyl-6,6'-dihydroxyspiro(bis)indane, 3,3',4,4'-tetrahydro-4,4,4',4'-tetramethyl-2,2'-spirobis(2H-1-benzopyrane)-7,7'-diol, trans-2,3-bis(4-hydroxyphenyl)-2-butene, 9,9-bis(4-hydroxyphenyl)fluorene, 9,9-bis-(4-hydroxyphenyl)xanthene, 1,6-bis(4-hydroxyphenyl)-1,6-hexanedione, α,α,α',α'-tetramethyl-α,α'-bis(4-hydroxyphenyl)-p-xylene, α,α,α',α'-tetramethyl-α,α'-bis (4-hydroxyphenyl)-m-xylene, 2,6-dihydroxybenzo-p-dioxine, 2,6-dihydroxythianthrene, 2,7-dihydroxyphenoxthathine, 9,10-dimethyl-2,7-dihydroxyphenazine, 3,6-dihydroxybenzofurane, 3,6-dihydroxybenzothiophene, 4,4'-dihydroxybiphenyl, 1,4-dihydroxynaphthalene, 2,7-dihydroxypyrene, hydroquinone, resolsine, ethylene glycol bis(4-hydroxybenzoate), diethylene glycol bis(4-hydroxybenzoate), triethylene glycol bis(4- hydroxybenzoate), 1,3-bis(4-hydroxyphenyl) tetramethyldisiloxane and phenol-modified silicone oil. An ester-containing aromatic diol obtained by reaction of 2 moles of a diol with 1 mole of isophthaloyl chloride or terephthaloyl chloride may also be suitably used.

In the polycarbonate containing both of the structural units of the formulas (I) and (II), the content of the structural unit (I) is preferably at least 5 mole %, more preferably at least 20 mole %, based on the total mole of the units (I) and (II) for reasons of charge transporting property of the polycarbonate.

Next, preferred embodiments of an electrophotographic photosensitive medium according to the present invention will be described by referring to FIGS. 1 to 6.

Referring now to FIG. 1, there is illustrated an electrophotographic photosensitive medium according to a first embodiment of the present invention. The photosensitive medium comprises a conductive substrate 1 and a photosensitive layer 2a formed on the conductive substrate 1. The photosensitive layer 2a is composed of a sensitizing dye, an aromatic polycarbonate and, if desired, a binder resin. Here, the aromatic polycarbonate functions as a photoconductive material which serves for generating and transporting an electric charge carrier to effect a light attenuation. However, since the aromatic polycarbonate exhibits almost no absorption of light of a visible wavelength region, it is necessary to increase the sensitivity of the photosensitive medium by adding the sensitizing dye capable of absorbing the visible ray in order to form a latent image upon radiation with the visible light.

In the preparation of the photosensitive medium as shown in FIG. 1, one or more aromatic polycarbonates are dissolved in a solvent. At this time, a binder resin can be added to the solution, if desired. A sensitizing dye is then added to the solution. The solution thus prepared is coated on the conductive substrate 1 and dried to form the photosensitive layer 2a. The photosensitive layer 2a has a thickness of 3 to 50 μm, preferably 5 to 40 μm. The content of the aromatic polycarbonate is in the range of 30 to 100% by weight based on the total weight of the photosensitive layer 2a. The sensitizing dye is contained in the range of 0.1 to 5% by weight, preferably 0.5 to 3% by weight, based on the total weight of the photosensitive layer 2a. Examples of the suitable sensitizing dyes include triaryl methane dyes such as brilliant green, Victoria blue B, methyl violet, crystal violet or acid violet 6B, xanthene dyes such as rhodamine B, rhodamine 6G, rhodamine G extra, eosin S, erythrocin, rose Bengal or fluorescein, thiazine dyes such as methylene blue, or cyanine dyes such as cyanine.

Figure 2:
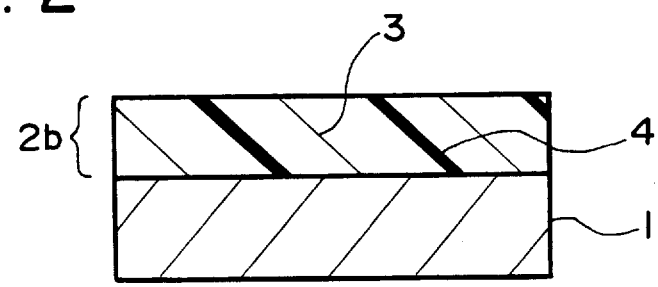
FIG. 2 is a sectional view showing the structure of an electrophotographic photosensitive medium according to a second embodiment of the present invention.

In FIG. 2, there is illustrated an electrophotographic photosensitive medium according to a second embodiment of the present invention. The photosensitive medium also includes the conductive substrate 1 and a photosensitive layer 2b formed on the conductive substrate 1. The photosensitive layer 2b contains a charge-generating material 3 dispersed in a charge-transporting material 4 composed of the aromatic polycarbonate solely or a mixture of the aromatic polycarbonate and a binder resin. The charge-generating material 3 may be an inorganic or organic pigment capable of generating an electric charge carrier. In this case, the charge-transport material 4 has functions of receiving and transporting the electric charge carrier generated by the charge-generating material 3. In such a photosensitive medium, it is essential that a wave-length range of the visible light absorbed by the charge-generating material 3 is not overlapped with that by the aromatic polycarbonate used as the charge-transport material, since the radiated light is required to reach the surface of the charge-generating material 3 through the charge-transport material 4 such that the electric charge carrier can be effectively generated from the charge-generating material 3. The aromatic polycarbonate according to the present invention scarcely absorbs light with a wave length of 600 nm or more and can exhibit an excellent charge-transporting property when used in combination with the charge-generating material 3 capable of generating an electric charge carrier upon the absorption of light of a visible region to a near infrared region. Incidentally, the charge-transport material 4 may contain a low molecular charge-transport substance.

In the preparation of the photosensitive medium as shown in FIG. 2, one or more aromatic polycarbonates are dissolved in a solvent with or without a binder resin. Fine particles of the charge-generating material 3 are then dispersed in the solution. The resultant dispersion is applied onto the conductive substrate 1 and dried to obtain the photosensitive layer 2b.

The photosensitive layer 2b has a thickness of 3 to 50 μm, preferably 5 to 40 μm. The content of the aromatic polycarbonate as the charge-transport material 4 is in the range of 40 to 100% by weight based on the total weight of the photosensitive layer 2b. Further, the content of the charge-generating material 3 is in the range of 0.1 to 50% by weight, preferably 1 to 20% by weight, based on the total weight of the photosensitive layer 2b. The charge-generating materials may be inorganic or organic pigments. Examples of the inorganic pigments suitable for the charge-generating material 3 include selenium, selenium-tellurium, cadmium sulfide, cadmium sulfide-selenium or a-silicon. Examples of the suitable organic pigments include azo pigments such as CI pigment blue 25 (Color Index (CI) 21180), CI pigment red 41 (CI21200), CI acid red 52 (CI45100), CI basic red 3 (CI45210), or other azo dyes containing a carbazole skeleton as disclosed in JP-A-53-95033, a distyrylbenzene skeleton as disclosed in JP-A-53-133445, a triphenylamine skeleton as disclosed in JP-A-53-132347, a benzothiophene skeleton as disclosed in JP-A-54-21728, an oxadiazole skeleton as disclosed in JP-A-54-12742, a fluorescenone skeleton as disclosed in JP-A-54-22824, a bisstilbene skeleton as disclosed in JP-A-54-17733, a distyryloxadiazole skeleton as disclosed in JP-A-54-2129 or a distyrylcarbazole skeleton as disclosed in JP-A-54-14967, phthalocyanine pigments such as CI pigment blue 16 (CI74100), indigo-based pigments such as CI vat brown 5 (CI73410) or CI vat dye (CI73030), or perylene-based pigments such as argo-scarlet B or indanthrene scarlet R both manufactured by Bayer AG. These charge-generating materials can be used singly or in combination.

Figure 3:
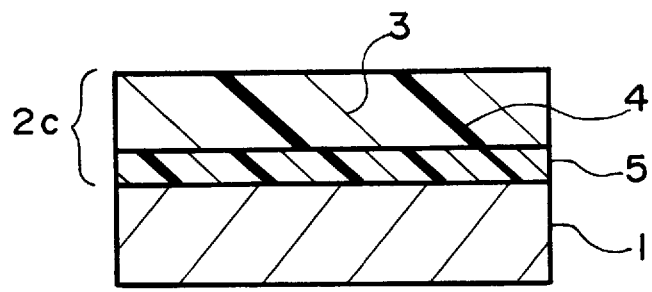
FIG. 3 is a sectional view showing the structure of an electrophotographic photosensitive medium according to a third embodiment of the present invention.

In FIG. 3, there is illustrated an electrophotographic photosensitive medium according to a third embodiment of the present invention, which also includes the conductive substrate 1 and a photosensitive layer 2c formed on the conductive substrate 1. The photosensitive layer 2c is provided with a charge-generating layer 5 composed mainly of the charge-generating material 3 and a charge-transport layer 4 laminated over the charge-generating layer 5 and composed of the aromatic polycarbonate according to the present invention. When the photosensitive layer 2c is irradiated with light, the light transmits through the charge-transport layer 4 and reaches the charge-generating layer 5 whereby charge carriers are generated from the charge-generating layer 5. The charge carriers generated are received and transported by the charge-transport layer 4, so that attenuation of the light radiated can be performed effectively. The mechanism of the light attenuation obtained by the electrophotographic photosensitive medium of this embodiment is the same as described in FIG. 2 above.

Meanwhile, the charge-transport layer 4 may be composed of only an aromatic polycarbonate acceding to the present invention or a combination of the aromatic polycarbonate and a binder resin. In order to enhance the charge-generating efficiency, the aromatic polycarbonate of the present invention can be also incorporated into the charge-generating layer 5. The photosensitive layer 2c may further contain a low-molecular charge-transport material.

The photosensitive medium shown in FIG. 3 can be produced in the following manner. The charge-generating material may be vacuum-deposited on the conductive substrate 1 to form the charge-generating layer 5 of the photosensitive layer 2c. Alternatively, finely pulverized particles of the charge-generating material 3 is dispersed in an adequate solvent, in which a binder resin is dissolved, if desired. The dispersion is coated on the conductive substrate 1 and dried to form the charge-generating layer 5. If required, the charge-generating layer 5 can be further treated by buffing for polishing a surface thereof and adjusting a thickness thereof. A solution composed of one or more aromatic polycarbonates with or without a binder resin is then coated over the thus-treated charge-generating layer 5 to form the charge-transporting layer 4. Examples of the suitable charge-generating materials for the charge-generating layer 5 of the photosensitive layer 2c may be the same as those used to form the photosensitive layer 2a as shown in FIG. 1.

The thickness of the charge-generating layer 5 of the photosensitive layer 2c is not more than 5 μm, preferably not more than 2 μm. The thickness of the charge-transport layer 4 of the photosensitive layer 2c is in the range of 3 to 50 μm, preferably 5 to 40 μm. In the event that the charge-generating layer 5 is prepared by coating the dispersion composed of finely pulverized charge-generating material 3 and the binder resin, the content of the finely pulverized charge-generating material 3 is in the range of 10 to 100% by weight, preferably 50 to 100% by weight based on the total weight of the charge-generating layer 5. The content of the one or more aromatic polycarbonates is in the range of 40 to 100% by weight based on the total weight of the charge-transport layer 4.

Meanwhile, as described above, the photosensitive layer 2c can contain a low-molecular charge-transport material. Examples of the suitable low-molecular charge-transport material include oxazole derivatives or oxadiazole derivatives as disclosed in JP-A-52-139065 and JP-A-52-139066, imidazole derivatives or triphenylamine derivatives as disclosed in JP-A-3-285960, benzidine derivatives as disclosed in JP-B-58-32372, a-phenylstilbene derivatives as disclosed in JP-A-57-73075, hydrazine derivatives as disclosed in JP-A-55-154955, JP-A-55-156954, JP-A-55-52063 or JP-A-56-81850, triphenyl methane derivatives as disclosed in JP-B-5-10983, anthracene derivatives as disclosed in JP-A-51-94829, styryl derivatives as disclosed in JP-A-56-29245 or JP-A-58-198043, carbazole derivatives as disclosed in JP-A-58-58552, pyrene derivatives as disclosed in JP-A-2-94812, or the like.

Figure 4:
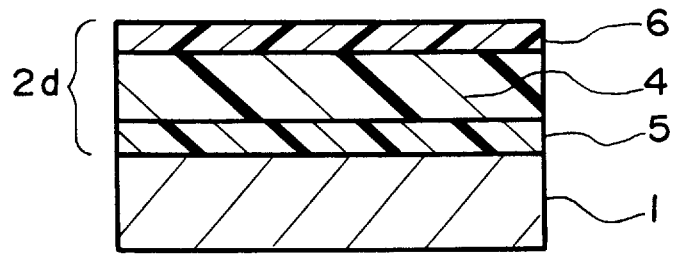
FIG. 4 is a sectional view showing the structure of an electrophotographic photosensitive medium according to a fourth embodiment of the present invention.

In FIG. 4, there is illustrated an electrophotographic photosensitive medium according to a fourth embodiment of the present invention. The photosensitive medium according to the fourth embodiment is provided, on a surface of a charge-transport layer 4, with a protective layer 6 as an uppermost layer of a photosensitive layer 2d. The protective layer 6 may be composed of the aromatic polycarbonate according to the present invention solely or a mixture of the aromatic polycarbonate and a binder resin. As a matter of course, the protective layer 6 can be effectively formed over a conventional low-molecular dispersion-type charge-transport layer. Incidentally, such a protective layer can be provided on the photosensitive layer 2b shown in FIG. 2.

The photosensitive medium shown in FIG. 4 can be produced by simply forming the protective layer 6 on the photosensitive medium as shown in FIG. 3. In this case, a dispersion for the protective layer 6 can be prepared by dispersing the aromatic polycarbonate of the present invention in a solvent with or without a binder resin. The dispersion is applied onto a surface of the charge-transporting layer 4 and dried to thereby form the protective layer 6 of the photosensitive layer 2d. The thickness of the protective layer 6 is preferably in the range of 0.15 to 10 μm. The content of the aromatic polycarbonate according to the present invention in the protective layer 6 is in the range of 40 to 100% by weight based on the total weight of the protective layer 6.

Figure 5:
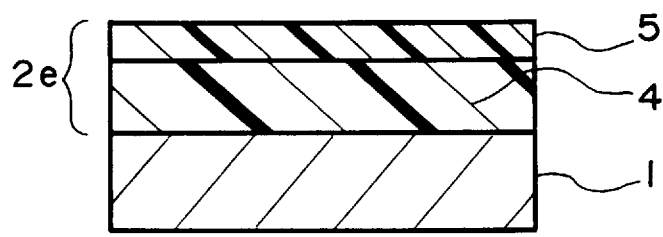
FIG. 5 is a sectional view showing the structure of an electrophotographic photosensitive medium according to a fifth embodiment of the present invention.

In FIG. 5, there is illustrated an electrophotographic photosensitive medium according to a fifth embodiment of the present invention, which includes a photosensitive layer 2e having such a configuration that a charge-generating layer 5 and a charge-transport layer 4 of the photosensitive medium are laminated in the order reverse to that shown in FIG. 3 on the conductive substrate 1. The mechanism for generating charge carriers and transporting the carriers is the same as those described in the preceding embodiments.

The photosensitive medium as shown in FIG. 5 can be prepared in the following manner. That is, the aromatic polycarbonate according to the present invention is first dispersed in a solvent with or without a binder resin. The dispersion is then coated over the conductive substrate 1 and dried to form the charge-transport layer 4. If desired, a binder resin, is spray-coated over the charge-transport layer 4 and then dried to form the charge-generating layer 5. The contents of the components contained in the charge-transport layer 4 and the charge-generating layer 5 are the same as those of the photosensitive medium shown in FIG. 3.

Figure 6:
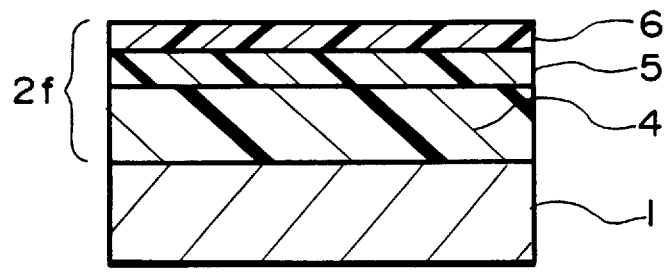
FIG. 6 is a sectional view showing the structure of an electrophotographic photosensitive medium according to a sixth embodiment of the present invention.

A photosensitive medium shown in FIG. 6 is provided with a photosensitive layer 2f having a protective layer 6 to improve a mechanical strength thereof. The photosensitive layer 2f can be produced by simply applying a dispersion for the protective layer 6 on the photosensitive medium shown in FIG. 5. The dispersion used for forming the protective layer 6 of the photosensitive layer 2f may be the same composition as that used to form the protective layer as shown in FIG. 4.

In the preceding embodiments of the present invention, as the conductive substrate 1, there may be used a metal plate or a metal foil made of aluminum or the like, a plastic film on which metal such as aluminum is deposited, or a paper treated with a conductive material.

Examples of the suitable binder resins include condensation resins such as polyamides, polyurethanes, polyesters, epoxy resins, polyketones or polycarbonates, vinyl polymers such as polyvinyl ketone, polystyrene, poly-N-vinyl carbazole or polyacrylamide, or other resins capable of exhibiting both an insulating property and an adherability. The binder resin can contain a plasticizer, if desired. Examples of the suitable plasticizers include halogenated paraffins, dimethyl naphthalene or dimethyl phthalate. Similarly, other additives such as anti-oxidant, a light stabilizer, a heat stabilizer and a lubricant can be incorporated in the binder resin, if desired.

In the afore-mentioned arrangement of the photosensitive medium according to the present invention, a barrier layer or an adhesive layer can be further provided between the conductive substrate and the photosensitive layer, if desired.

Examples of suitable materials for the barrier layer or the adhesive layer include polyamide, nitrocellulose, aluminum oxide or titanium oxide. The thickness of the barrier layer or the adhesive layer is preferably not more than 1 μm.

When the photosensitive medium according to the present invention is used in an electrophotographic duplicating machine, a surface of the photosensitive medium electrostatically charged and exposed to radiated light to form a latent image thereon. The latent image is then developed with an adequate developing agent and the developed image is transported to a recording medium such as a paper.

The photosensitive medium according to the present invention is superior in sensitivity and durability.

The following examples will further illustrate the present invention.

Synthesis Example 1

40.95 g (0.11 mol) of diethyl[bis(4-methoxyphenyl)methyl]phosphonate and 33.87 g (0.11 mol) of 4,4'-dimethyl-4"-formyl triphenylamine was dissolved in 500 ml of dehydrated dimethylformamide (DMF). The solution was placed in a water bath and cooled to 22° to 25° C. Thereafter, 19 g (0.16 mol) of potassium-t-butylate was gradually added to the solution while stirring to react them with each other. After completing the addition of potassium-t-butylate, the mixture was agitated at room temperature for 7 hours and then diluted with 400 ml of water. The mixture was filtered to obtain a reaction product. The reaction product was further subjected to a column chromatography employing a silica gel-filled column and a toluene as a solvent and then recrystallized by using a combined solvent of ethanol and toluene to thereby obtain 50.59 g of 4,4'-dimethyl-4"-[2,2-bis(4-methoxyphenyl)vinyl]triphenylamine (compound No. 1) of the following formula (A-1):

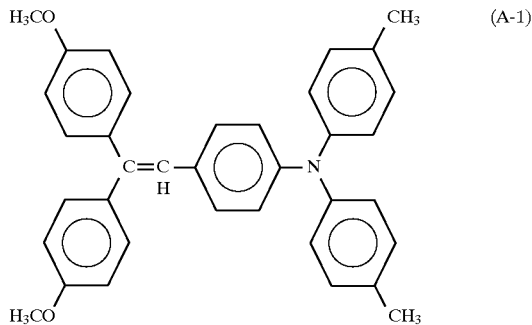

Figure 7:
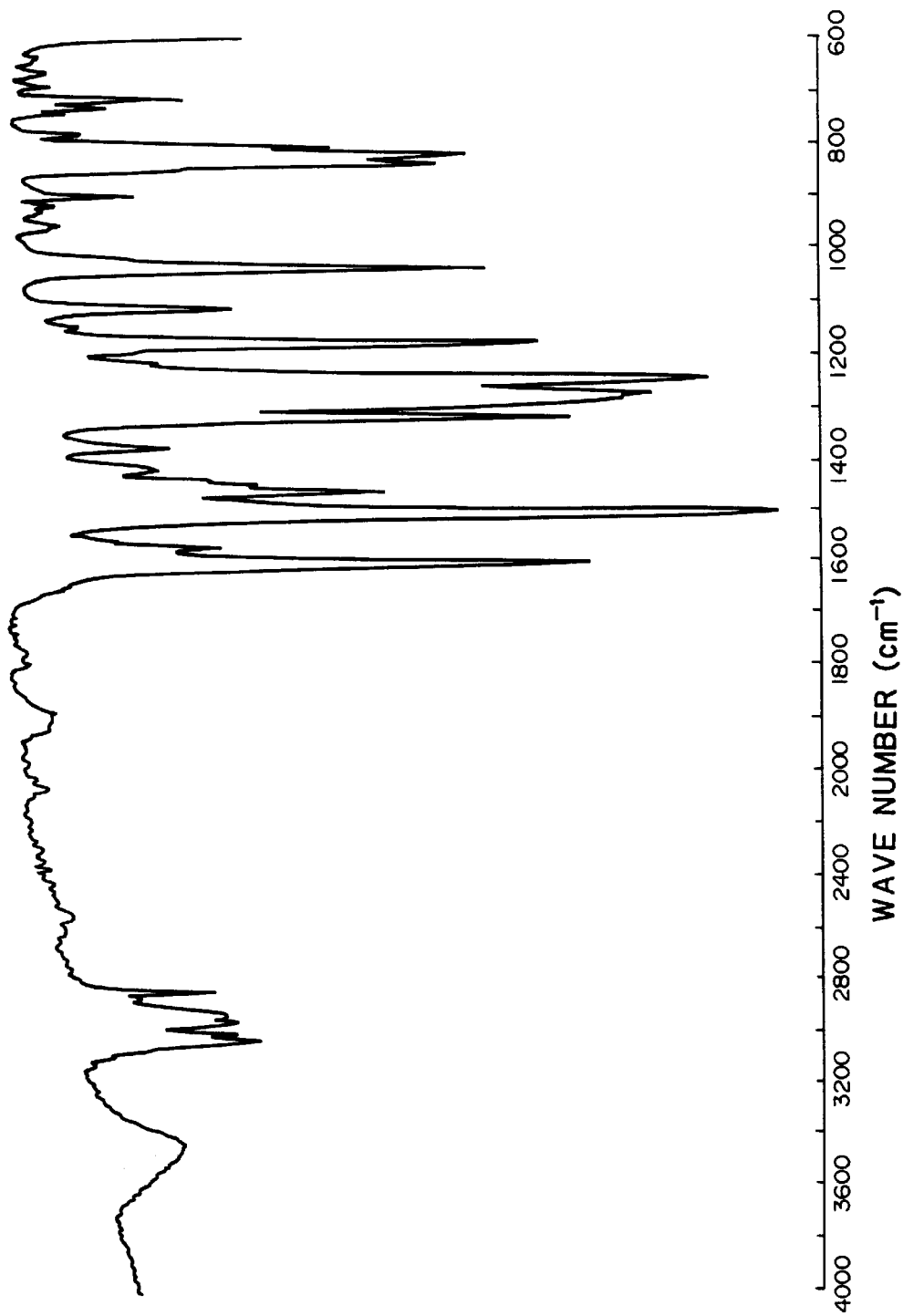
FIG. 7 is an IR spectrum (according to KBr tablet method) of an amine compound (compound No. 1) obtained in Synthesis Example 1.
Figure 8:
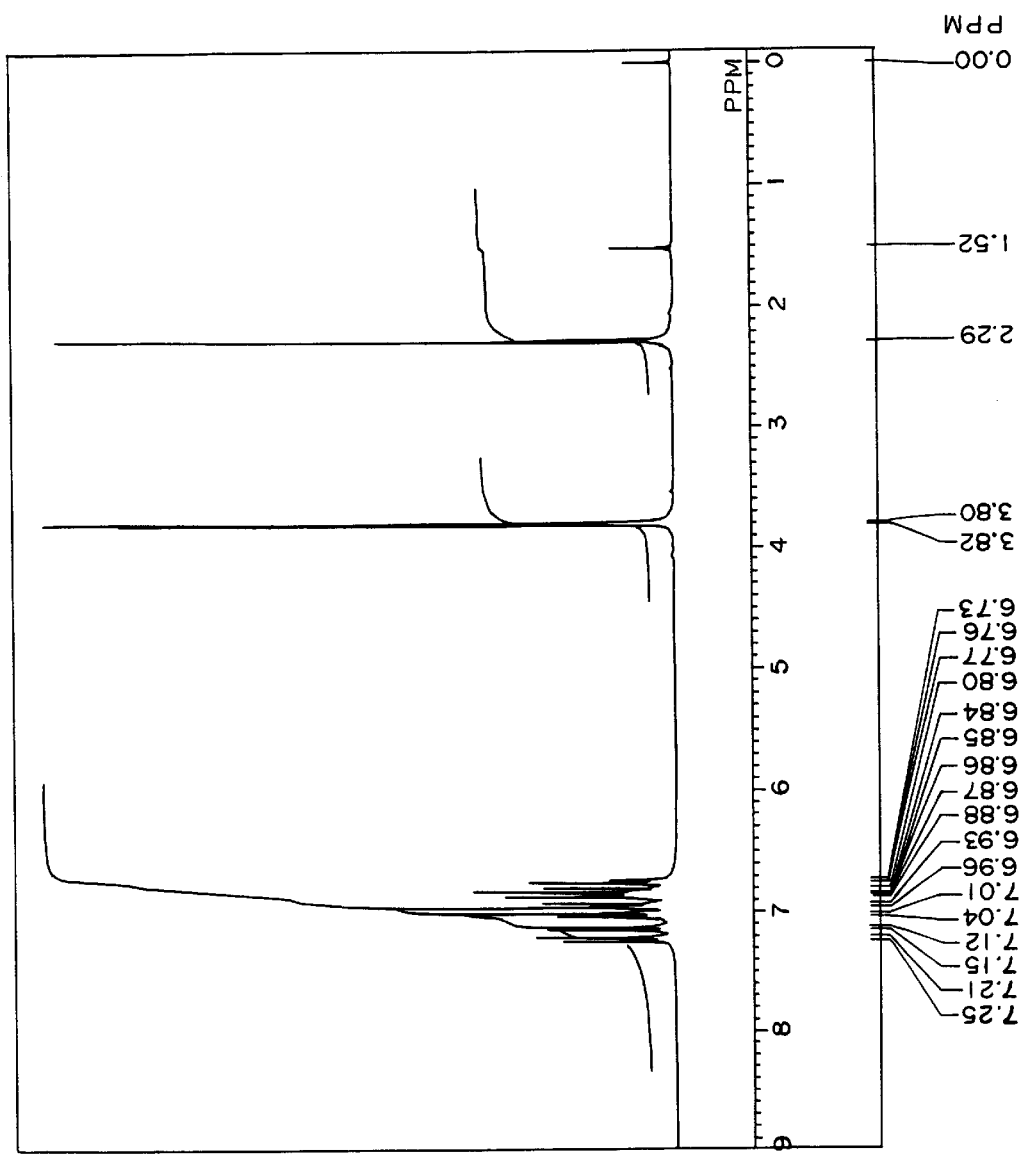
FIG. 8 is a graph showing a proton NMR spectrum (in $CDCl_3$ solution) of an amine compound (compound No. 1) obtained in Synthesis Example 1.

The yield of the amine compound was 88%. It was confirmed that the product was in the form of light-yellow needle crystals and had a melting point of 170.8° to 171.4° C. The IR spectrum (according to KBr tablet method) and the proton NMR spectrum (in $CDCl_3$ solution) are shown in FIGS. 7 and 8, respectively. The results of the elemental analysis are indicated below.

| Elemental Analysis (%) | | | |
|---|---|---|---|
| | C | H | N |
| Measured Value | 84.52 | 6.54 | 2.82 |
| Calculated Value (as $C_{36}H_{33}NO_2$) | 84.51 | 6.50 | 2.74 |

Synthesis Example 2

Synthesis Example 1 was repeated in the same manner as described except that a formyl compound having the following formula (F-1):

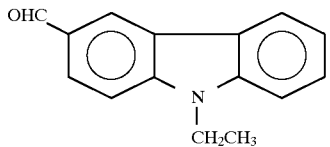

was used instead of 4,4'-dimethyl-4"-formyl triphenylamine. As a result, there was obtained an amine compound of the following formula (A-2):

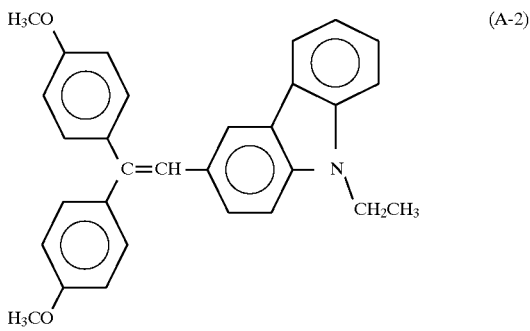

Figure 9:
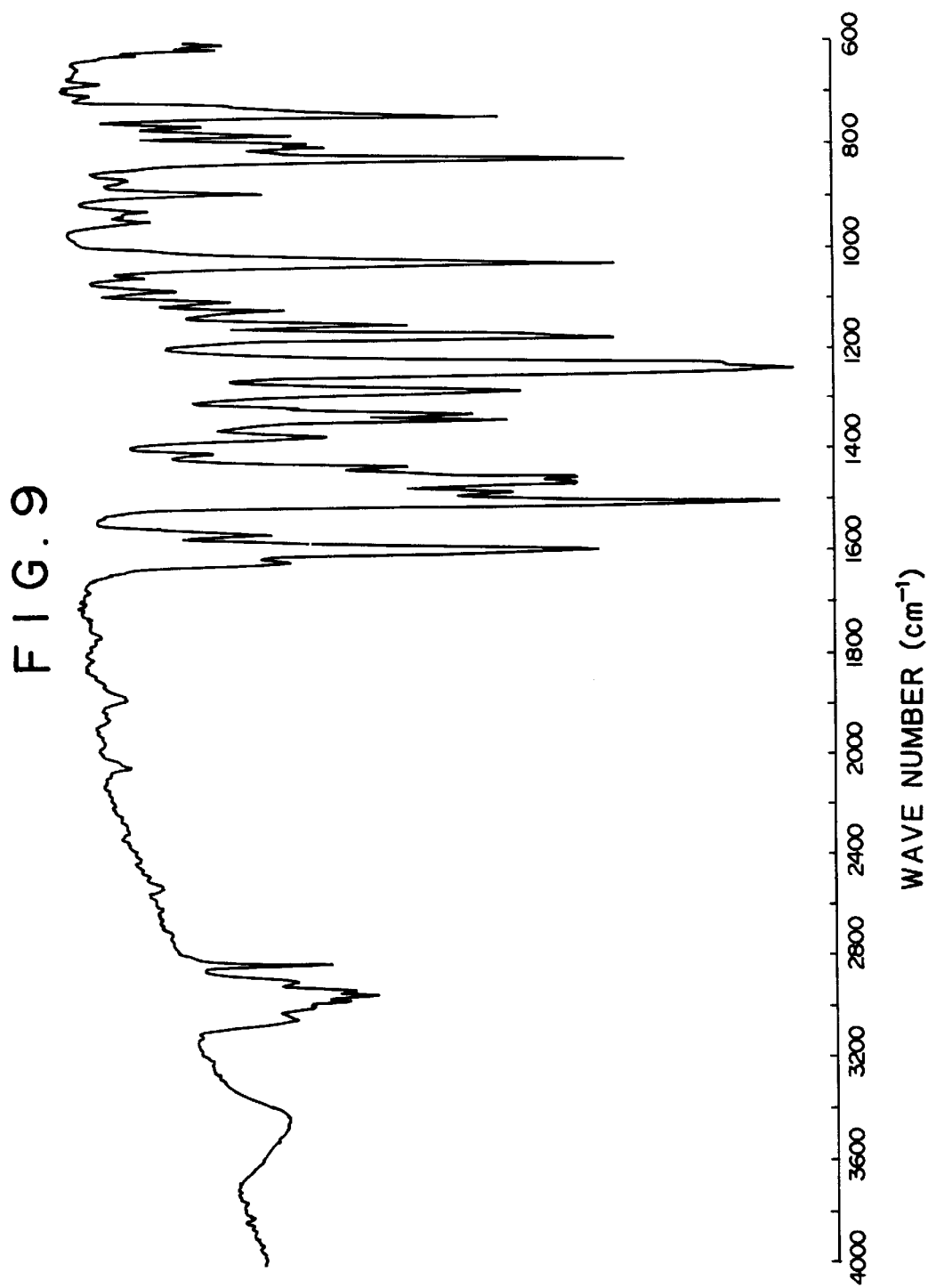
FIG. 9 is an IR spectrum (according to KBr tablet method) of an amine compound (compound No. 2) obtained in Synthesis Example 2.
Figure 10:
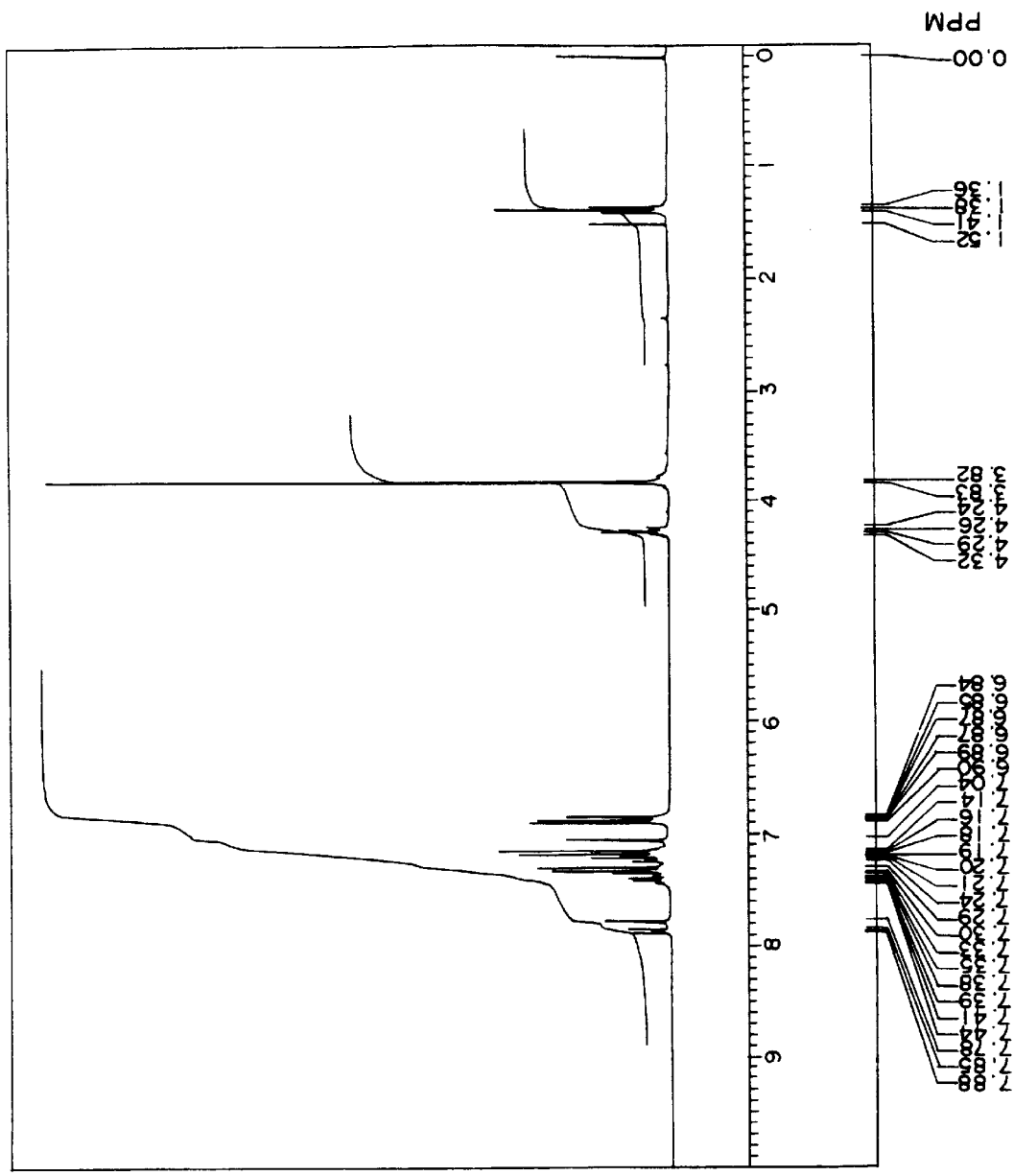
FIG. 10 is a proton NMR spectrum (in $CDCl_3$ solution) of an amine compound (compound No. 2) obtained in Synthesis Example 2.

The yield of the amine compound was 82.5%. It was confirmed that the amine compound had a melting point of 150° C. The IR spectrum (according to KBr tablet method) and the proton NMR spectrum (in $CDCl_3$ solution) are shown in FIGS. 9 and 10, respectively. The results of the elemental analysis are indicated below.

| Elemental Analysis (%) | | | |
|---|---|---|---|
| | C | H | N |
| Measured Value | 83.27 | 6.30 | 3.25 |
| Calculated Value (as $C_{30}H_{27}NO_2$) | 83.11 | 6.04 | 3.23 |

Synthesis Example 3

Synthesis Example 1 was repeated in the same manner as described except that diethyl[bis(3-methoxyphenyl)methyl]phosphonate was used instead of diethyl[bis(4-methoxyphenyl)methyl]phosphonate and a formyl compound having the following formula (F-2):

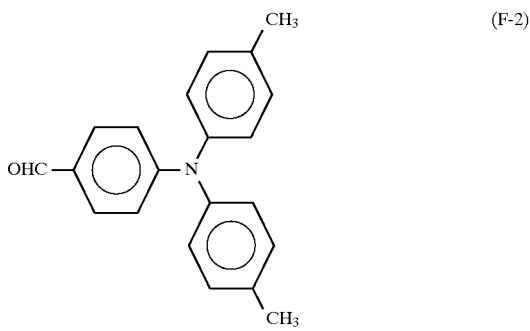

was used instead of 4,4'-dimethyl-4"-formyl triphenylamine. As a result, there was obtained an amine compound of the following formula (A-3):

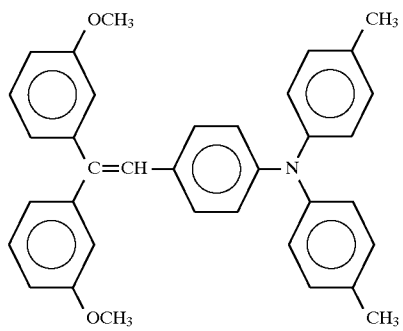
(A-3)

Figure 11:
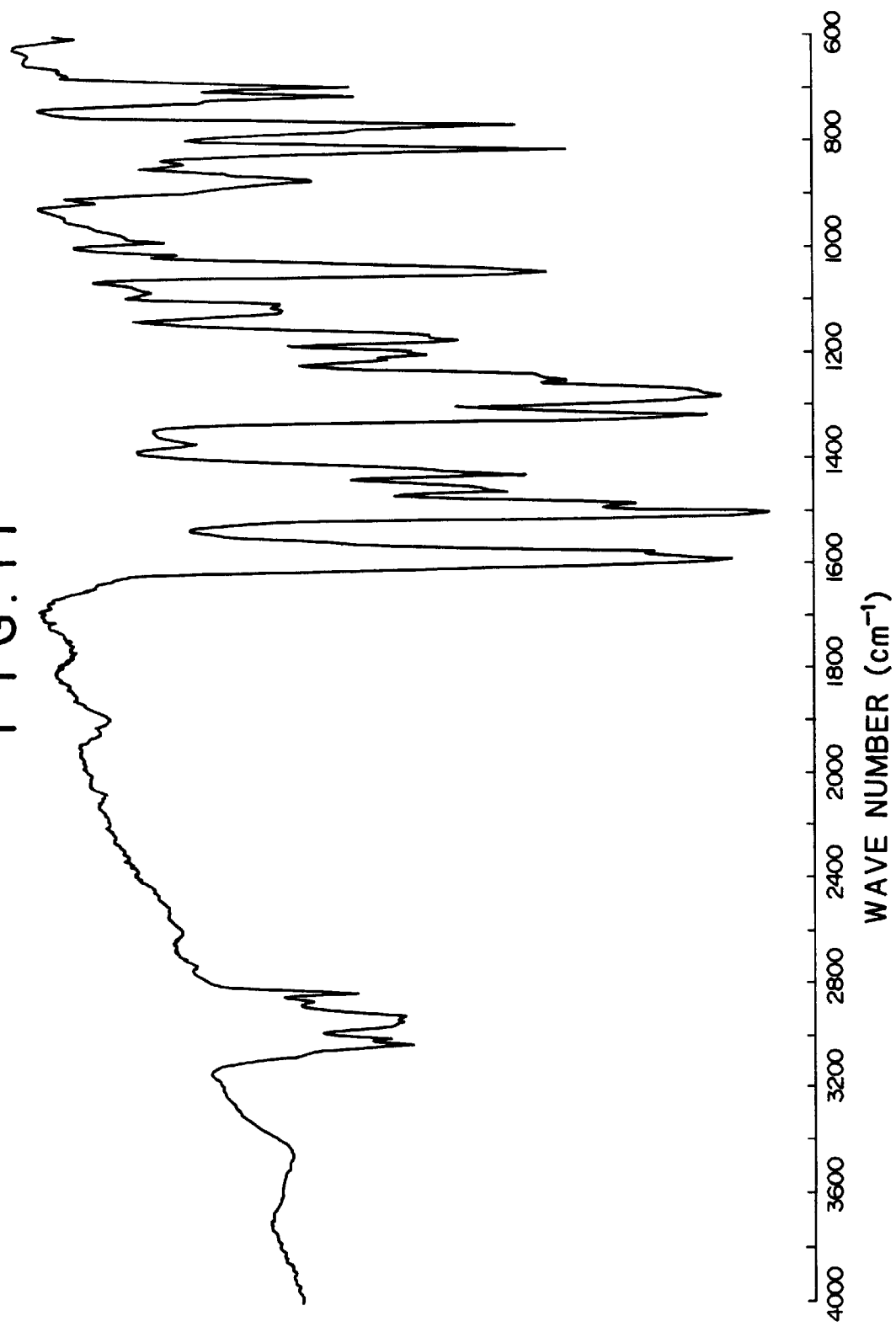
FIG. 11 is an IR spectrum (according to KBr tablet method) of an amine compound (compound No. 3) obtained in Synthesis Example 3.
Figure 12:
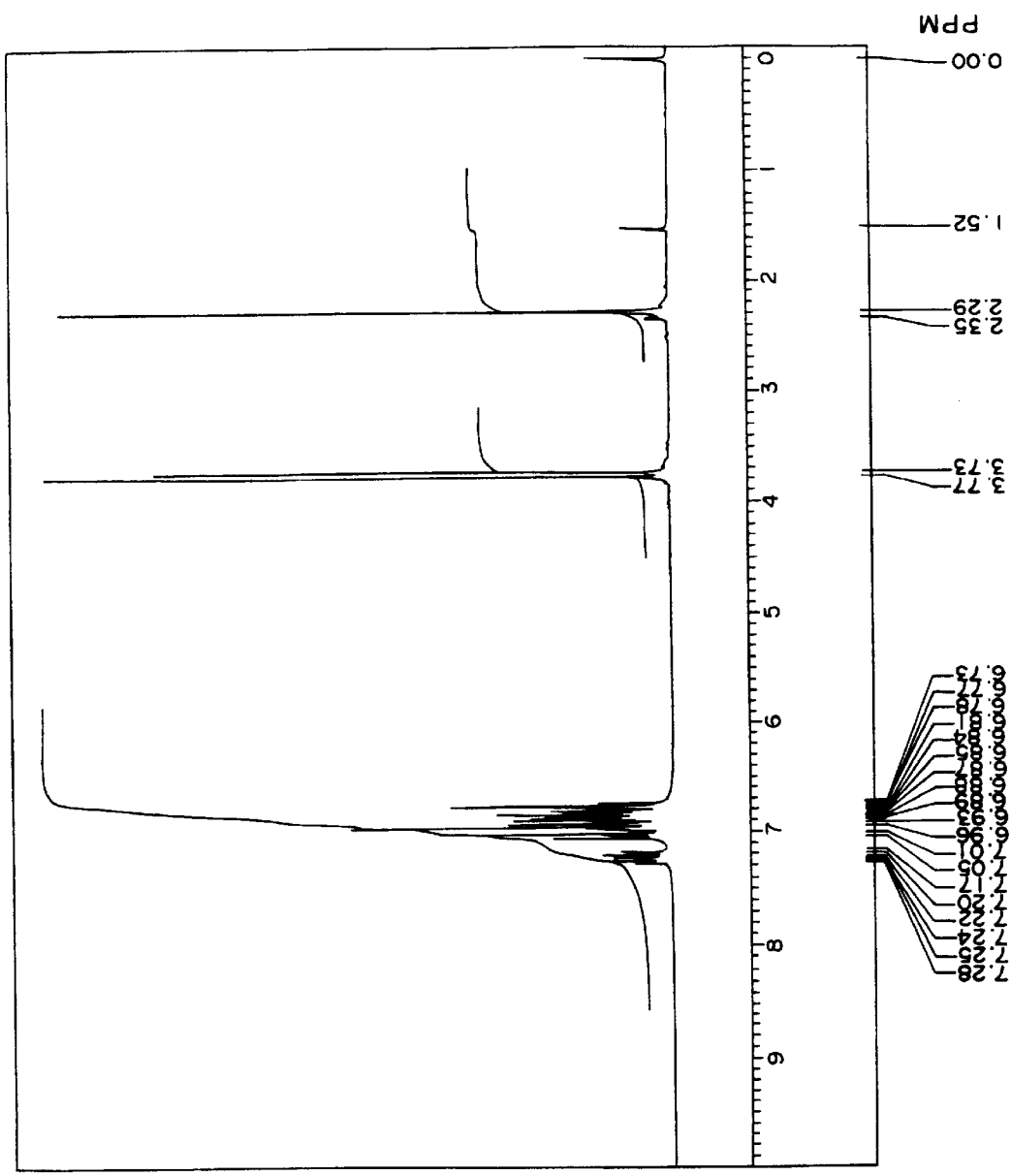
FIG. 12 is a proton NMR spectrum (in $CDCl_3$ solution) of an amine compound (compound No. 3) obtained in Synthesis Example 3.

The thus-obtained amine compound was amorphous. It was confirmed that the yield of the amine compound was 83.4%. The IR spectrum (according to KBr tablet method) and the proton NMR spectrum (in $CDCl_3$ solution) are shown in FIGS. 11 and 12, respectively. The results of the elemental analysis are indicated below.

| | Elemental Analysis (%) | | |
|---|---|---|---|
| | C | H | N |
| Measured Value | 84.79 | 6.52 | 2.69 |
| Calculated Value (as $C_{36}H_{33}NO_2$) | 84.51 | 6.50 | 2.74 |

Synthesis Example 4

Synthesis Example 1 was repeated in the same manner as described except that a formyl compound of the following formula (F-3):

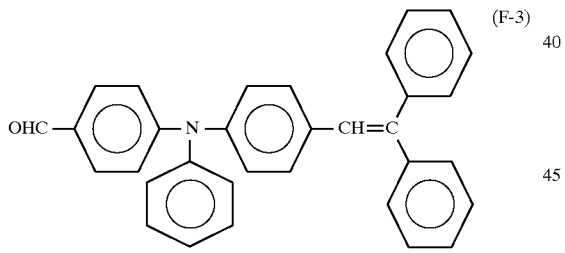
(F-3)

was used instead of 4,4'-dimethyl-4"-formyl triphenylamine. As a result, there was obtained an amine compound of the following formula (A-4):

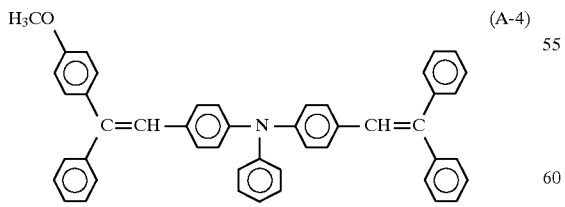
(A-4)

Figure 13:
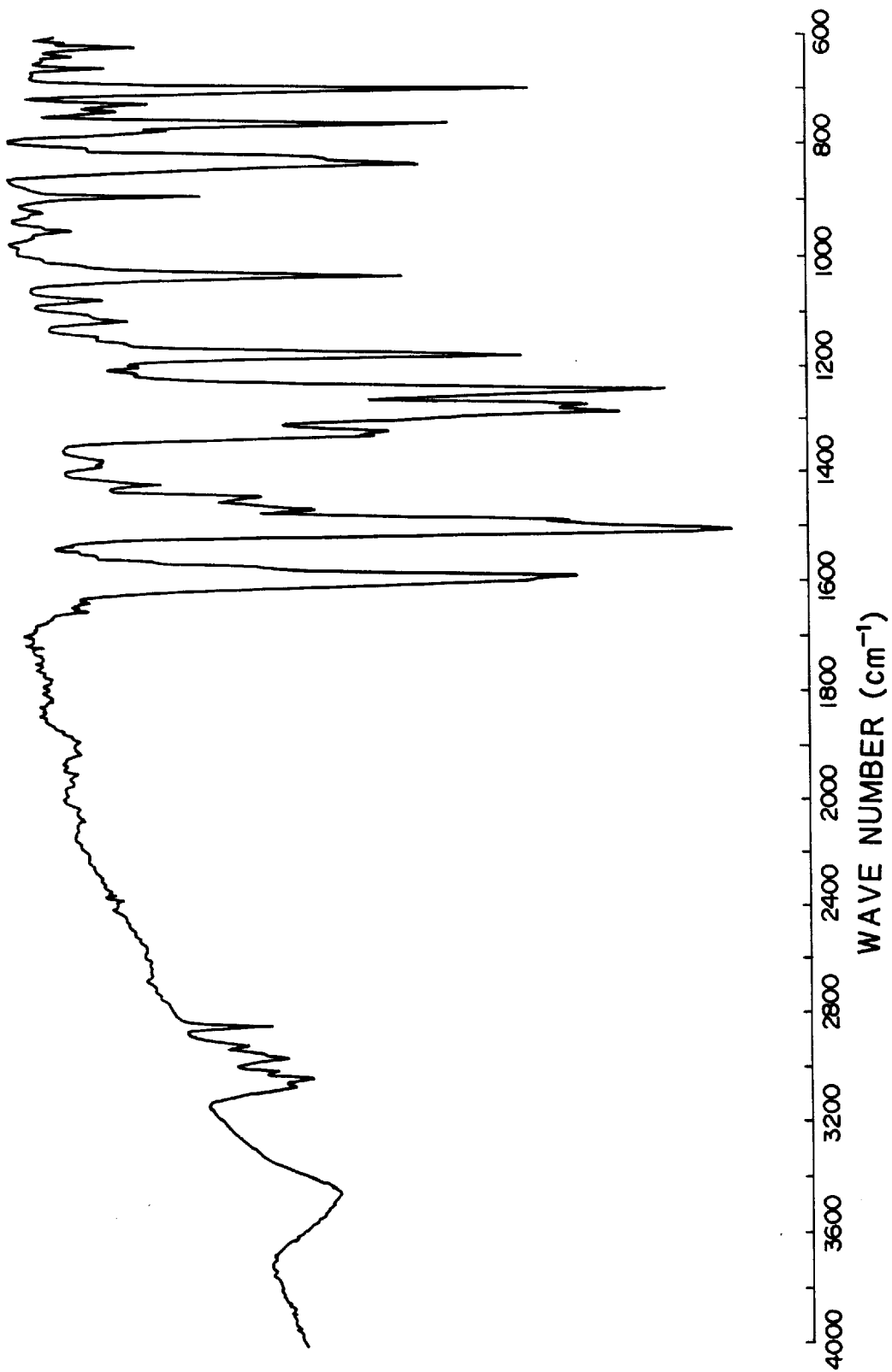
FIG. 13 is an IR spectrum (according to KBr tablet method) of an amine compound (compound No. 4) obtained in Synthesis Example 4.

It was confirmed that the yield of the amine compound was 54.9% and the compound had a melting point of 167° C. The IR spectrum (according to KBr tablet method) is shown in FIG. 13. The results of the elemental analysis are indicated below.

| | Elemental Analysis (%) | | |
|---|---|---|---|
| | C | H | N |
| Measured Value | 87.25 | 5.85 | 2.12 |
| Calculated Value ($C_{48}H_{39}NO_2$) | 87.11 | 5.92 | 2.12 |

Synthesis Example 5

Synthesis Example 1 was repeated in the same manner as described except that a formyl compound of the formula (F-4):

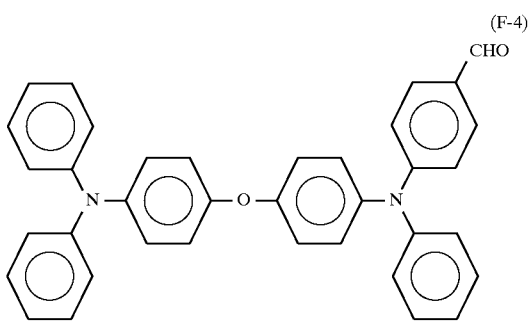
(F-4)

was used instead of 4,4'-dimethyl-4"-formyl triphenylamine. As a result, there was obtained an amine compound of the formula (A-5):

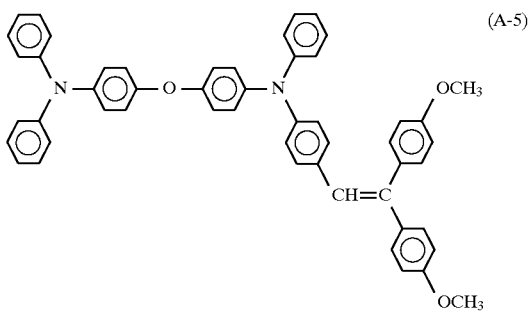
(A-5)

Figure 14:
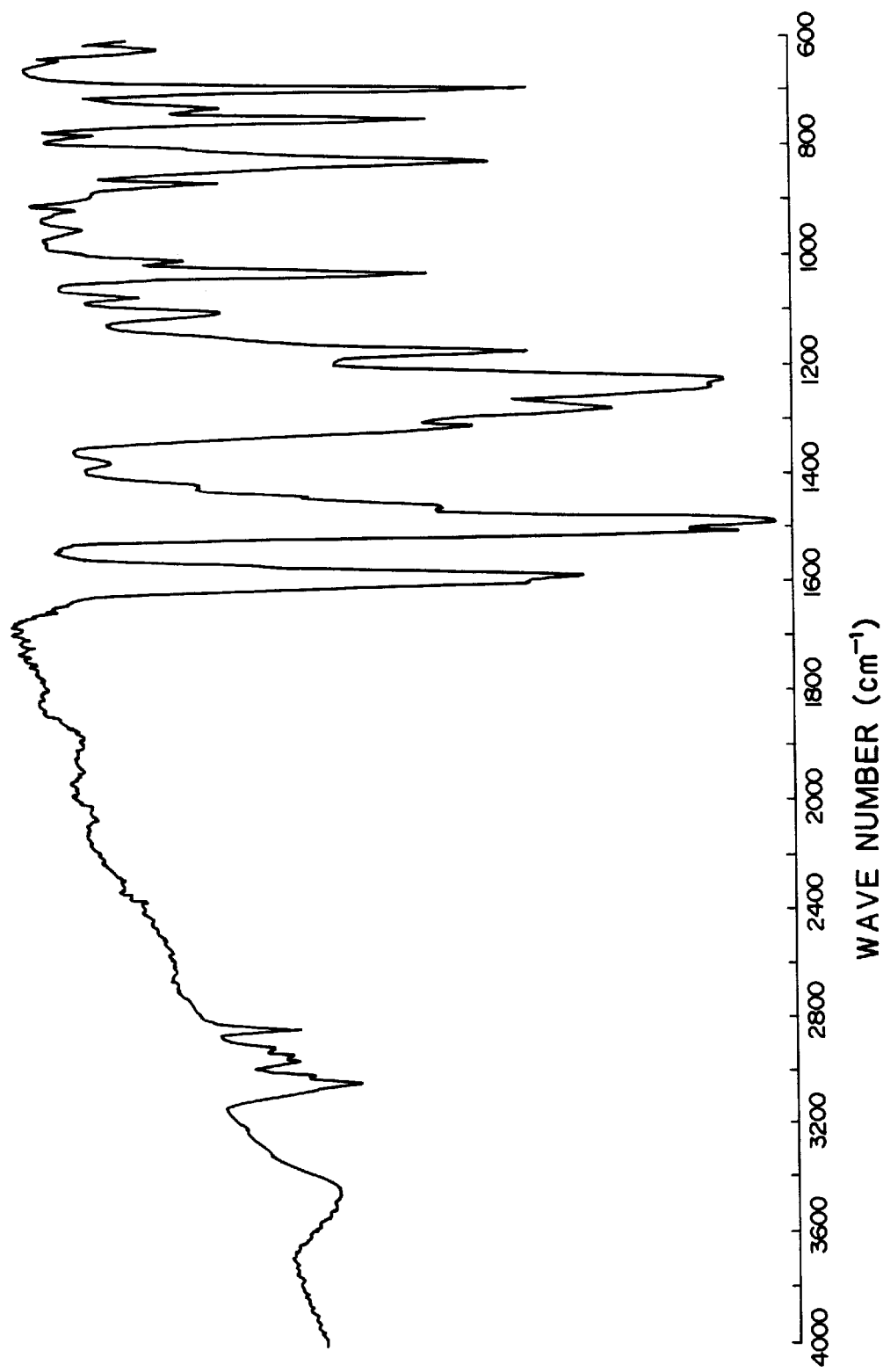
FIG. 14 is an IR spectrum (according to KBr tablet method) of an amine compound (compound No. 5) obtained in Synthesis Example 5.

It was confirmed that the yield of the amine compound was 85.2% and the compound had a melting point of 178.9° C. The IR spectrum (according to KBr tablet method) is shown in FIG. 14. The results of the elemental analysis are indicated below.

| | Elemental Analysis (%) | | |
|---|---|---|---|
| | C | H | N |
| Measured Value | 84.52 | 5.76 | 3.51 |
| Calculated Value (as $C_{52}H_{42}N_2O_3$) | 84.06 | 5.71 | 3.77 |

Synthesis Example 6

Synthesis Example 1 was repeated in the same manner as described except that a formyl compound of the formula (F-5):

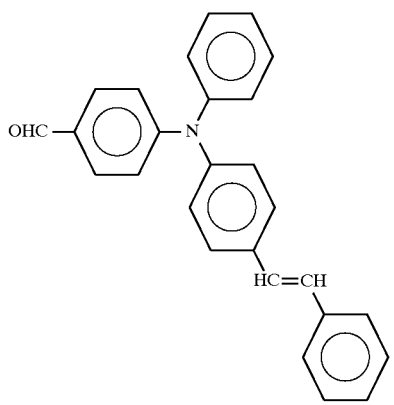

(F-5)

was used instead of 4,4'-dimethyl-4'-formyl triphenylamine. As a result, there was obtained an amine compound of the formula (A-6):

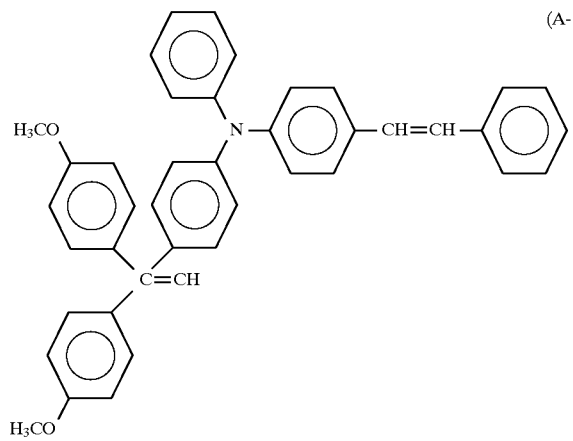

(A-6)

Figure 15:
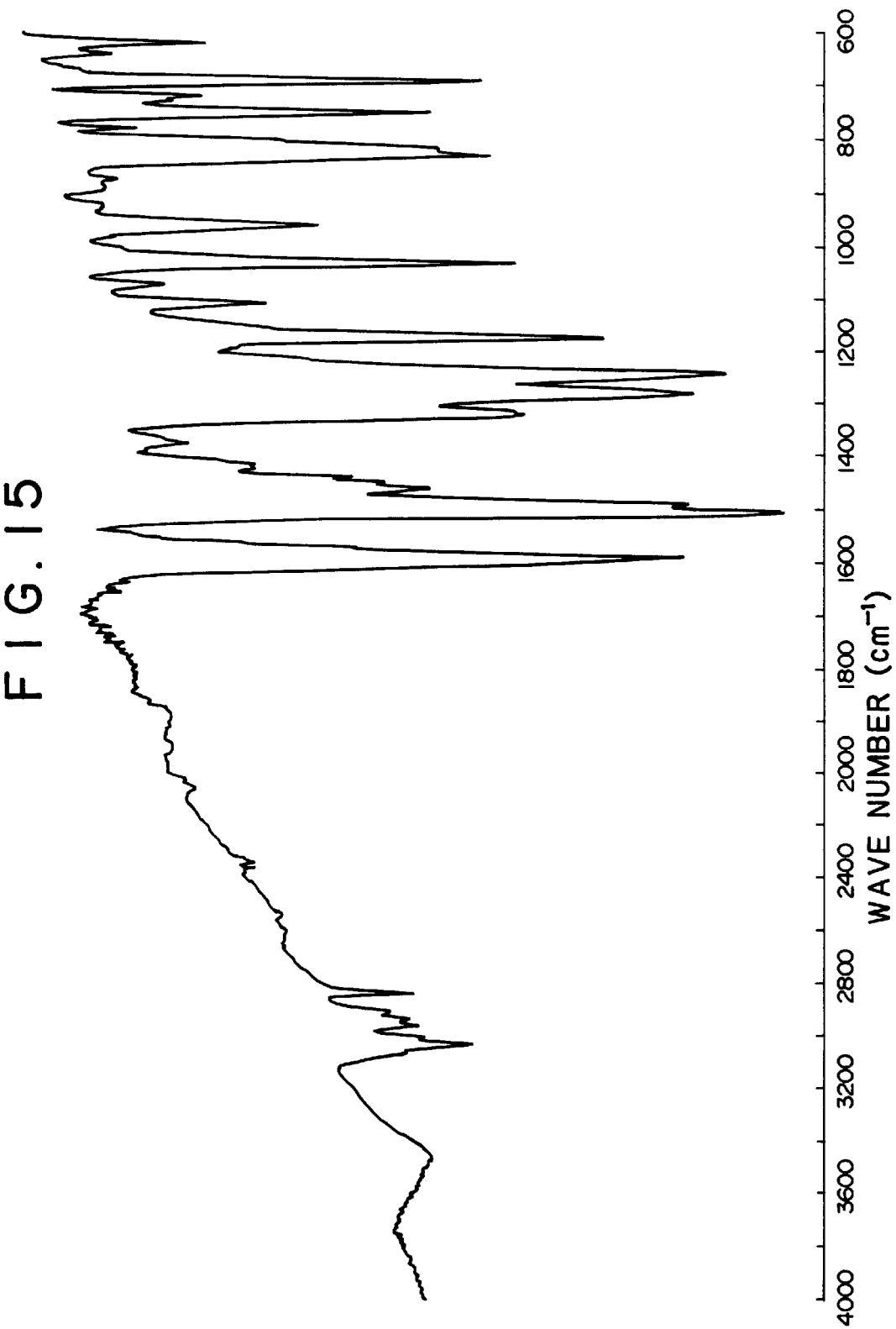
FIG. 15 is an IR spectrum (according to KBr tablet method) of an amine compound (compound No. 6) obtained in Synthesis Example 6.

The thus-obtained amine compound was an amorphous substance. It was confirmed that the yield of the amine compound was 91.07%. The IR spectrum (according to KBr tablet method) is shown in FIG. 15. The results of the elemental analysis are indicated below.

| | Elemental Analysis (%) | | |
|---|---|---|---|
| | C | H | N |
| Measured Value | 86.30 | 5.94 | 2.37 |
| Calculated Value (as $C_{42}H_{35}NO_2$) | 86.12 | 6.02 | 2.39 |

Synthesis Example 7

Synthesis Example 1 was repeated in the same manner as described except that a formyl compound of the formula (F-6):

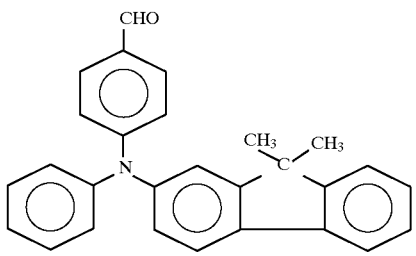

(F-6)

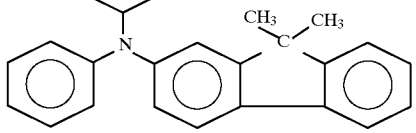

was used instead of 4,4'-dimethyl-4"-formyl triphenylamine. As a result, there was obtained an amine compound of the formula (A-7):

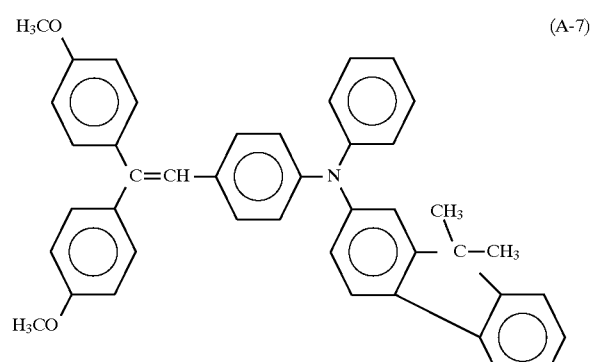

(A-7)

Figure 16:
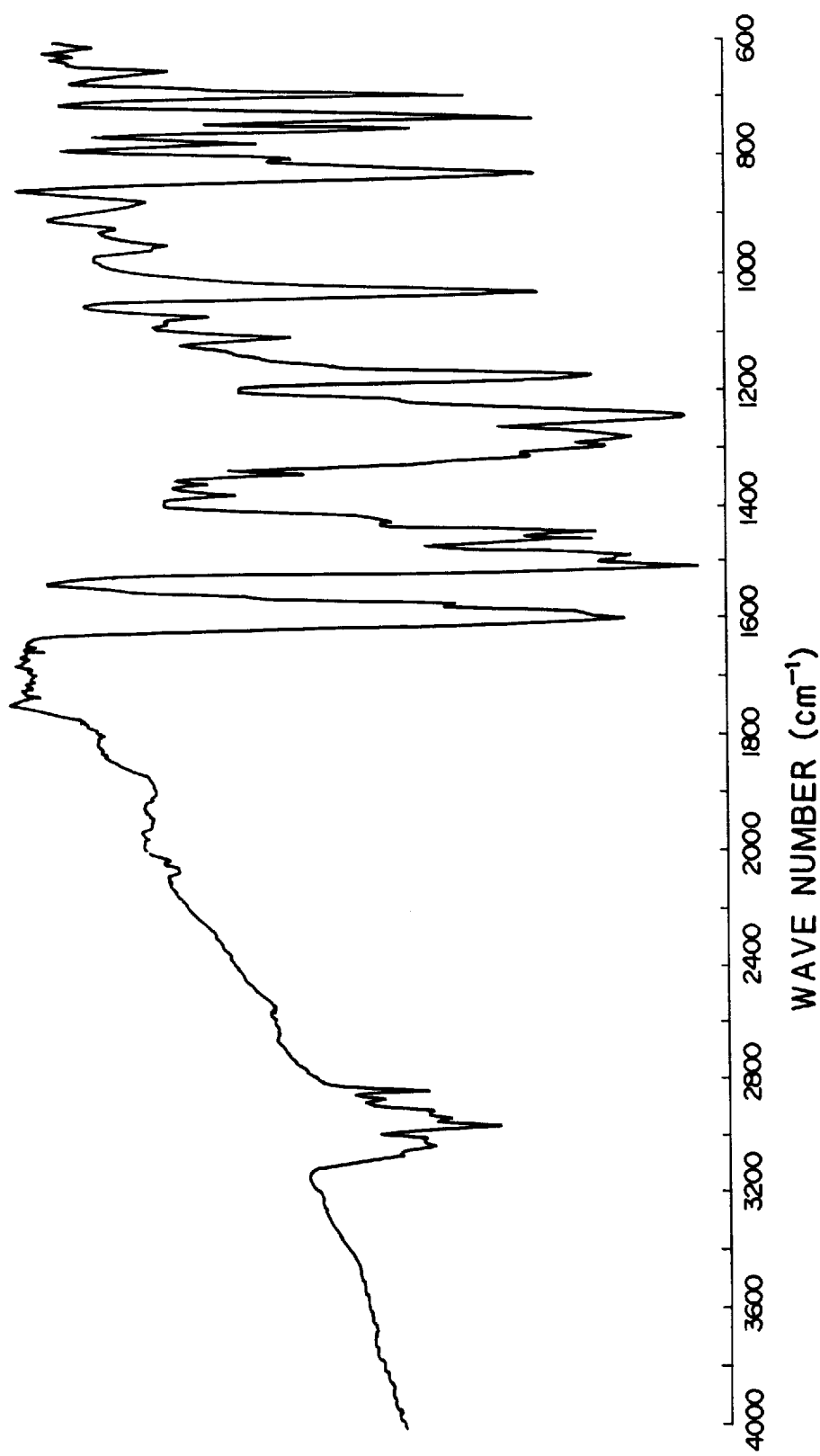
FIG. 16 is an IR spectrum (according to KBr tablet method) of an amine compound (compound No. 7) obtained in Synthesis Example 7.
Figure 17:
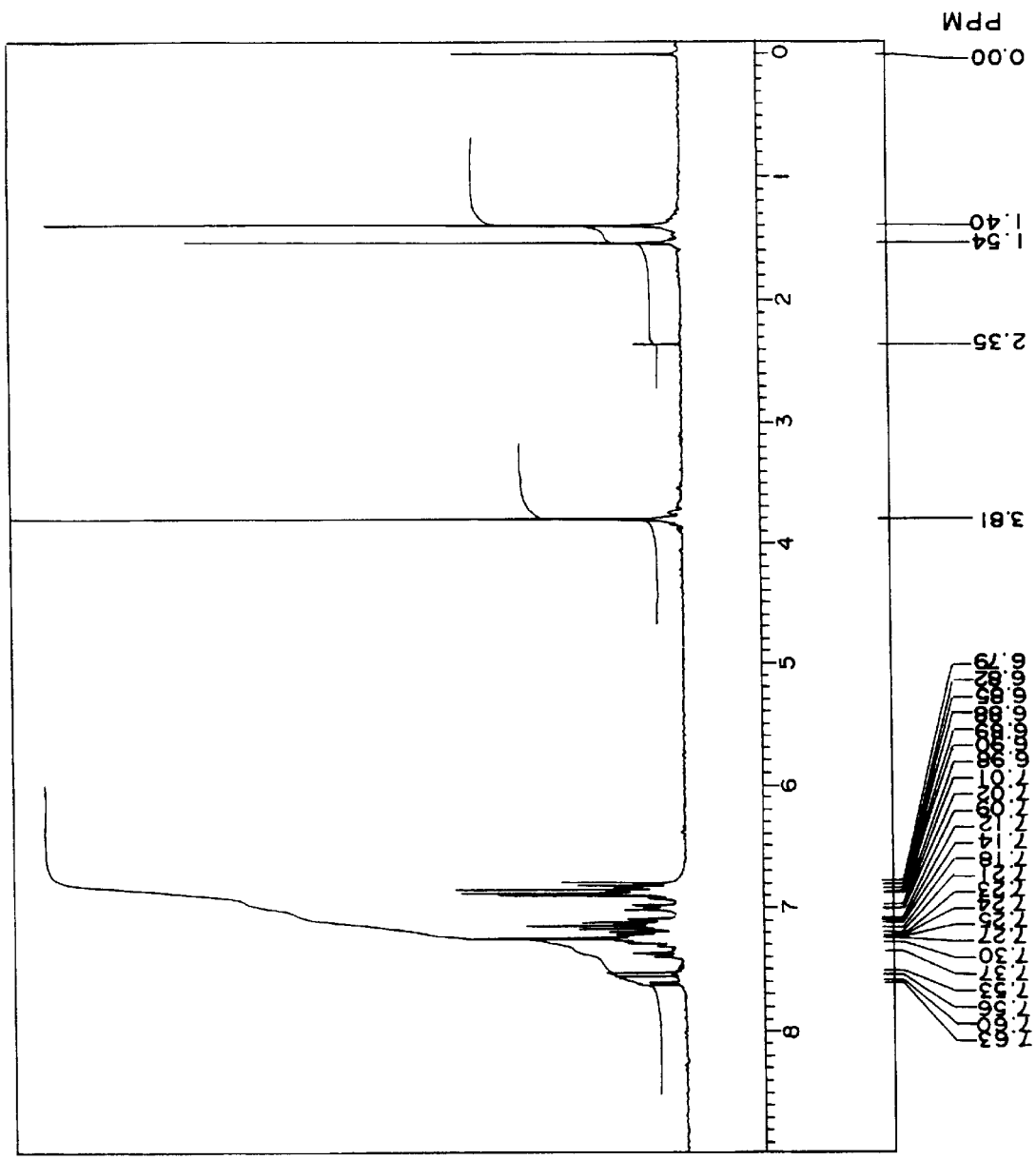
FIG. 17 is a proton NMR spectrum (in $CDCl_3$ solution) of an amine compound (compound No. 7) obtained in Synthesis Example 7.

The thus-obtained amine compound was an amorphous substance. It was confirmed that the yield of the amine compound was 73.8%. The IR spectrum (according to KBr tablet method) and the proton NMR spectrum (in $CDCl_3$ solution) are shown in FIGS. 16 and 17, respectively. The results of the elemental analysis are indicated below.

| | Elemental Analysis (%) | | |
|---|---|---|---|
| | C | H | N |
| Measured Value | 86.46 | 6.29 | 2.24 |
| Calculated Value (as $C_{43}H_{37}NO_2$) | 86.11 | 6.22 | 2.34 |

Synthesis Example 8

Synthesis Example 1 was repeated in the same manner as described except that a formyl compound of the formula (F-7):

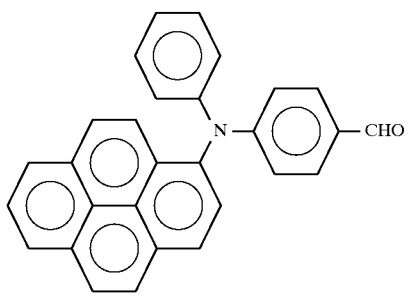

(F-7)

was used instead of 4,4'-dimethyl-4"-formyl triphenylamine. As a result, there was obtained an amine compound of the formula (A-8):

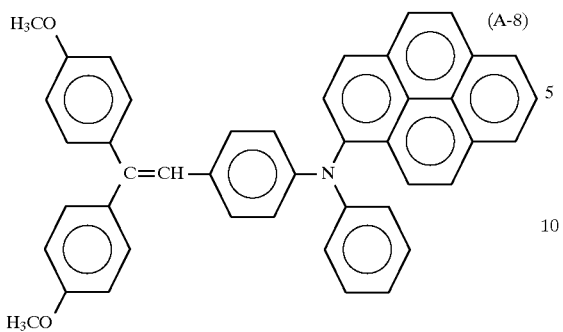

(A-8)

Figure 18:
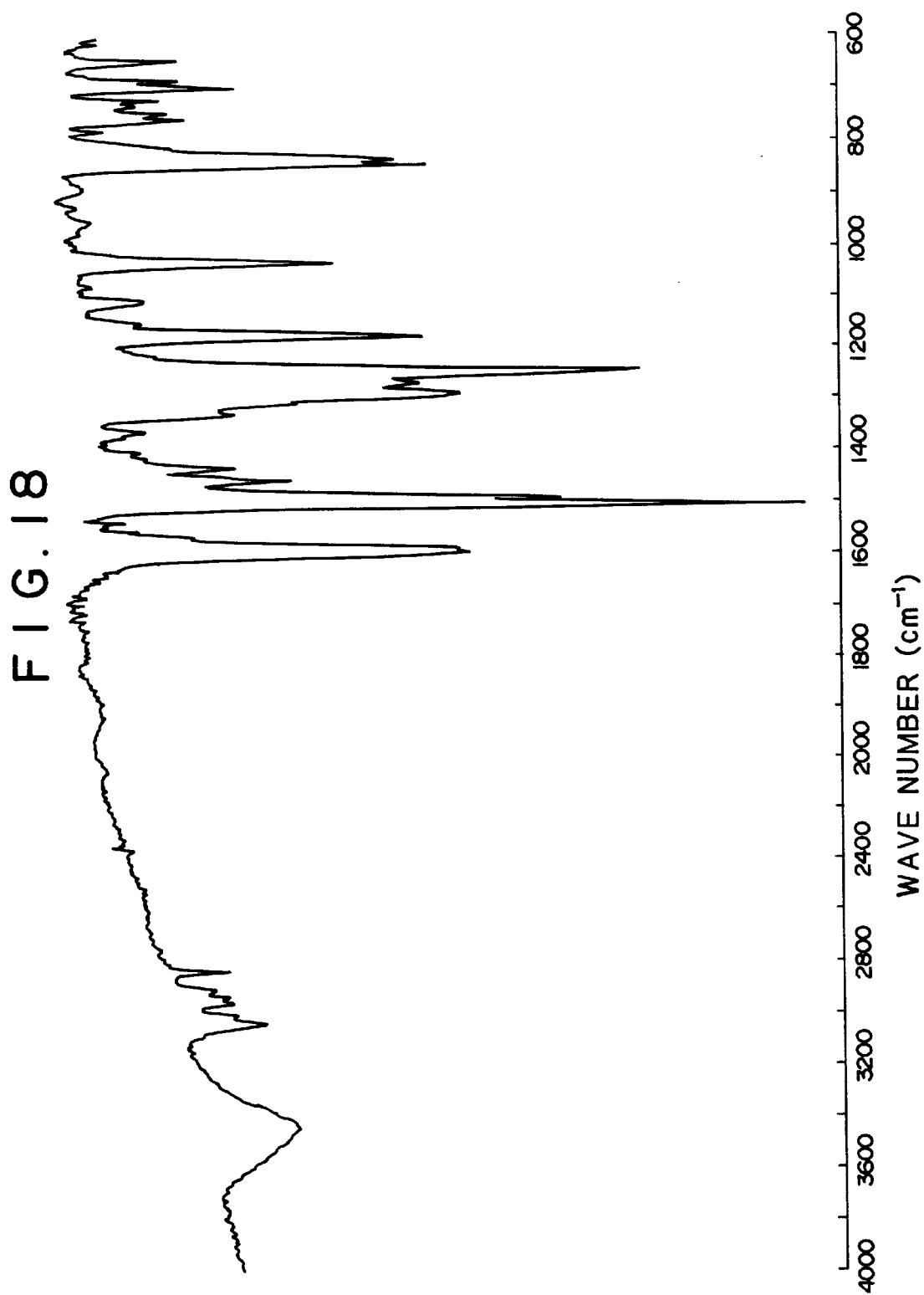
FIG. 18 is an IR spectrum (according to KBr tablet method) of an amine compound (compound No. 8) obtained in Synthesis Example 8.

The thus-obtained amine compound was an amorphous substance. It was confirmed that the yield of the amine compound was 91.0%. The IR spectrum (according to KBr tablet method) is shown in FIG. 18. The results of the elemental analysis are indicated below.

| | Elemental Analysis (%) | | |
|---|---|---|---|
| | C | H | N |
| Measured Value | 86.77 | 6.24 | 2.09 |
| Calculated Value (as $C_{44}H_{33}NO_2$) | 86.96 | 5.47 | 2.30 |

Synthesis Example 9

Synthesis Example 1 was repeated in the same manner as described except that a formyl compound of the formula (F-8):

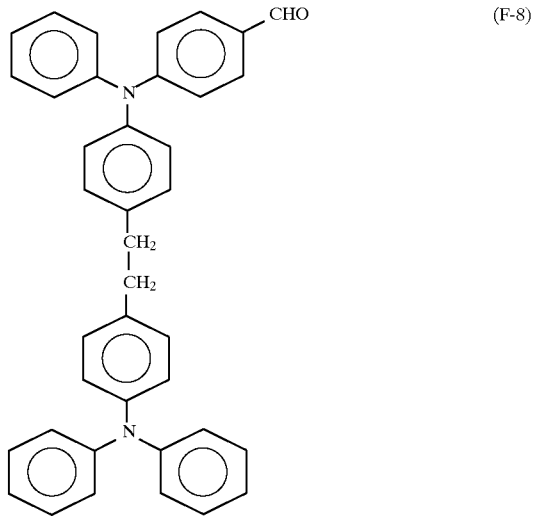

(F-8)

was used instead of 4,4'-dimethyl-4''-formyl triphenylamine. As a result, there was obtained an amine compound of the formula (A-9):

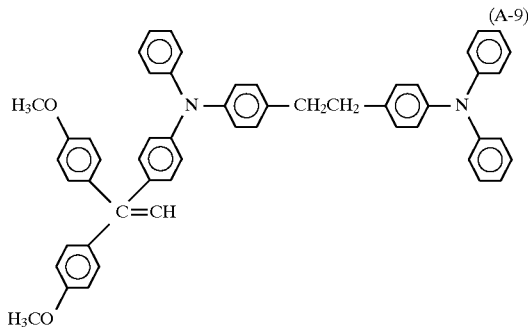

(A-9)

Figure 19:
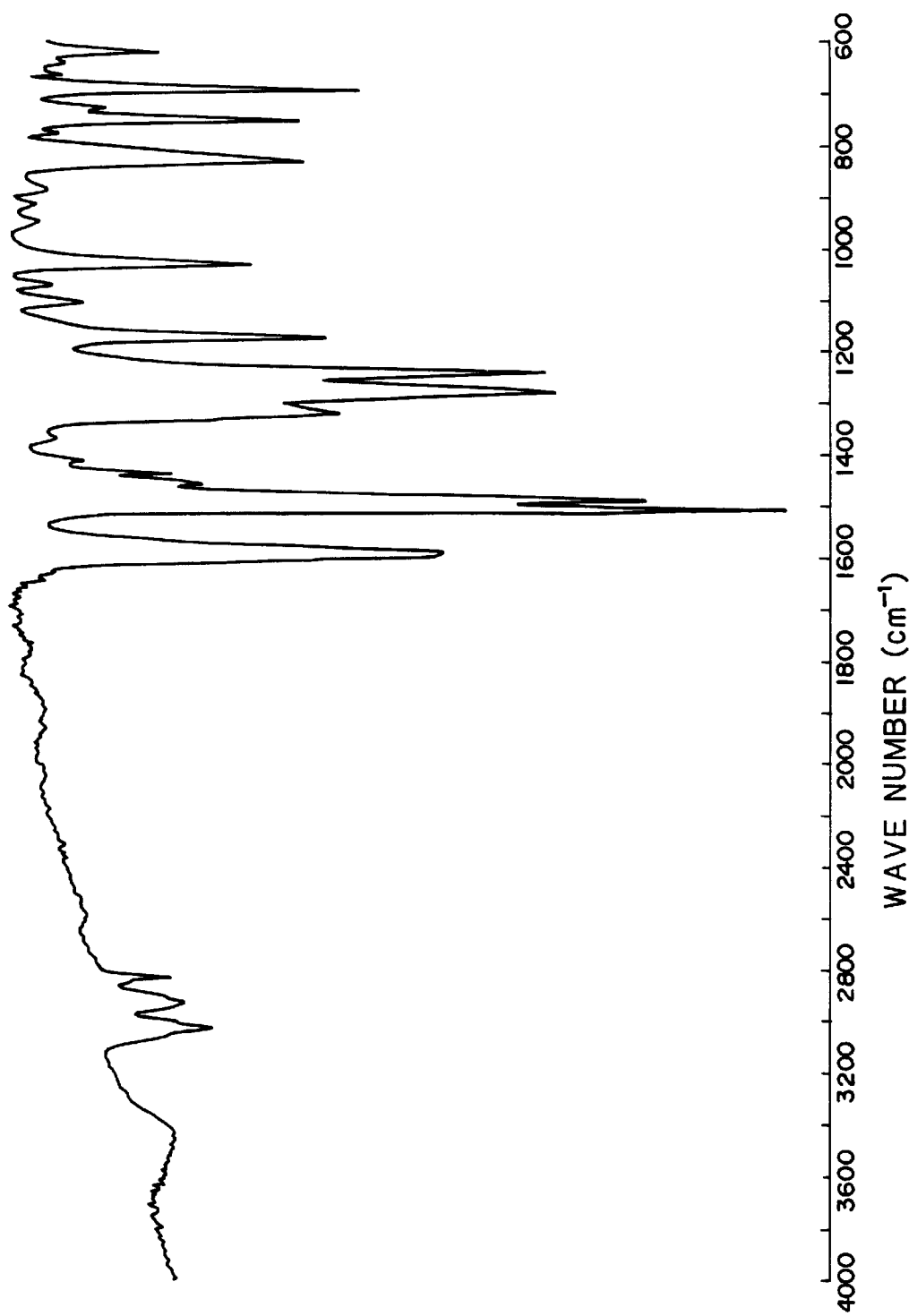
FIG. 19 is an IR spectrum (according to KBr tablet method) of an amine compound (compound No. 9) obtained in Synthesis Example 9.

The thus-obtained amine compound was an amorphous substance. It was confirmed that the yield of the amine compound was 77.0%. The IR spectrum (according to KBr tablet method) is shown in FIG. 19. The results of the elemental analysis are indicated below.

| | Elemental Analysis (%) | | |
|---|---|---|---|
| | C | H | N |
| Measured Value | 86.20 | 6.30 | 3.65 |
| Calculated Value (as $C_{54}H_{46}N_2O_2$) | 85.91 | 6.14 | 3.71 |

Synthesis Example 10

Synthesis Example 1 was repeated in the same manner as described except that a formyl compound of the formula (F-9):

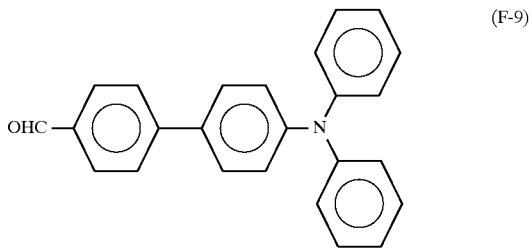

(F-9)

was used instead of 4,4'-dimethyl-4''-formyl triphenylamine. As a result, there was obtained an amine compound of the formula (A-10):

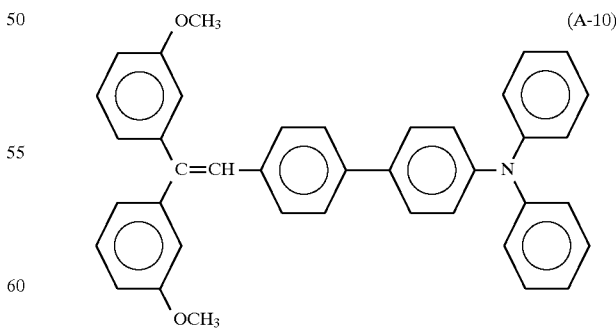

(A-10)

Figure 20:
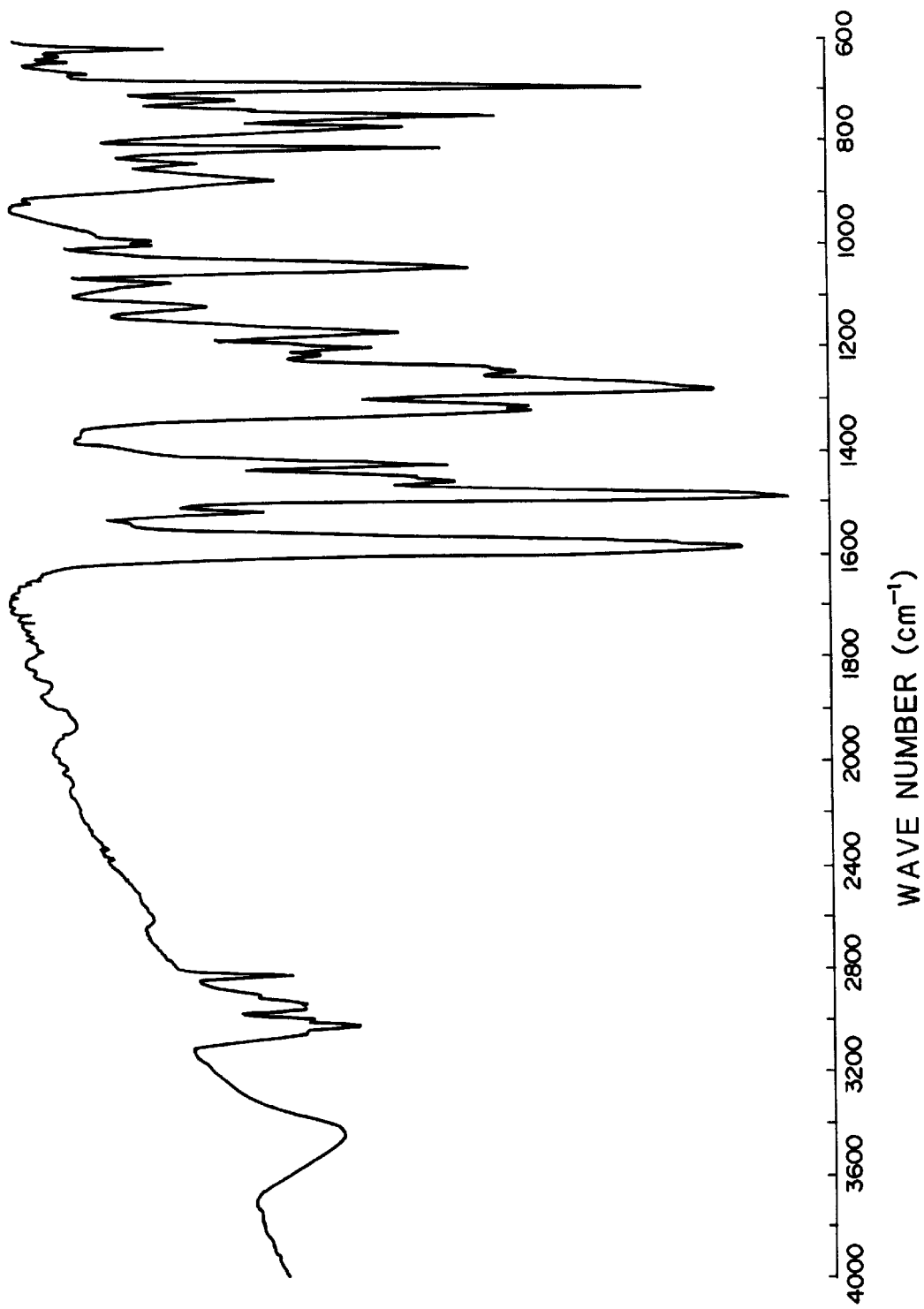
FIG. 20 is an IR spectrum (according to KBr tablet method) of an amine compound (compound No. 10) obtained in Synthesis Example 10.

The thus-obtained amine compound was an amorphous substance. It was confirmed that the yield of the amine compound was 88.2%. The IR spectrum (according to KBr tablet method) is shown in FIG. 20. The results of the elemental analysis are indicated below.

| Elemental Analysis (%) | | | |
|---|---|---|---|
| | C | H | N |
| Measured Value | 85.71 | 5.88 | 2.47 |
| Calculated Value (as $C_{40}H_{33}NO_2$) | 85.84 | 5.94 | 2.50 |

Synthesis Example 11

Synthesis Example 10 was repeated in the same manner as described except that diethyl[bis(3-methoxyphenyl)methyl]phosphonate was used instead of diethyl[bis(4-methoxyphenyl)methyl]phosphonate. As a result, there was obtained an amine compound of the formula (A-11):

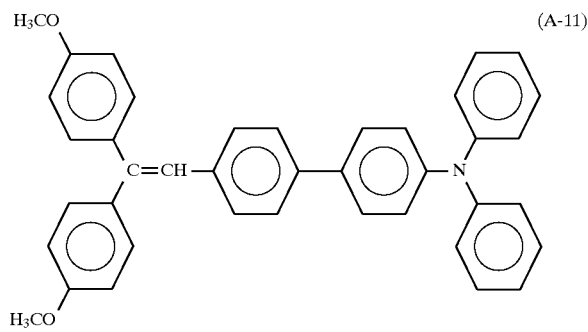
(A-11)

Figure 21:
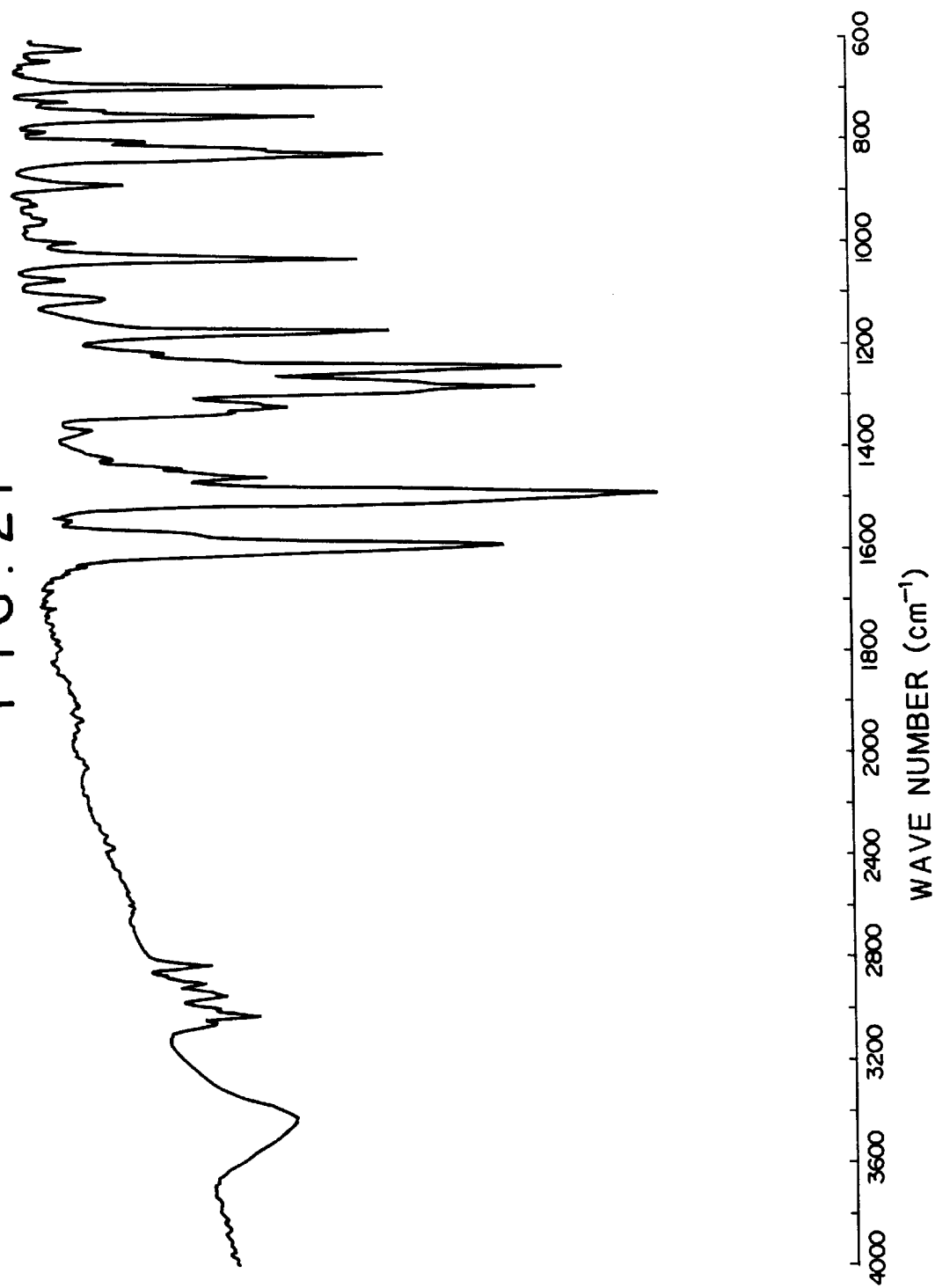
FIG. 21 is an IR spectrum (according to KBr tablet method) of an amine compound (compound No. 11) obtained in Synthesis Example 11.

The thus-obtained amine compound had a melting point of 184.5°–185.5° C. It was confirmed that the yield of the amine compound was 60.1%. The IR spectrum (according to KBr tablet method) is shown in FIG. 21. The results of the elemental analysis are indicated below.

| Elemental Analysis (%) | | | |
|---|---|---|---|
| | C | H | N |
| Measured Value | 85.98 | 5.90 | 2.40 |
| Calculated Value (as $C_{40}H_{33}NO_2$) | 85.84 | 5.94 | 2.50 |

Synthesis Example 12

Synthesis Example 1 was repeated in the same manner as described except that a formyl compound of the formula (F-10):

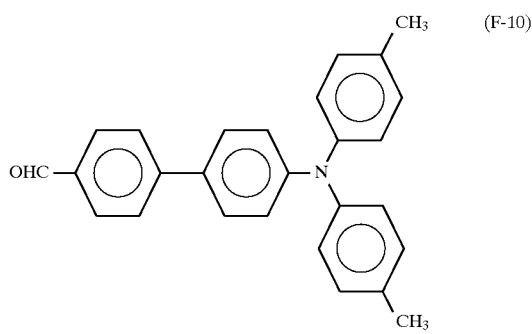
(F-10)

was used instead of 4,4'-dimethyl-4"-formyl triphenylamine. As a result, there was obtained an amine compound of the formula (A-12):

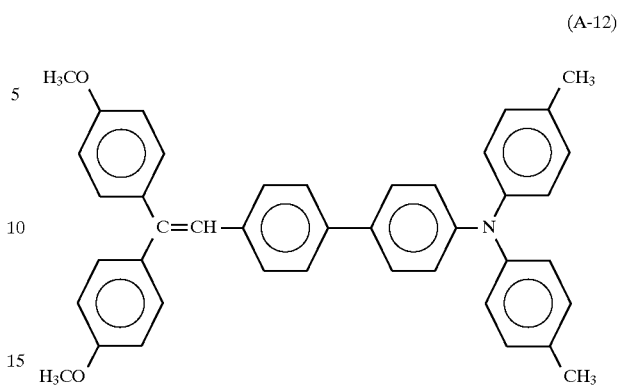
(A-12)

Figure 22:
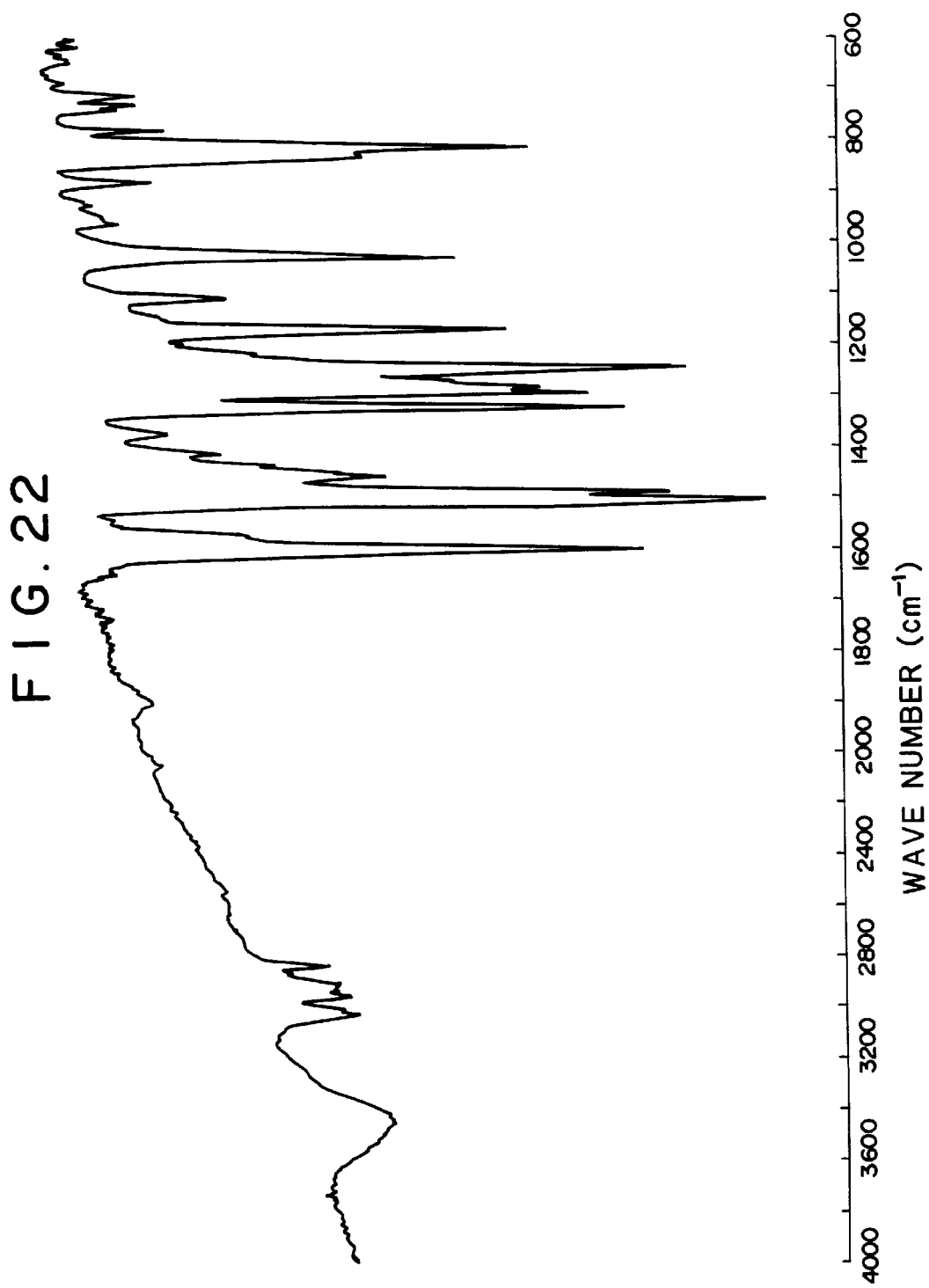
FIG. 22 is an IR spectrum (according to KBr tablet method) of an amine compound (compound No. 12) obtained in Synthesis Example 12.

The thus-obtained amine compound had a melting point of 181.0°–182.° C. It was confirmed that the yield of the amine compound was 79.9%. The IR spectrum (according to KBr tablet method) is shown in FIG. 22. The results of the elemental analysis are indicated below.

| Elemental Analysis (%) | | | |
|---|---|---|---|
| | C | H | N |
| Measured Value | 86.05 | 6.36 | 2.49 |
| Calculated Value (as $C_{42}H_{37}NO_2$) | 85.81 | 6.36 | 2.38 |

Synthesis Example 13

45.5 g (81 mmol) of the dimethoxy compound of the formula 11 obtained in Synthesis Example 11 and 40.0 g (452 mmol) of sodium thioethylate were added to 300 ml of dry DMF and the mixture was refluxed for 8 hours in a nitrogen stream. The reaction mixture was then cooled to room temperature and poured in 600 ml of ice water. The mixture was acidified with concentrated hydrochloric acid. The product was extracted with ethyl acetate and the extractant was washed with water and dried over magnesium sulfate. The solvent was then removed in vacuo to leave a light brown oily substance. This was dissolved in 100 ml of acetic anhydride and mixed with 10 ml of pyridine for 10 minute. The mixture was poured in water and the precipitates were filtered, washed and dried to obtain 49.0 g (yield: 97.8%) of light yellow powder. This was then subjected to column chromatography (elution liquid: toluene) and recrystallized from a mixed solvent of ethyl acetate and toluene, thereby obtaining 45.0 g (yield: 89.8%) of diacetoxy compound of the formula (A-13) in the form of light yellow needle-like crystals having a melting point of 207.0°–208.0° C.

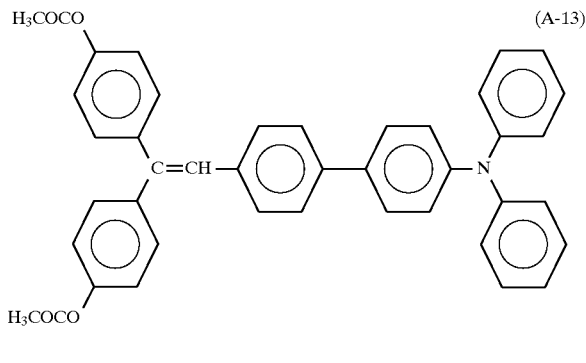

(A-13)

Figure 23:
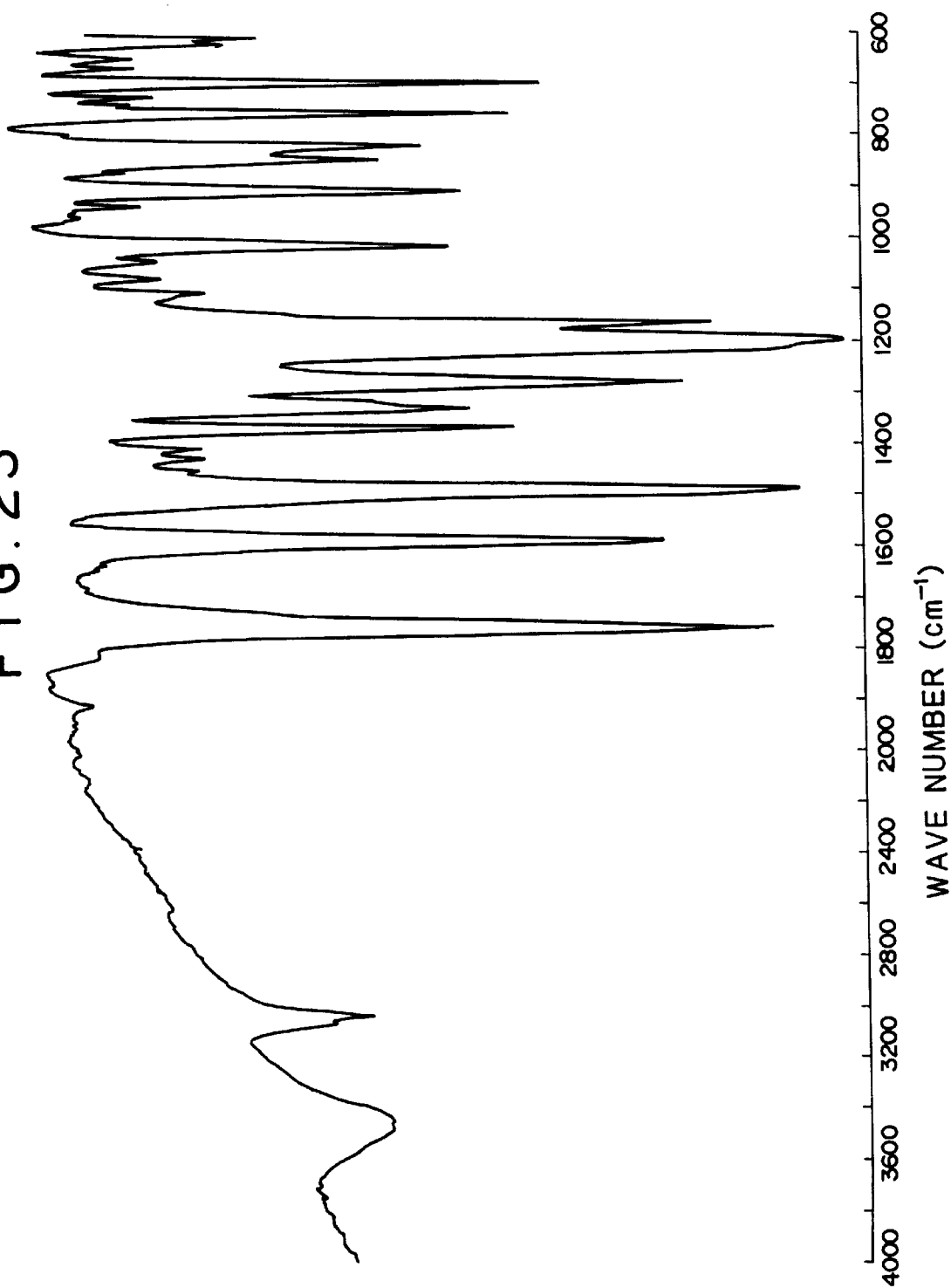
FIG. 23 is an IR spectrum (according to KBr tablet method) of an amine compound (compound No. 13) obtained in Synthesis Example 13.

The IR spectrum (according to KBr tablet method) is shown in FIG. 23. The results of the elemental analysis are indicated below.

|  | Elemental Analysis (%) | | |
| --- | --- | --- | --- |
|  | C | H | N |
| Measured Value | 82.11 | 5.34 | 2.11 |
| Calculated Value (as $C_{42}H_{33}NO_4$) | 81.92 | 5.41 | 2.28 |

Synthesis Example 14

Example 13 was repeated in the same manner as described except that the dimethoxy compound of the formula (A-12) obtained in Synthesis Example 12 was used in place of the compound of the formula (A-11), thereby obtaining a diacetoxy compound of the formula (A-14) having a melting point of 182.0°–183.0° C.

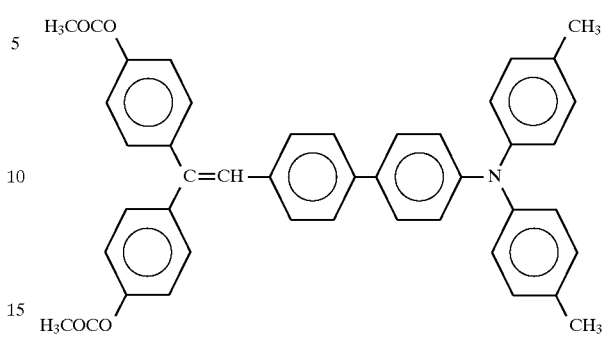

(A-14)

Figure 24:
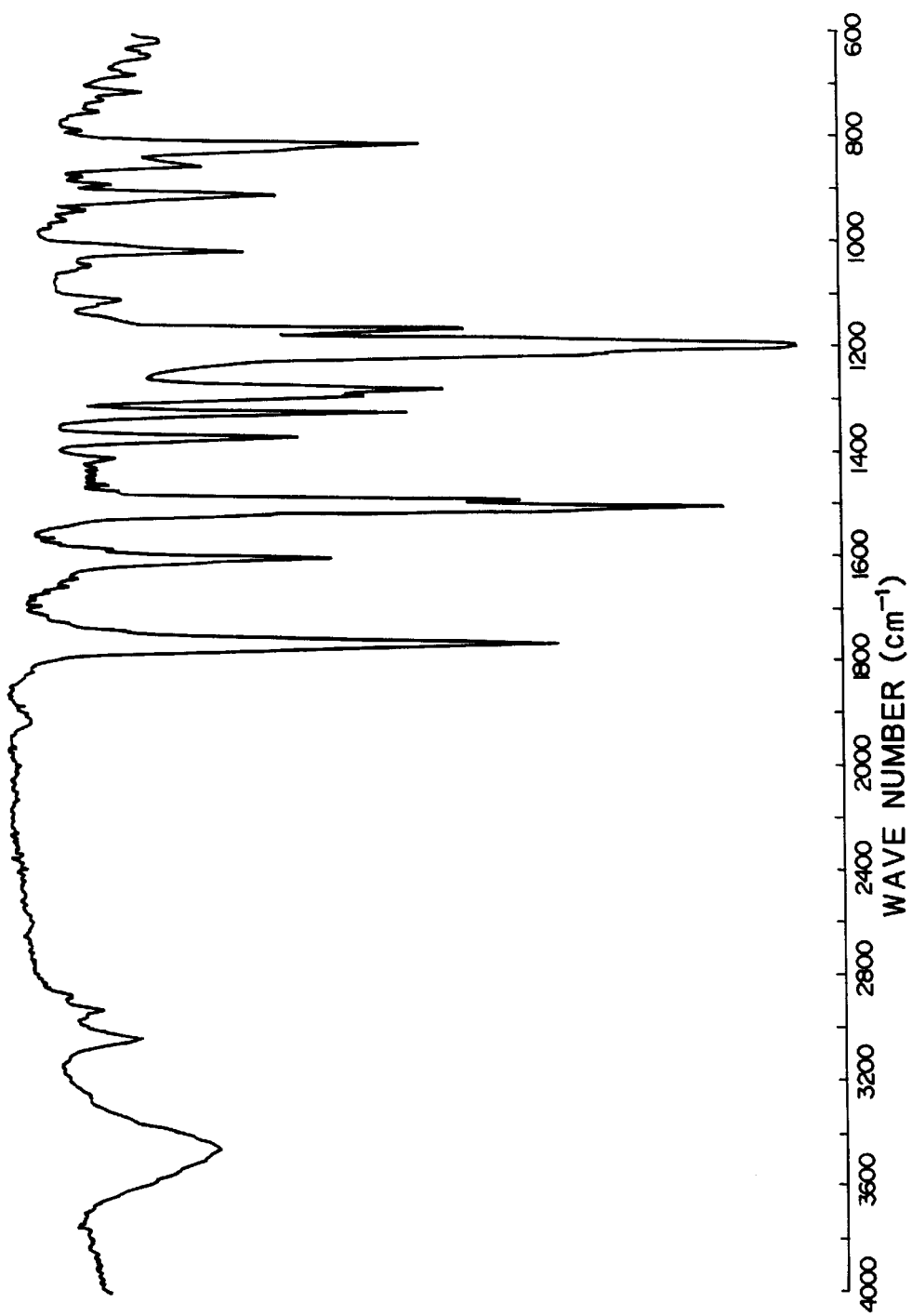
FIG. 24 is an IR spectrum (according to KBr tablet method) of an amine compound (compound No. 14) obtained in Synthesis Example 14.

The yield was 97.3%. The IR spectrum (according to KBr tablet method) is shown in FIG. 24. The results of the elemental analysis are indicated below.

|  | Elemental Analysis (%) | | |
| --- | --- | --- | --- |
|  | C | H | N |
| Measured Value | 81.90 | 5.71 | 2.20 |
| Calculated Value (as $C_{44}H_{37}NO_4$) | 82.08 | 5.80 | 2.18 |

Synthesis Example 15

Example 13 was repeated in the same manner as described except that the dimethoxy compound of the formula (A-7) obtained in Synthesis Example 7 was used in place of the compound of the formula (A-11), thereby obtaining a diacetoxy compound of the formula (A-15) in the form of amorphous substance.

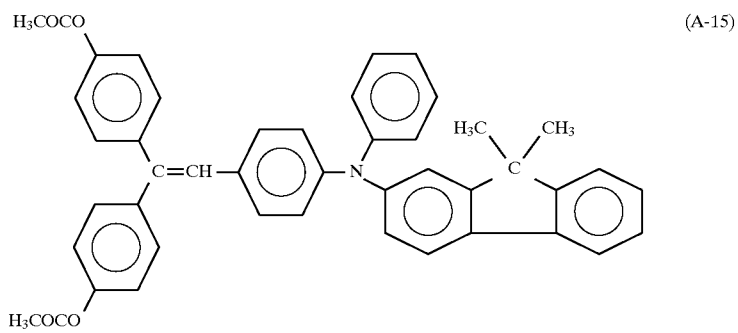

(A-15)

Figure 25:
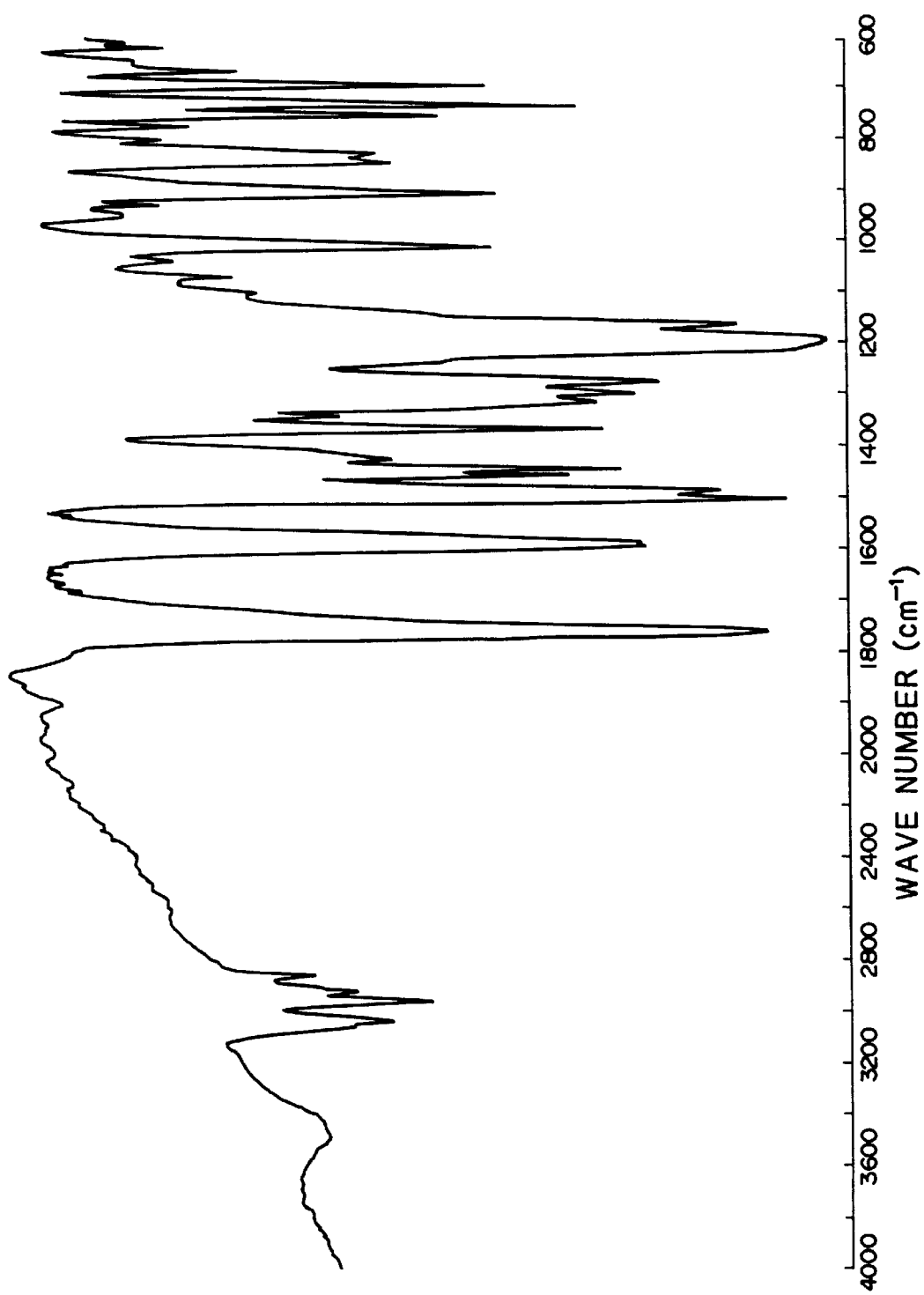
FIG. 25 is an IR spectrum (according to KBr tablet method) of an amine compound (compound No. 15) obtained in Synthesis Example 15.

The yield was 86.8%. The IR spectrum (according to KBr tablet method) is shown in FIG. 25. The results of the elemental analysis are indicated below.

| Elemental Analysis (%) | | | |
|---|---|---|---|
| | C | H | N |
| Measured Value | 82.47 | 5.76 | 1.94 |
| Calculated Value (as $C_{45}H_{37}NO_4$) | 82.42 | 5.69 | 2.14 |

Synthesis Example 16

11.0 g (25.5 mmol) of 4,4'-dimethyl-4"-[2,2-bis(4methoxyphenyl)vinyl]triphenylamine of the formula (A-1) obtained in Synthesis Example 1 and 10.0 g (107 mmol) of sodium thioethylate was dissolved in 110 ml of dried dimethylformamide (DMF). The solution was heated under reflux for 3 hours in a nitrogen gas stream. The resultant mixture was allowed to stand in air so as to be cooled to room temperature. The mixture was then placed in ice water and neutralized with concentrated hydrochloric acid. The mixture was extracted with ethyl acetate so as to give an organic layer. The organic layer was washed with water and dried to distill off the solvent. Thereafter, the organic layer was subjected to a column chromatography in which a silica gel-filled column and an eluent composed of toluene and ethyl acetate (volume ratio: 7:1) were employed, so that 10.87 g of yellow powder was obtained. This was then recrystallized from a combined solvent of cyclohexane and toluene and heated under reduced pressure for drying to thereby obtain 9.59 g of 4,4'-dimethyl-4"-[2,2-bis(4-hydroxyphenyl)vinyl]triphenylamine of the following formula (A-16):

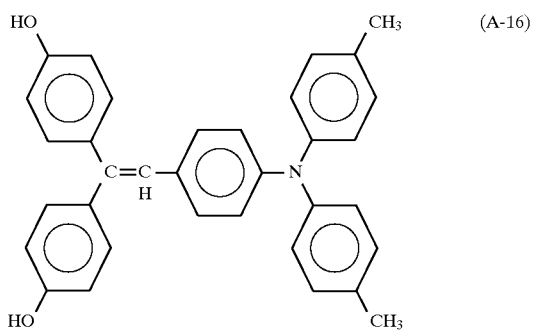

(A-16)

Figure 26:
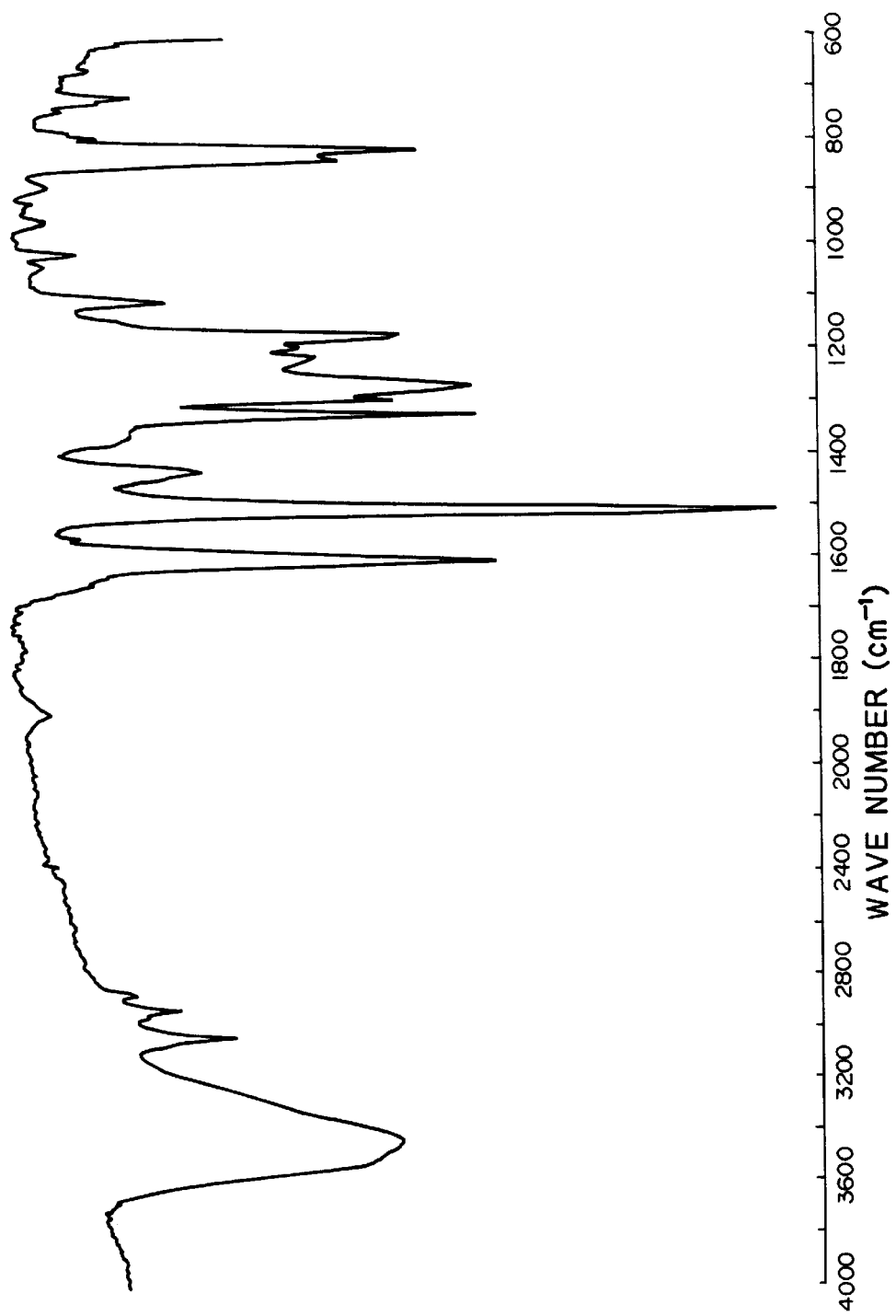
FIG. 26 is an IR spectrum (according to KBr tablet method) of a OH-containing amine (compound No. 16) obtained in Synthesis Example 16.
Figure 27:
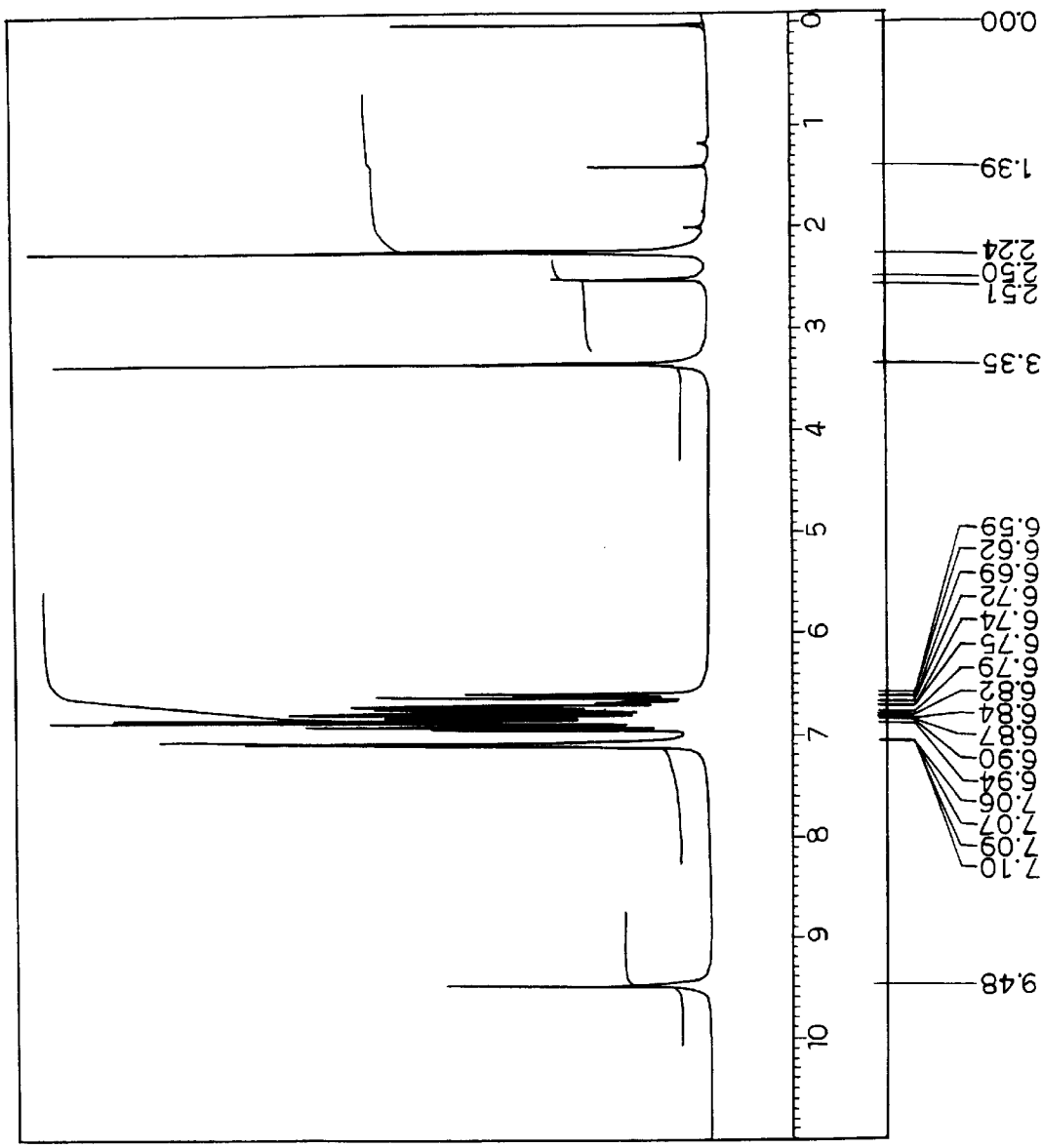
FIG. 27 is a proton NMR spectrum (in $d_6$-DMSO solution) of a OH-containing amine (compound No. 16) obtained in Synthesis Example 16.

The thus-obtained diol compound was a yellow powdery substance and the yield thereof was 92.3%. A greater part of the diol compound was amorphous and did not have a melting point. But there was also present crystallized part having a melting point of 172.5° C. The IR spectrum (according to KBr tablet method) and the proton NMR spectrum (in $d_6$-DMSO solution) are shown in FIGS. 26 and 27, respectively. The results of the elemental analysis are indicated below.

| Elemental Analysis (%) | | | |
|---|---|---|---|
| | C | H | N |
| Measured Value | 84.58 | 6.21 | 2.92 |
| Calculated Value (as $C_{34}H_{29}NO_2$) | 84.44 | 6.04 | 2.90 |

Synthesis Example 17

Synthesis Example 16 was repeated in the same manner as described except that the amine compound of the formula (A-2) obtained in Synthesis Example 2 was used instead of the compound of the formula (A-1). As a result, there was obtained a OH-containing amine compound of the formula (A-17):

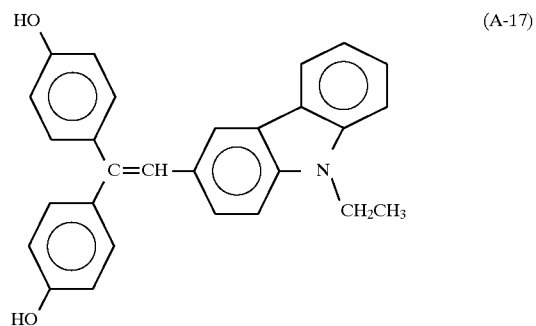

(A-17)

Figure 28:
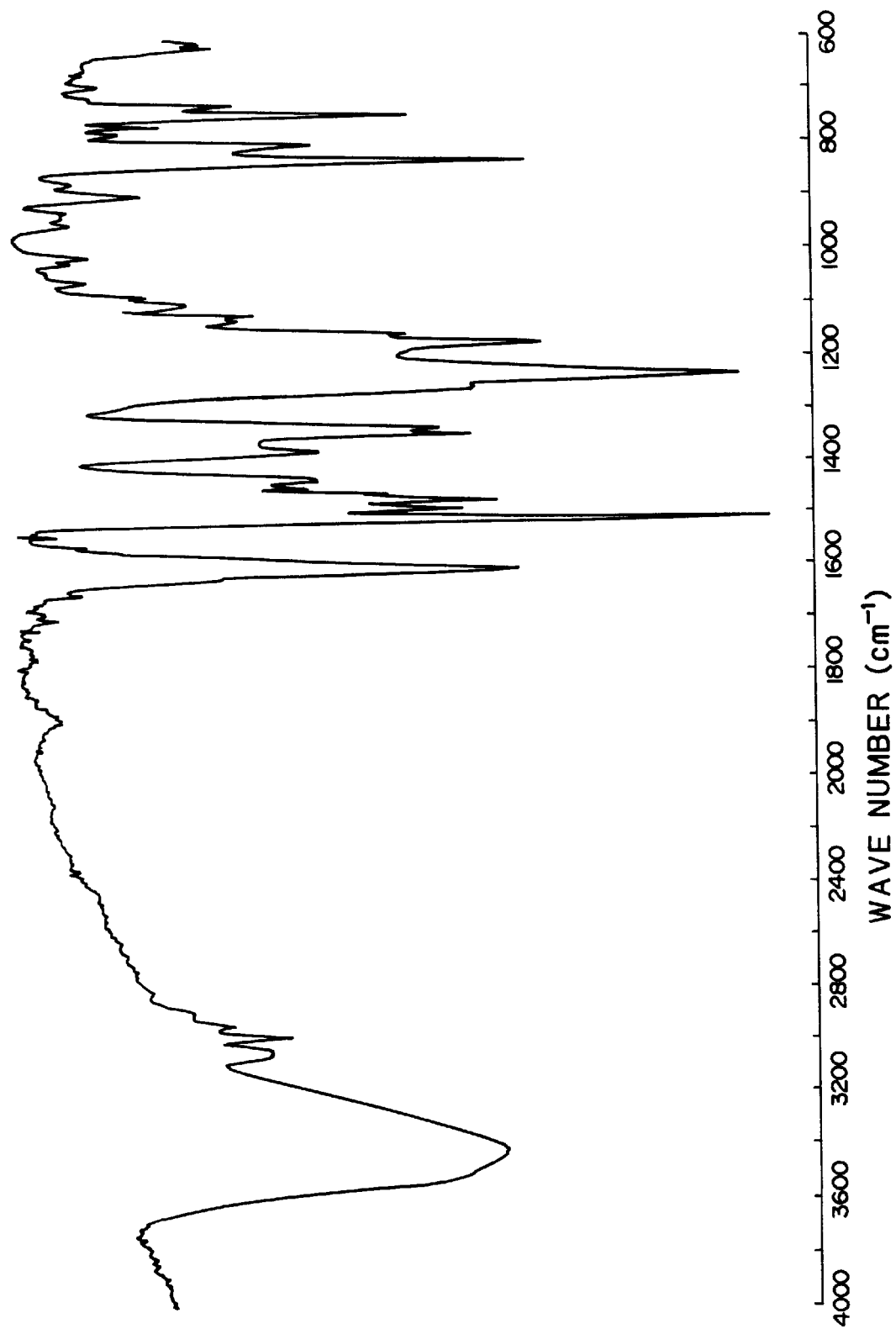
FIG. 28 is an IR spectrum (according to KBr tablet method) of a OH-containing amine (compound No. 17) obtained in Synthesis Example 17.
Figure 29:
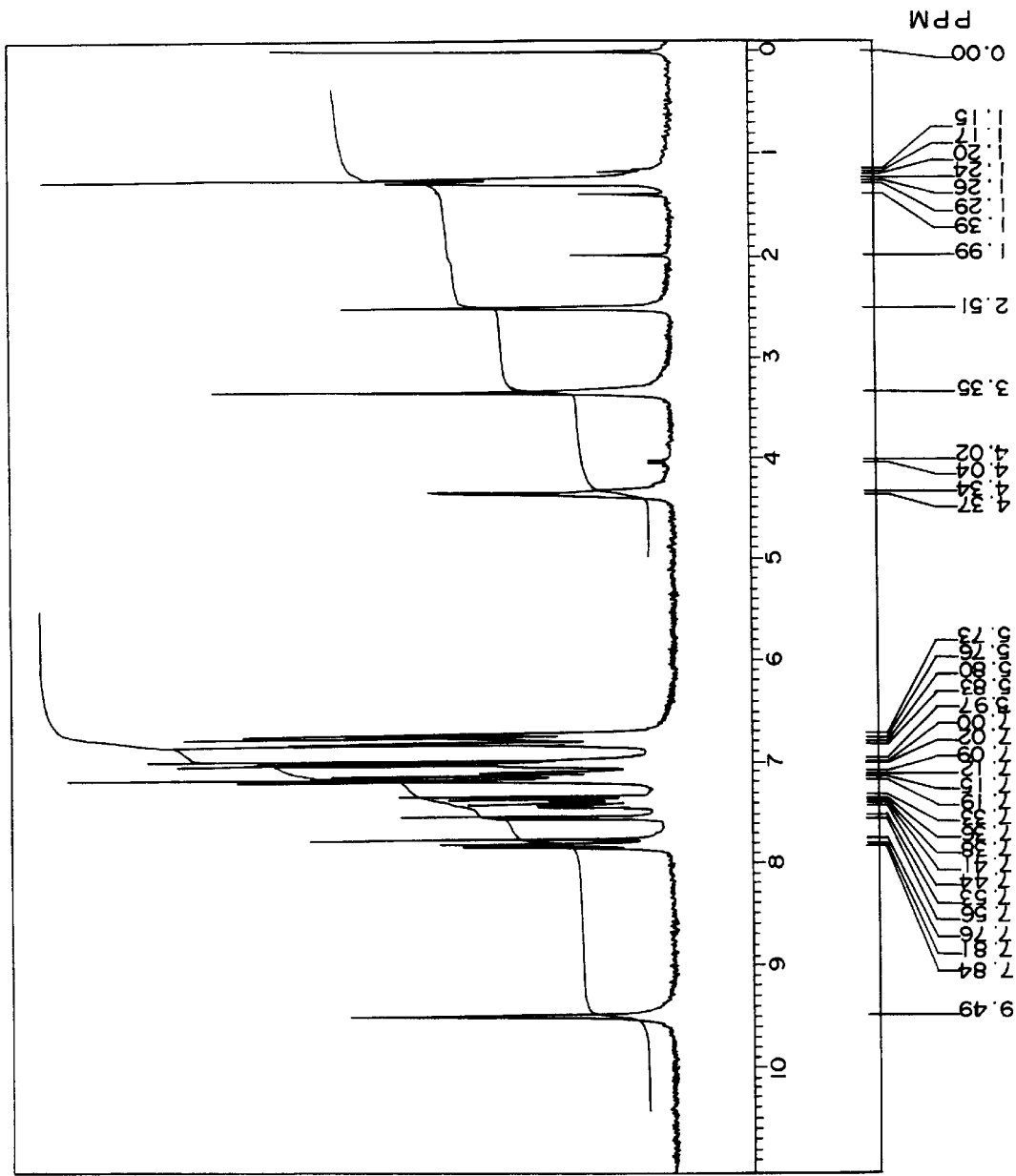
FIG. 29 is a proton NMR spectrum (in $d_6$-DMSO solution) of a OH-containing amine (compound No. 17) obtained in Synthesis Example 17.

The OH-containing amine compound was an amorphous substance. The yield was 93.3%. The IR spectrum (according to KBr tablet method) and the proton NMR spectrum (in $d_6$-DMSO solution) are shown in FIGS. 28 and 29, respectively. The results of the elemental analysis are indicated below.

| Elemental Analysis (%) | | | |
|---|---|---|---|
| | C | H | N |
| Measured Value | 82.44 | 5.74 | 3.33 |
| Calculated Value (as $C_{27}H_{23}NO_2$) | 82.94 | 5.72 | 3.45 |

Synthesis Example 18

Synthesis Example 16 was repeated in the same manner as described except that the amine compound of the formula (A-3) obtained in Synthesis Example 3 was used instead of the compound of the formula (A-1). As a result, there was obtained a OH-containing amine compound of the formula (A-18):

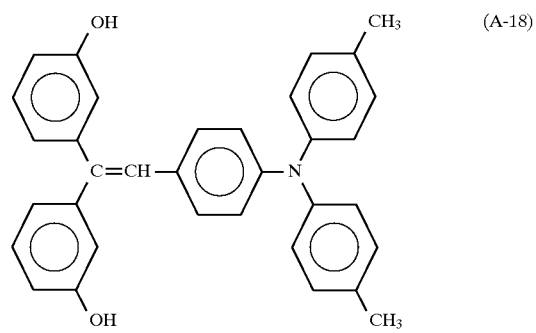

(A-18)

Figure 30:
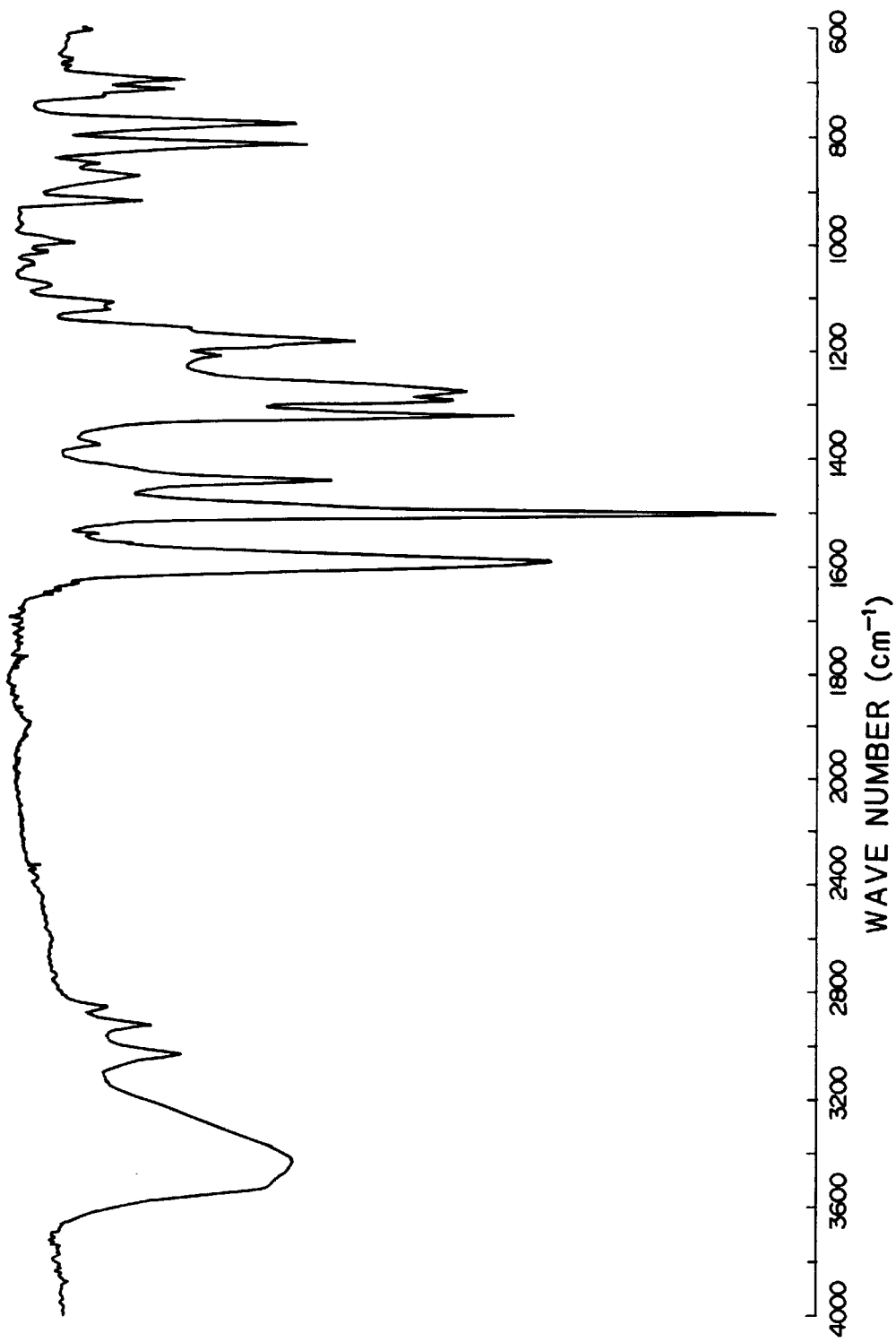
FIG. 30 is an IR spectrum (according to KBr tablet method) of a OH-containing amine (compound No. 18) obtained in Synthesis Example 18.
Figure 31:
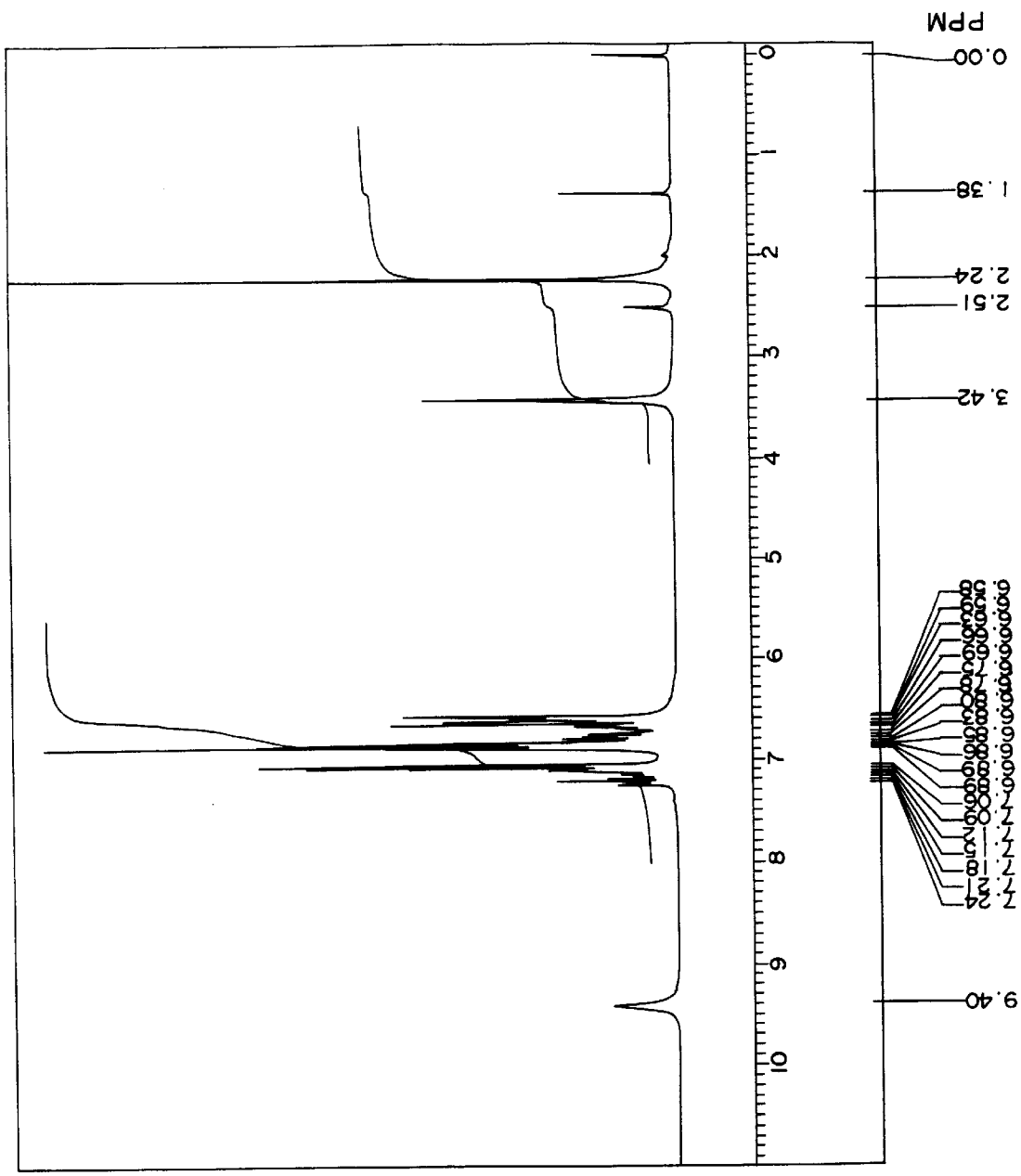
FIG. 31 is a proton NMR spectrum (in $d_6$-DMSO solution) of a OH-containing amine (compound No. 18) obtained in Synthesis Example 18.

The OH-containing amine compound was an amorphous substance. The yield was 89.7%. The IR spectrum (according to KBr tablet method) and the proton NMR spectrum (in $d_6$-DMSO solution) are shown in FIGS. 30 and 31, respectively. The results of the elemental analysis are indicated below.

| Elemental Analysis (%) | | | |
|---|---|---|---|
| | C | H | N |
| Measured Value | 84.61 | 6.04 | 2.77 |
| Calculated Value (as $C_{34}H_{29}NO_2$) | 84.44 | 6.04 | 2.90 |

Synthesis Example 19

Synthesis Example 16 was repeated in the same manner as described except that the amine compound of the formula (A-4) obtained in Synthesis Example 4 was used instead of the compound of the formula (A-1), thereby obtaining a OH-containing amine compound of the formula (A-19):

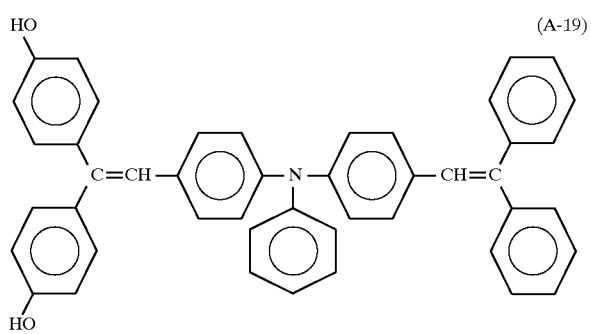

(A-19)

Figure 32:
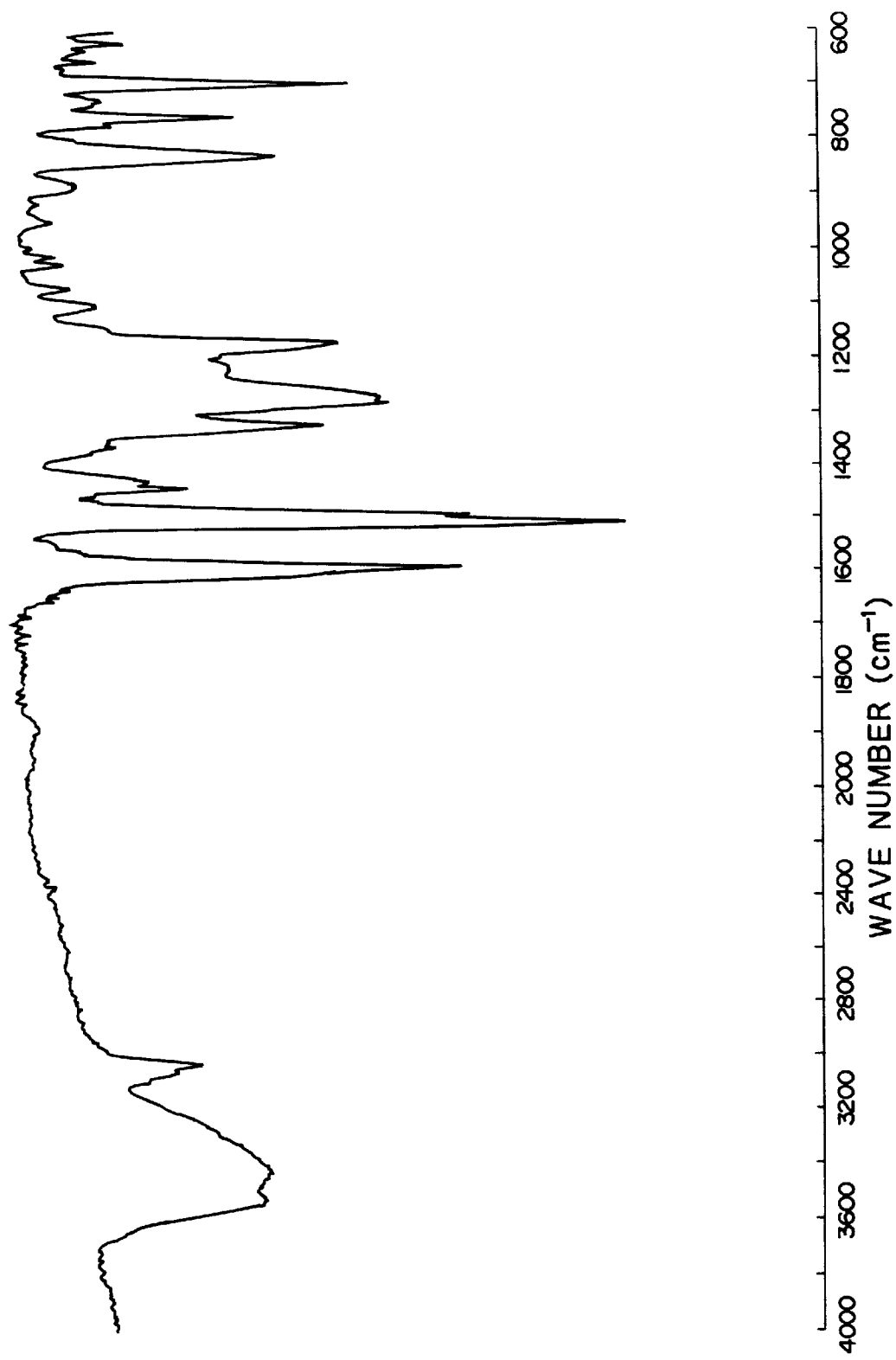
FIG. 32 is an IR spectrum (according to KBr tablet method) of a OH-containing amine (compound No. 19) obtained in Synthesis Example 13.

The OH-containing amine compound had a melting of 135° C. The yield was 93.4%. The IR spectrum (according to KBr tablet method) is shown in FIG. 32. The results of the elemental analysis are indicated below.

| Elemental Analysis (%) | | | |
|---|---|---|---|
| | C | H | N |
| Measured Value | 87.38 | 5.50 | 2.21 |
| Calculated Value (as $C_{46}H_{35}NO_2$) | 87.18 | 5.57 | 2.21 |

Synthesis Example 20

Synthesis Example 16 was repeated in the same manner as described except that the amine compound of the formula (A-5) obtained in Synthesis Example 5 was used instead of the compound of the formula (A-1). As a result, there was obtained a OH-containing amine compound of the formula (A-20):

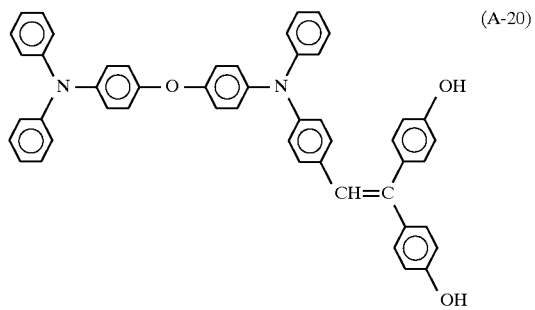

(A-20)

Figure 33:
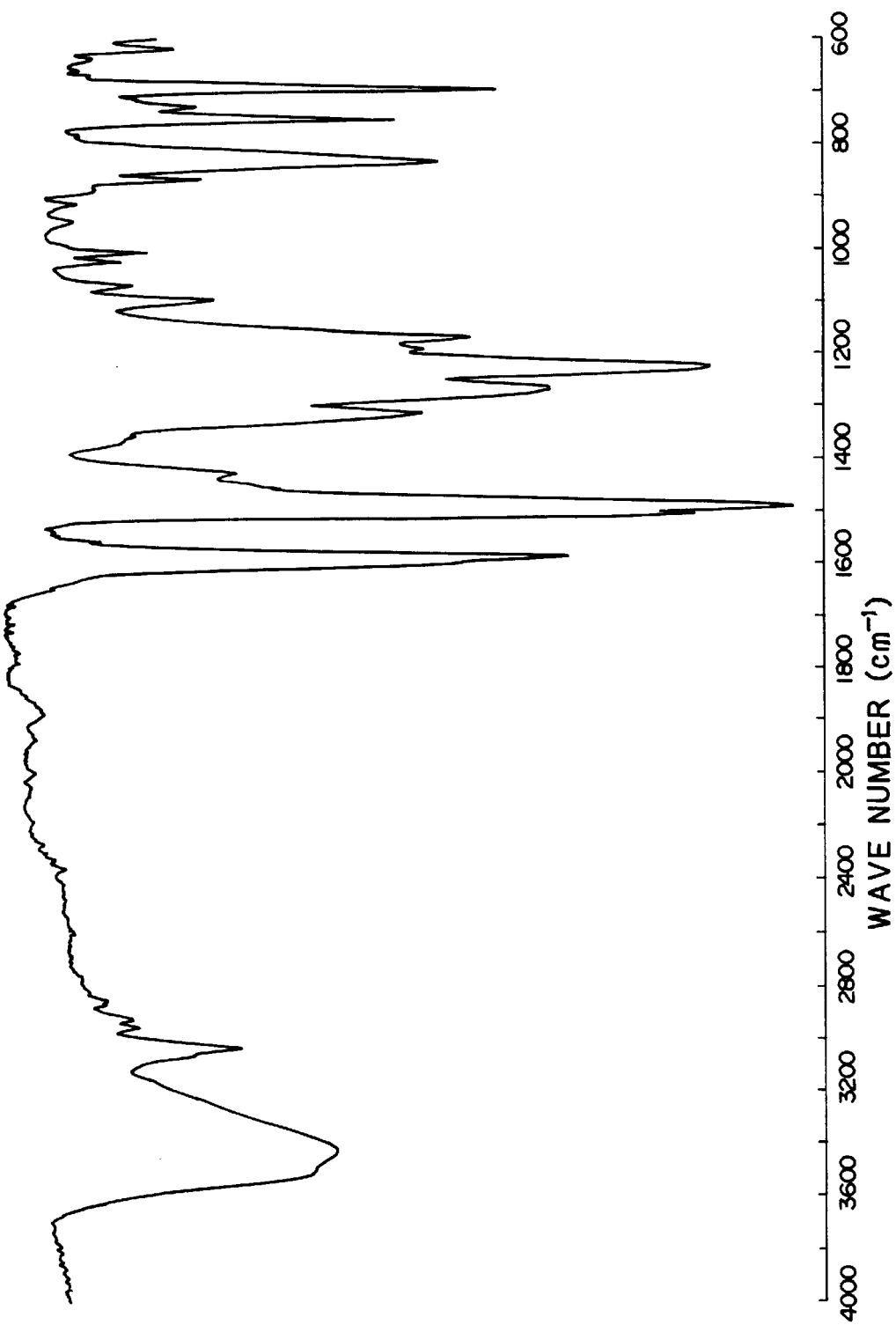
FIG. 33 is an IR spectrum (according to KBr tablet method) of a OH-containing amine (compound No. 20) obtained in Synthesis Example 20.

The OH-containing amine compound was an amorphous substance. The yield was 61.6%. The IR spectrum (according to KBr tablet method) is shown in FIG. 33. The results of the elemental analysis are indicated below.

| Elemental Analysis (%) | | | |
|---|---|---|---|
| | C | H | N |
| Measured Value* | 84.01 | 5.82 | 3.46 |
| Calculated Value* (as $C_{51.5}H_{41.5}N_2O_3$) | 83.92 | 5.68 | 3.81 |

*solvent (¼ n-hexane) adduct

Synthesis Example 21

Synthesis Example 16 was repeated in the same manner as described except that the amine compound of the formula (A-6) obtained in Synthesis Example 6 was used instead of the compound of the formula (A-1). As a result, there was obtained a OH-containing amine compound of the formula (A-21):

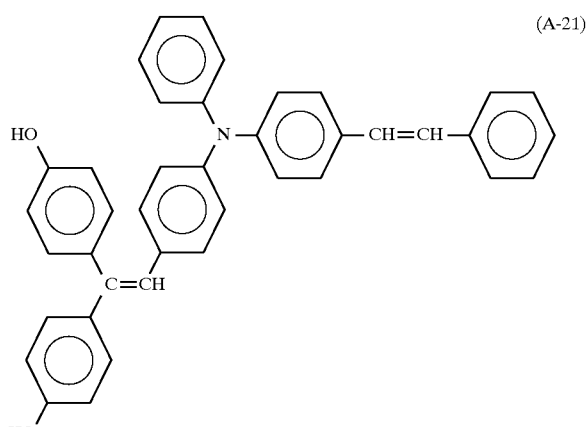

(A-21)

Figure 34:
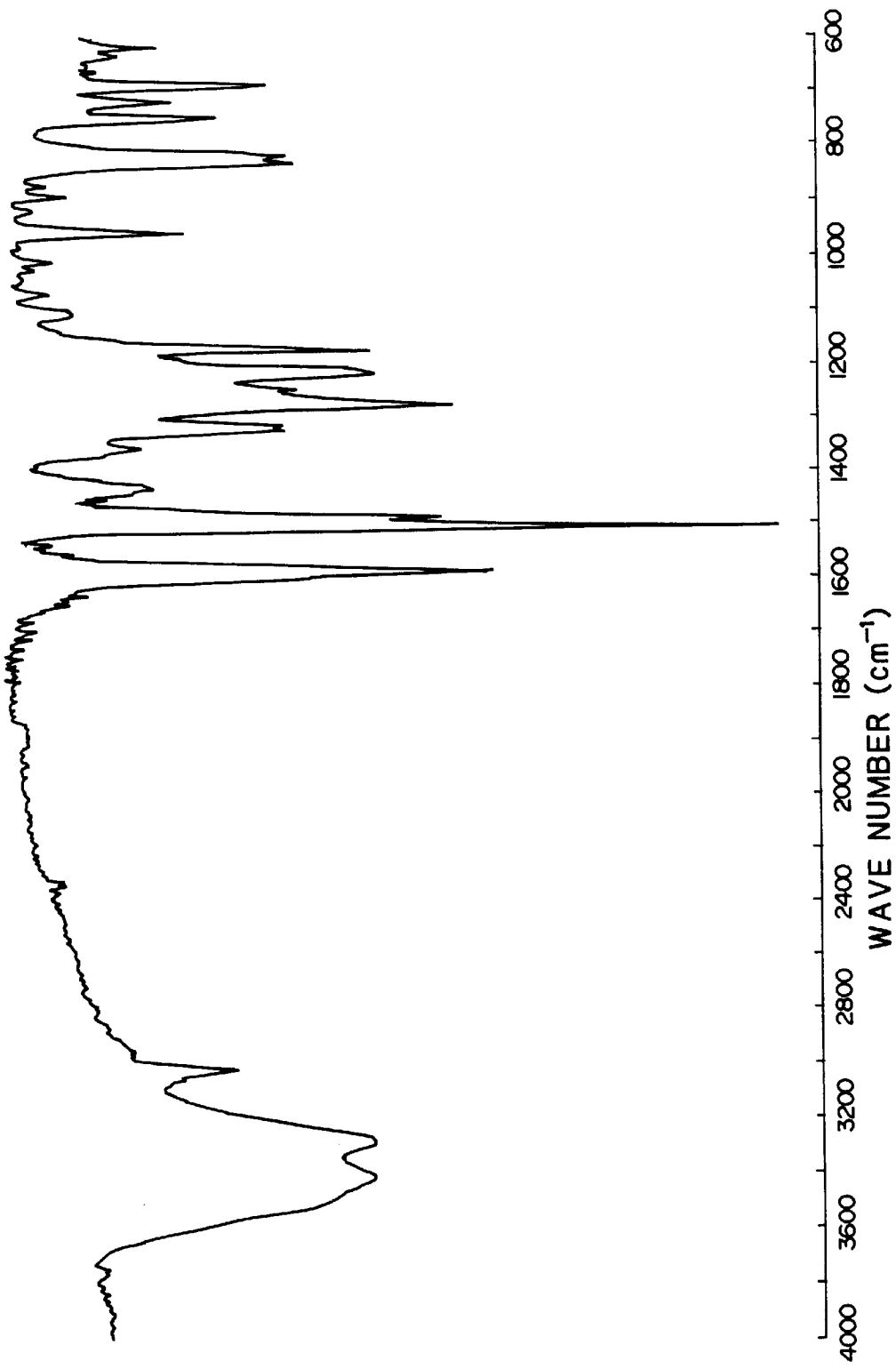
FIG. 34 is an IR spectrum (according to KBr tablet method) of a OH-containing amine (compound No. 21) obtained in Synthesis Example 21.

The OH-containing amine compound was an amorphous substance. The yield was 90.55%. The IR spectrum (according to KBr tablet method) is shown in FIG. 34. The results of the elemental analysis are indicated below.

| Elemental Analysis (%) | | | |
|---|---|---|---|
| | C | H | N |
| Measured Value | 86.07 | 5.64 | 2.46 |
| Calculated Value (as $C_{40}H_{31}NO_2$) | 86.15 | 5.60 | 2.51 |

Synthesis Example 22

Synthesis Example 16 was repeated in the same manner as described except that the amine compound of the formula (A-7) obtained in Synthesis Example 7 was used instead of the compound of the formula (A-1), thereby obtaining a OH-containing amine compound of the formula (A-22):

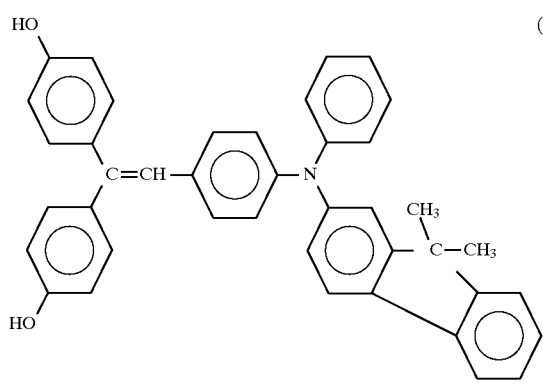
(A-22)

Figure 35:
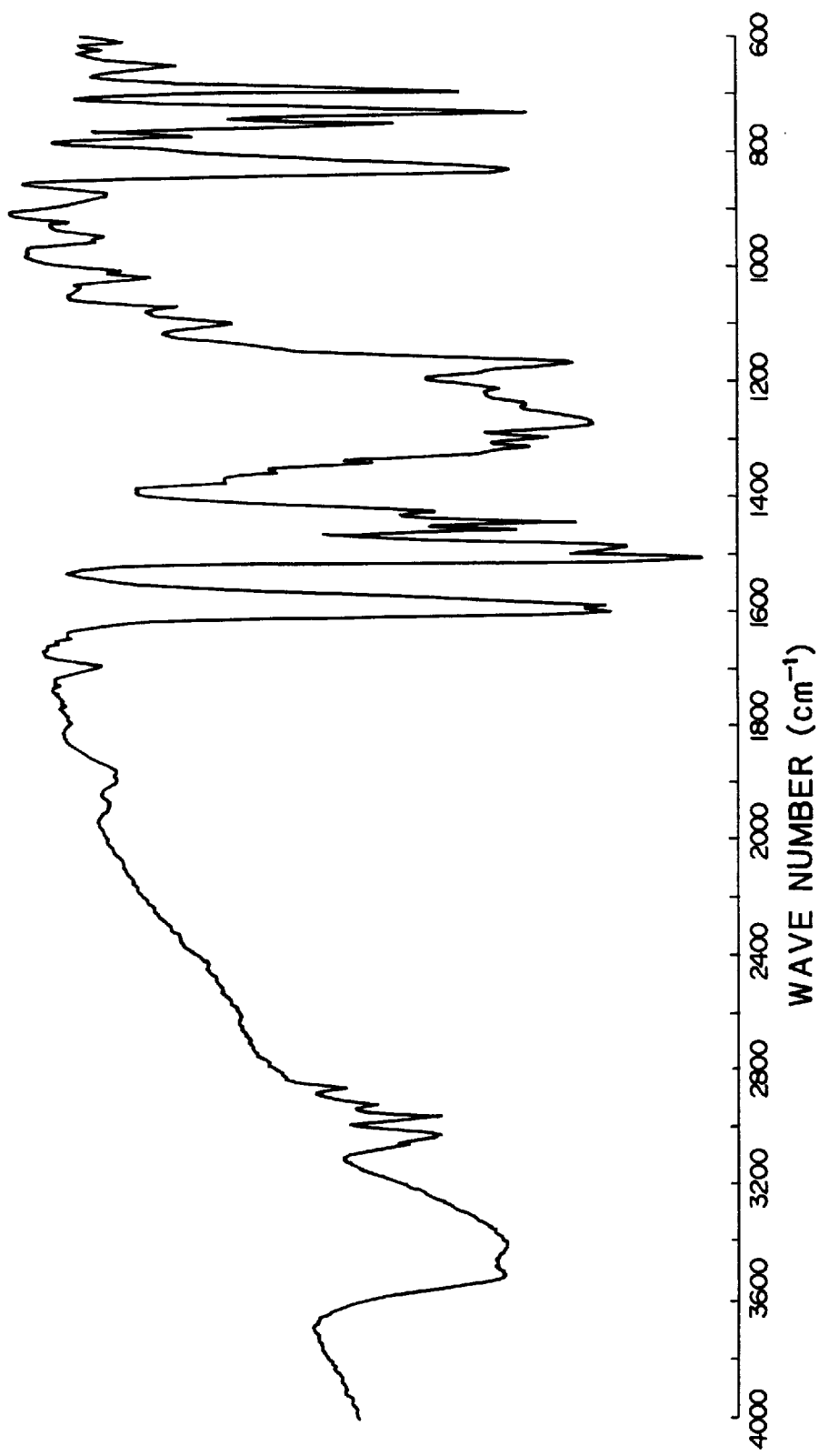
FIG. 35 is an IR spectrum (according to KBr tablet method) of a OH-containing amine (compound No. 22) obtained in Synthesis Example 16.
Figure 36:
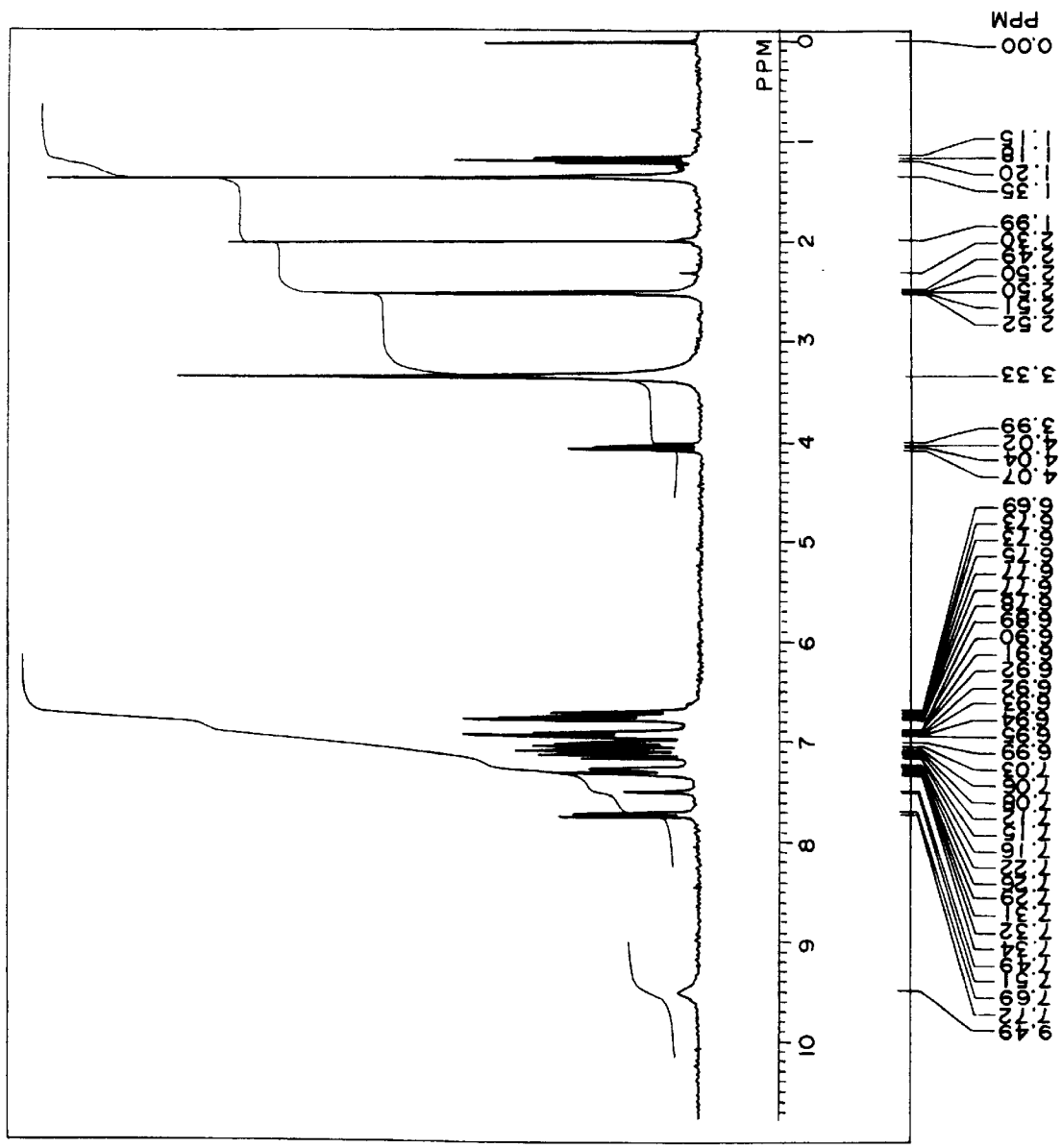
FIG. 36 is a proton NMR spectrum (in $d_6$-DMSO solution) of a OH-containing amine (compound No. 22) obtained in Synthesis Example 22.

The OH-containing amine compound was an amorphous substance. The yield was 57.91%. The IR spectrum (according to KBr tablet method) and the proton NMR spectrum (in $d_6$-DMSO solution) are shown in FIGS. 35 and 36, respectively. The results of the elemental analysis are indicated below.

| Elemental Analysis (%) | | | |
|---|---|---|---|
| | C | H | N |
| Measured Value | 84.86 | 6.15 | 2.16 |
| Calculated Value (as $C_{41}H_{33}NO_2$) | 86.14 | 5.82 | 2.45 |

Synthesis Example 23

Synthesis Example 16 was repeated in the same manner as described except that the amine compound of the formula (A-8) obtained in Synthesis Example 8 was used instead of the compound of the formula (A-1). As a result, there was obtained a OH-containing amine compound of the formula (A-23):

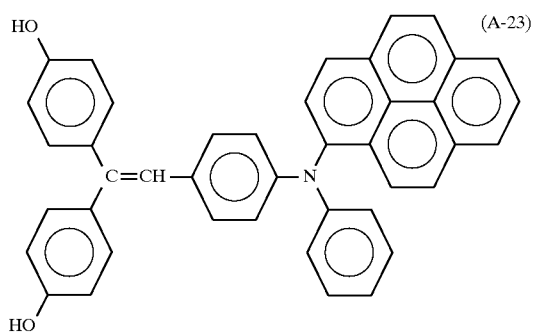
(A-23)

Figure 37:
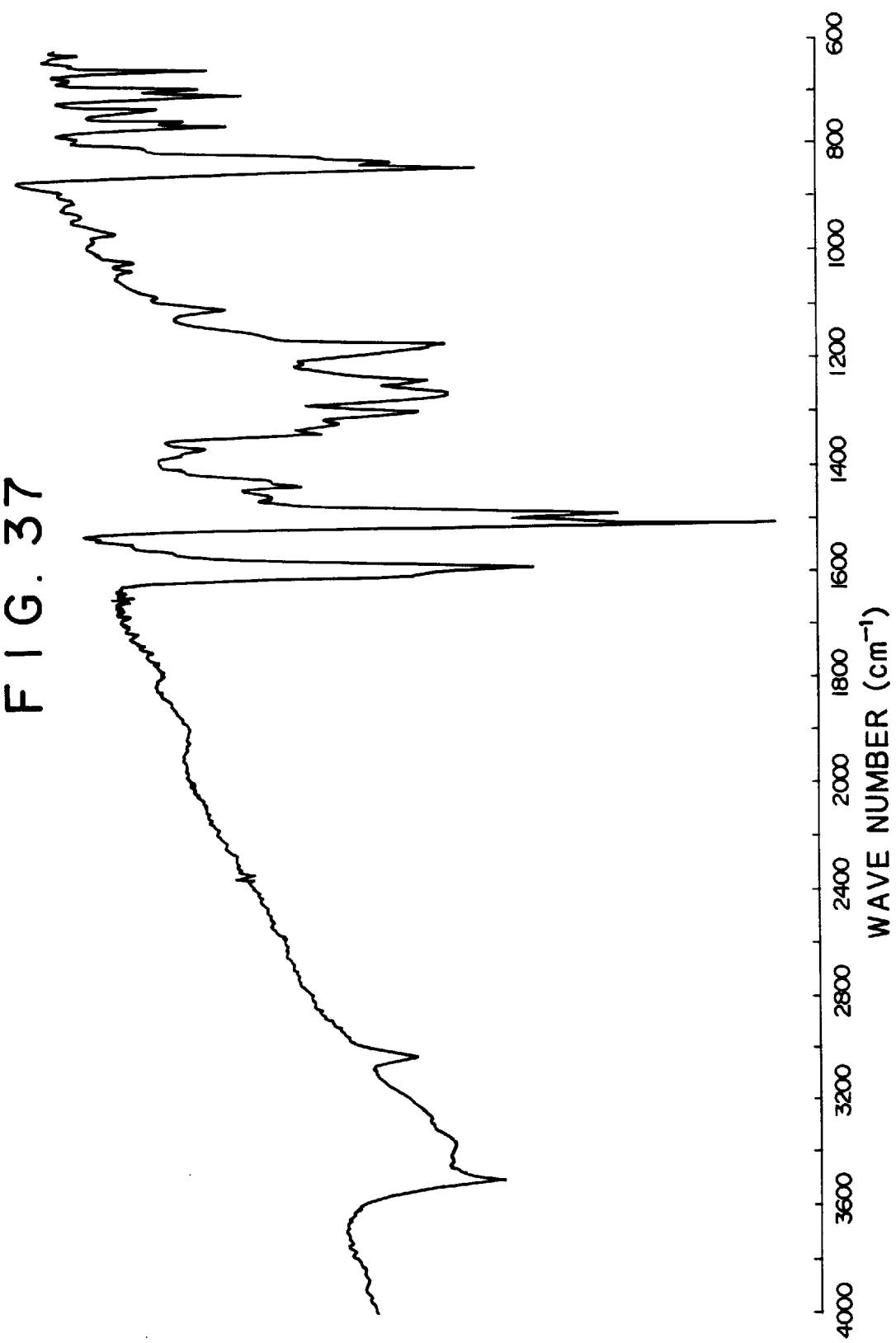
FIG. 37 is an IR spectrum (according to KBr tablet method) of a OH-containing amine (compound No. 23) obtained in Synthesis Example 23.

The OH-containing amine compound had a melting point of 211° C. The yield was 91.7%. The IR spectrum (according to KBr tablet method) is shown in FIG. 37. The results of the elemental analysis are indicated below.

| Elemental Analysis (%): | | | |
|---|---|---|---|
| | C | H | N |
| Measured Value | 86.57 | 5.02 | 2.29 |
| Calculated Value (as $C_{42}H_{29}NO_2$) | 87.02 | 5.04 | 2.42 |

Synthesis Example 24

Synthesis Example 16 was repeated in the same manner as described except that the amine compound of the formula (A-9) obtained in Synthesis Example 9 was used instead of the compound of the formula (A-1). As a result, there was obtained a OH-containing amine compound of the formula (A-24):

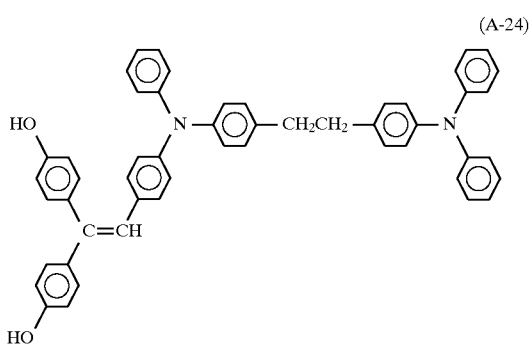
(A-24)

Figure 38:
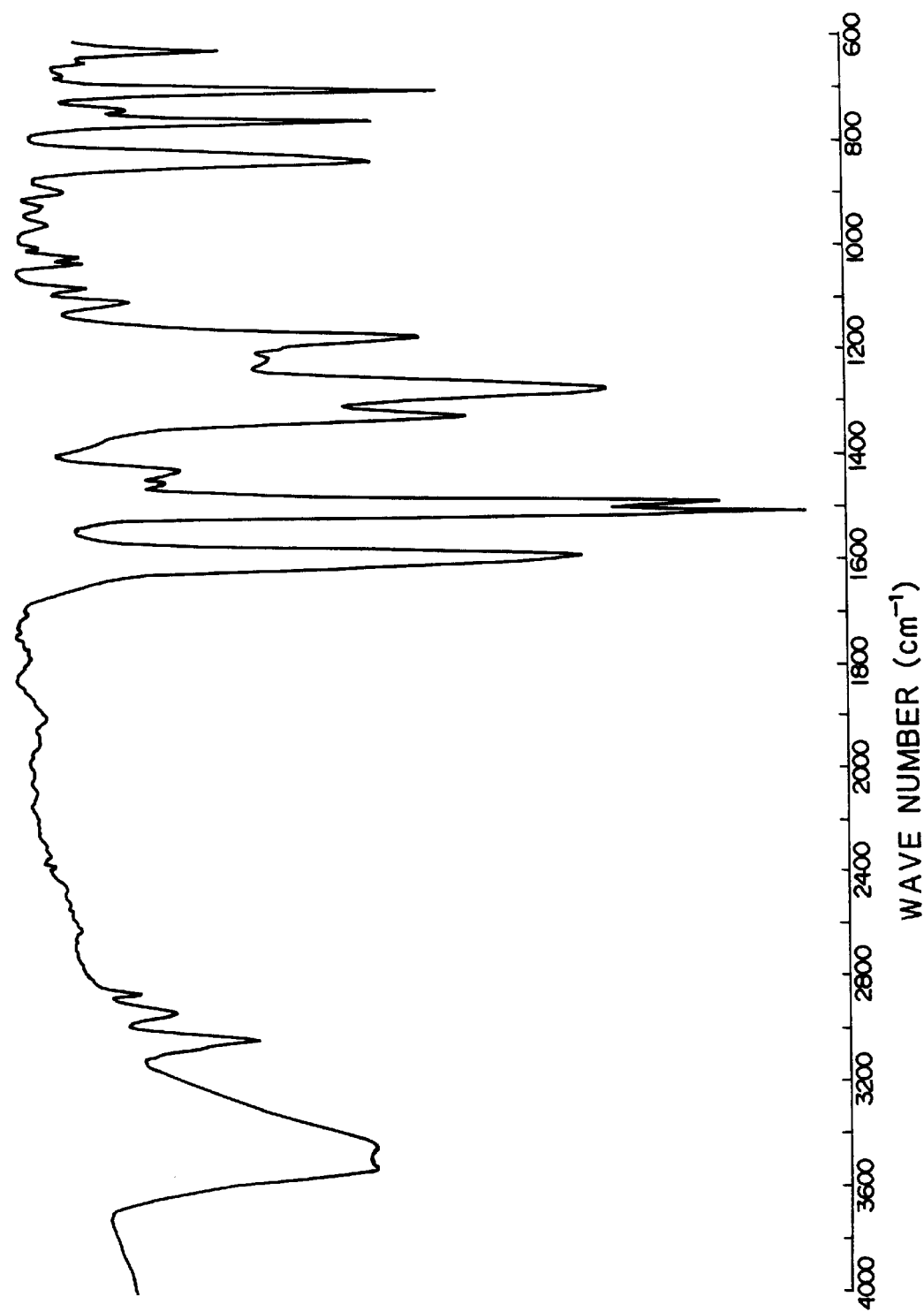
FIG. 38 is an IR spectrum (according to KBr tablet method) of a OH-containing amine (compound No. 24) obtained in Synthesis Example 24.

The OH-containing amine compound was an amorphous substance. The yield was 90.2%. The IR spectrum (according to KBr tablet method) is shown in FIG. 38. The results of the elemental analysis are indicated below.

| Elemental Analysis (%) | | | |
|---|---|---|---|
| | C | H | N |
| Measured Value | 85.95 | 5.85 | 3.80 |
| Calculated Value (as $C_{52}H_{42}N_2O_2$) | 85.92 | 5.82 | 3.85 |

Synthesis Example 25

Synthesis Example 16 was repeated in the same manner as described except that the amine compound of the formula (A-10) obtained in Synthesis Example 10 was used instead of the compound of the formula (A-1). As a result, there was obtained a OH-containing amine compound of the formula (A-25):

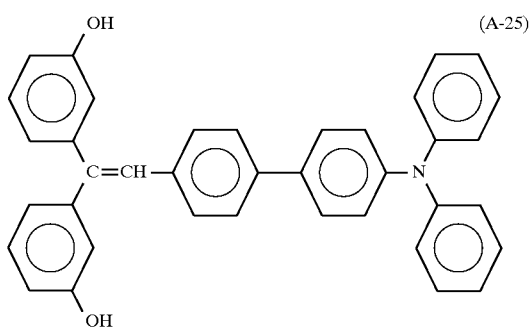
(A-25)

Figure 39:
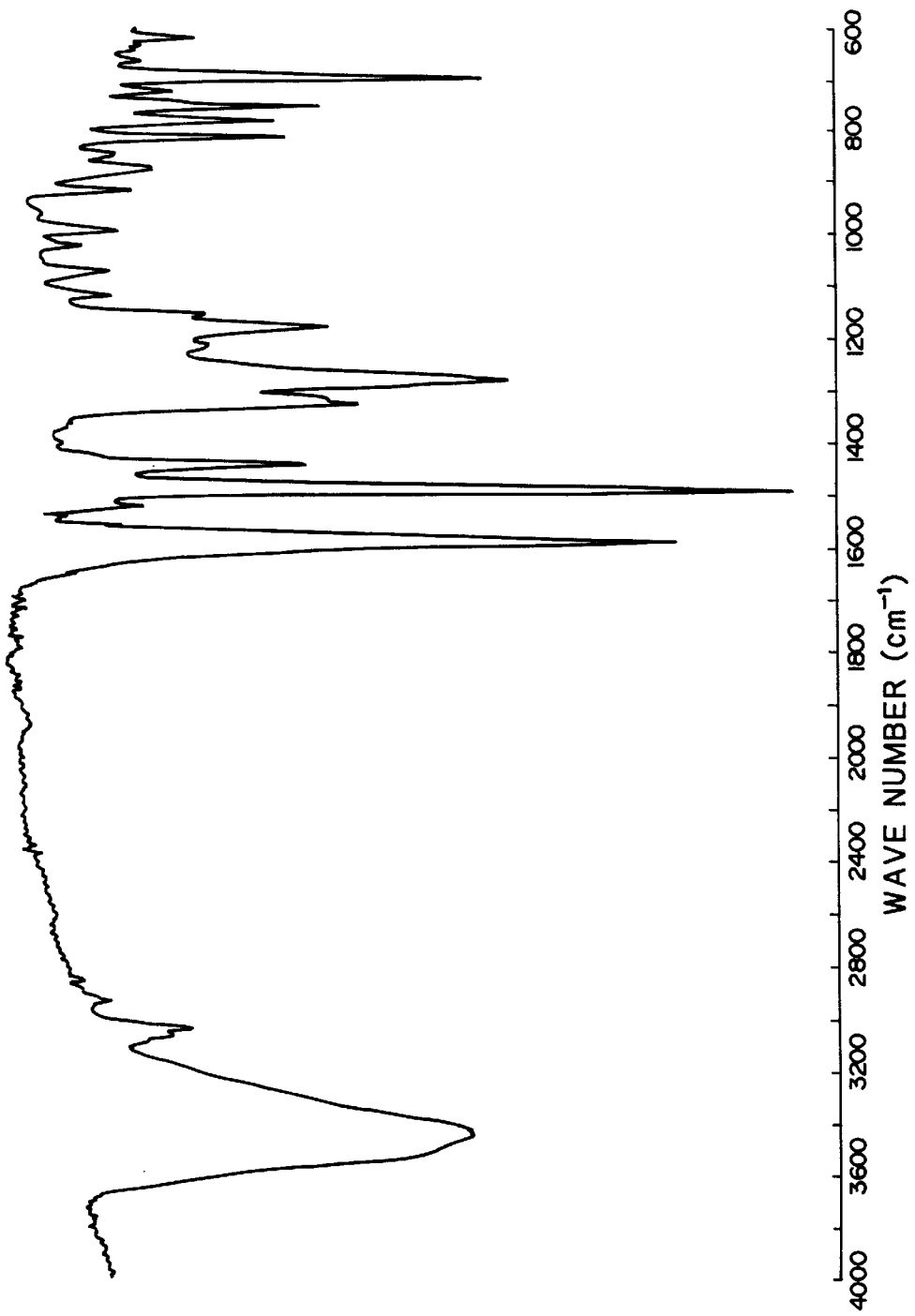
FIG. 39 is an IR spectrum (according to KBr tablet method) of a OH-containing amine (compound No. 25) obtained in Synthesis Example 25.

The OH-containing amine compound was an amorphous substance. The yield was 95.1%. The IR spectrum (according to KBr tablet method) is shown in FIG. 39. The results of the elemental analysis are indicated below.

| Elemental Analysis (%) | | | |
|---|---|---|---|
| | C | H | N |
| Measured Value | 85.45 | 5.53 | 2.55 |
| Calculated Value (as $C_{36}H_{29}NO_2$) | 85.85 | 5.50 | 2.63 |

Synthesis Example 26

Synthesis Example 16 was repeated in the same manner as described except that the amine compound of the formula (A-11) obtained in Synthesis Example 11 was used instead of the compound of the formula (A-1). As a result, there was obtained a OH-containing amine compound of the formula (A-26):

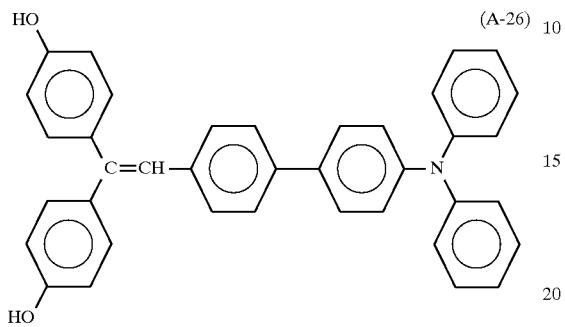

(A-26)

Figure 40:
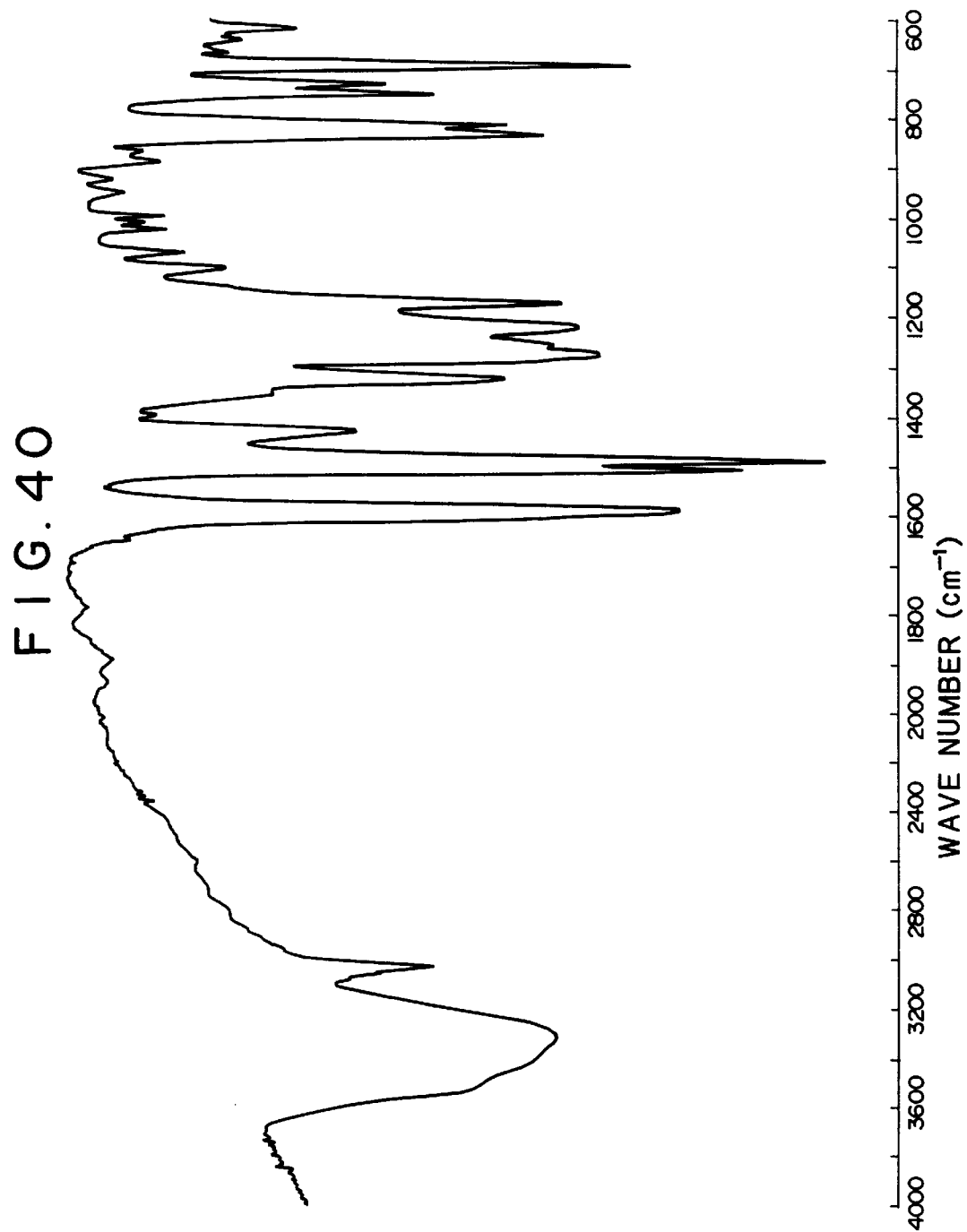
FIG. 40 is an IR spectrum (according to KBr tablet method) of a OH-containing amine (compound No. 26) obtained in Synthesis Example 26.

The OH-containing amine compound showed a DTA endothermic peak at 119.2° C. The yield was 96.0%. The IR spectrum (according to KBr tablet method) is shown in FIG. 40. The results of the elemental analysis are indicated below.

| | Elemental Analysis (%) | | |
|---|---|---|---|
| | C | H | N |
| Measured Value | 86.63 | 5.86 | 2.24 |
| Calculated Value (as $C_{38}H_{29}NO_2$) | 86.63 | 5.99 | 2.25 |

Synthesis Example 27

Synthesis Example 16 was repeated in the same manner as described except that the amine compound of the formula (A-12) obtained in Synthesis Example 12 was used instead of the compound of the formula (A-1). As a result, there was obtained a OH-containing amine compound of the formula (A-26):

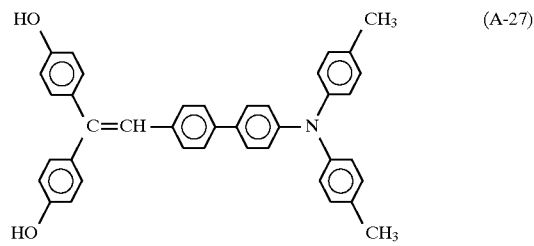

(A-27)

The OH-containing amine compound showed a DTA endothermic peak at 119.7° C. The yield was 97.0%. The IR spectrum (according to KBr tablet method) is shown in FIG. 41. The results of the elemental analysis are indicated below.

| | Elemental Analysis (%) | | |
|---|---|---|---|
| | C | H | N |
| Measured Value | 86.76 | 6.28 | 2.10 |
| Calculated Value (as $C_{40}H_{33}NO_2$) | 86.59 | 6.35 | 2.15 |

Reference Example 1

7.5 parts of a tris-azo compound as a charge-generating material having the following formula:

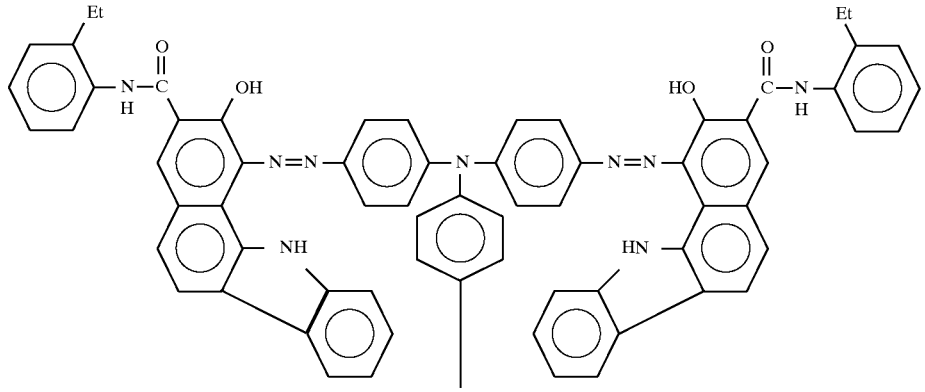

-continued

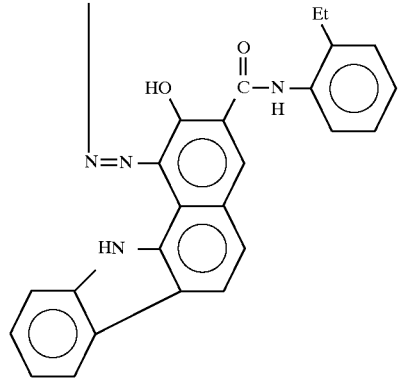

and 500 parts of a 0.5% tetrahydrofuran solution of a polyester resin (Viron 200 manufactured by Toyo Boseki K.K.) were pulverized and mixed together in a ball mill to obtain a dispersion. The dispersion obtained was coated on an aluminum-deposited polyester film by using a doctor blade and left in an ambient atmosphere for natural drying so that a charge-generating layer having a thickness of about 1 μm was formed on the polyester film. Separately, 1 part of the amine compound of the formula (A-1) as a charge-transfer material obtained in Synthesis Example 1 was dissolved in a resin solution composed of 1 part of a polycarbonate resin (Panlight K-1300 manufactured by Teijin K.K.). The thus-obtained solution was coated on the charge-generating layer formed on the polyester film by using a doctor blade. The coated solution was dried at 80° C. for 2 minutes and then at 120° C. for 5 minutes, so that a charge-transfer layer having a thickness of about 20 μm was obtained.

Next, the thus-obtained photosensitive member having a laminated structure was tested for the sensitivity to a visible ray by using an electrostatic copying paper tester (SP428-model manufactured by Kawaguchi Electric Machinery Co., Ltd.). In the test, the photosensitive member was placed in a dark chamber and corona-discharged at −6 KV for 20 seconds. The electrostatically charged photosensitive member was then measured for a surface potential Vm (V) thereof and further allowed to stand in the dark chamber for 20 seconds, upon which a surface potential V0 (V) was measured. Thereafter, a tungsten lamp light was radiated onto a surface of the photosensitive member at an illumination intensity of 4.5 lux to measure an exposure amount $E_{1/2}$ (lux second) required to decrease the surface potential $V_0$ to one-half of the initial value. The results are shown in Table 1.

Reference Example 2

7.5 parts of a bis-azo compound as a charge-generating material having the following formula:

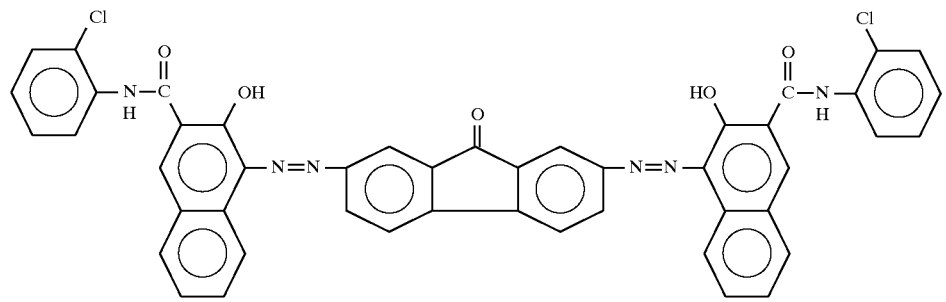

and 500 parts of a 0.5% tetrahydrofuran solution of a polyester resin (Viron 200 manufactured by Toyo Boseki K.K.) were pulverized and mixed together in a ball mill to obtain a dispersion. The dispersion obtained was coated on an aluminum-deposited polyester film by using a doctor blade and left in an ambient atmosphere for natural drying so that a charge-generating layer having a thickness of about 1 μm was formed on the polyester film. Separately, 1 part of the amine compound of the formula (A-16) as a charge-transfer material obtained in Synthesis Example 16 was dissolved in a resin solution composed of 1 part of a polycarbonate resin (Panlight K-1300 manufactured by Teijin K.K.). The thus-obtained solution was coated on the charge-generating layer formed on the polyester film by using a doctor blade. The coated solution was dried at 80°

C. for 2 minutes and then at 120° C. for 5 minutes, so that a charge-transfer layer having a thickness of about 20 μm was obtained.

Next, the thus-obtained photosensitive member having a laminated structure was tested for the sensitivity to a visible ray by using an electrostatic copying paper tester (SP428-model manufactured by Kawaguchi Electric Machinery Co., Ltd.). In the test, the photosensitive member was placed in a dark chamber and corona-discharged at −6 KV for 20 seconds. The electrostatically charged photosensitive member was then measured for a surface potential $V_m$ (V) thereof and further allowed to stand in the dark chamber for 20 seconds, upon which a surface potential $V_0$ (V) was measured. Thereafter, a tungsten lamp light was radiated onto a surface of the photosensitive member at an illumination intensity of 4.5 lux to measure an exposure amount $E_{1/2}$ (lux.second) required to decrease the surface potential $V_0$ to one-half of the initial value. The results are shown in Table 1.

Reference Examples 3 to 8

Reference Example 2 was repeated in the same manner as described except that the compounds enumerated in Table 1 were used as a charge-transfer material. The photosensitive member obtained was tested to give the results shown in Table 1.

TABLE 1

| Reference Example No. | Charge-transfer material formula | $-V_m$ (V) | $-V_0$ (V) | $E_{1/2}$ (lux · sec) |
|---|---|---|---|---|
| 1 | A-1 | 1310 | 740 | 0.51 |
| 2 | A-16 | 1014 | 323 | 0.80 |
| 3 | A-2 | 1500 | 1386 | 1.50 |
| 4 | A-3 | 1363 | 1219 | 1.12 |
| 5 | A-4 | 1363 | 1160 | 1.10 |
| 6 | A-17 | 1508 | 1314 | 1.71 |
| 7 | A-18 | 1466 | 1174 | 0.90 |
| 8 | A-19 | 1260 | 864 | 0.78 |

EXAMPLE 1

4.84 parts by weight of 4,4'-dimethyl-4"-[2,2-bis(4-hydroxyphenyl)vinyl]triphenylamine having the formula (A-16) was dissolved in 40 parts by weight of dehydrated tetrahydrofuran (THF). While stirring in a nitrogen atmosphere, the solution was mixed with 3.06 parts by weight of triethylamine. Thereafter, 2.32 parts by weight of diethylene glycol bischloroformate dissolved in 8 parts by weight of tetrahydrofuran was dropped into the solution through 30 minutes while maintaining the temperature at 20° C. The resultant mixture was stirred at room temperature for 1 hour. The reaction was completed by adding 1 part of a 4% (by weight) tetrahydrofuran solution of phenol. Then, the reaction mixture was filtered to remove salt precipitates. The filtrate was dropped into a large amount of methanol so that aromatic polycarbonate was precipitated as a yellow product. Such dissolving and precipitating procedures were repeated twice more for the purification of the product, thereby obtaining polycarbonate resin No. 1 in the form of an alternating copolymer having the repeating unit of the formula (R-1).

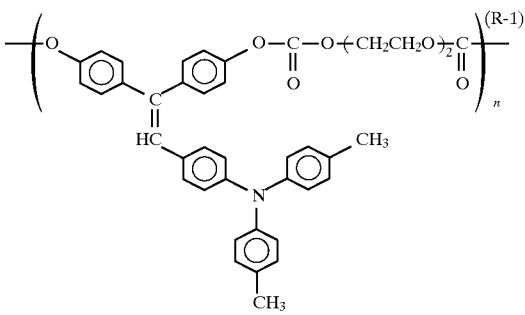

Figure 42:
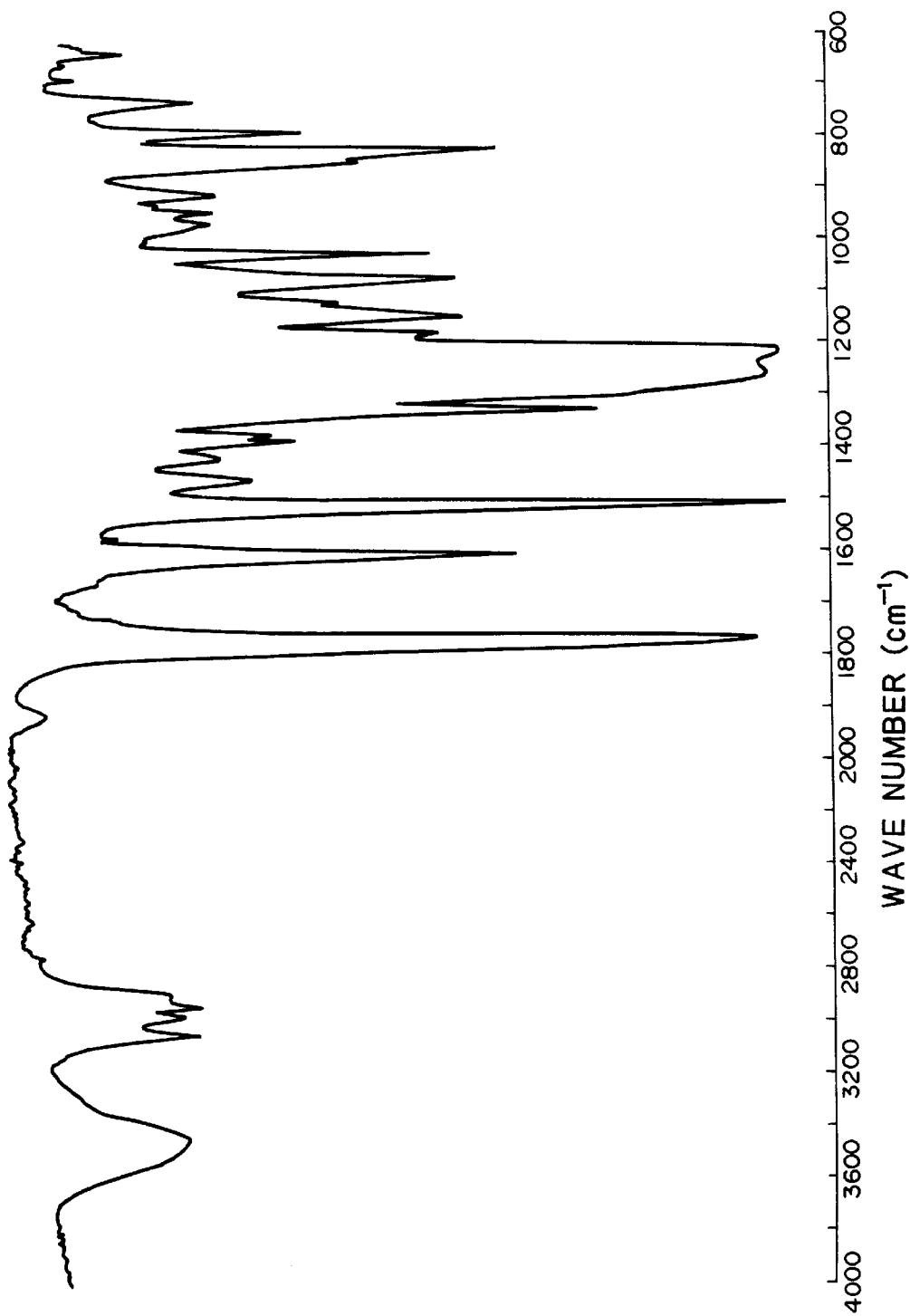
FIG. 42 is an IR spectrum (according to KBr tablet method) of an aromatic polycarbonate (polycarbonate No. 1) obtained in Example 1.

The gel permeation chromatography revealed that the polycarbonate No. 1 had a number average molecular weight of 17,051 and a weight average molecular weight of 32,301 in terms of polystyrene. The DSC analysis revealed that this resin had a glass transition point of 119.2° C. The IR spectrum is shown in FIG. 42, indicating an absorption at 1760 cm$^{-1}$ attributed to the stretching vibration of carbonate C=O groups. The elemental analysis gave:

|  | C | H | N |
|---|---|---|---|
| Measured Value | 74.70 | 5.50 | 2.09 |
| Calculated Value | 74.87 | 5.50 | 2.18 |

EXAMPLE 2

Figure 43:
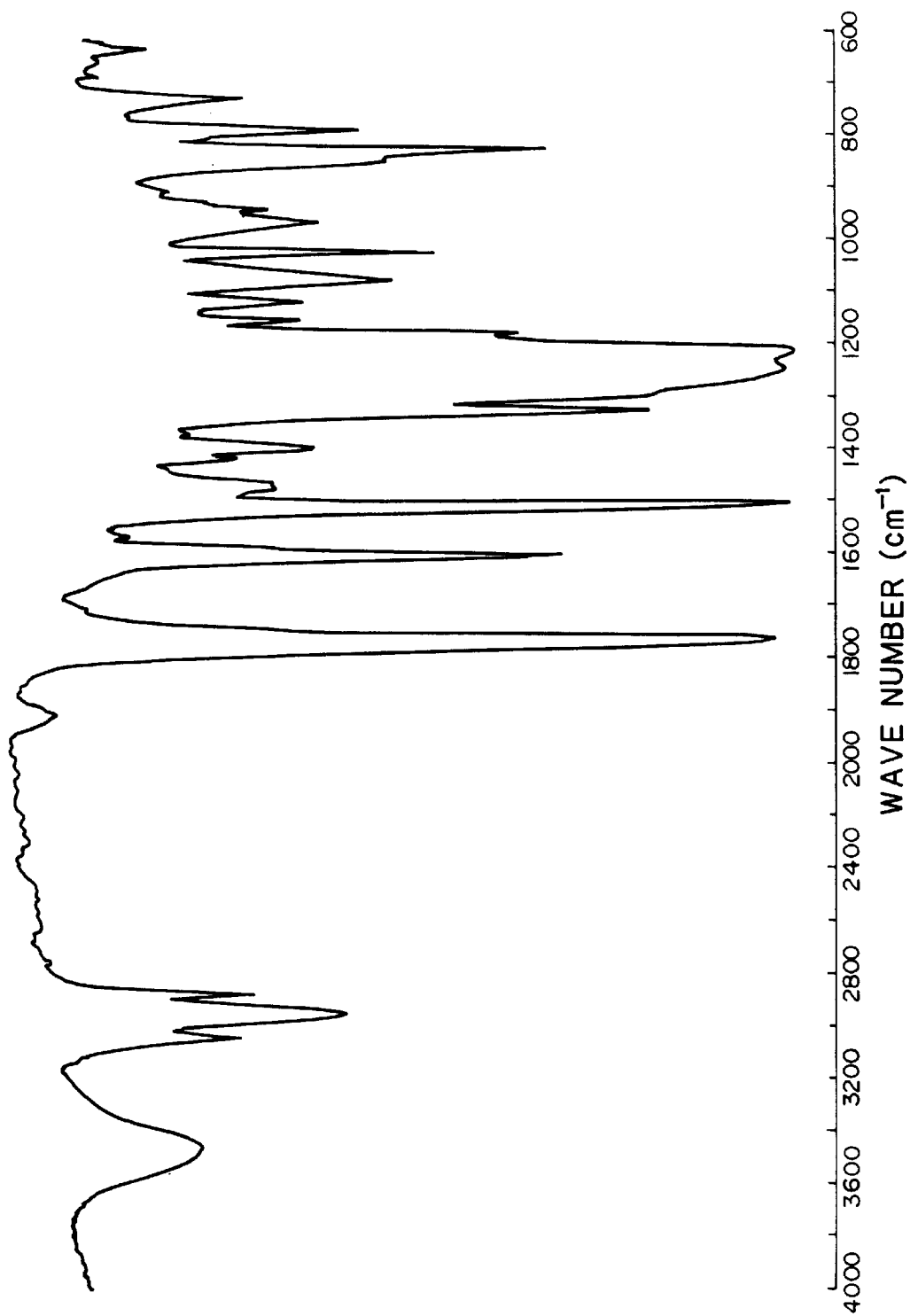
FIG. 43 is an IR spectrum (according to KBr tablet method) of an aromatic polycarbonate (polycarbonate No. 2) obtained in Example 2.

Example 1 was repeated in the same manner as described except that a bis-chloroformate of the formula ClCOO(CH$_2$)$_6$OCOCl was used, thereby to give a polycarbonate No. 2 having a recurring unit of the formula (R-2) shown below. The physical properties are summarized below:

Number average molecular weight: 17,856
Weight average molecular weight: 35,954
IR spectrum: shown in FIG. 43
Glass transition point: 115.8° C.

| | Elemental Analysis (%) | | |
|---|---|---|---|
| | C | H | N |
| Measured Value | 77.23 | 6.05 | 2.11 |
| Calculated Value | 77.16 | 6.01 | 2.14 |

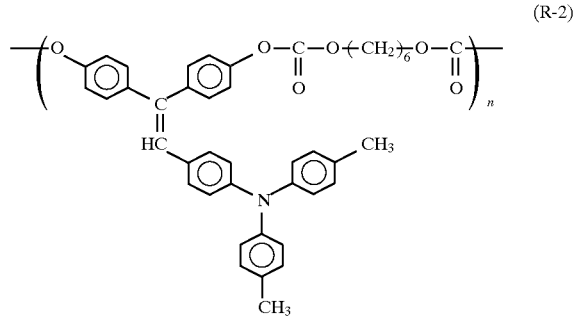

EXAMPLE 3

Example 1 was repeated in the same manner as described except that a bischloroformate of the formula ClCOOPhC(CH$_3$)$_2$PhOCOCl where Ph stands for a phenylene group, was used. As a result, there was obtained a polycarbonate No. 3 having a recurring unit of the following formula (R-3):

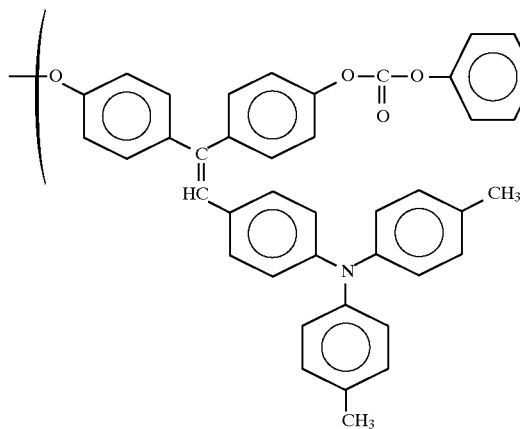

(R-3)

Figure 44:
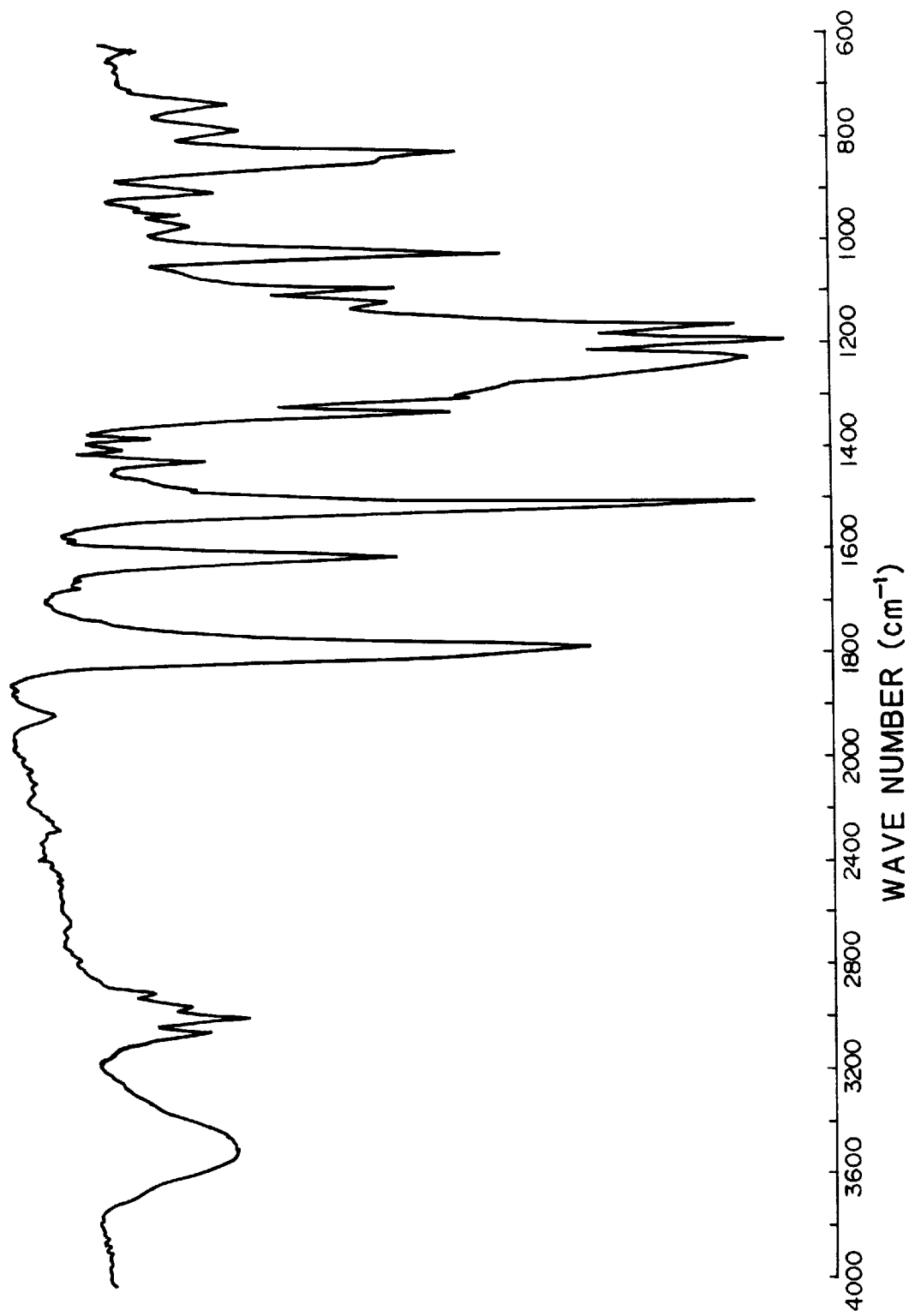
FIG. 44 is an IR spectrum (according to KBr tablet method) of an aromatic polycarbonate (polycarbonate No. 3) obtained in Example 3.

The physical properties are summarized below:
Number average molecular weight: 8,617
Weight average molecular weight: 19,873
IR spectrum: shown in FIG. 44
Glass transition point: 169.5° C.

| Elemental Analysis (%) | | | |
|---|---|---|---|
| | C | H | N |
| Measured Value | 80.04 | 5.33 | 1.69 |
| Calculated Value | 80.19 | 5.41 | 1.83 |

EXAMPLE 4

Example 1 was repeated in the same manner as described except that a bischloroformate of the formula ClCOO$(CH_2CH_2CH_2CH_2O)_{3.09}$OCOCl was used. As a result, there was obtained a polycarbonate No. 4 having a recurring unit of the following formula (R-4):

| Elemental Analysis (%) | | | |
|---|---|---|---|
| | C | H | N |
| Measured Value | 74.72 | 6.80 | 1.73 |
| Calculated Value | 74.81 | 6.71 | 1.80 |

EXAMPLES 5–25

Example 1 was repeated in the same manner as described except that various combinations of the OH-containing amine compounds of the formulas (A-16)-(A-24) with bis-chloroformate or trichloromethylchloroformate were used to give polycarbonates No. 5 through 25 having recurring units of the formulas (R-5) through (R-25). The physical properties of these polycarbonates are shown beneath respective formulas:

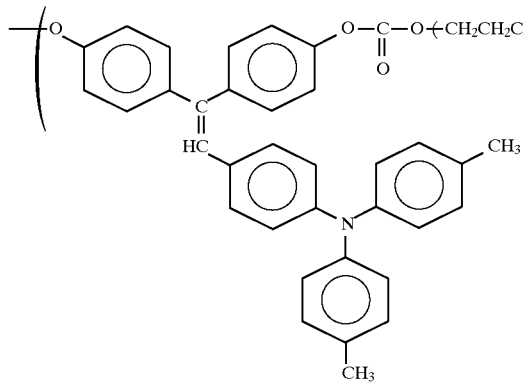

(R-4)

The physical properties are summarized below:

Number average molecular weight: 26,336 weight average molecular weight: 75,571

Figure 45:
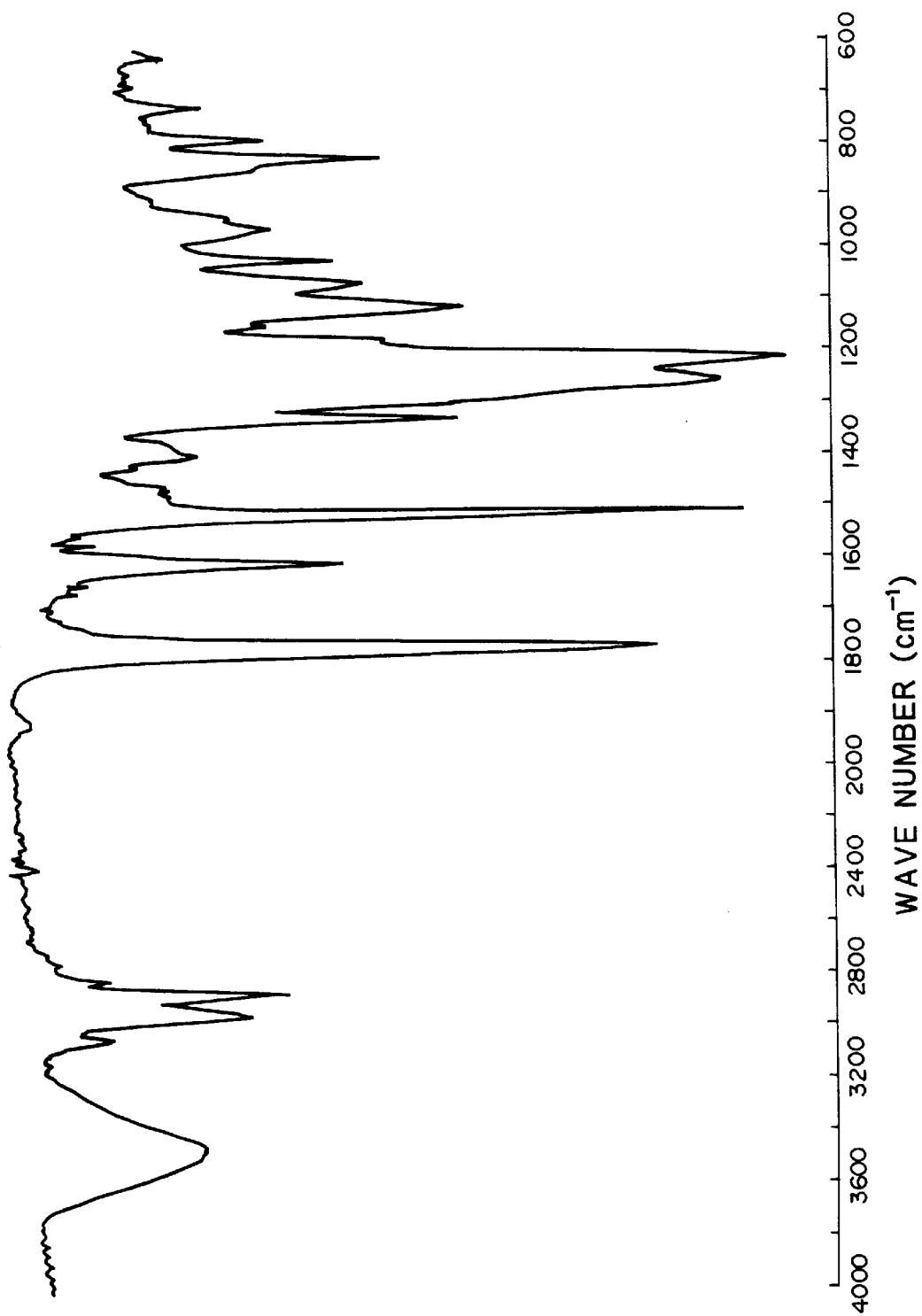
FIG. 45 is an IR spectrum (according to KBr tablet method) of an aromatic polycarbonate (polycarbonate No. 4) obtained in Example 4.

IR spectrum: shown in FIG. 45

Glass transition point: 62.7° C.

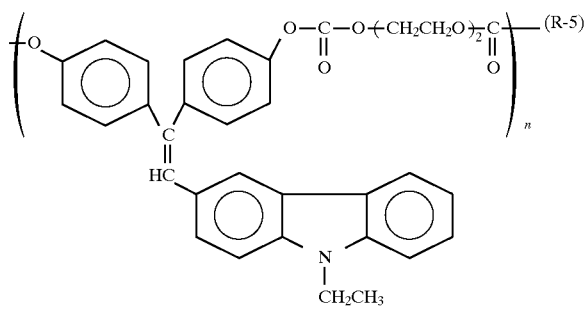

(R-5)

Figure 46:
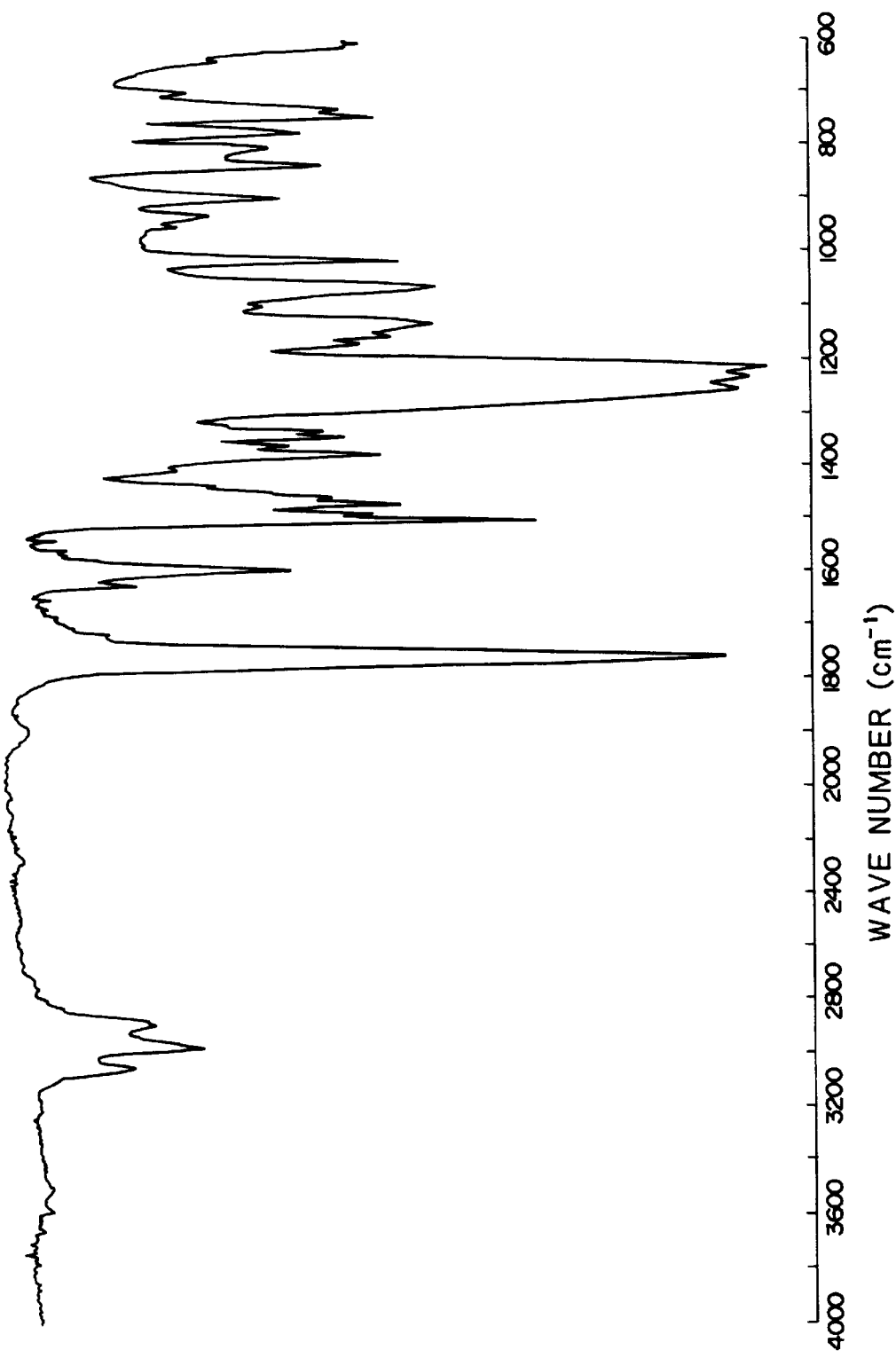
FIG. 46 is an IR spectrum (cast film on an NaCl plate) of an aromatic polycarbonate (polycarbonate No. 5) obtained in Example 5.

Number average molecular weight: 16,200
Weight average molecular weight: 31,600
IR spectrum: shown in FIG. 46
Glass transition point: 118.0° C.

| Elemental Analysis (%) | C | H | N |
|---|---|---|---|
| Measured Value | 72.06 | 5.22 | 2.48 |
| Calculated Value | 72.46 | 5.19 | 2.49 |

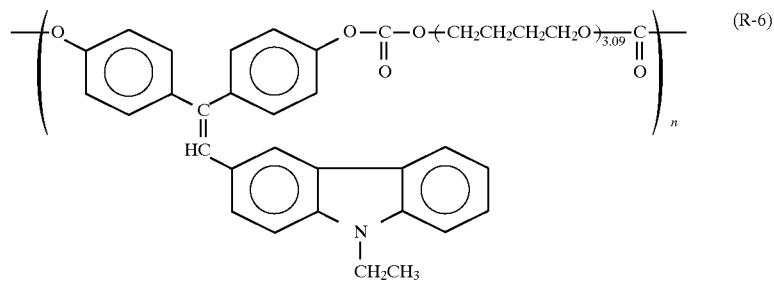

(R-6)

Figure 47:
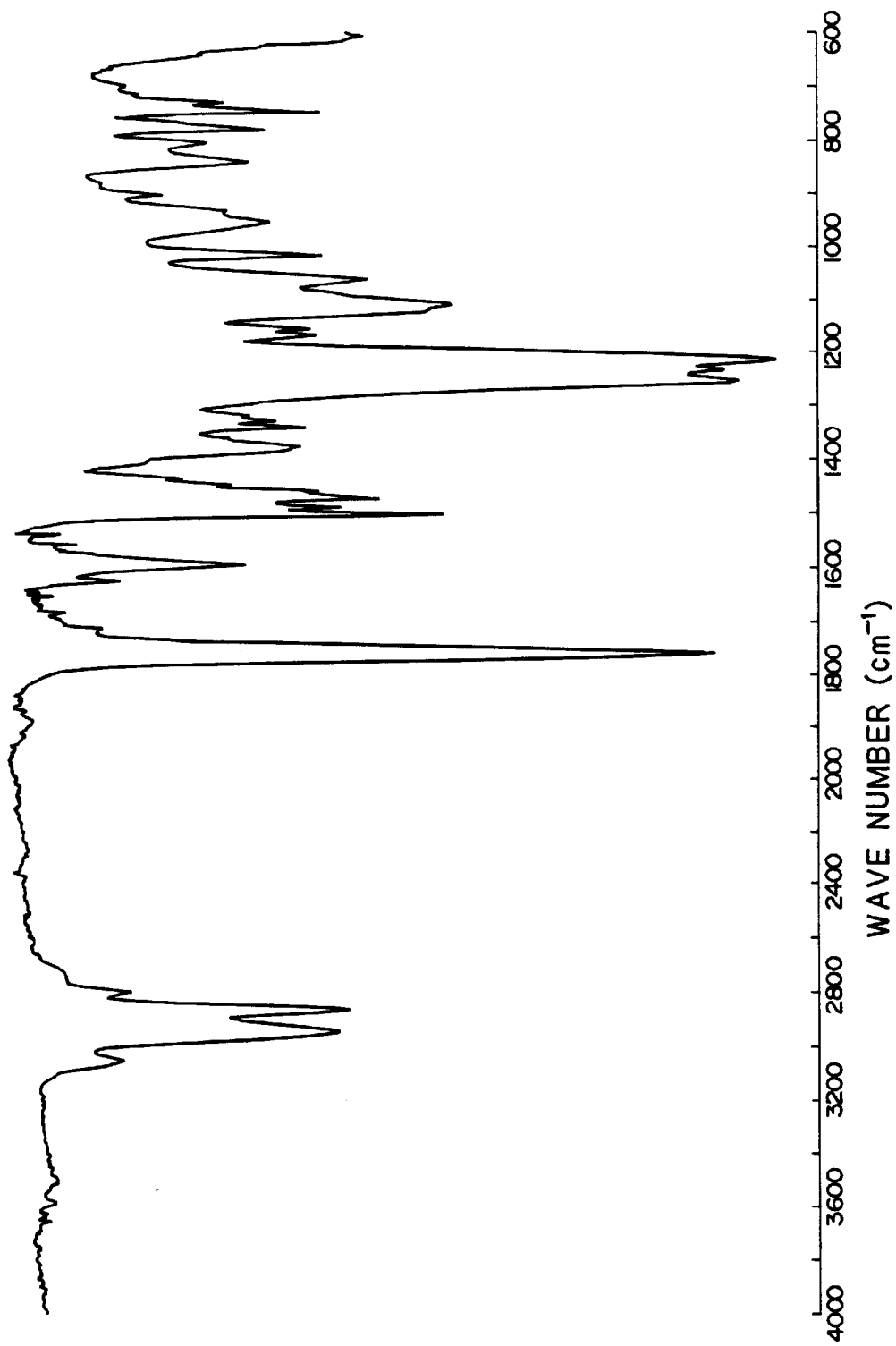
FIG. 47 is an IR spectrum (cast film on an NaCl plate) of an aromatic polycarbonate (polycarbonate No. 6) obtained in Example 6.

Number average molecular weight: 24,600
Weight average molecular weight: 50,300
IR spectrum: shown in FIG. 47
Glass transition point: 54.3° C.

| Elemental Analysis (%): | C | H | N |
|---|---|---|---|
| Measured Value | 72.64 | 6.83 | 1.98 |
| Calculated Value | 72.86 | 6.60 | 2.01 |

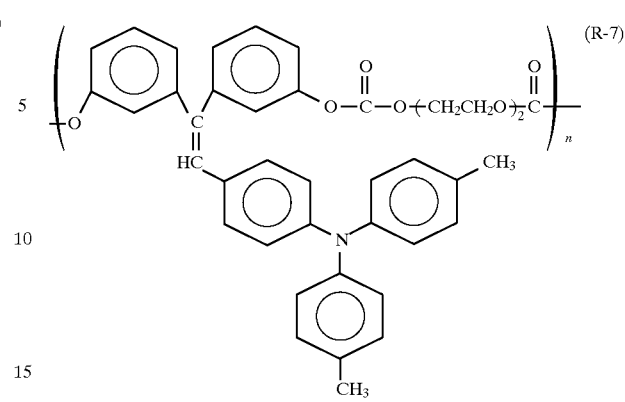

(R-7)

Figure 48:
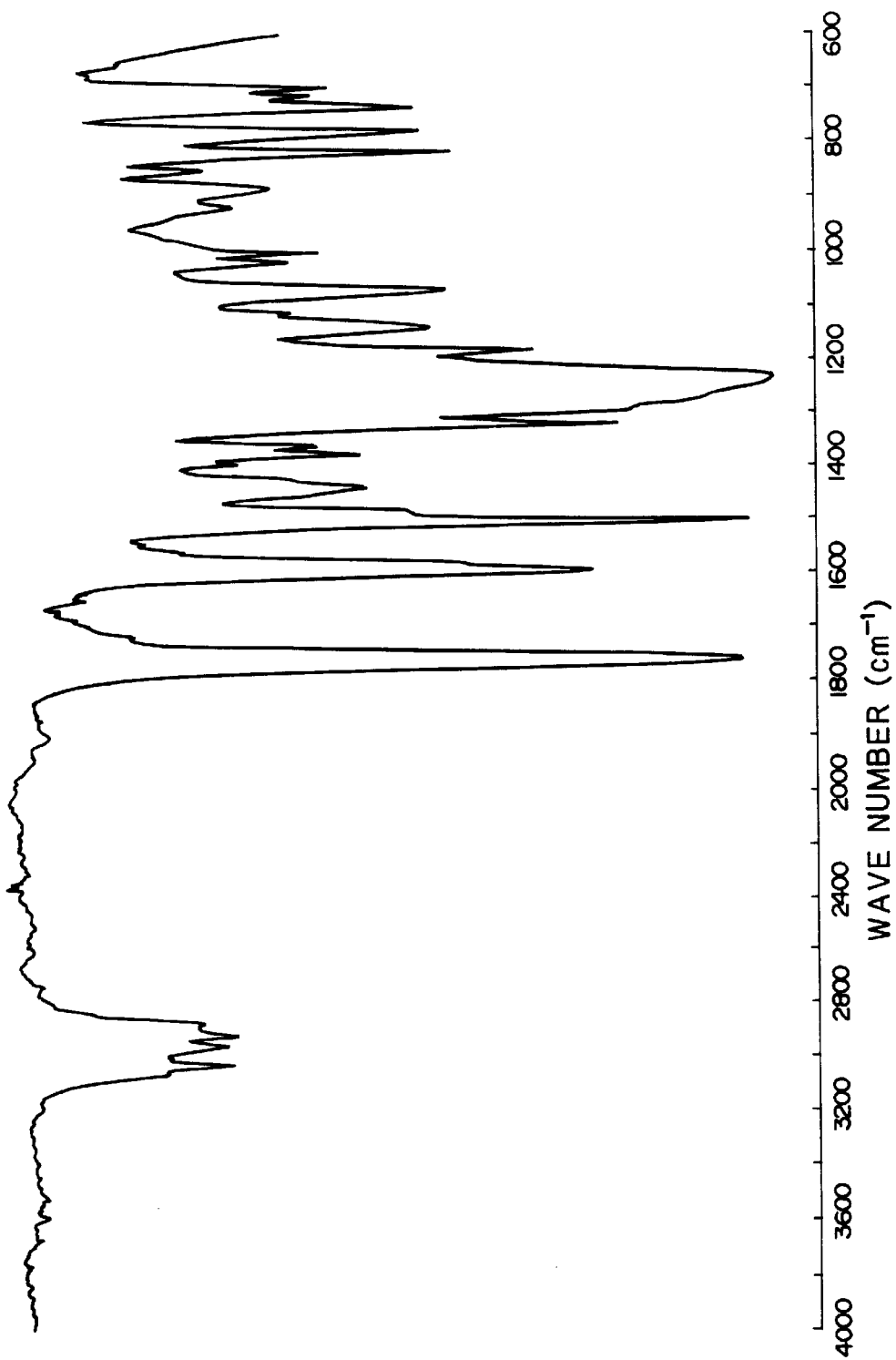
FIG. 48 is an IR spectrum (cast film on an NaCl plate) of an aromatic polycarbonate (polycarbonate No. 7) obtained in Example 7.

Number average molecular weight: 13,700
Weight average molecular weight: 36,200
IR spectrum: shown in FIG. 48
Glass transition point: 104.2° C.

| Elemental Analysis (%): | C | H | N |
|---|---|---|---|
| Measured Value | 74.57 | 5.52 | 2.26 |
| Calculated Value | 74.87 | 5.50 | 2.18 |

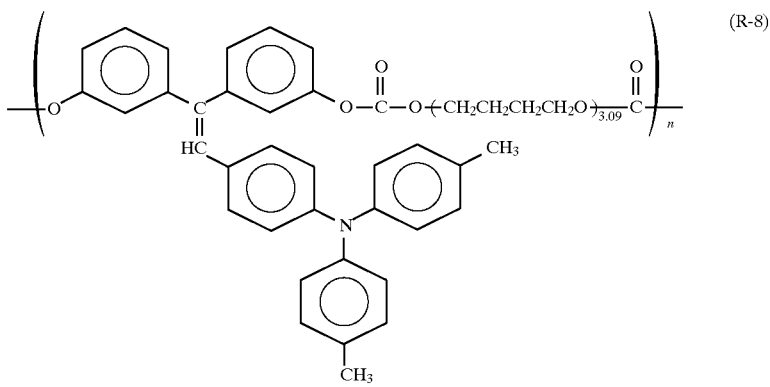

(R-8)

Number average molecular weight: 17,900

Weight average molecular weight: 43,500

Figure 49:
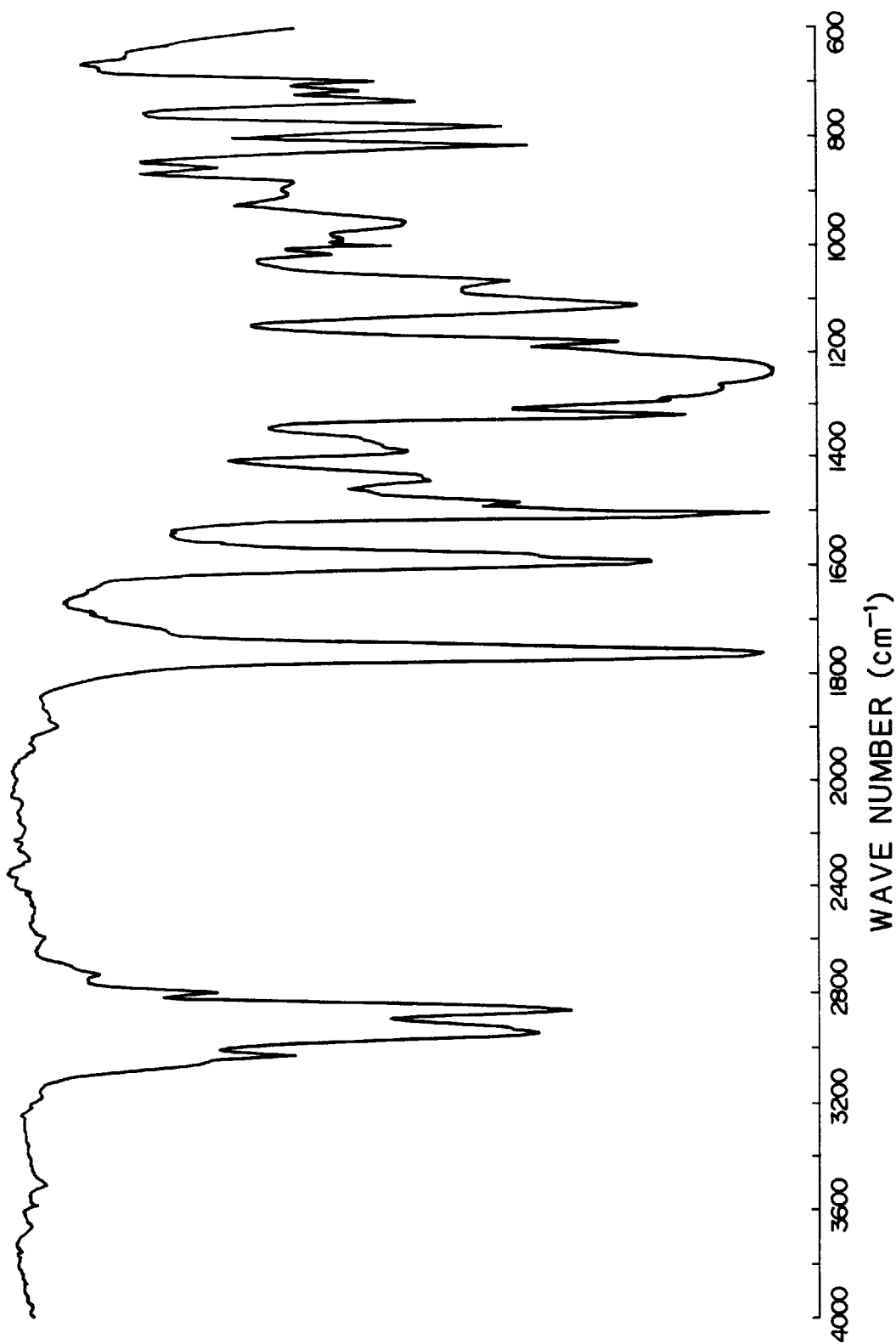
FIG. 49 is an IR spectrum (cast film on an NaCl plate) of an aromatic polycarbonate (polycarbonate No. 8) obtained in Example 8.

IR spectrum: shown in FIG. 49

Glass transition point: 53.2° C.

| Elemental Analysis (%): | C | H | N |
|---|---|---|---|
| Measured Value | 74.51 | 6.89 | 1.93 |
| Calculated Value | 74.81 | 6.71 | 1.80 |

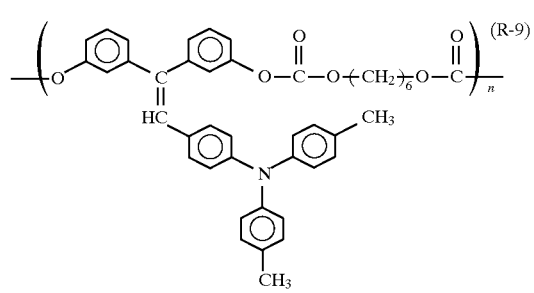
(R-9)

Number average molecular weight: 15,200

Weight average molecular weight: 39,200

Figure 50:
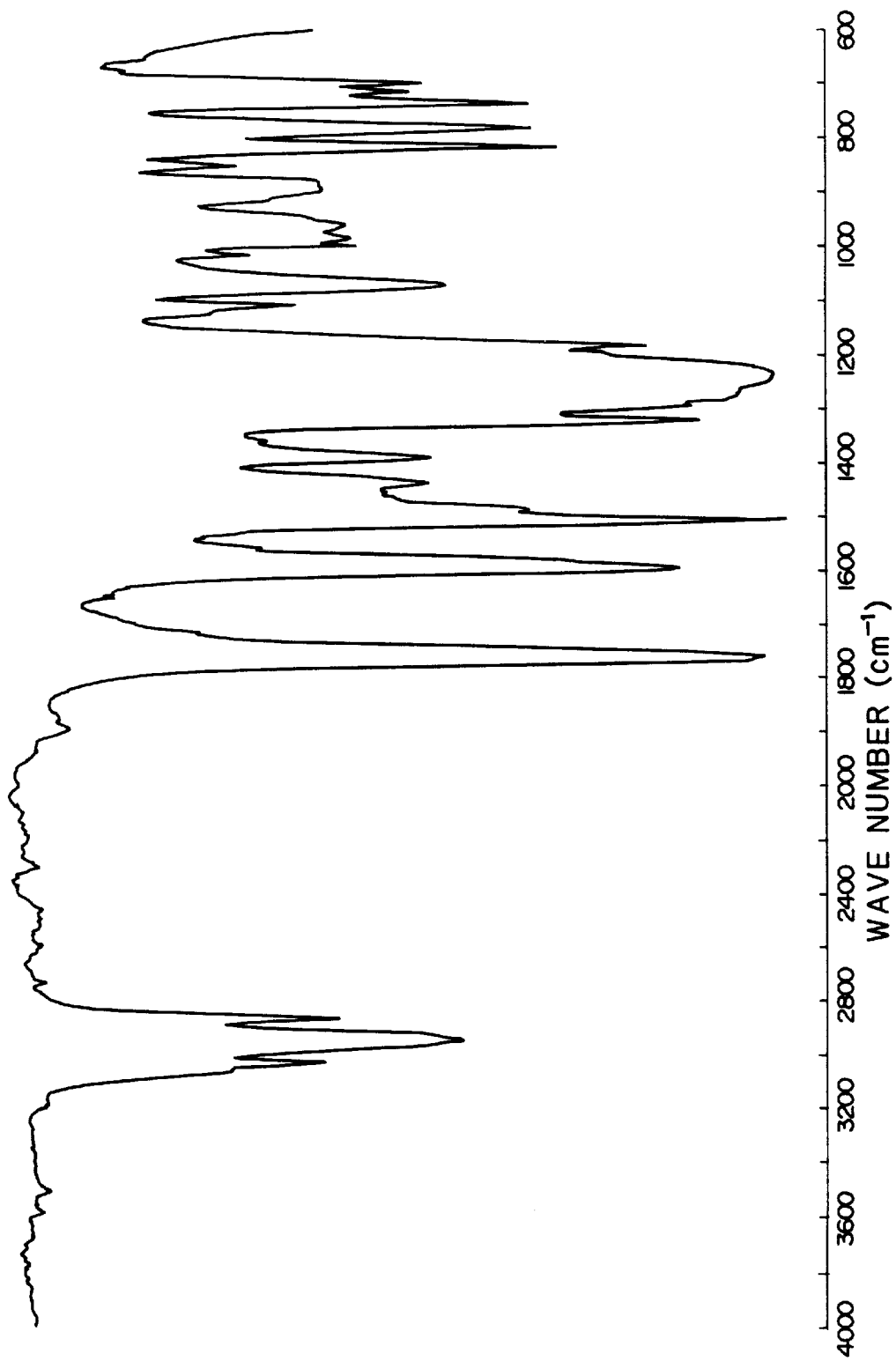
FIG. 50 is an IR spectrum (cast film on an NaCl plate) of an aromatic polycarbonate (polycarbonate No. 9) obtained in Example 9.

IR spectrum: shown in FIG. 50

Glass transition point: 97.5° C.

| Elemental Analysis (%): | C | H | N |
|---|---|---|---|
| Measured Value | 76.98 | 6.11 | 2.21 |
| Calculated Value | 77.16 | 6.01 | 2.14 |

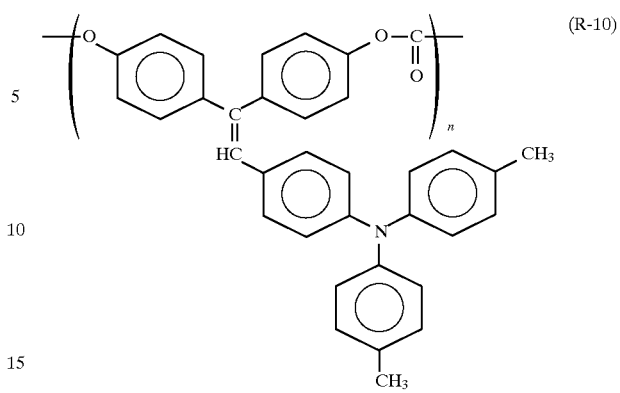
(R-10)

Number average molecular weight: 9,800

Weight average molecular weight: 19,500

Figure 51:
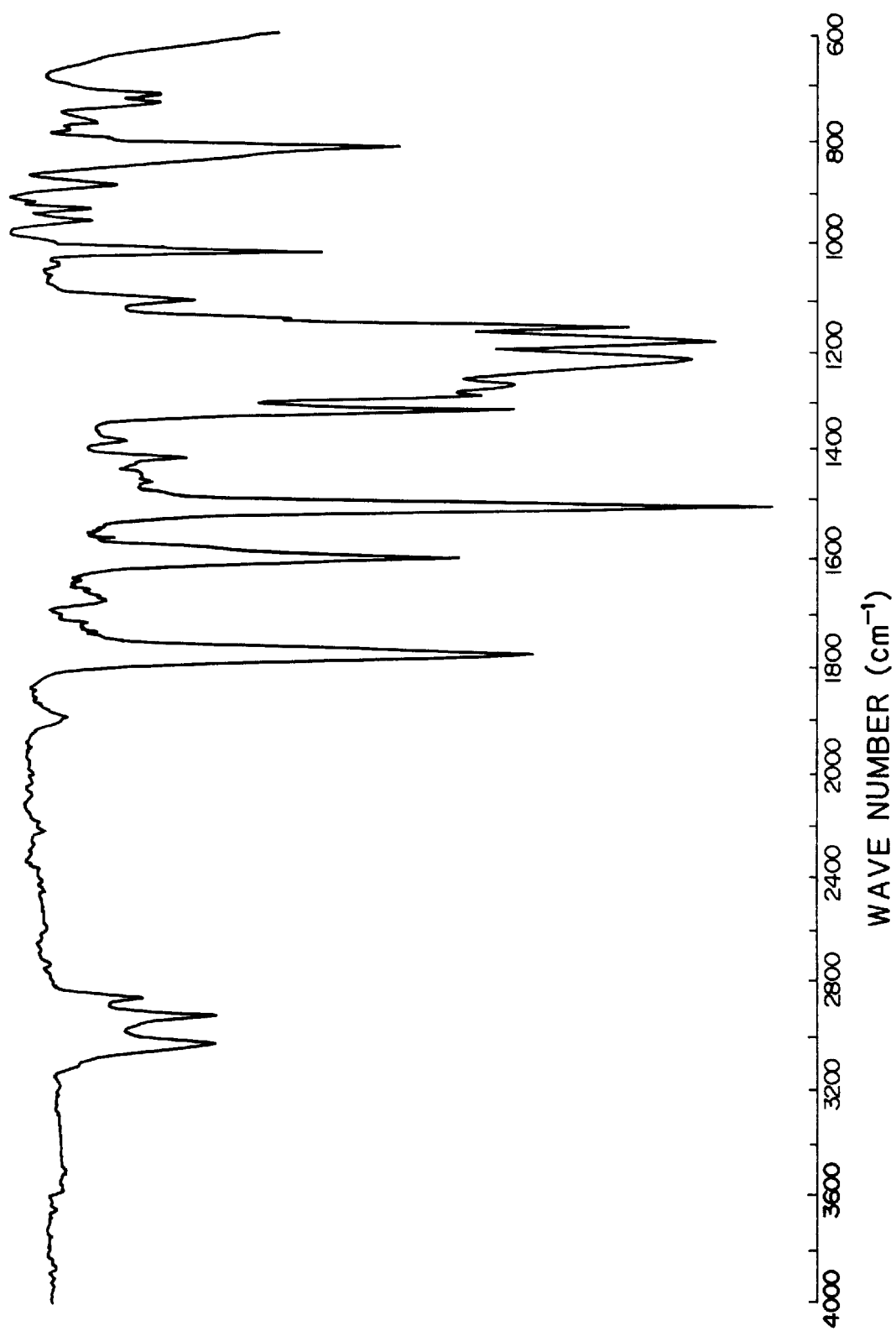
FIG. 51 is an IR spectrum (cast film on an NaCl plate) of an aromatic polycarbonate (polycarbonate No. 10) obtained in Example 10.

IR spectrum: shown in FIG. 51

Glass transition point: 176.5° C.

| Elemental Analysis (%): | C | H | N |
|---|---|---|---|
| Measured Value | 81.93 | 5.54 | 2.68 |
| Calculated Value | 82.42 | 5.30 | 2.75 |

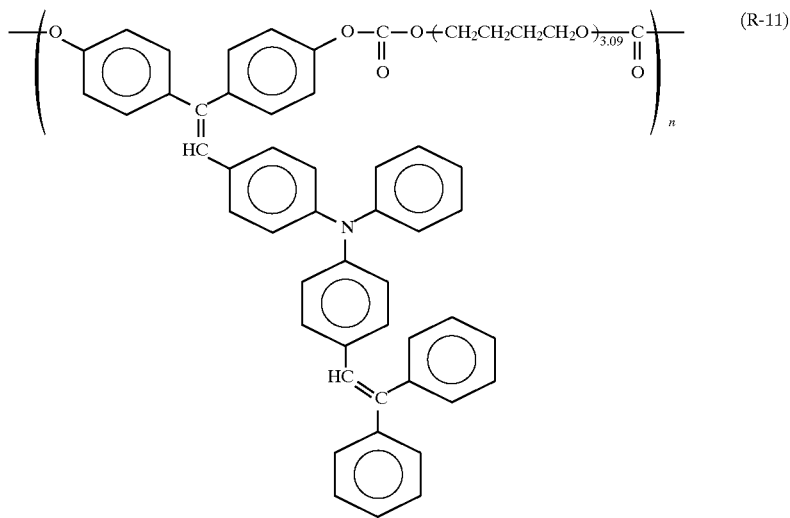
(R-11)

Number average molecular weight: 25,600

Weight average molecular weight: 72,800

Figure 52:
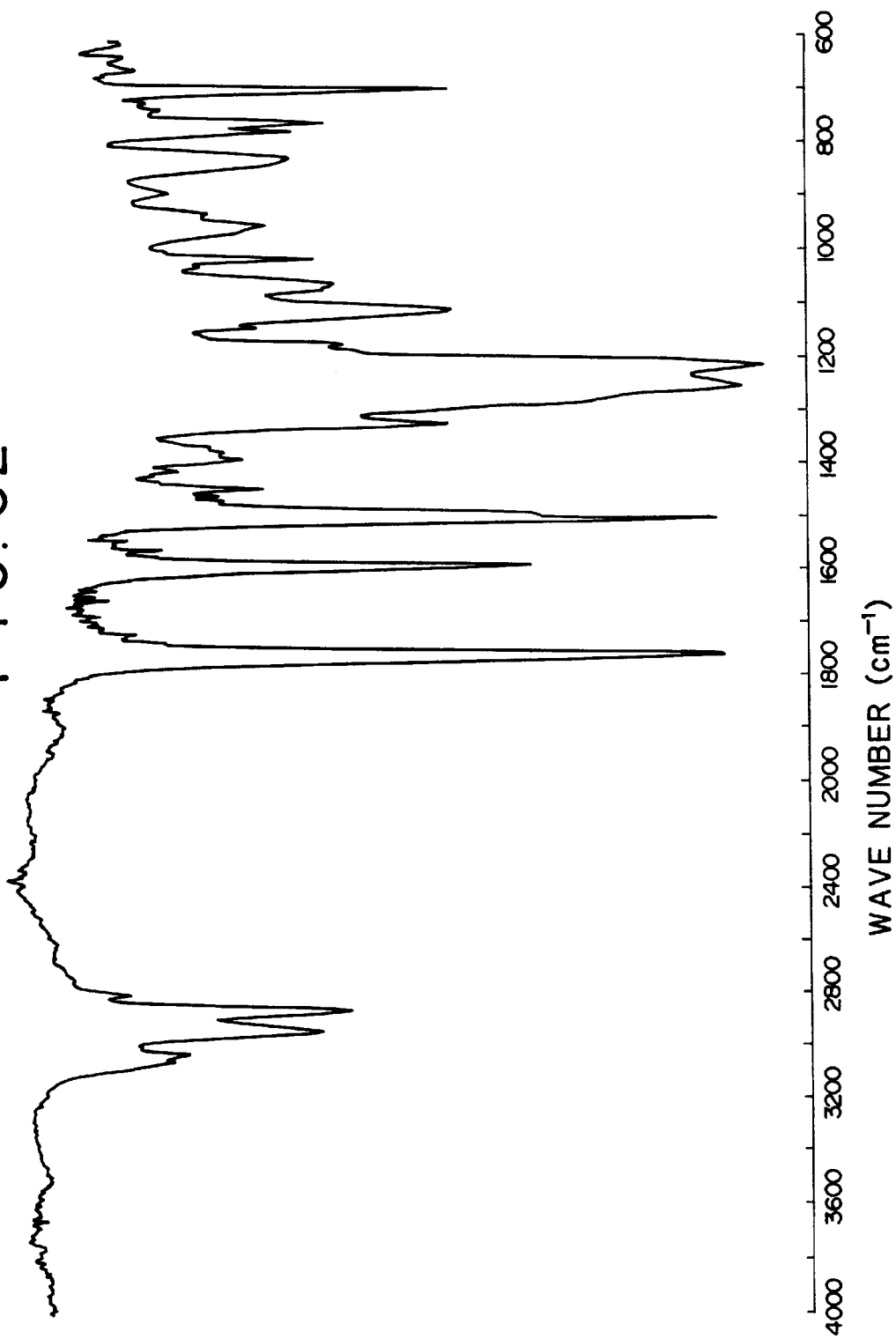
FIG. 52 is an IR spectrum (cast film on an NaCl plate) of an aromatic polycarbonate (polycarbonate No. 11) obtained in Example 11.

IR spectrum: shown in FIG. 52

Glass transition point: 75.0° C.

| Elemental Analysis (%): | C | H | N |
|---|---|---|---|
| Measured Value | 78.04 | 6.40 | 1.40 |
| Calculated Value | 78.07 | 6.48 | 1.51 |

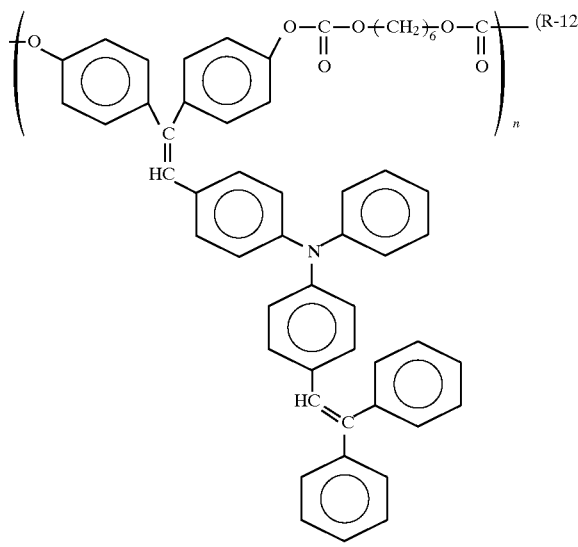
(R-12)

Figure 53:
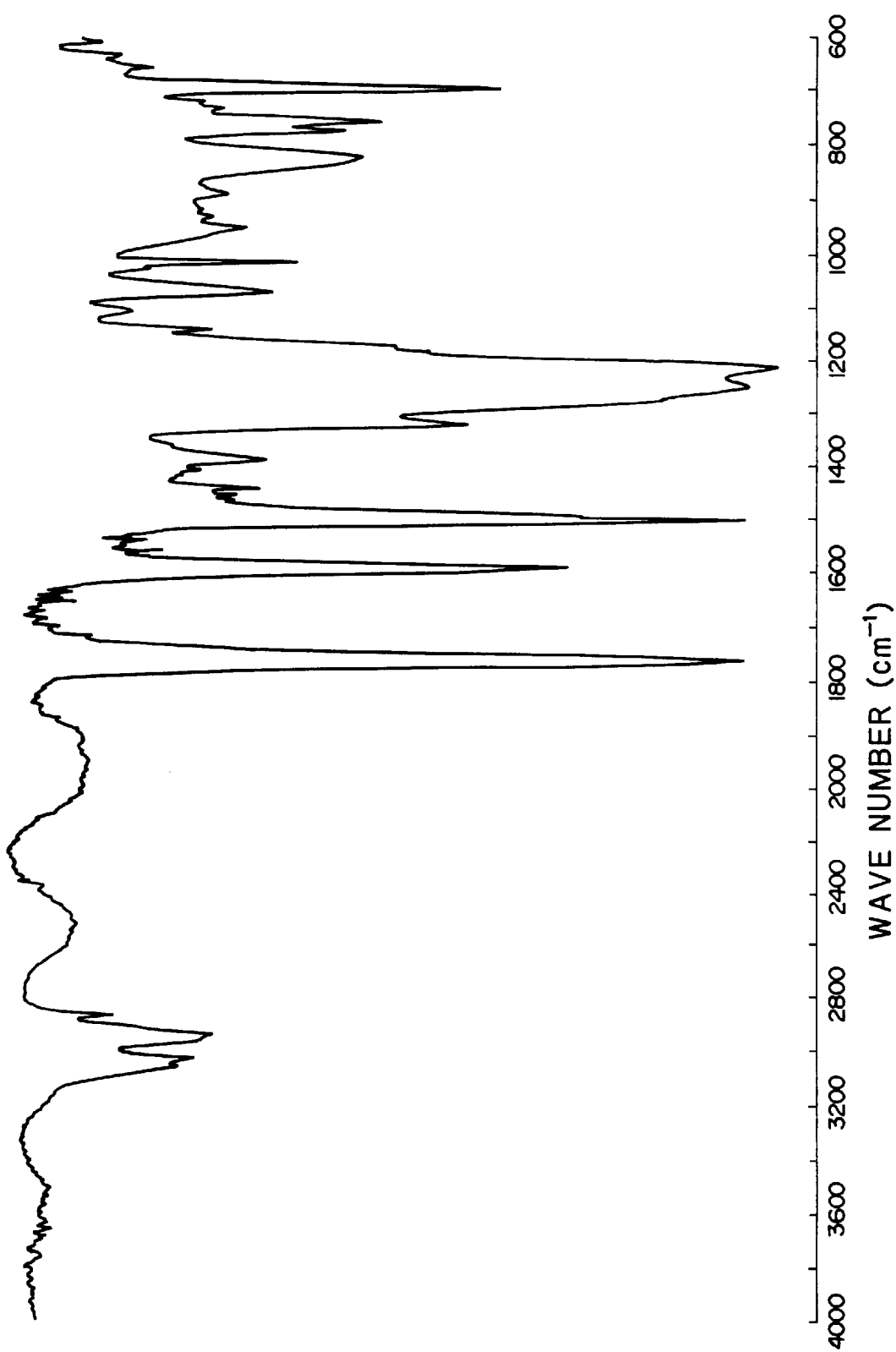
FIG. 53 is an IR spectrum (cast film on an NaCl plate) of an aromatic polycarbonate (polycarbonate No. 12) obtained in Example 12.

Number average molecular weight: 18,700
Weight average molecular weight: 39,800
IR spectrum: shown in FIG. 53
Glass transition point: 116.0° C.

| Elemental Analysis (%): | C | H | N |
|---|---|---|---|
| Measured Value | 80.41 | 5.69 | 1.86 |
| Calculated Value | 80.47 | 5.83 | 1.74 |

Figure 54:
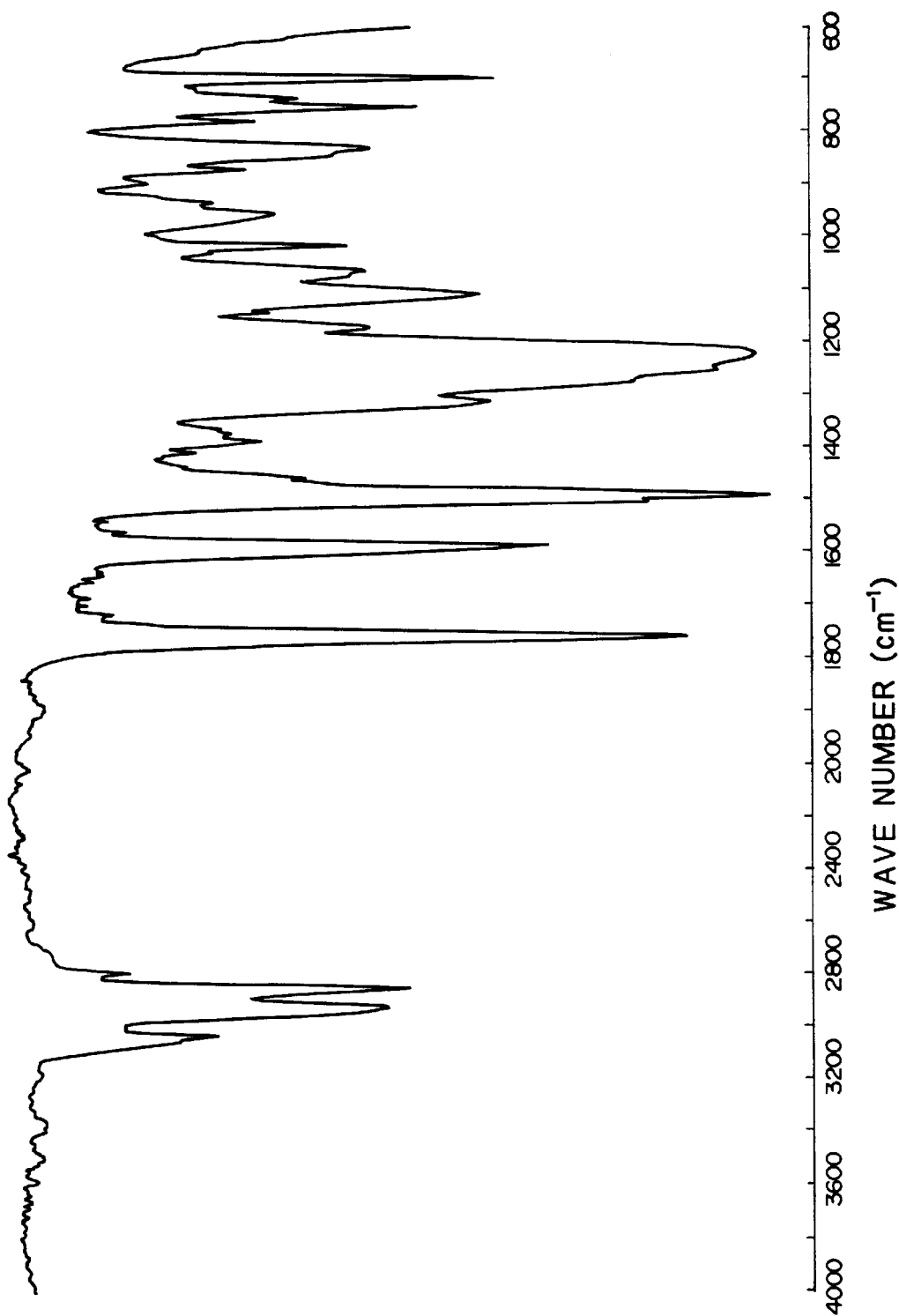
FIG. 54 is an IR spectrum (cast film on an NaCl plate) of an aromatic polycarbonate (polycarbonate No. 13) obtained in Example 13.

Number average molecular weight: 25,200
Weight average molecular weight: 54,000
IR spectrum: shown in FIG. 54
Glass transition point: 71.9° C.

| Elemental Analysis (%): | C | H | N |
|---|---|---|---|
| Measured Value | 76.34 | 5.08 | 2.64 |
| Calculated Value | 76.70 | 6.09 | 2.73 |

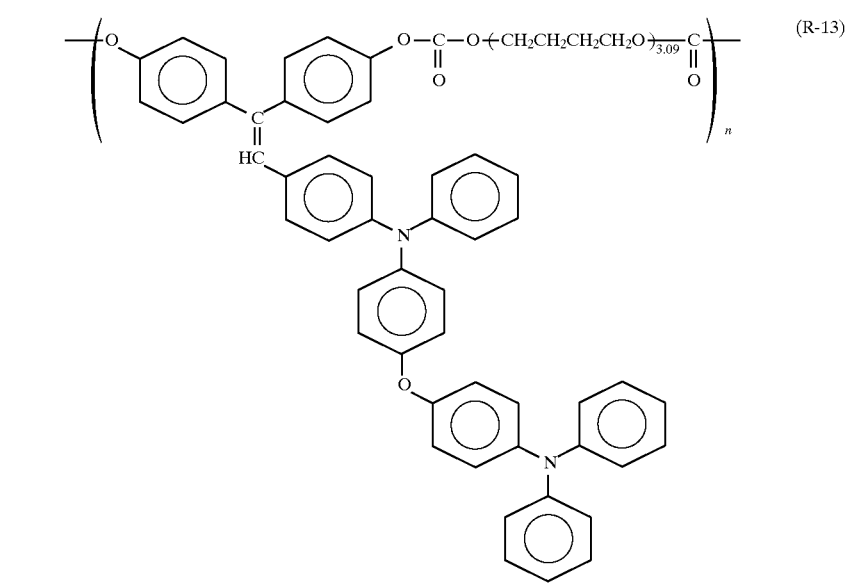
(R-13)

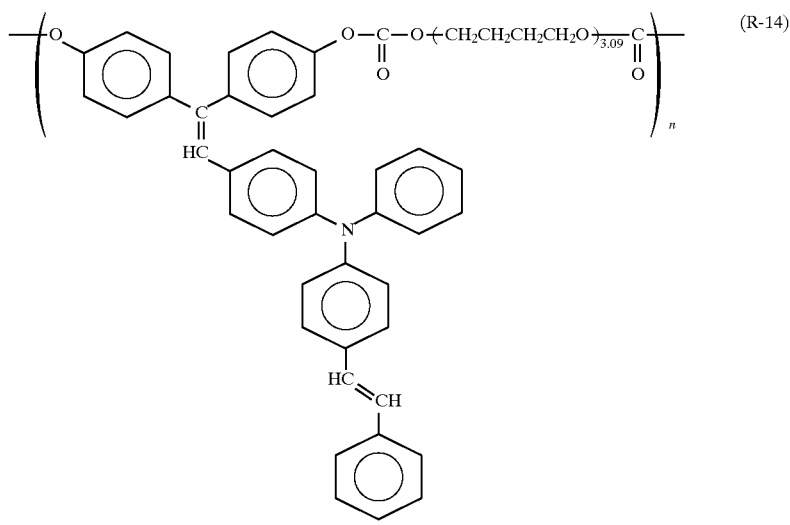
(R-14)

Number average molecular weight: 33,400

Weight average molecular weight: 81,700

Figure 55:
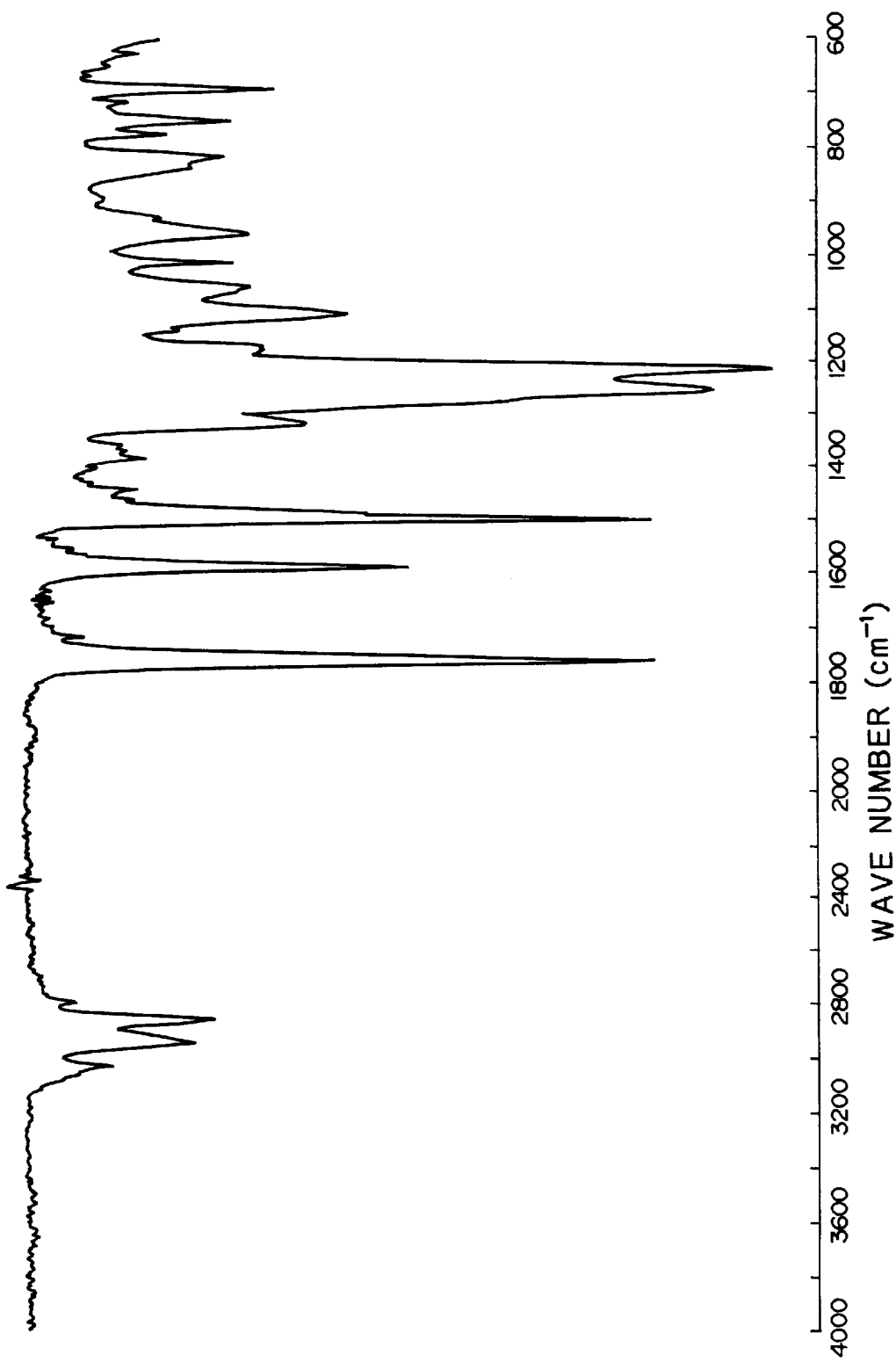
FIG. 55 is an IR spectrum (cast film on an NaCl plate) of an aromatic polycarbonate (polycarbonate No. 14) obtained in Example 14.

IR spectrum: shown in FIG. 55

Glass transition point: 69.1° C.

| Elemental Analysis (%): | C | H | N |
|---|---|---|---|
| Measured Value | 76.61 | 6.48 | 1.59 |
| Calculated Value | 76.77 | 6.37 | 1.65 |

Polycarbonate No. 15:

(R-15)

Number average molecular weight: 22,000

Weight average molecular weight: 65,000

Figure 56:
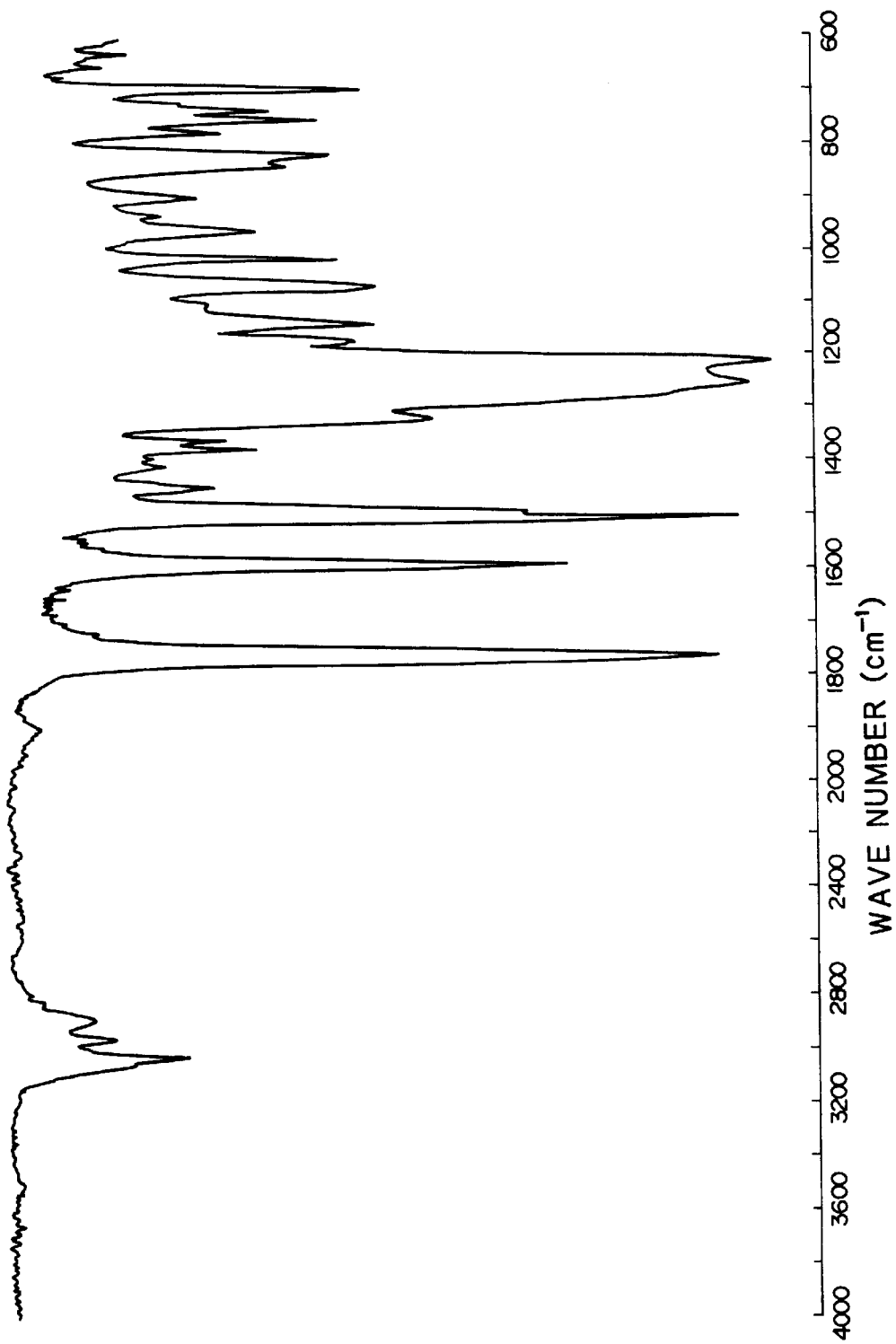
FIG. 56 is an IR spectrum (cast film on an NaCl plate) of an aromatic polycarbonate (polycarbonate No. 15) obtained in Example 15.

IR spectrum: shown in FIG. 56

Glass transition point: 106.9° C.

| Elemental Analysis (%): | C | H | N |
|---|---|---|---|
| Measured Value | 76.75 | 5.18 | 1.85 |
| Calculated Value | 77.19 | 5.21 | 1.96 |

Polycarbonate No. 16:

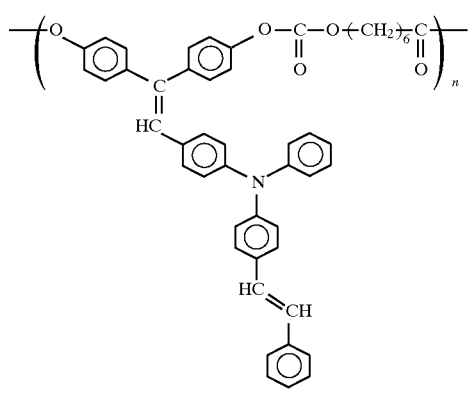
(R-16)

Number average molecular weight: 35,500

Weight average molecular weight: 126,300

Figure 57:
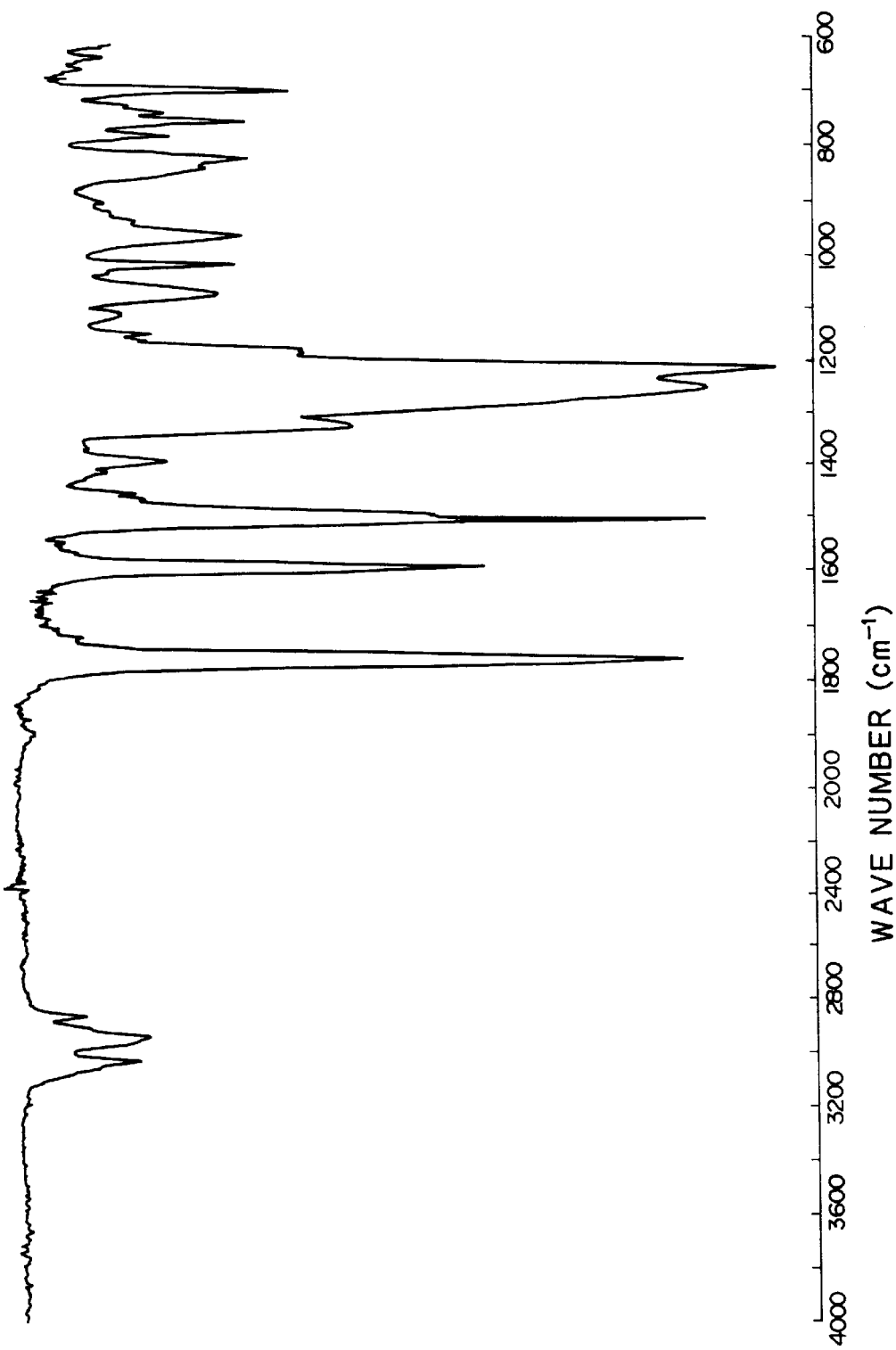
FIG. 57 is an IR spectrum (cast film on an NaCl plate) of an aromatic polycarbonate (polycarbonate No. 16) obtained in Example 16.

IR spectrum: shown in FIG. 57

Glass transition point: 101.9° C.

| Elemental Analysis (%): | C | H | N |
|---|---|---|---|
| Measured Value | 78.95 | 5.68 | 1.83 |
| Calculated Value | 79.21 | 5.68 | 1.92 |

Polycarbonate No. 17:

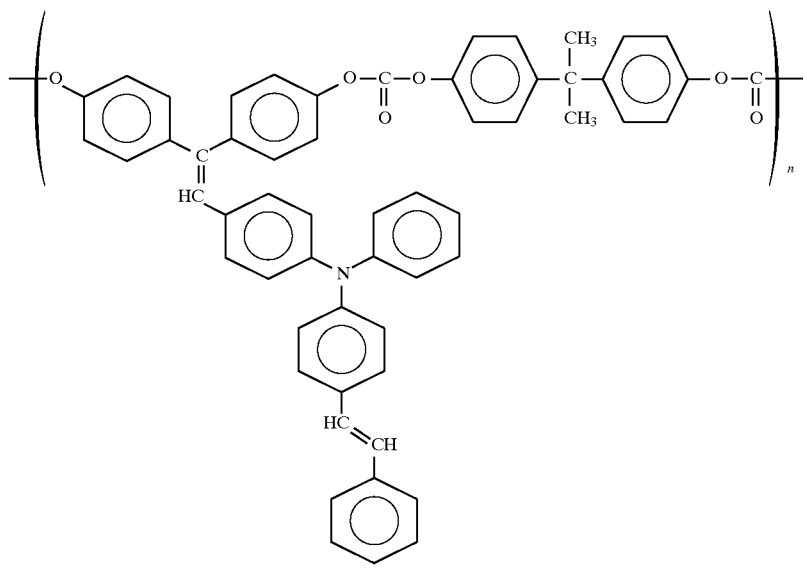
(R-17)

Figure 58:
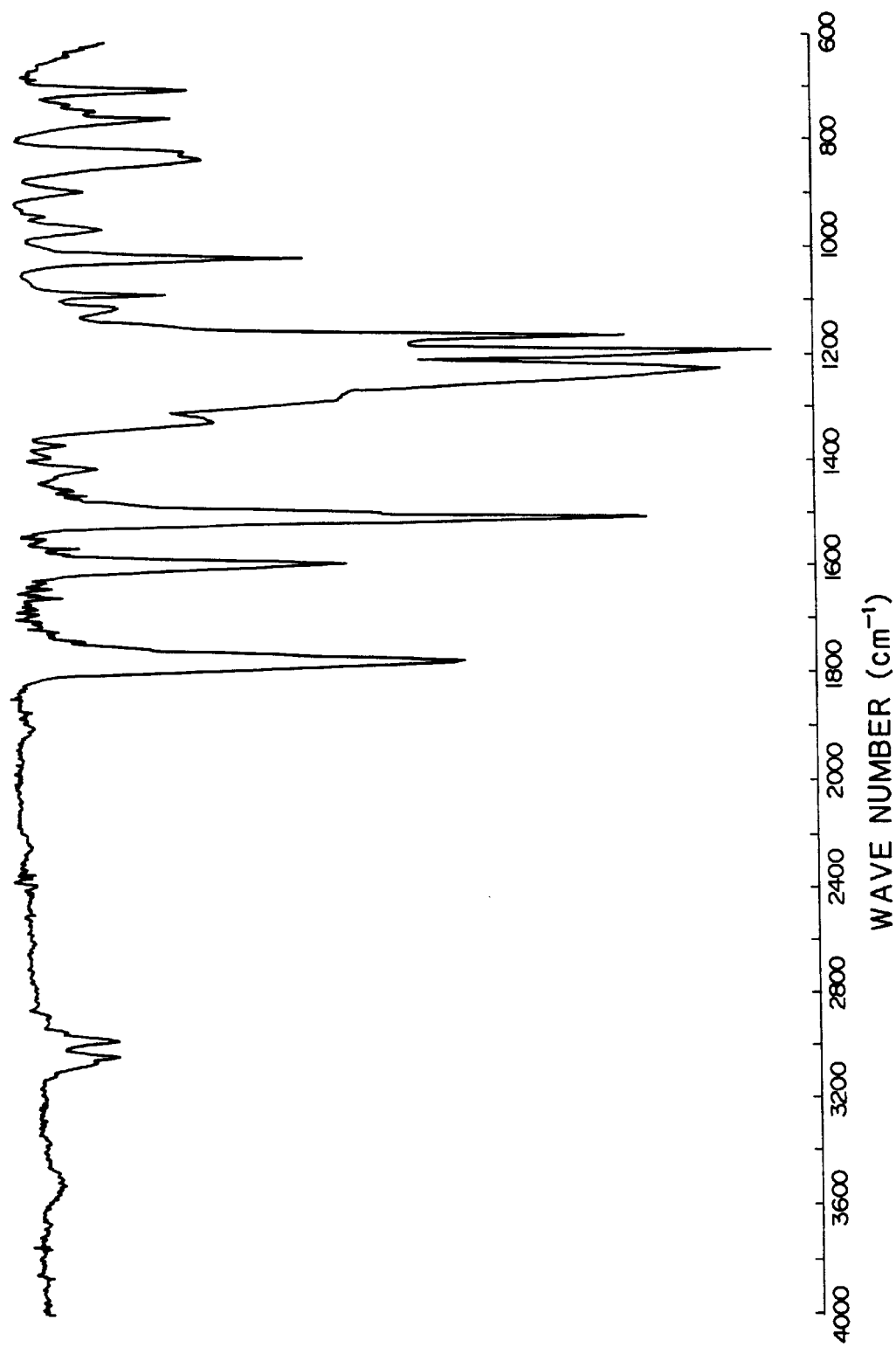
FIG. 58 is an IR spectrum (cast film on an NaCl plate) of an aromatic polycarbonate (polycarbonate No. 17) obtained in Example 17.

Number average molecular weight: 8,500
Weight average molecular weight: 19,600
IR spectrum: shown in FIG. 58
Glass transition point: 140.4° C.

Figure 59:
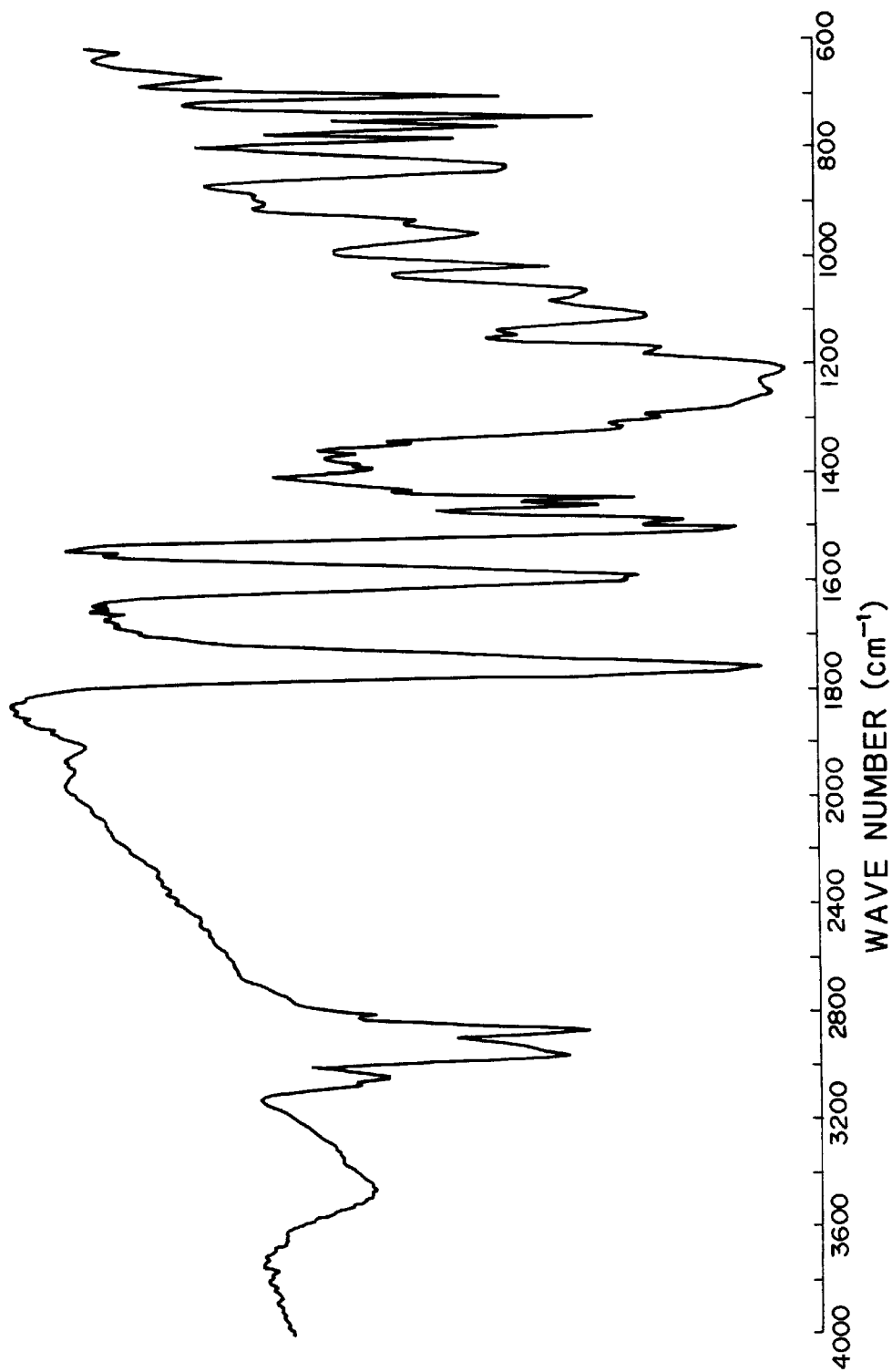
FIG. 59 is an IR spectrum (cast film on an NaCl plate) of an aromatic polycarbonate (polycarbonate No. 18) obtained in Example 18.

Number average molecular weight: 4,900
Weight average molecular weight: 7,200
IR spectrum: shown in FIG. 59
Glass transition point: 76.3° C.

| Elemental Analysis (%): | C | H | N |
|---|---|---|---|
| Measured Value | 81.45 | 5.11 | 1.44 |
| Calculated Value | 81.70 | 5.17 | 1.67 |

| Elemental Analysis (%): | C | H | N |
|---|---|---|---|
| Measured Value | 77.87 | 6.34 | 1.85 |
| Calculated Value | 76.91 | 6.50 | 1.62 |

Polycarbonate No. 18:

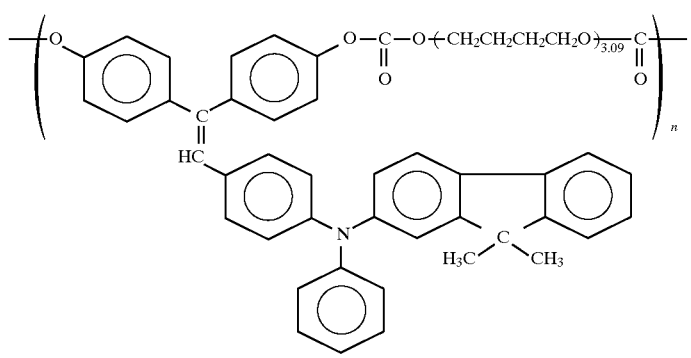
(R-18)

Polycarbonate No. 19:

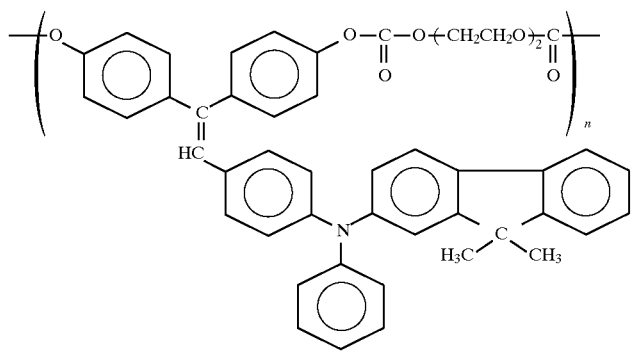

(R-19)

Figure 60:
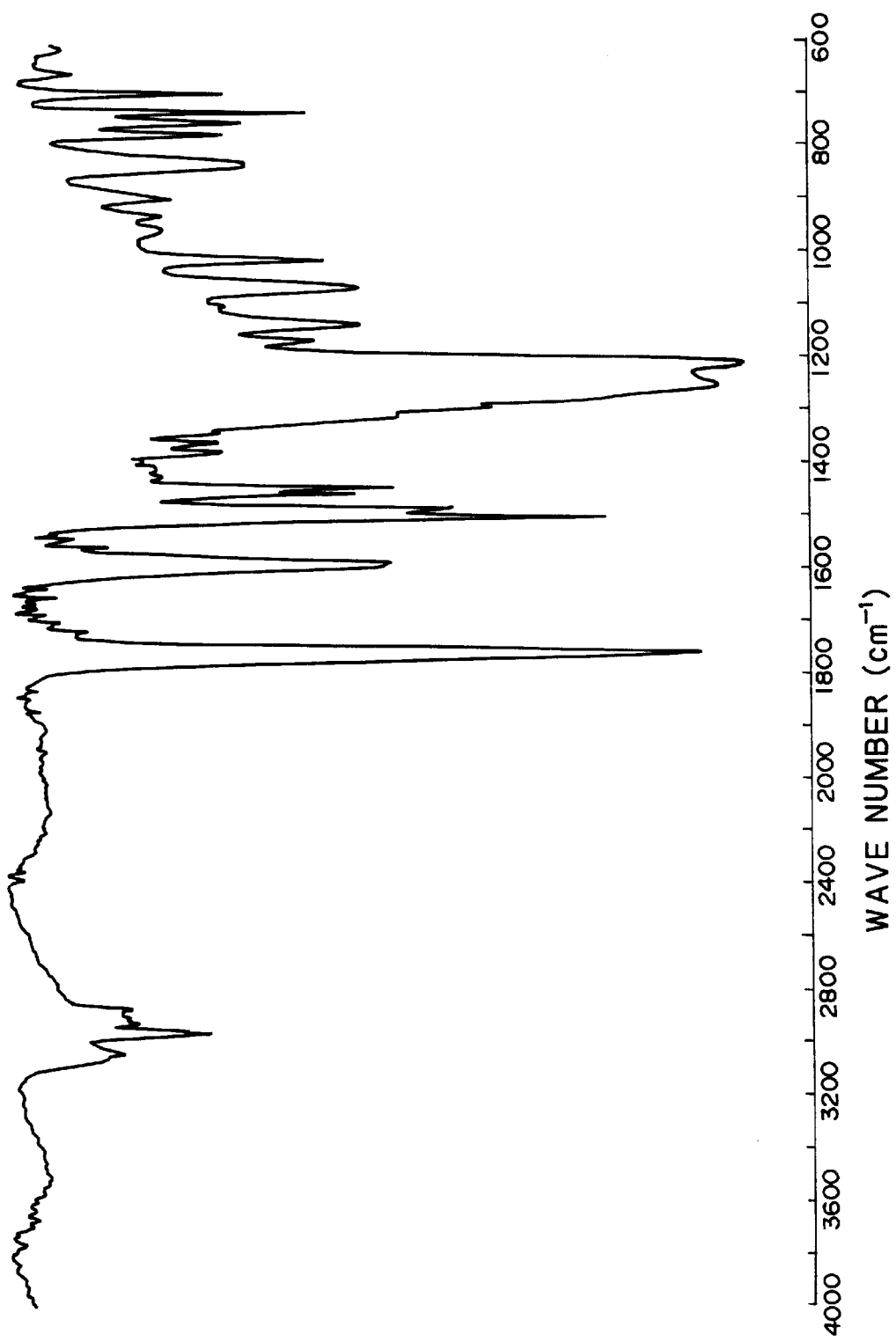
FIG. 60 is an IR spectrum (cast film on an NaCl plate) of an aromatic polycarbonate (polycarbonate No. 19) obtained in Example 19.

Number average molecular weight: 22,400
Weight average molecular weight: 114,000
IR spectrum: shown in FIG. 60
Glass transition point: 123.8° C.

| Elemental Analysis (%): | C | H | N |
|---|---|---|---|
| Measured Value | 77.05 | 5.27 | 1.92 |
| Calculated Value | 77.35 | 5.39 | 1.92 |

Figure 61:
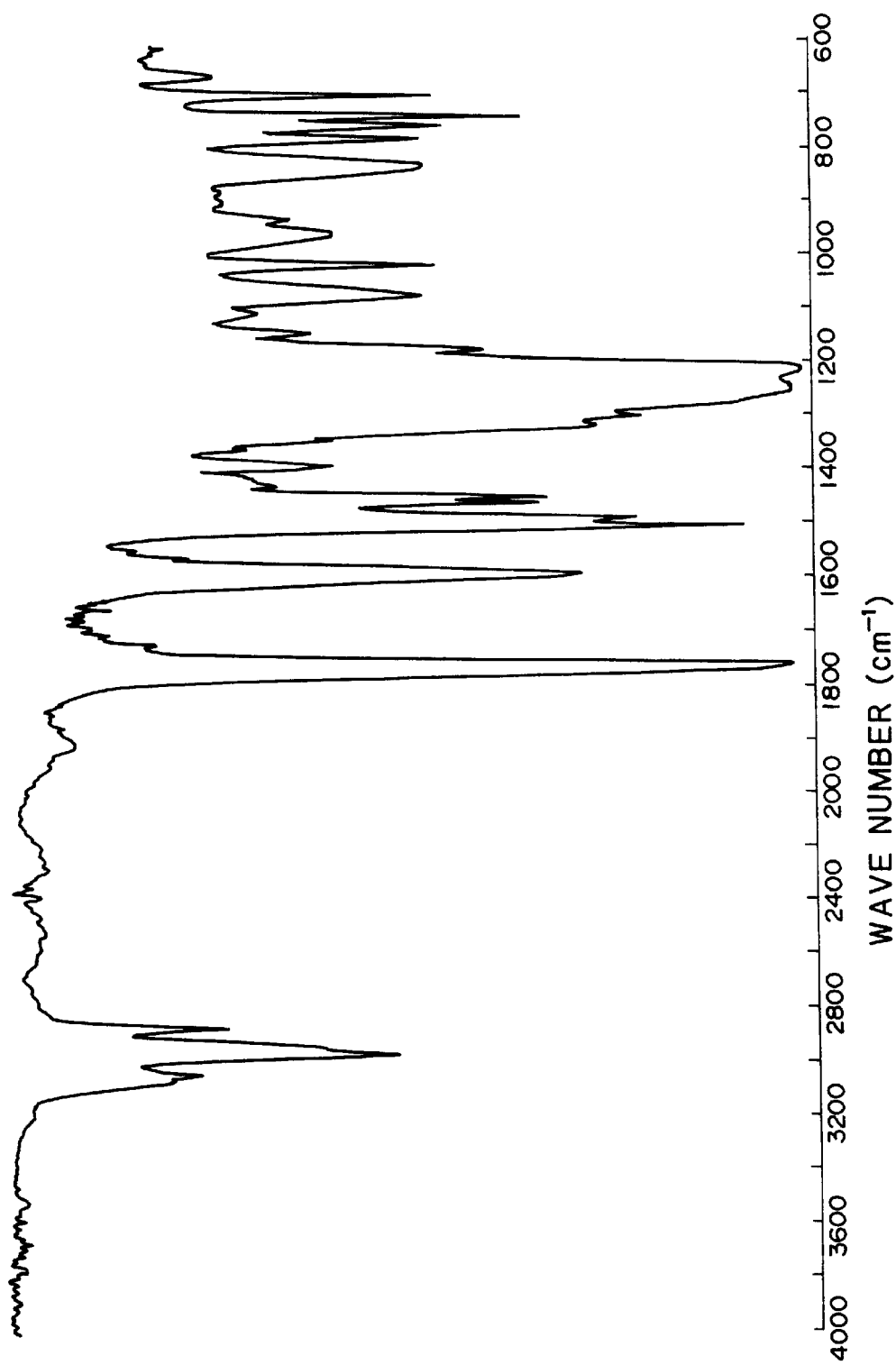
FIG. 61 is an IR spectrum (cast film on an NaCl plate) of an aromatic polycarbonate (polycarbonate No. 20) obtained in Example 20.

Number average molecular weight: 28,600
Weight average molecular weight: 102,200
IR spectrum: shown in FIG. 61
Glass transition point: 117.0° C.

| Elemental Analysis (%): | C | H | N |
|---|---|---|---|
| Measured Value | 79.02 | 5.73 | 1.90 |
| Calculated Value | 79.33 | 5.84 | 1.89 |

Polycarbonate No. 20:

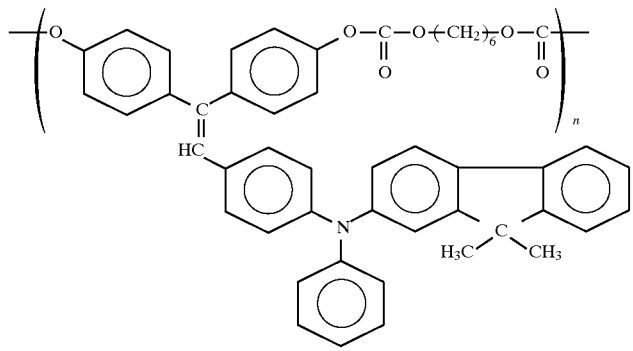

(R-20)

Polycarbonate No. 11:

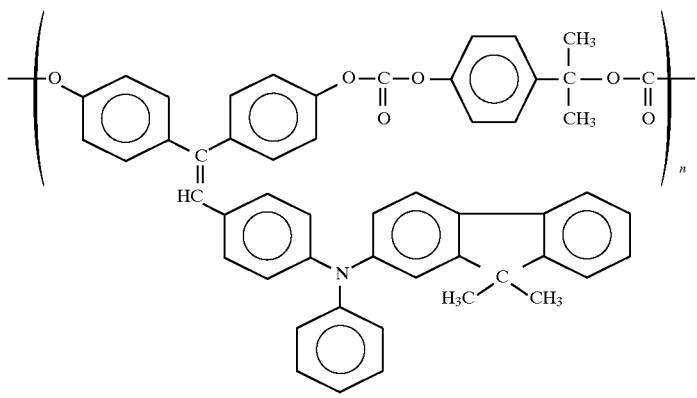

(R-21)

Figure 62:
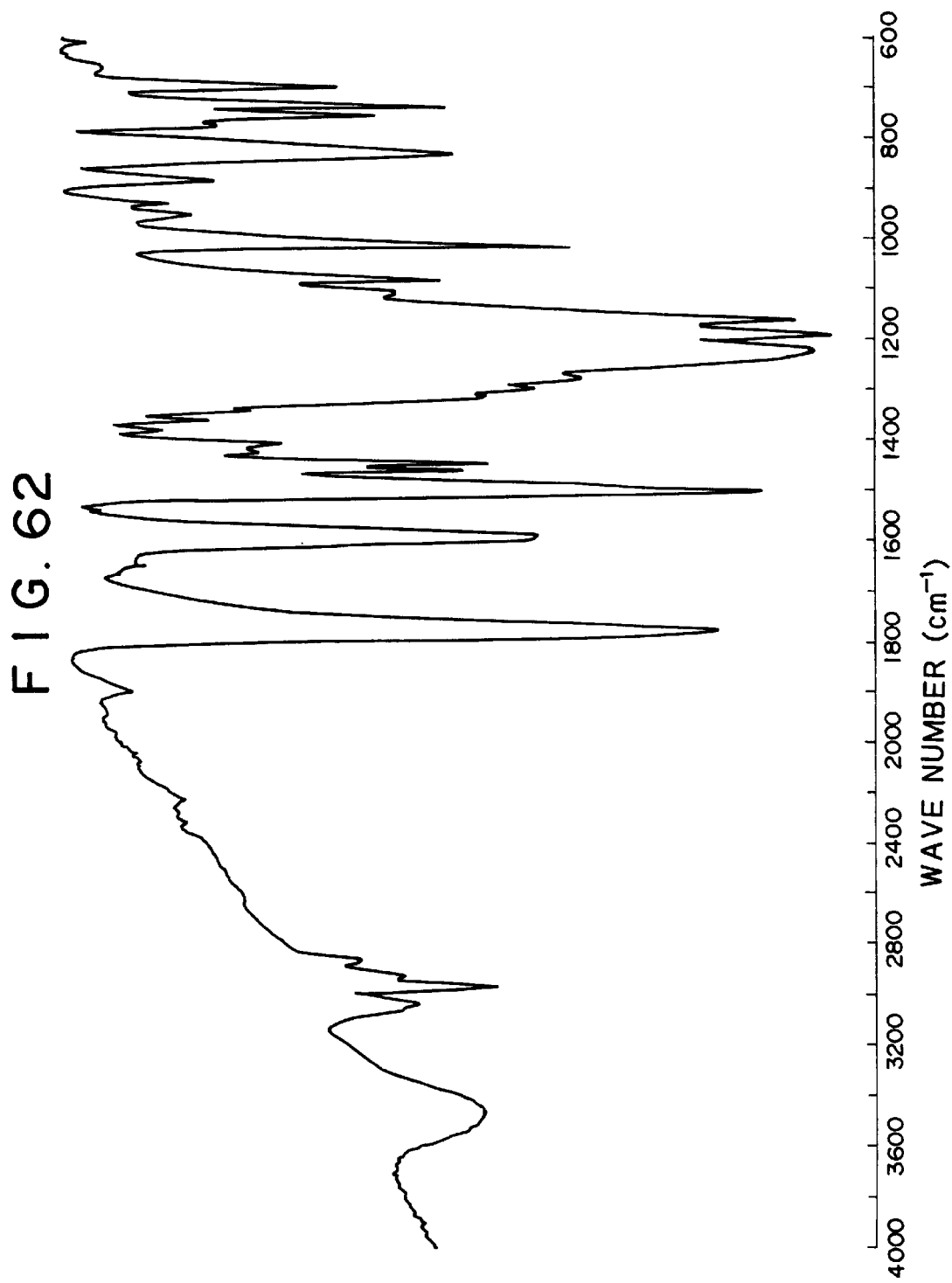
FIG. 62 is an IR spectrum (cast film on an NaCl plate) of an aromatic polycarbonate (polycarbonate No. 21) obtained in Example 21.

Number average molecular weight: 10,000
Weight average molecular weight: 31,400
IR spectrum: shown in FIG. 62
Glass transition point: 163.6° C.

| Elemental Analysis (%): | C | H | N |
|---|---|---|---|
| Measured Value | 81.60 | 5.20 | 1.65 |
| Calculated Value | 81.77 | 5.32 | 1.64 |

Polycarbonate No. 22:

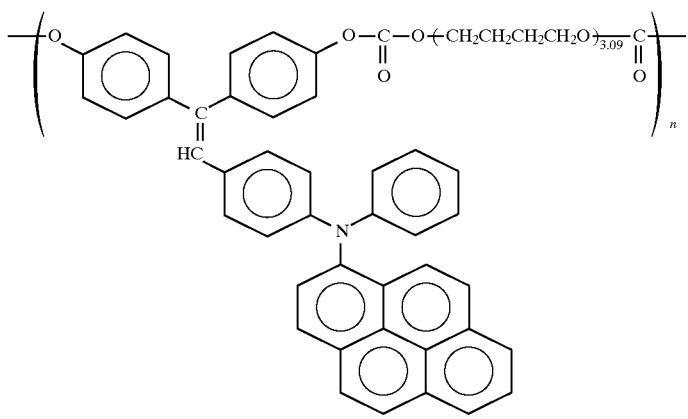

(R-22)

Figure 63:
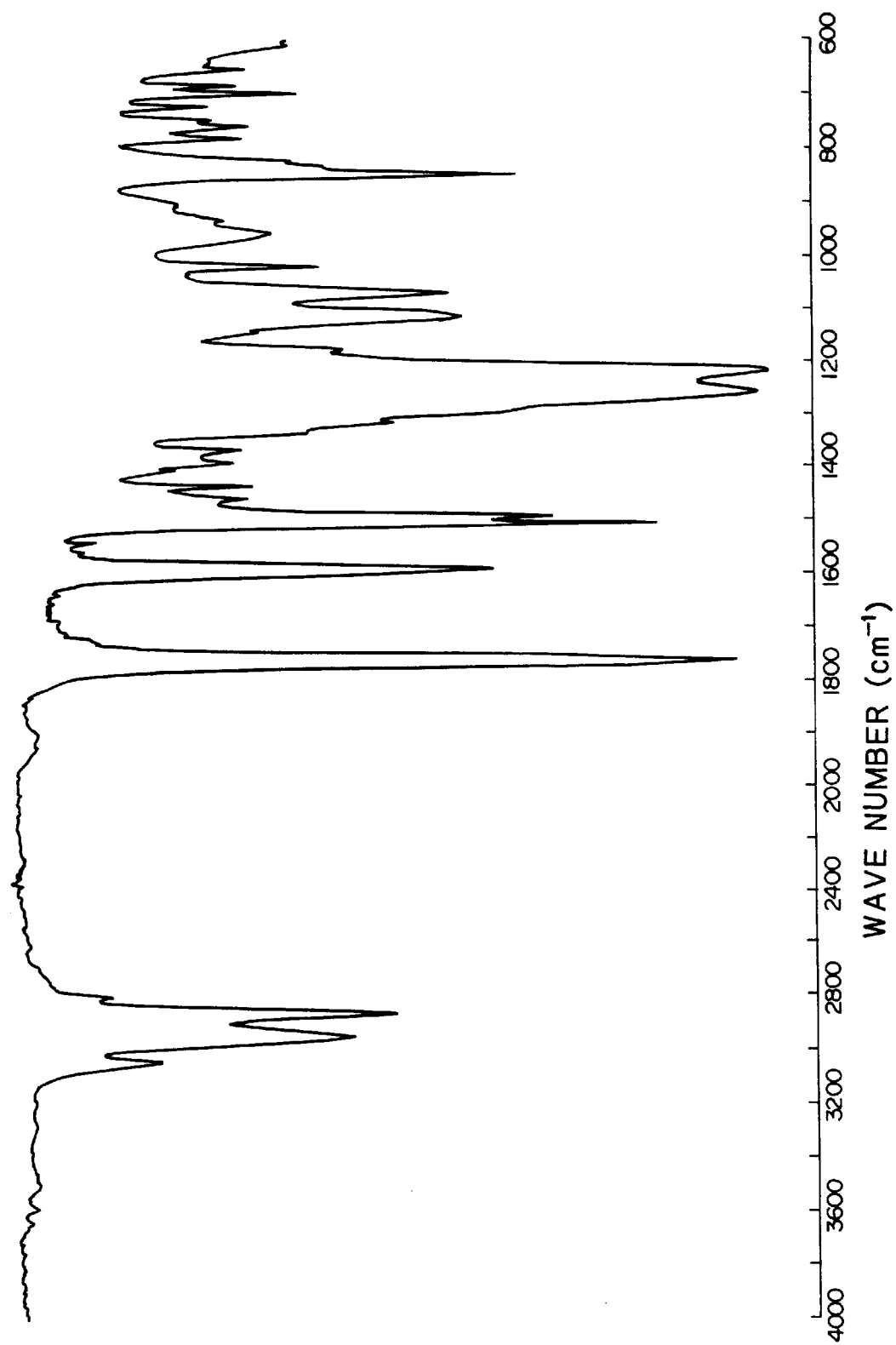
FIG. 63 is an IR spectrum (cast film on an NaCl plate) of an aromatic polycarbonate (polycarbonate No. 22) obtained in Example 22.

Number average molecular weight: 12,500
Weight average molecular weight: 27,300
IR spectrum: shown in FIG. 63
Glass transition point: 84.7° C.

| Elemental Analysis (%) | | | |
|---|---|---|---|
| | C | H | N |
| Measured Value | 77.53 | 6.00 | 1.48 |
| Calculated Value | 77.58 | 5.98 | 1.61 |

Polycarbonate No. 23:

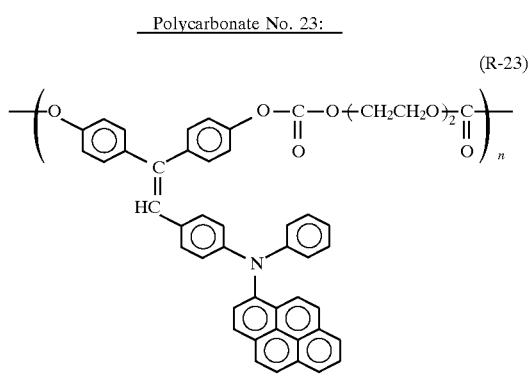
(R-23)

Figure 64:
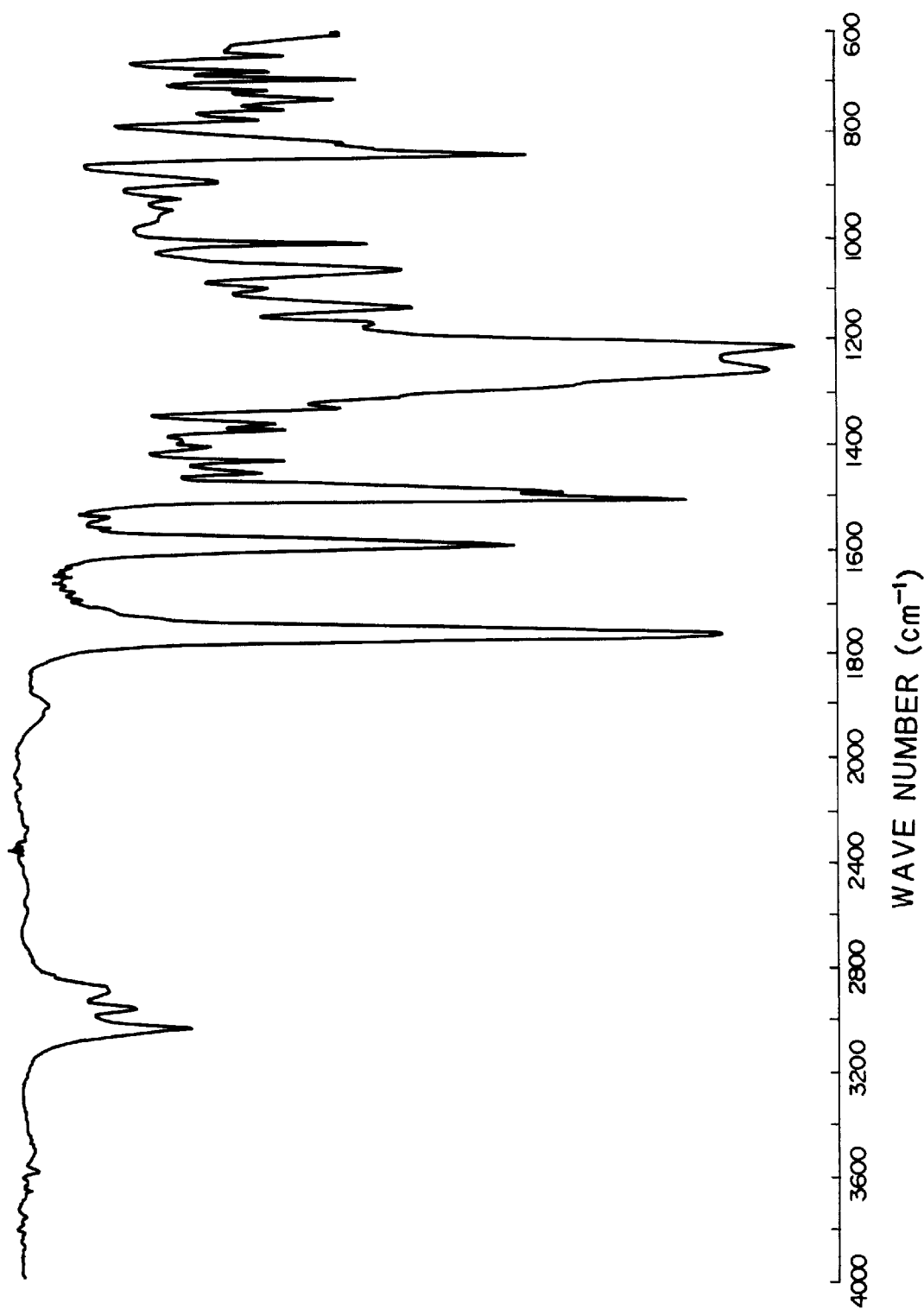
FIG. 64 is an IR spectrum (cast film on an NaCl plate) of an aromatic polycarbonate (polycarbonate No. 23) obtained in Example 23.

Number average molecular weight: 19,100
Weight average molecular weight: 43,000
IR spectrum: shown in FIG. 64
Glass transition point: 145.1° C.

| Elemental Analysis (%) | | | |
|---|---|---|---|
| Measured Value | 77.56 | 4.65 | 1.84 |
| Calculated Value | 78.14 | 4.78 | 1.90 |

Polycarbonate No. 24:

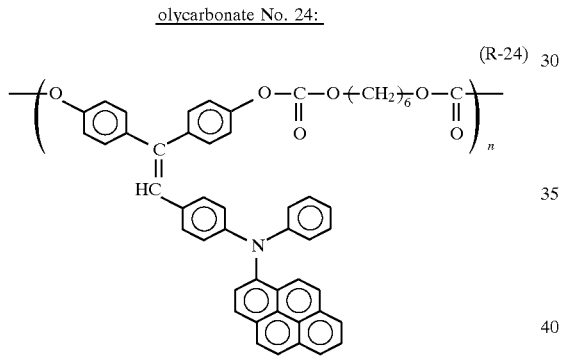
(R-24)

Figure 65:
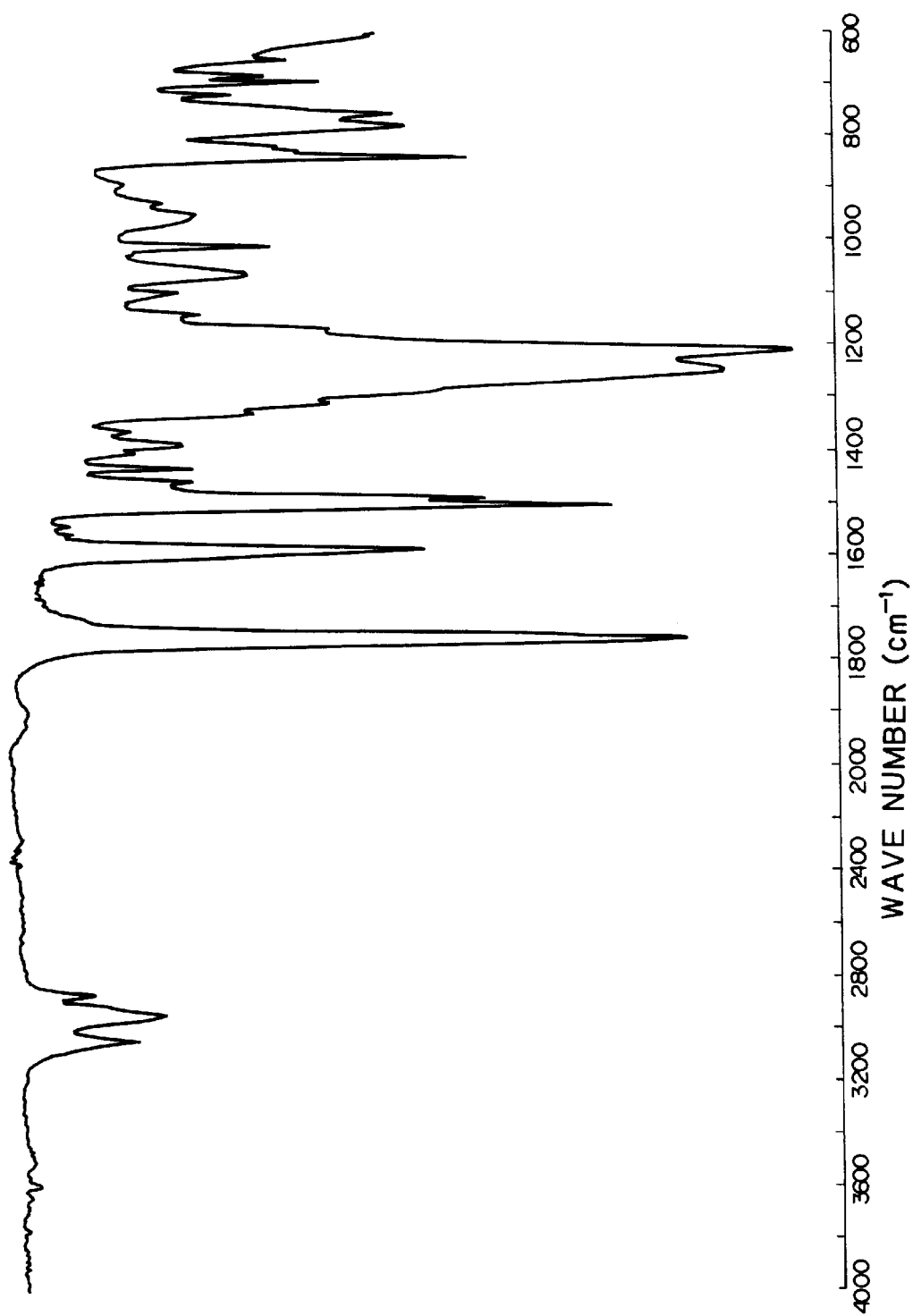
FIG. 65 is an IR spectrum (cast film on an NaCl plate) of an aromatic polycarbonate (polycarbonate No. 24) obtained in Example 24.

Number average molecular weight: 19,800
Weight average molecular weight: 63,100
IR spectrum: shown in FIG. 65
Glass transition point: 138.4° C.

| Elemental Analysis (%) | | | |
|---|---|---|---|
| Measured Value | 79.64 | 5.15 | 1.80 |
| Calculated Value | 80.09 | 5.24 | 1.87 |

Polycarbonate No. 25:

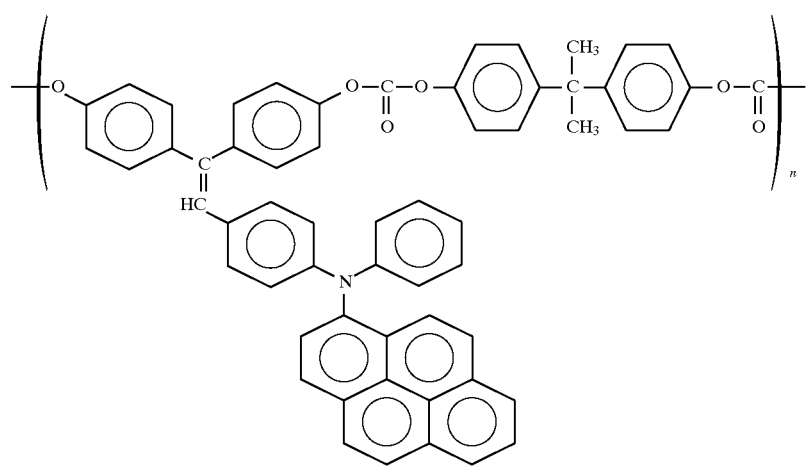
(R-25)

Figure 66:
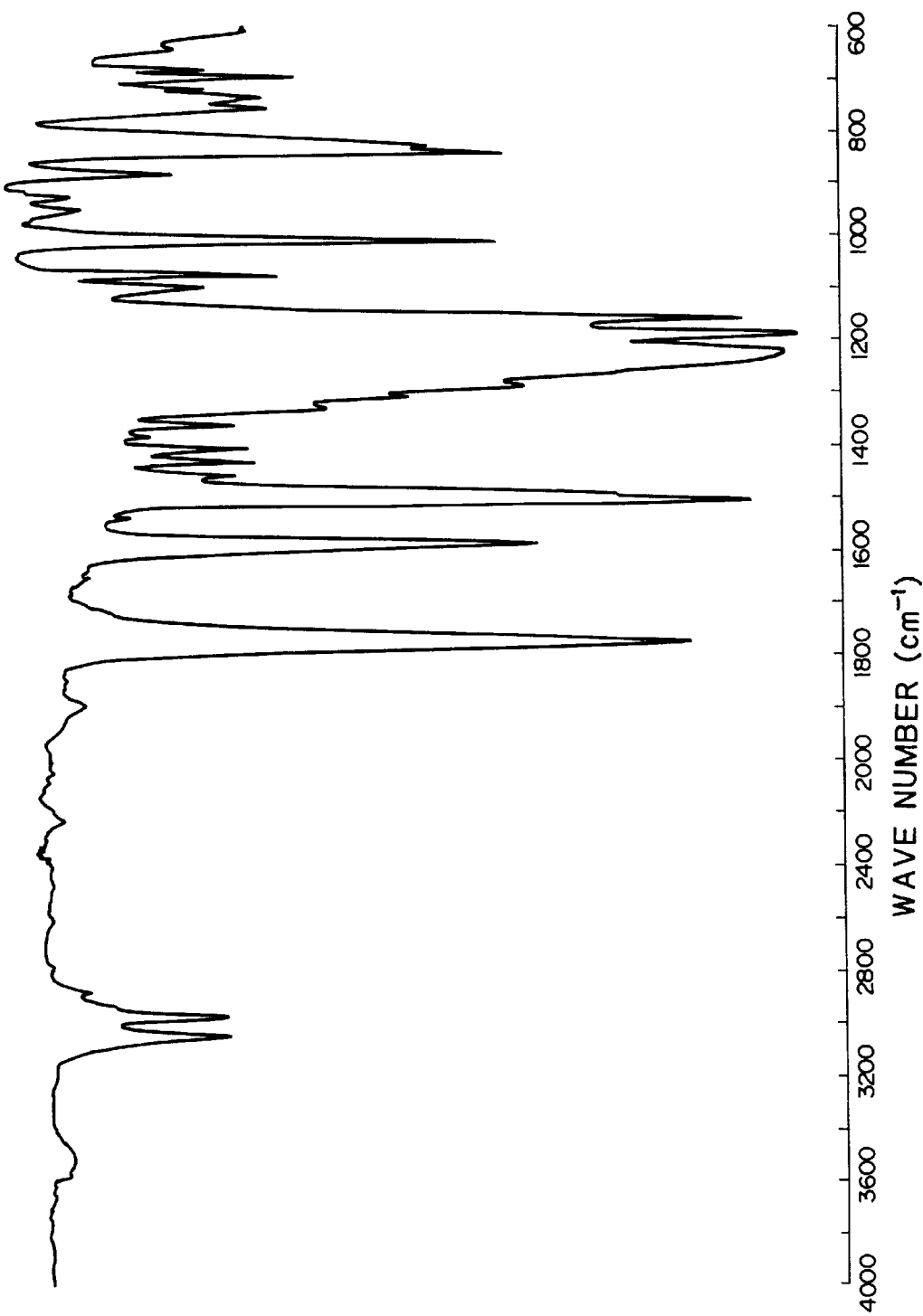
FIG. 66 is an IR spectrum (cast film on an NaCl plate) of an aromatic polycarbonate (polycarbonate No. 25) obtained in Example 25.

Number average molecular weight: 9,100
Weight average molecular weight: 23,800
IR spectrum: shown in FIG. 66
Glass transition point: 199.5° C.

| Elemental Analysis (%) | | | |
| --- | --- | --- | --- |
| Measured Value | 82.53 | 4.71 | 1.63 |
| Calculated Value | 82.40 | 4.81 | 1.63 |

EXAMPLE 26

Figure 67:
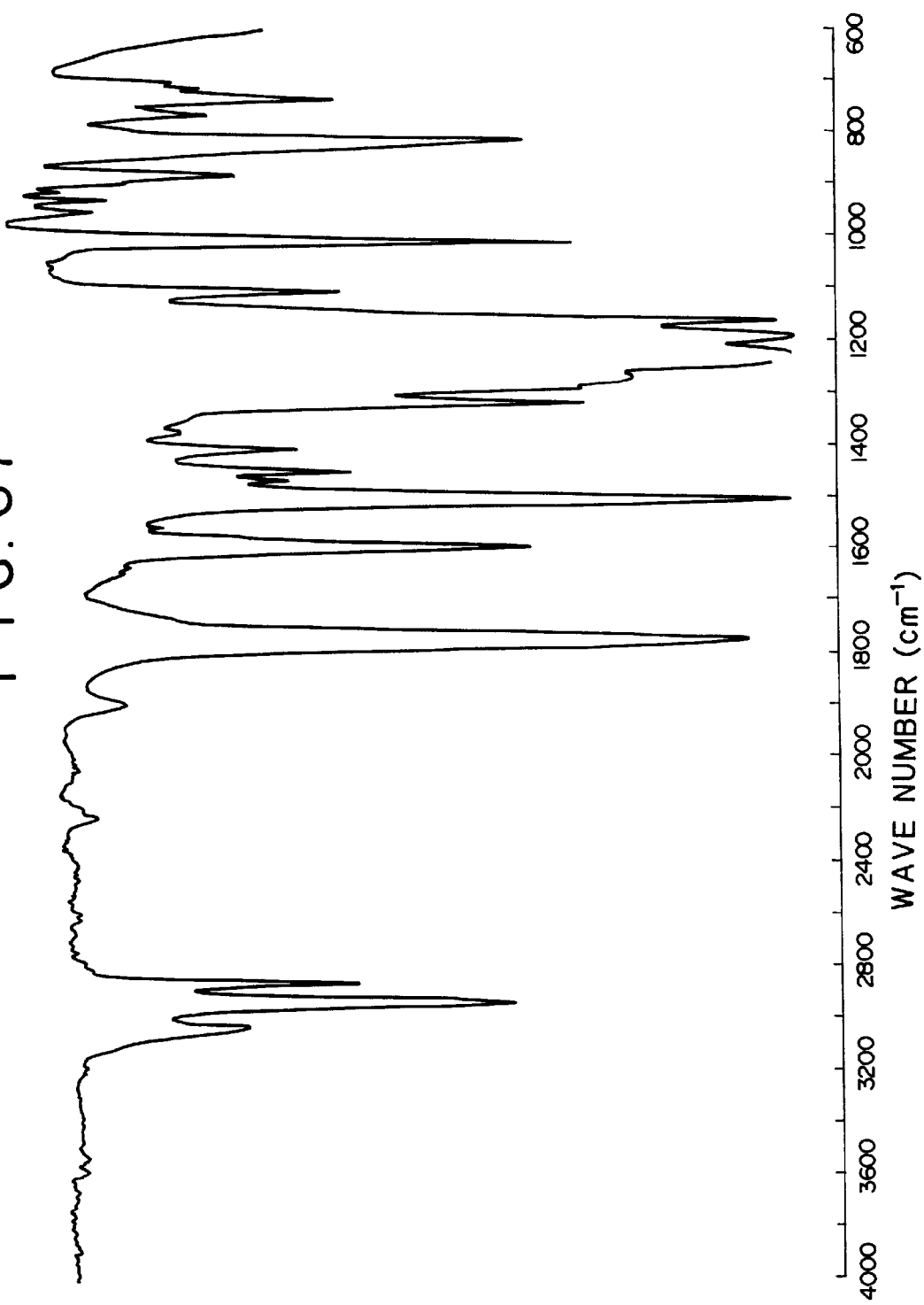
FIG. 67 is an IR spectrum (cast film on an NaCl plate) of an aromatic polycarbonate (polycarbonate No. 26) obtained in Example 26.

3.46 parts by weight of 4,4'-dimethyl-4"-[2,2-bis(4-hydroxyphenyl)vinyl]triphenylamine having the formula (A-16), 2.54 parts by weight of 1,1-bis(4-hydroxyphenyl) cyclohexane and 0.01 part by weight of 4-tert-butylphenol (polymerization stopper) were placed in a reactor equipped with a stirrer, to which a solution of 2.7 parts by weight of sodium hydroxide and 0.05 part by weight of sodium hydrosulfite dissolved in 60 parts by weight of water was added. The mixture was stirred with heating under a nitrogen stream to dissolve the solids. The resulting solution was cooled to 6° C. Then, a solution of 2.96 parts of bis(trichloromethyl)carbonate (trimer of phosgene) dissolved in 40 parts of dichloromethane was added dropwise to the cooled solution through 15 minutes with vigorous stirring so as to maintain an emulsified state. The reaction mixture was further stirred for another 15 minutes. Then, 0.7 part of sodium hydroxide was added and the mixture was stirred for 15 minutes. Subsequently, 0.005 part of triethylamine was added and the mixture was reacted at 30° C. for 90 minutes with stirring. The product was extracted with 250 parts by weight of dichloromethane. The organic phase was washed with a 5% aqueous sodium hydroxide solution and then with 2% hydrochloric acid and finally with water. The washed organic layer was dropped into a large amount of methanol so that aromatic polycarbonate No. 26 was precipitated as a yellow product. The polycarbonate No. 26 had structural units of the formula (R-26):

The gel permeation chromatography revealed that the polycarbonate No. 26 had a number average molecular weight of 106,000 and a weight average molecular weight of 627,000 in terms of polystyrene. The DSC analysis revealed that this resin had a glass transition point of 184° C. The IR spectrum is shown in FIG. 67. The elemental analysis gave:

|  | C | H | N |
| --- | --- | --- | --- |
| Measured Value | 80.29 | 5.62 | 1.49 |
| Calculated Value | 80.34 | 5.70 | 1.56 |

The measured values in the elementary analysis are in well conformity with the theoretical values calculated with the proviso that the polycarbonate is a random copolymer having a molar ratio of the monomer units of 0.43:0.57.

EXAMPLES 27–31

Example 26 was repeated in the same manner as described except that kinds and amounts of the raw material diols were varied, thereby to give polycarbonates No. 27 through 31 having structural units of the formulas (R-27) through (R-31) shown below. The physical properties of these polycarbonates are shown beneath respective formulas.

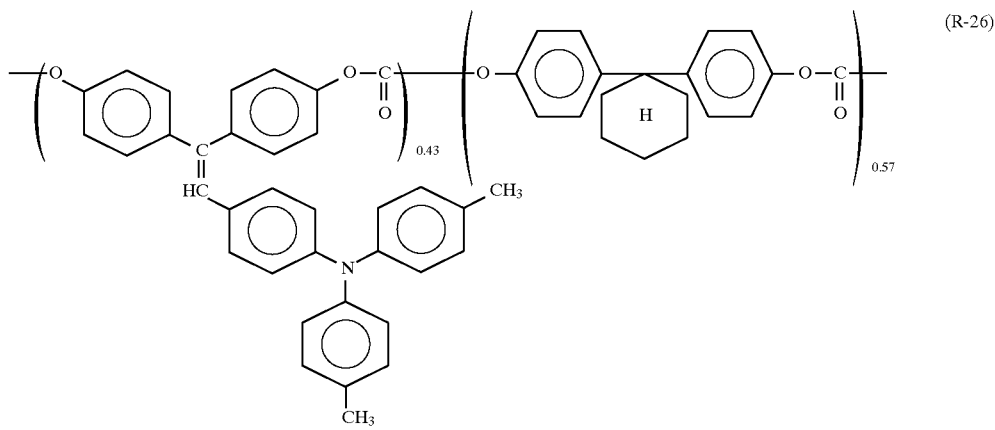

Polycarbonate No. 27:

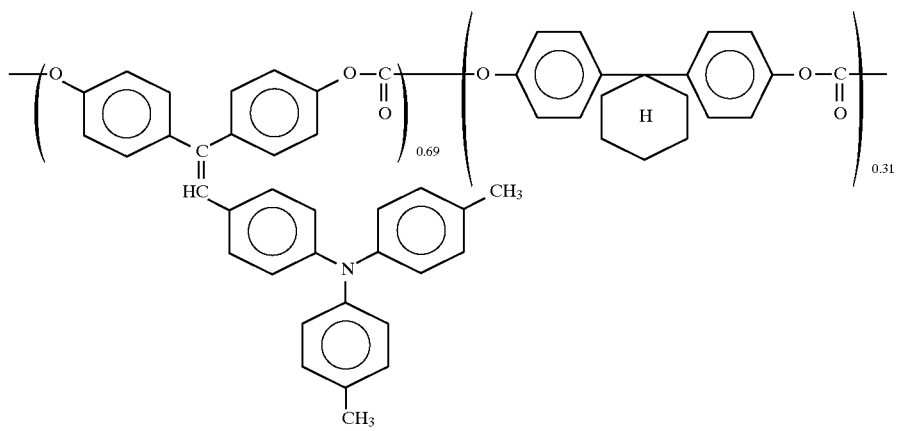
(R-27)

Figure 68:
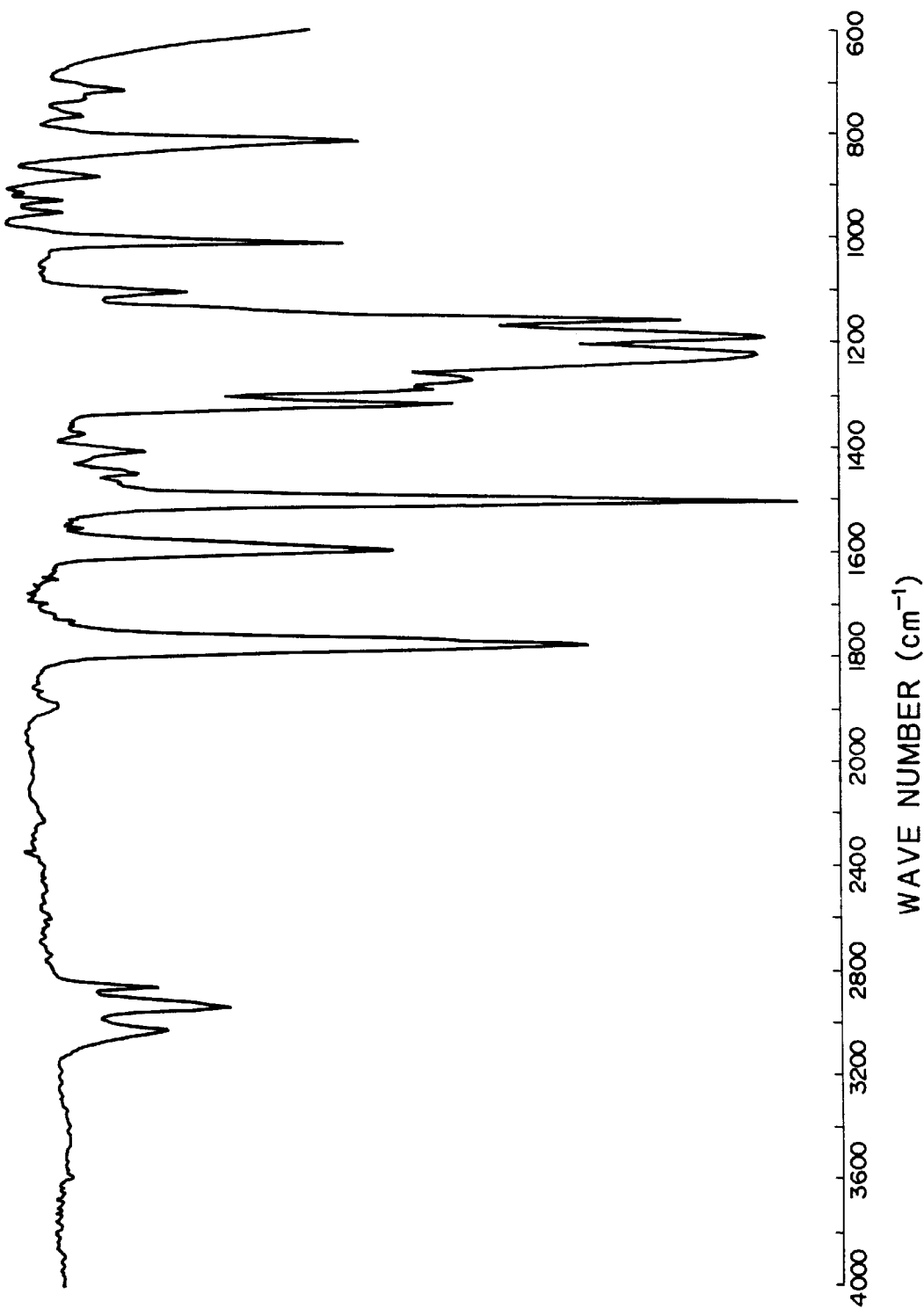
FIG. 68 is an IR spectrum (cast film on an NaCl plate) of an aromatic polycarbonate (polycarbonate No. 27) obtained in Example 27.

Number average molecular weight: 85,200
Weight average molecular weight: 170,200
IR spectrum: shown in FIG. 68
Glass transition point: 188.0° C.

| Elemental Analysis (%) | | | |
|---|---|---|---|
| | C | H | N |
| Measured Value | 81.29 | 5.28 | 2.14 |
| Calculated Value | 81.47 | 5.51 | 2.18 |

Figure 69:
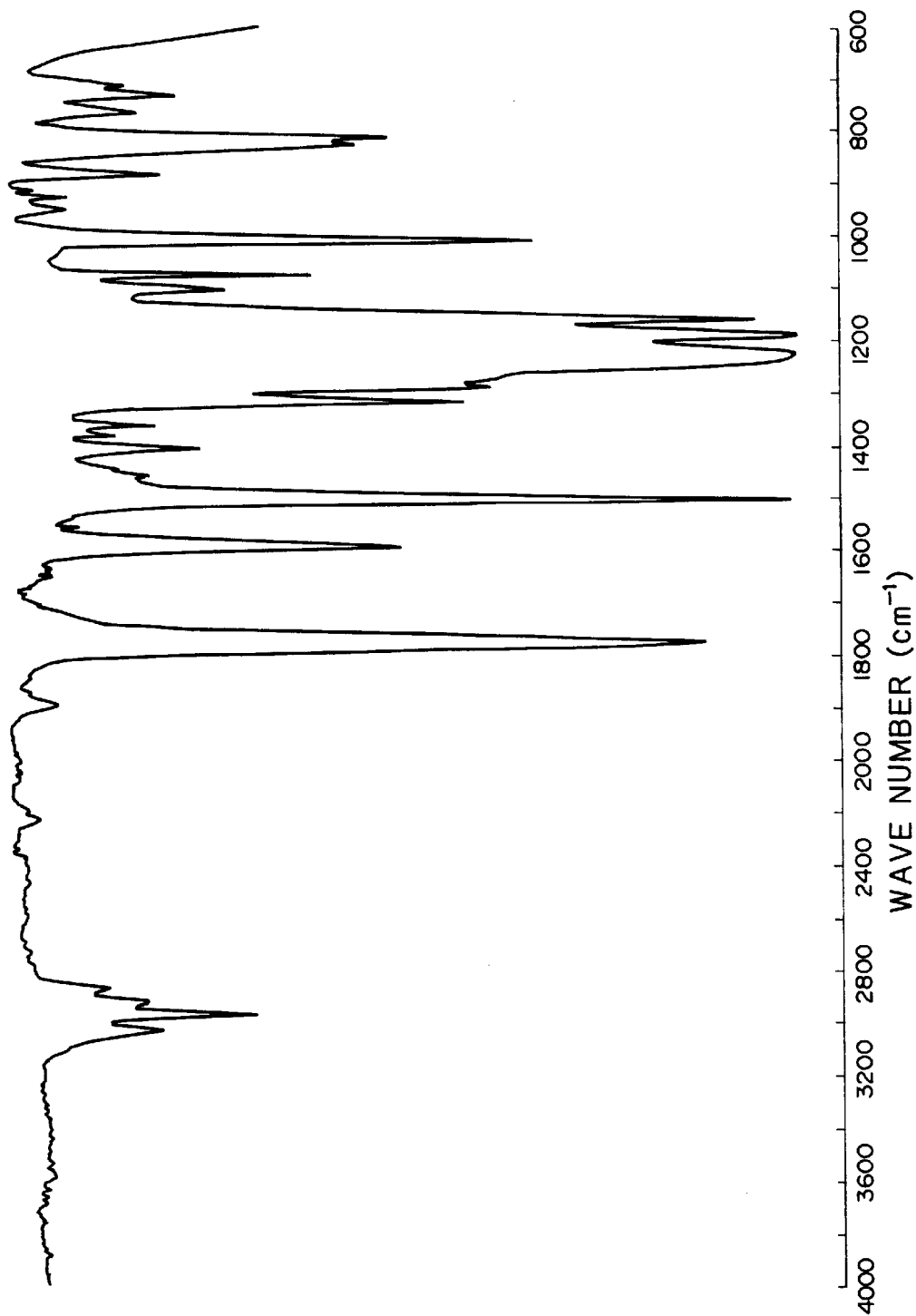
FIG. 69 is an IR spectrum (cast film on an NaCl plate) of an aromatic polycarbonate (polycarbonate No. 28) obtained in Example 28.

Number average molecular weight: 83,600
Weight average molecular weight: 207,900
IR spectrum: shown in FIG. 69
Glass transition point: 172.5° C.

| Elemental Analysis (%) | | | |
|---|---|---|---|
| | C | H | N |
| Measured Value | 79.37 | 5.33 | 1.41 |
| Calculated Value | 79.50 | 5.43 | 1.56 |

Polycarbonate No. 28:

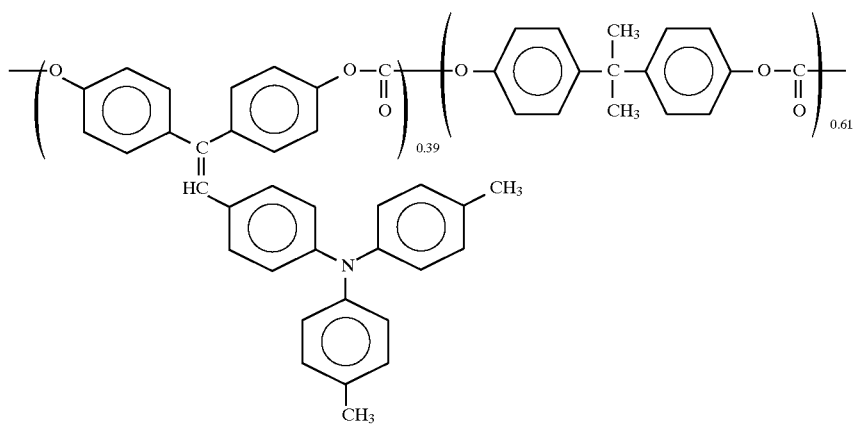
(R-28)

Polycarbonate No. 29:

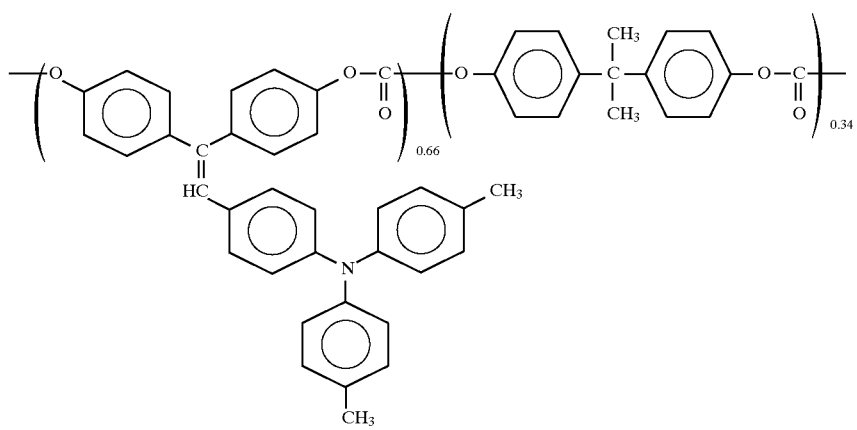
(R-29)

Figure 70:
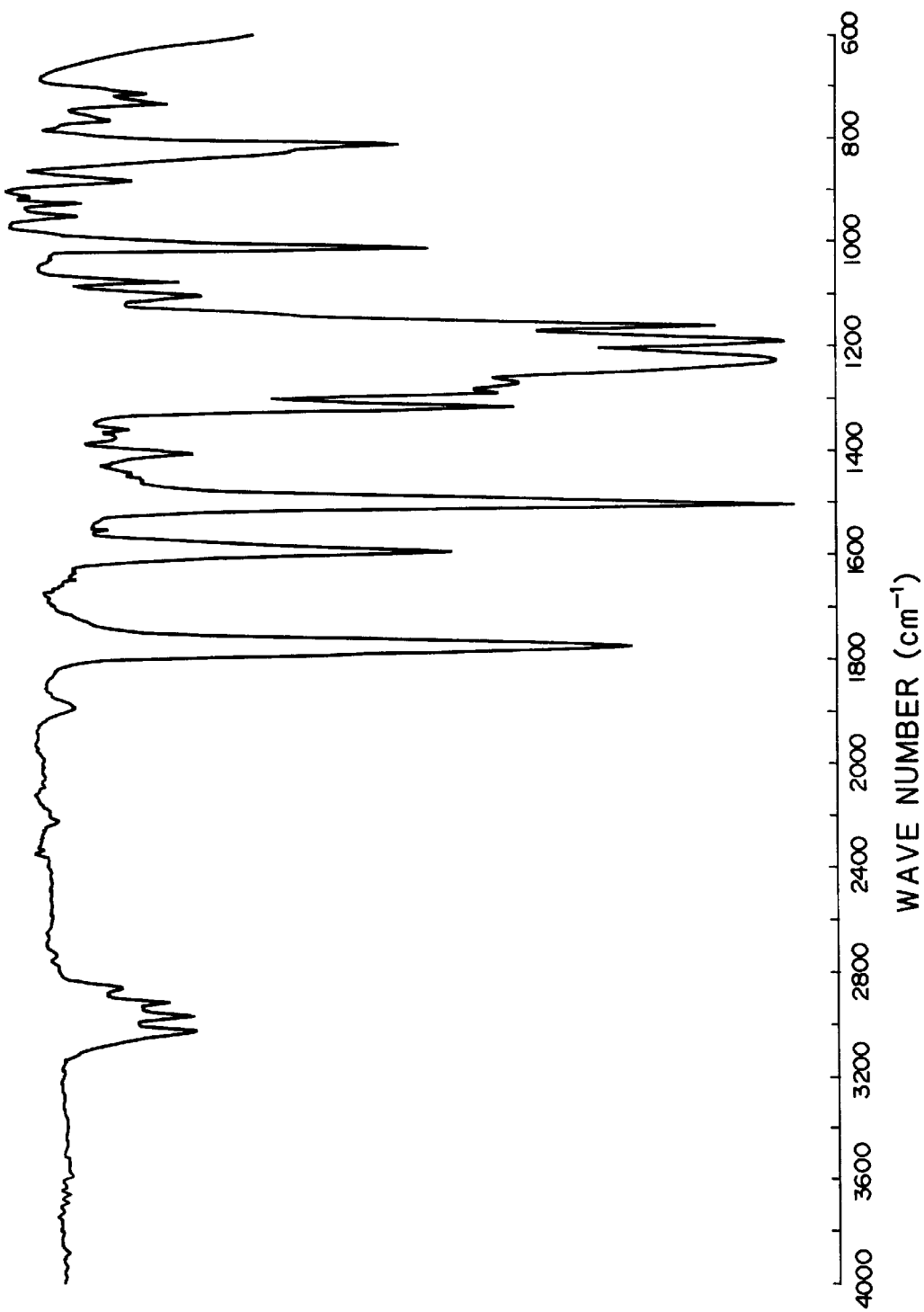
FIG. 70 is an IR spectrum (cast film on an NaCl plate) of an aromatic polycarbonate (polycarbonate No. 29) obtained in Example 29.

Number average molecular weight: 98,800
Weight average molecular weight: 192,400
IR spectrum: shown in FIG. 70
Glass transition point: 181.3° C.

| Elemental Analysis (%) | | | |
|---|---|---|---|
| | C | H | N |
| Measured Value | 81.02 | 5.33 | 2.10 |
| Calculated Value | 81.06 | 5.38 | 2.18 |

Polycarbonate No. 30:

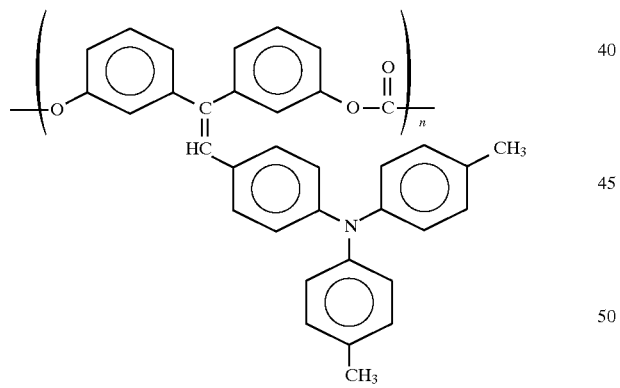
(R-30)

Figure 71:
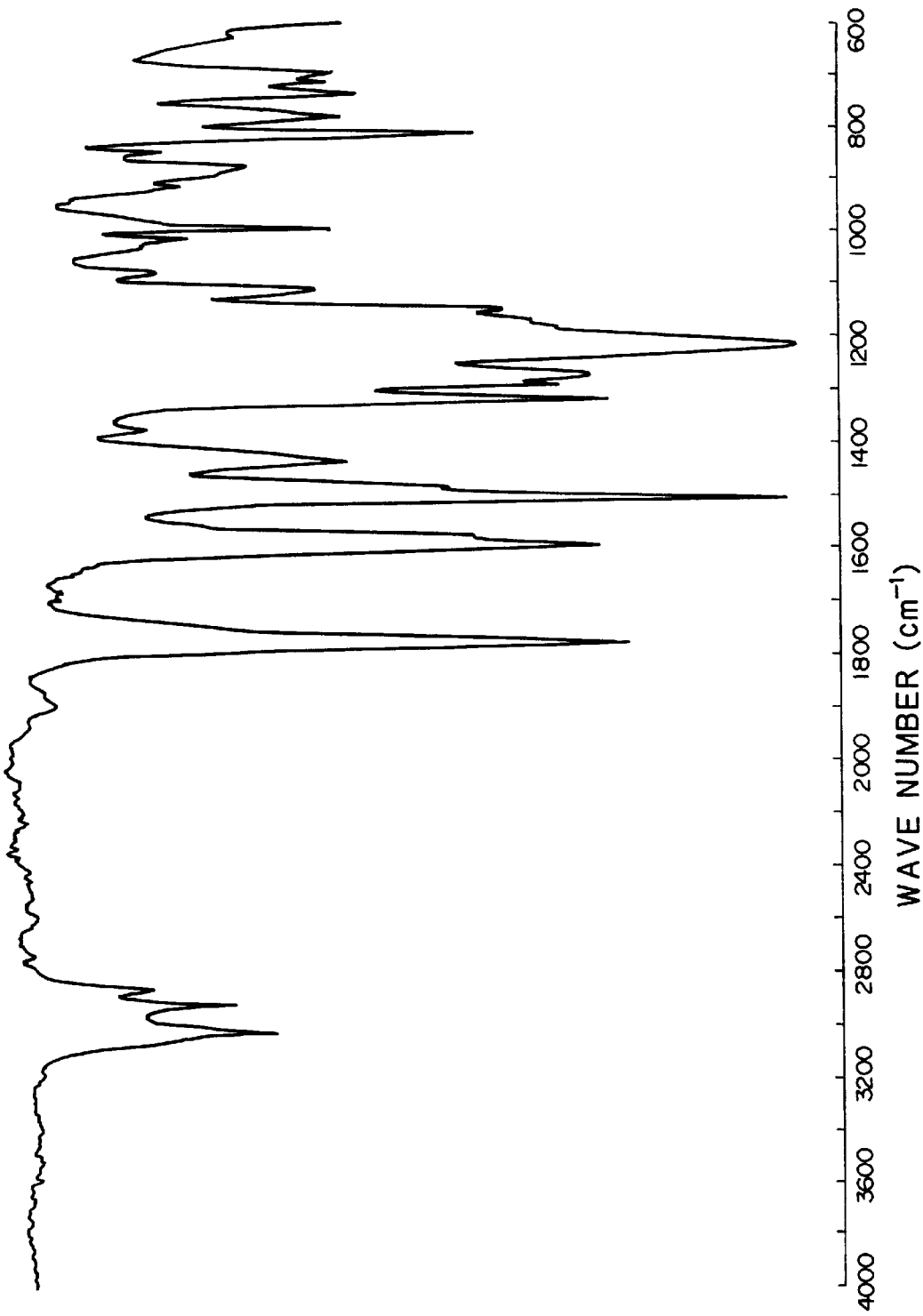
FIG. 71 is an IR spectrum (cast film on an NaCl plate) of an aromatic polycarbonate (polycarbonate No. 30) obtained in Example 30.

Number average molecular weight: 22,800
Weight average molecular weight: 141,700
IR spectrum: shown in FIG. 71
Glass transition point: 161.5° C.

| Elemental Analysis (%) | | | |
|---|---|---|---|
| | C | H | N |
| Measured Value | 82.62 | 5.20 | 2.85 |
| Calculated Value | 82.49 | 5.34 | 2.75 |

Polycarbonate No. 31:

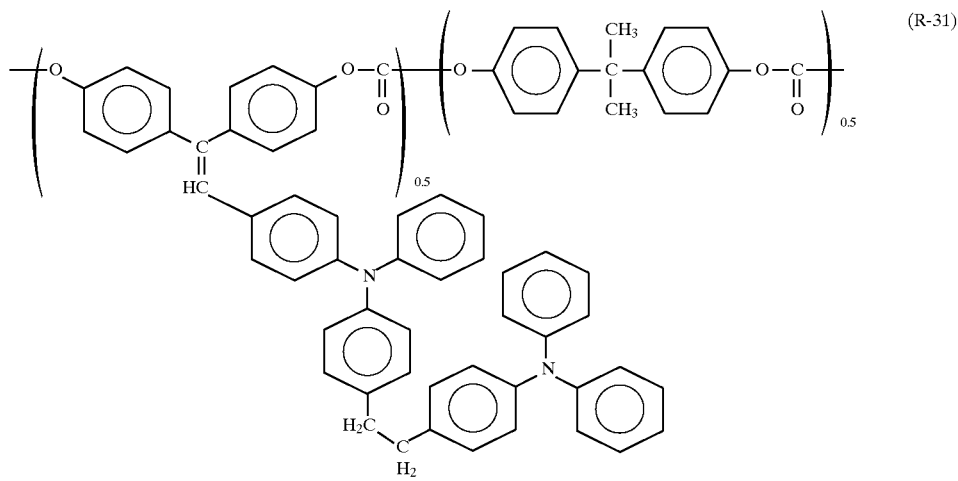

(R-31)

Figure 72:
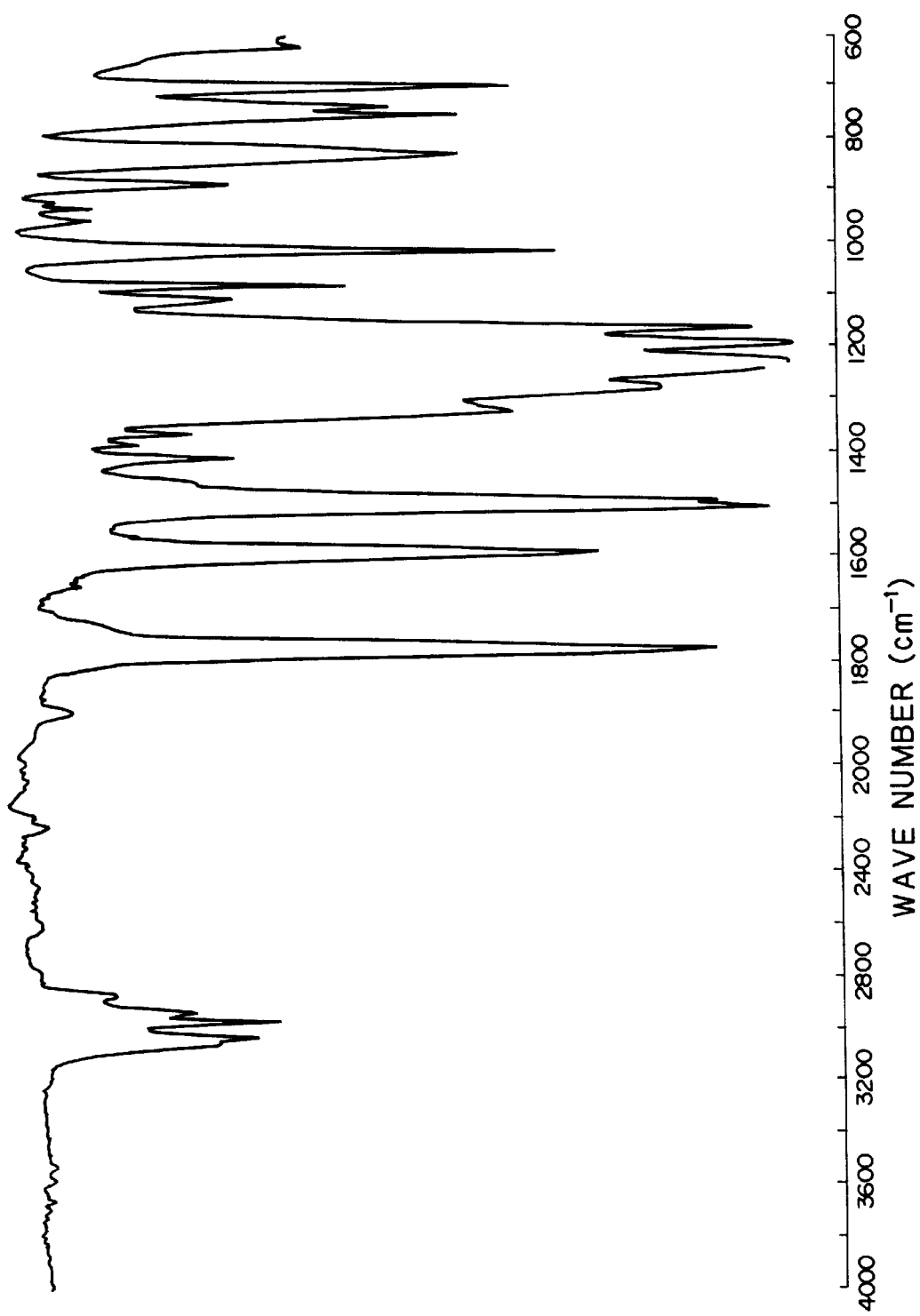
FIGS. 72–82 are IR spectra (NaCl) of aromatic polycarbonates (polycarbonate Nos. 31–41) obtained in Examples 31–41.

Number average molecular weight: 42,600
Weight average molecular weight: 116,100
IR spectrum: shown in FIG. 72
Glass transition point: 154.9° C.

| Elemental Analysis (%) | | | |
|---|---|---|---|
| | C | H | N |
| Measured Value | 81.45 | 5.37 | 1.64 |
| Calculated Value | 81.50 | 5.40 | 1.67 |

Figure 73:
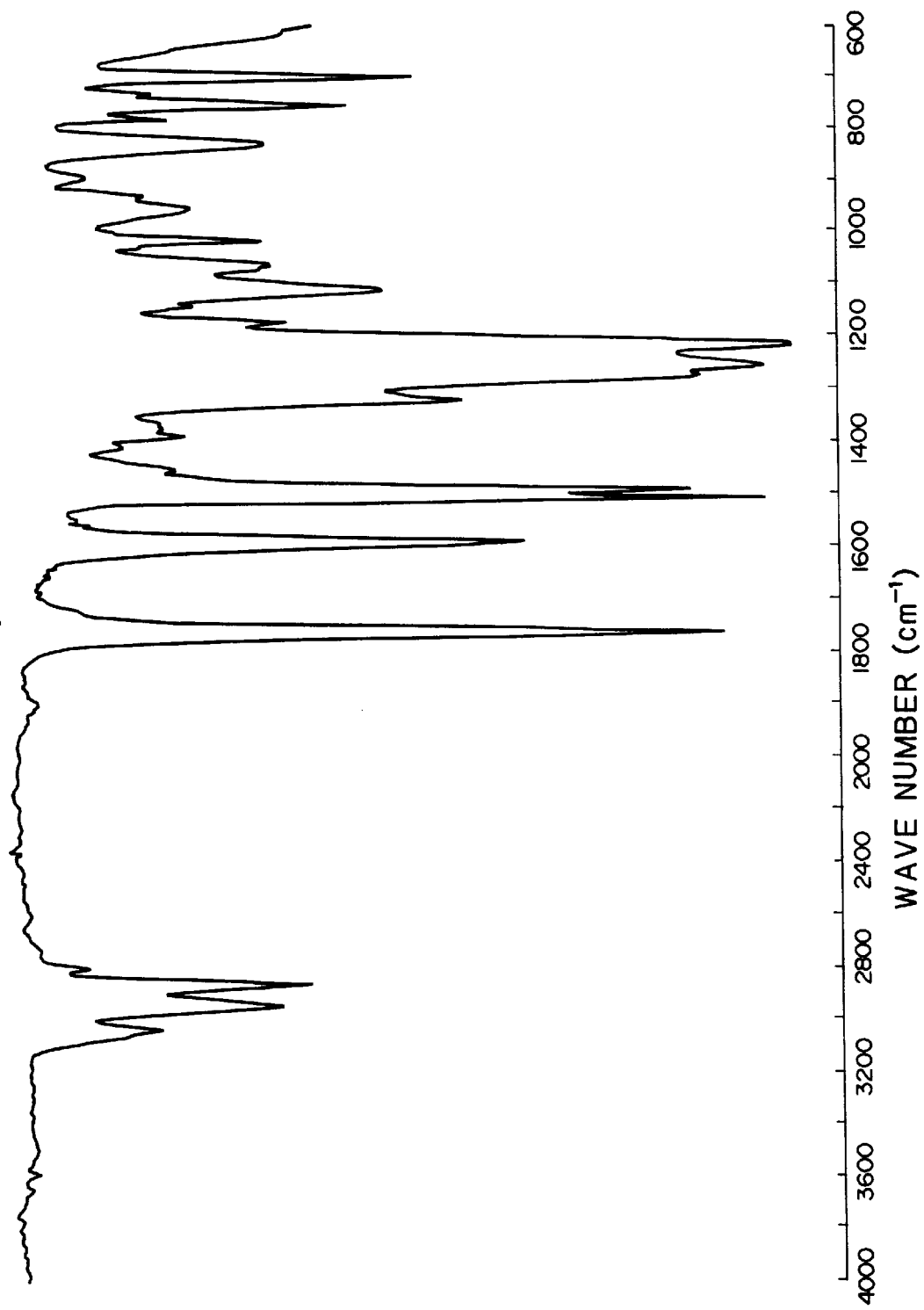

Number average molecular weight: 8,200
Weight average molecular weight: 20,400
IR spectrum: shown in FIG. 73
Glass transition point: 71.2° C.

| Elemental Analysis (%) | | | |
|---|---|---|---|
| | C | H | N |
| Measured Value | 78.15 | 6.38 | 2.75 |
| Calculated Value | 78.16 | 6.40 | 2.75 |

EXAMPLES 32–35

Example 1 was repeated in the same manner as described except that various combinations of the OH-containing amine compounds of the formulas (A-24) and (A-26) with bischloroformate were used to give polycarbonates No. 32 through 35 having recurring units of the formulas (R-32) through (R-35). The physical properties of these polycarbonates are shown beneath respective formulas:

Polycarbonate No. 32:

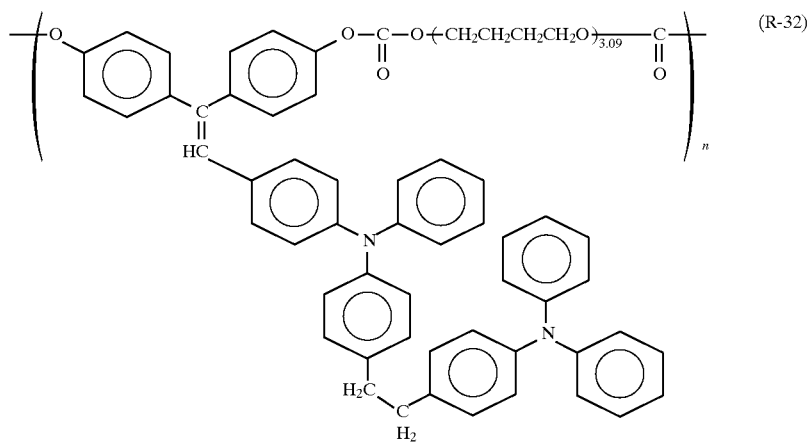

(R-32)

Polycarbonate No. 33:

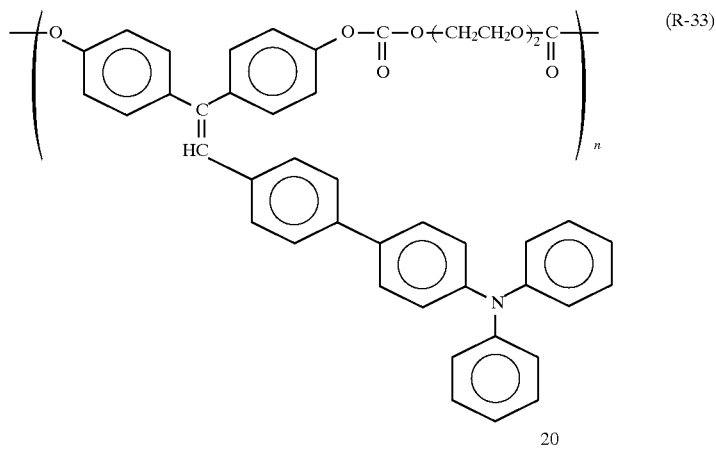

(R-33)

Figure 74:
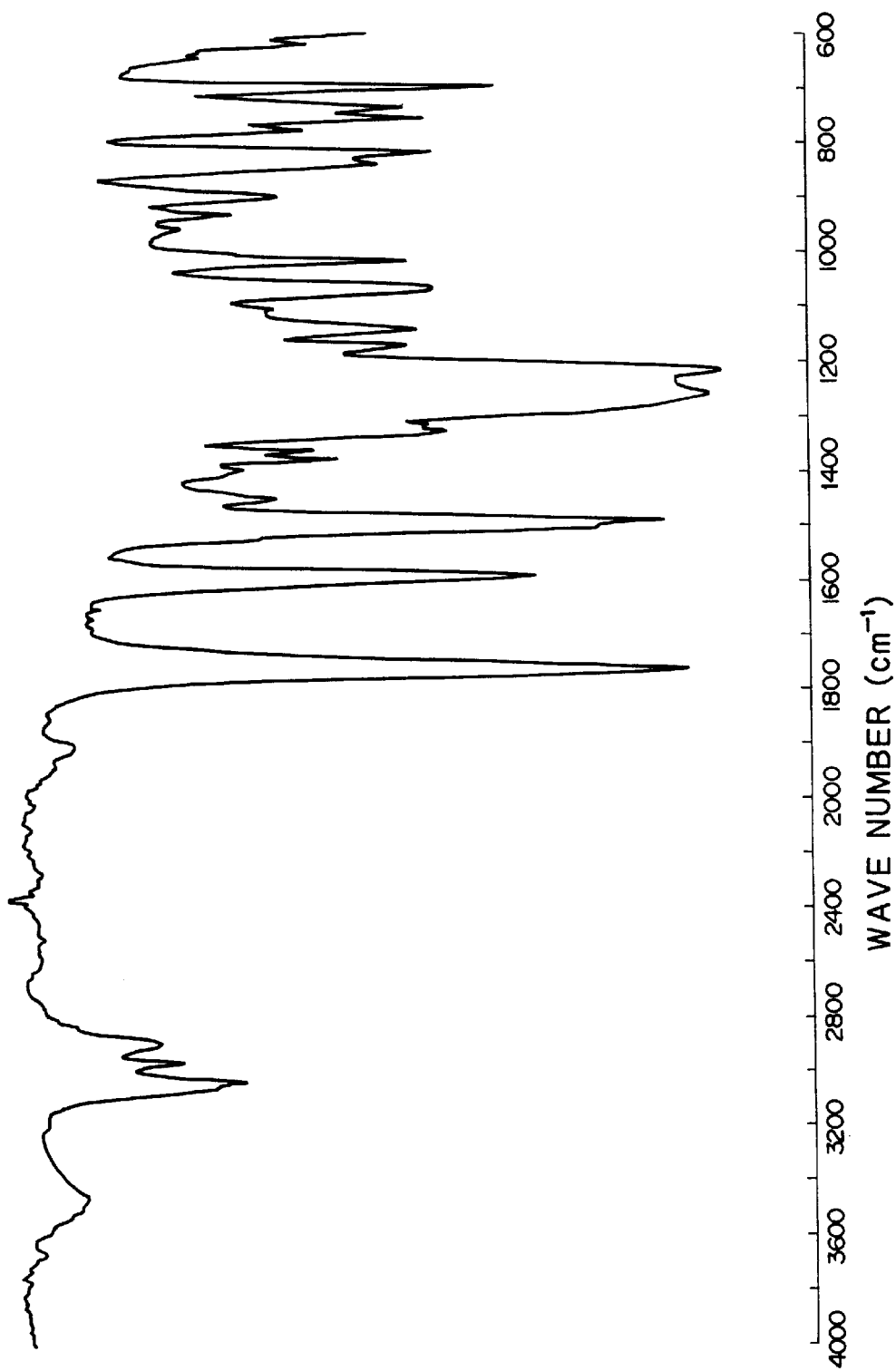

Number average molecular weight: 6,700
Weight average molecular weight: 11,800
IR spectrum: shown in FIG. 74
Glass transition point: 122.2° C.

Figure 75:
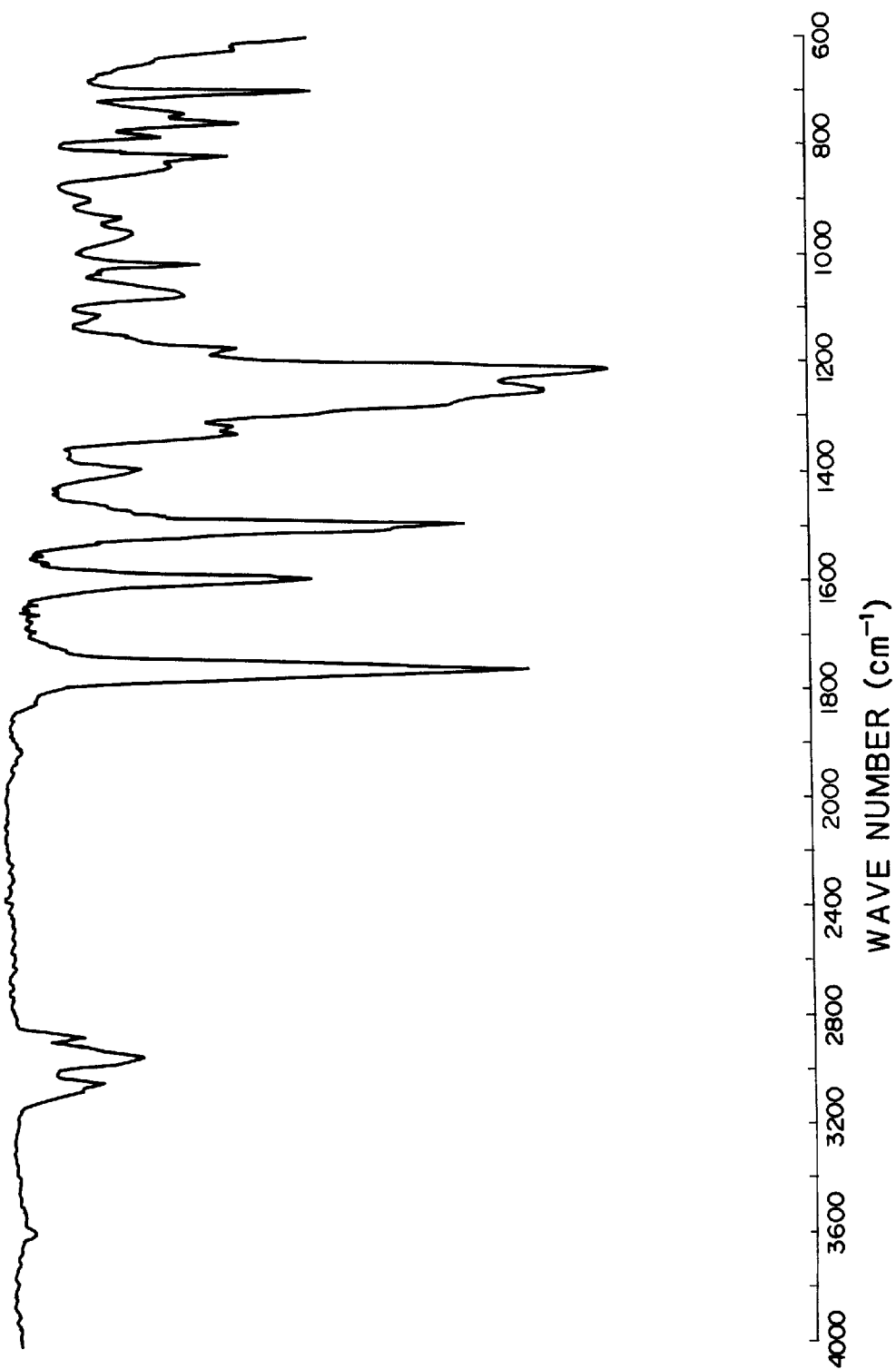

Number average molecular weight: 9,300
Weight average molecular weight: 20,300
IR spectrum: shown in FIG. 75
Glass transition point: not measured

| Elemental Analysis (%) | | | |
|---|---|---|---|
| | C | H | N |
| Measured Value | 76.60 | 5.12 | 2.00 |
| Calculated Value | 76.61 | 5.12 | 2.03 |

| Elemental Analysis (%) | | | |
|---|---|---|---|
| | C | H | N |
| Measured Value | 78.69 | 5.60 | 1.98 |
| Calculated Value | 78.71 | 5.61 | 2.00 |

Polycarbonate No. 34:

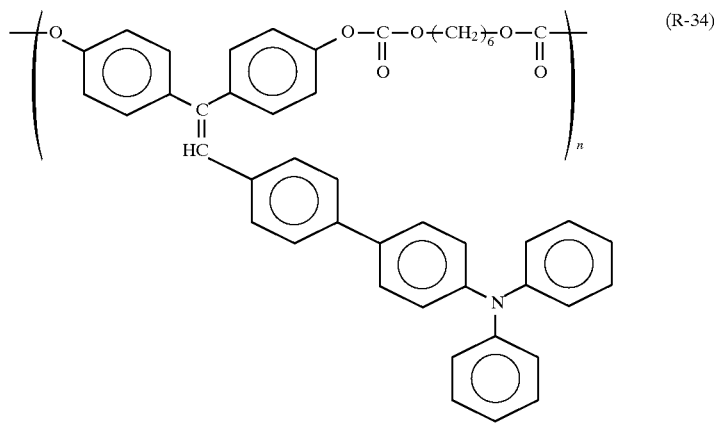

(R-34)

Polycarbonate No. 35:

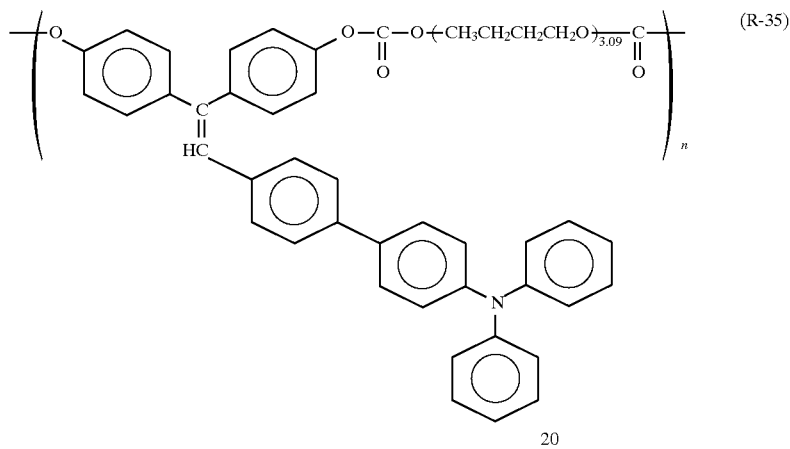

(R-35)

Figure 76:
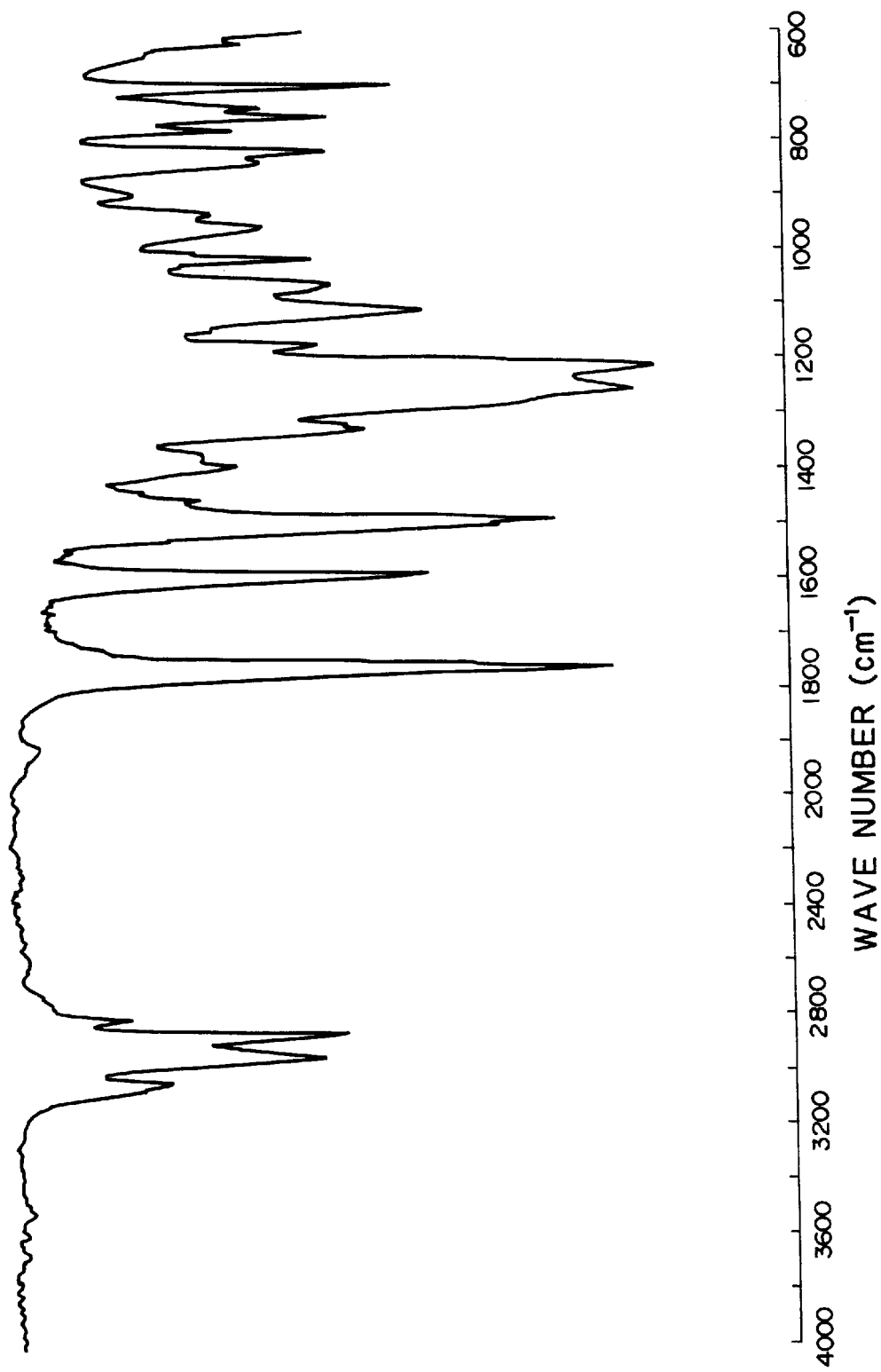

Number average molecular weight; 12,800
Weight average molecular weight: 28,700
IR spectrum: shown in FIG. 76
Glass transition point: not measured

| Elemental Analysis (%) | | | |
|---|---|---|---|
|  | C | H | N |
| Measured Value | 76.27 | 6.30 | 1.65 |
| Calculated Value | 76.27 | 6.34 | 1.70 |

EXAMPLES 36–41

Example 26 was repeated in the same manner as described except that kinds and amounts of the raw material diols were varied, thereby to give polycarbonates No. 36 through 41 having structural units of the formulas (R-36) through (R-41) shown below. The physical properties of these polycarbonates are shown beneath respective formulas.

Figure 77:
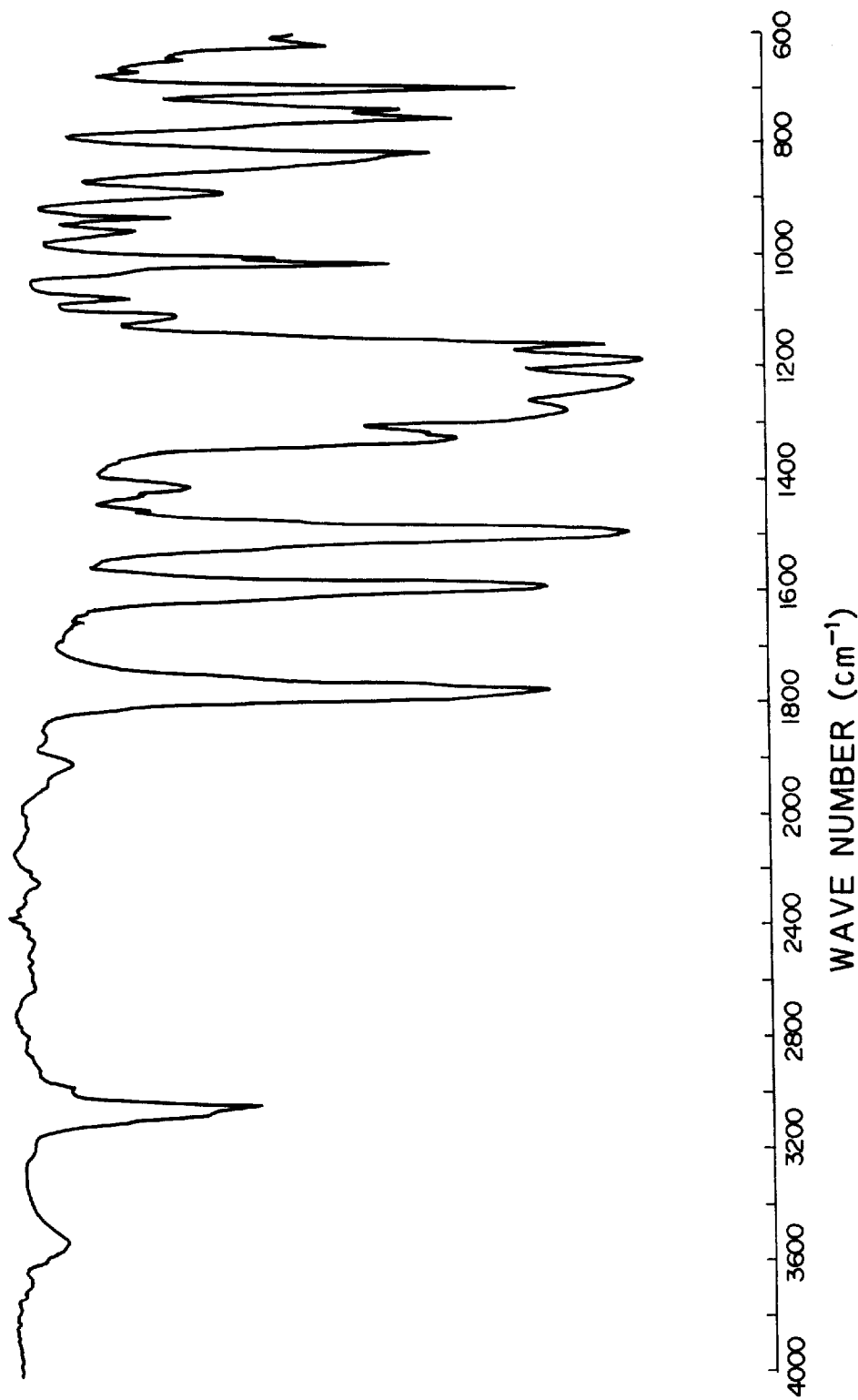

Number average molecular weight: 5,100
Weight average molecular weight: 9,700
IR spectrum: shown in FIG. 77
Glass transition point: 190.1° C.

| Elemental Analysis (%) | | | |
|---|---|---|---|
|  | C | H | N |
| Measured Value | 83.96 | 4.85 | 2.51 |
| Calculated Value | 83.99 | 4.89 | 2.51 |

Polycarbonate No. 36:

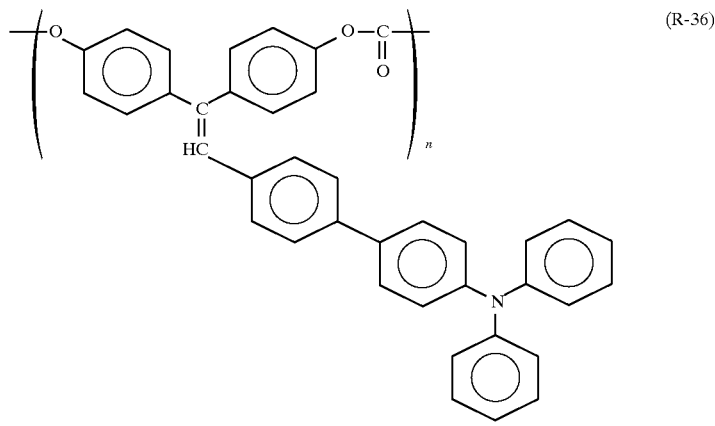

(R-36)

Polycarbonate No. 37:

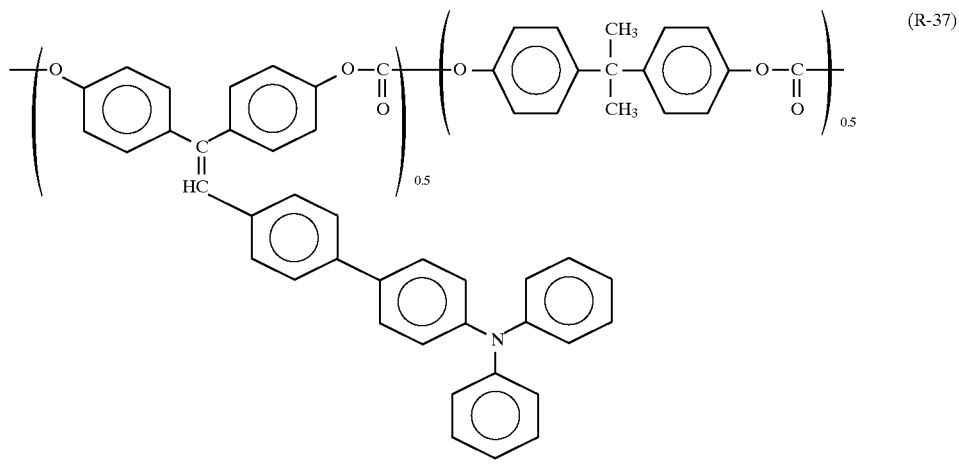
(R-37)

Figure 78:
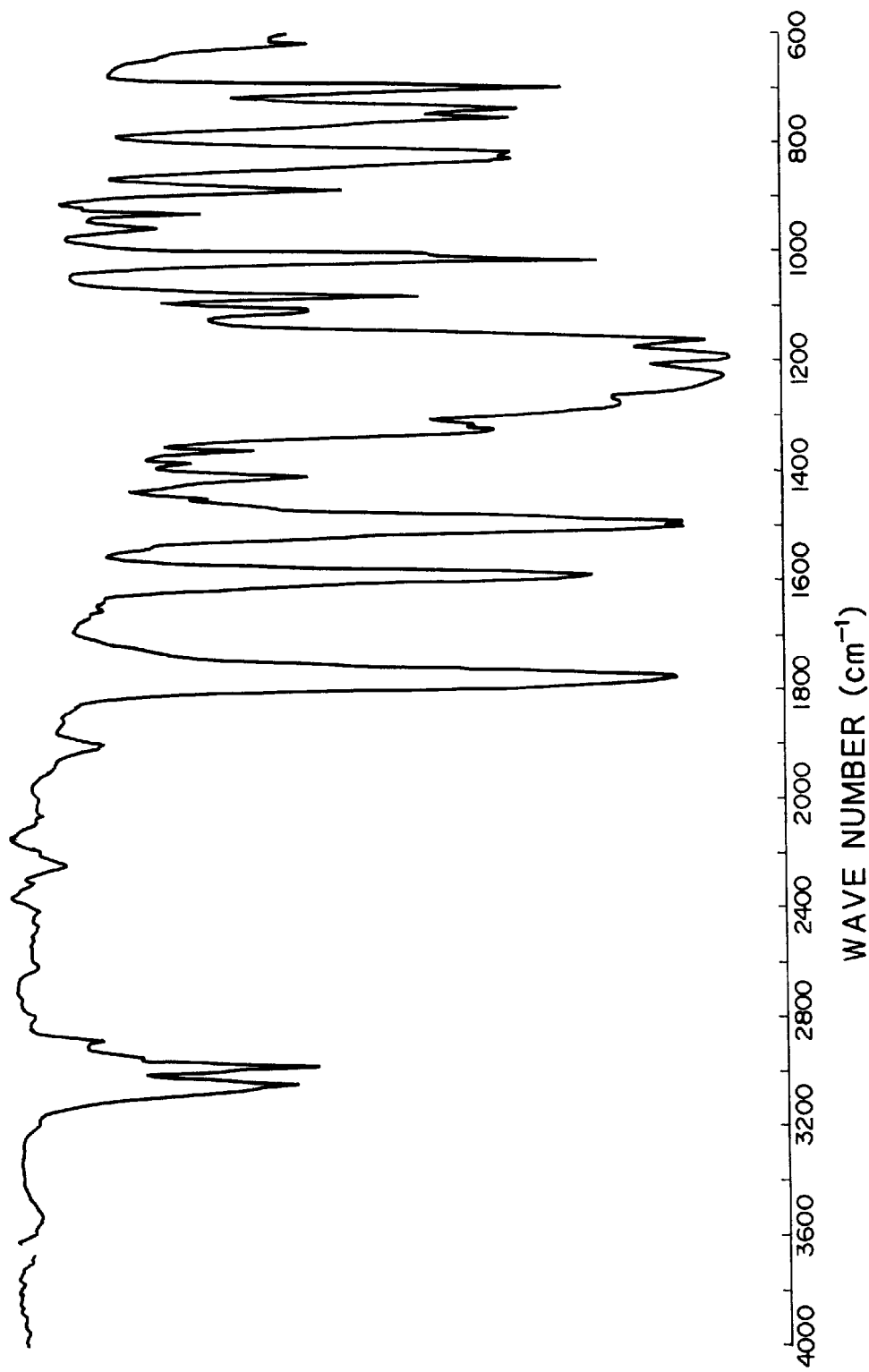

Number average molecular weight: 15,200
Weight average molecular weight: 45,600
IR spectrum: shown in FIG. 78
Glass transition point: 186.6° C.

| Elemental Analysis (%) | C | H | N |
|---|---|---|---|
| Measured Value | 81.34 | 5.07 | 1.70 |
| Calculated Value | 81.35 | 5.10 | 1.73 |

Figure 79:
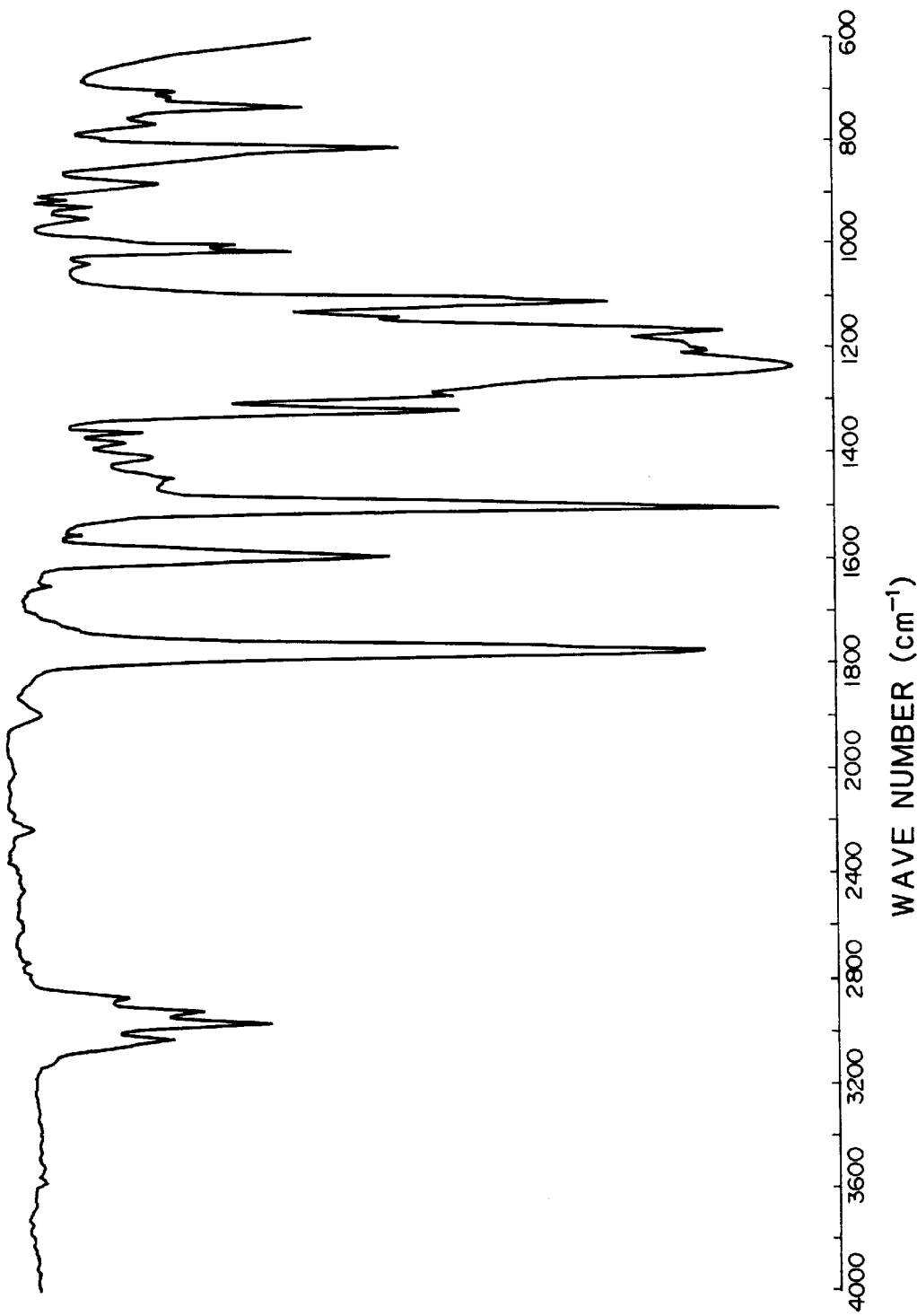

Number average molecular weight: 45,700
Weight average molecular weight: 111,500
IR spectrum: shown in FIG. 79
Glass transition point: 155.9° C.

| Elemental Analysis (%): | C | H | N |
|---|---|---|---|
| Measured Value | 79.91 | 5.78 | 1.53 |
| Calculated Value | 79.93 | 5.81 | 1.56 |

Polycarbonate No. 38:

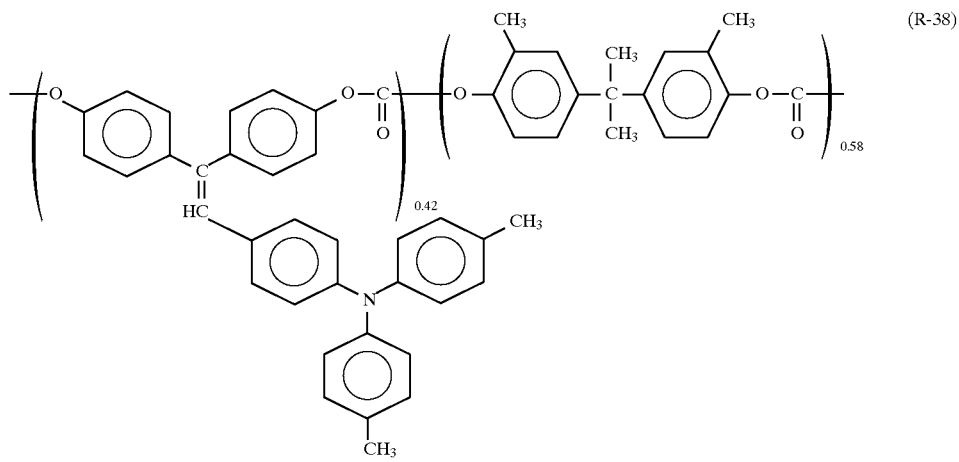
(R-38)

Polycarbonate No. 39:

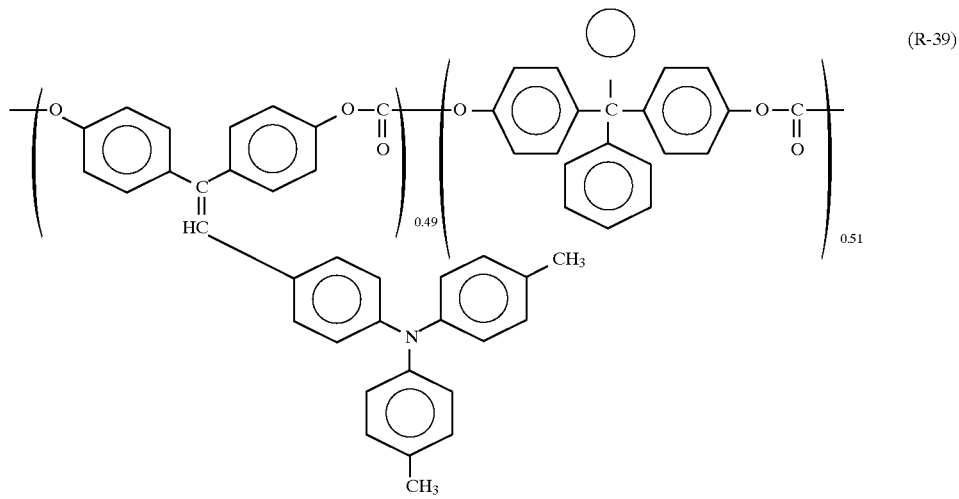

(R-39)

Figure 80:
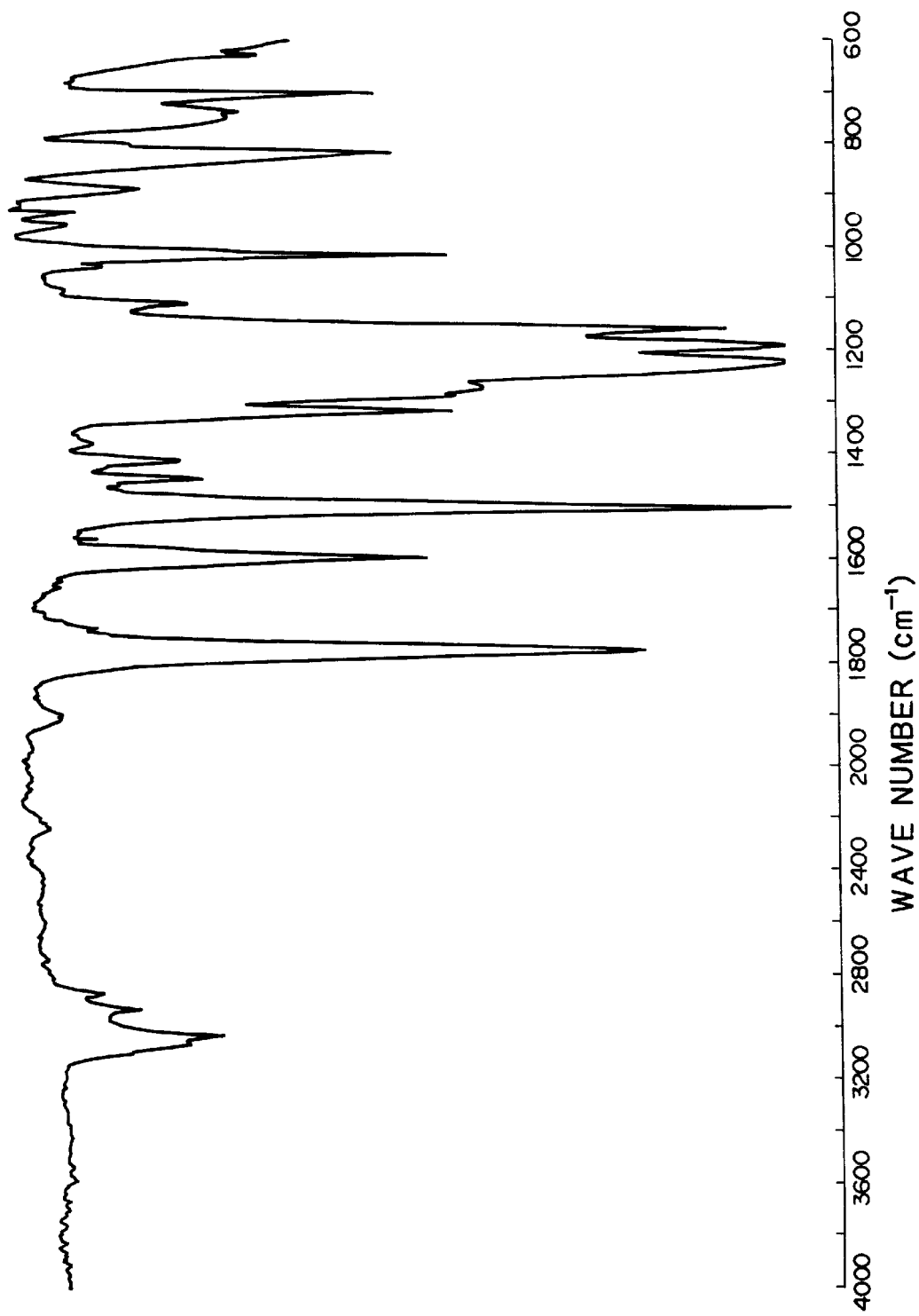

Number average molecular weight: 55,900
Weight average molecular weight: 107,400
IR spectrum: shown in FIG. 80
Glass transition point: 196.9° C.

| Elemental Analysis (%): | | | |
|---|---|---|---|
| | C | H | N |
| Measured Value | 82.47 | 5.10 | 1.54 |
| Calculated Value | 82.51 | 5.10 | 1.55 |

Figure 81:
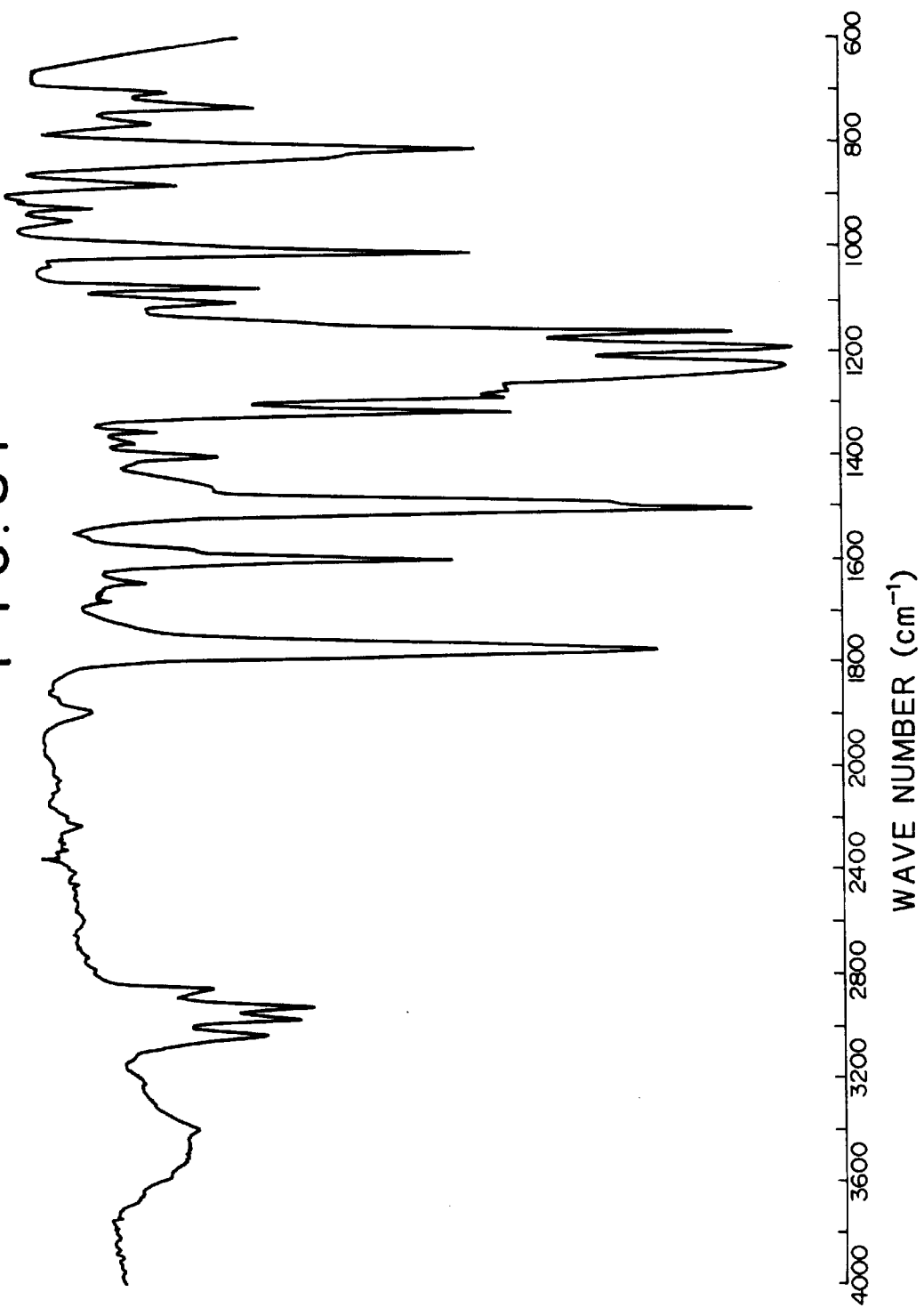

Number average molecular weight: 94,700
Weight average molecular weight: 612,400
IR spectrum: shown in FIG. 81
Glass transition point: 190.7° C.

| Elemental Analysis (%): | | | |
|---|---|---|---|
| | C | H | N |
| Measured Value | 81.47 | 5.38 | 1.65 |
| Calculated Value | 81.50 | 5.40 | 1.67 |

Polycarbonate No. 40:

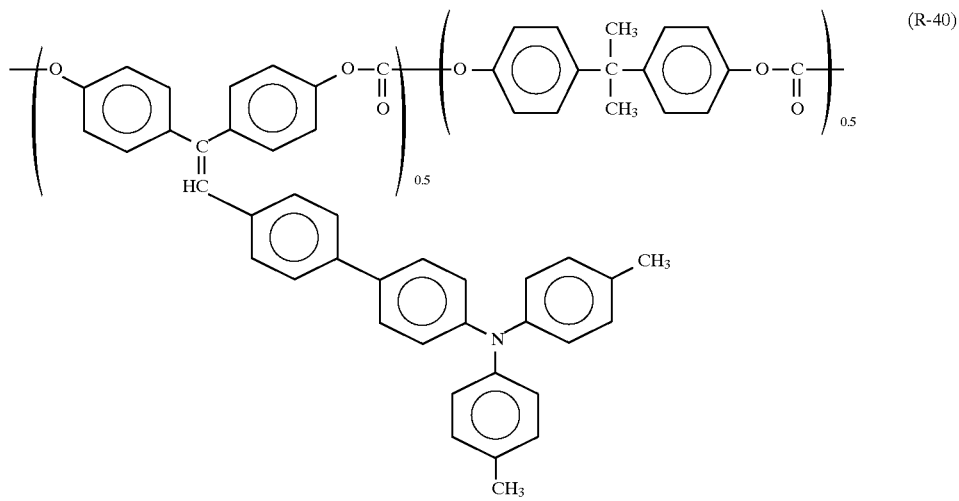

(R-40)

Polycarbonate No. 41:

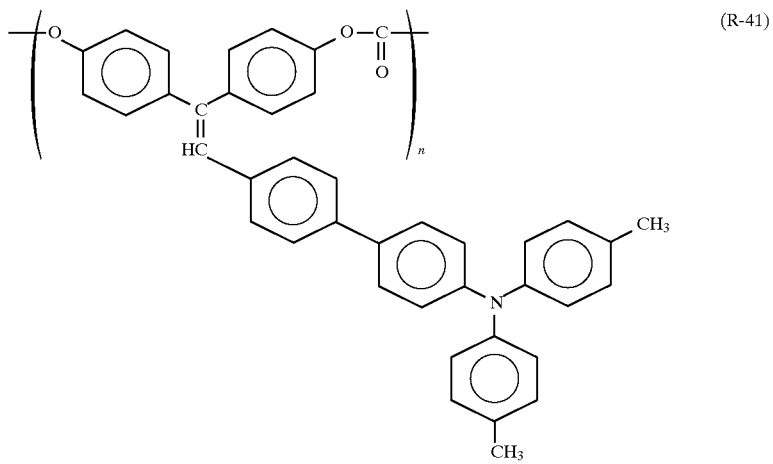

(R-41)

Figure 82:
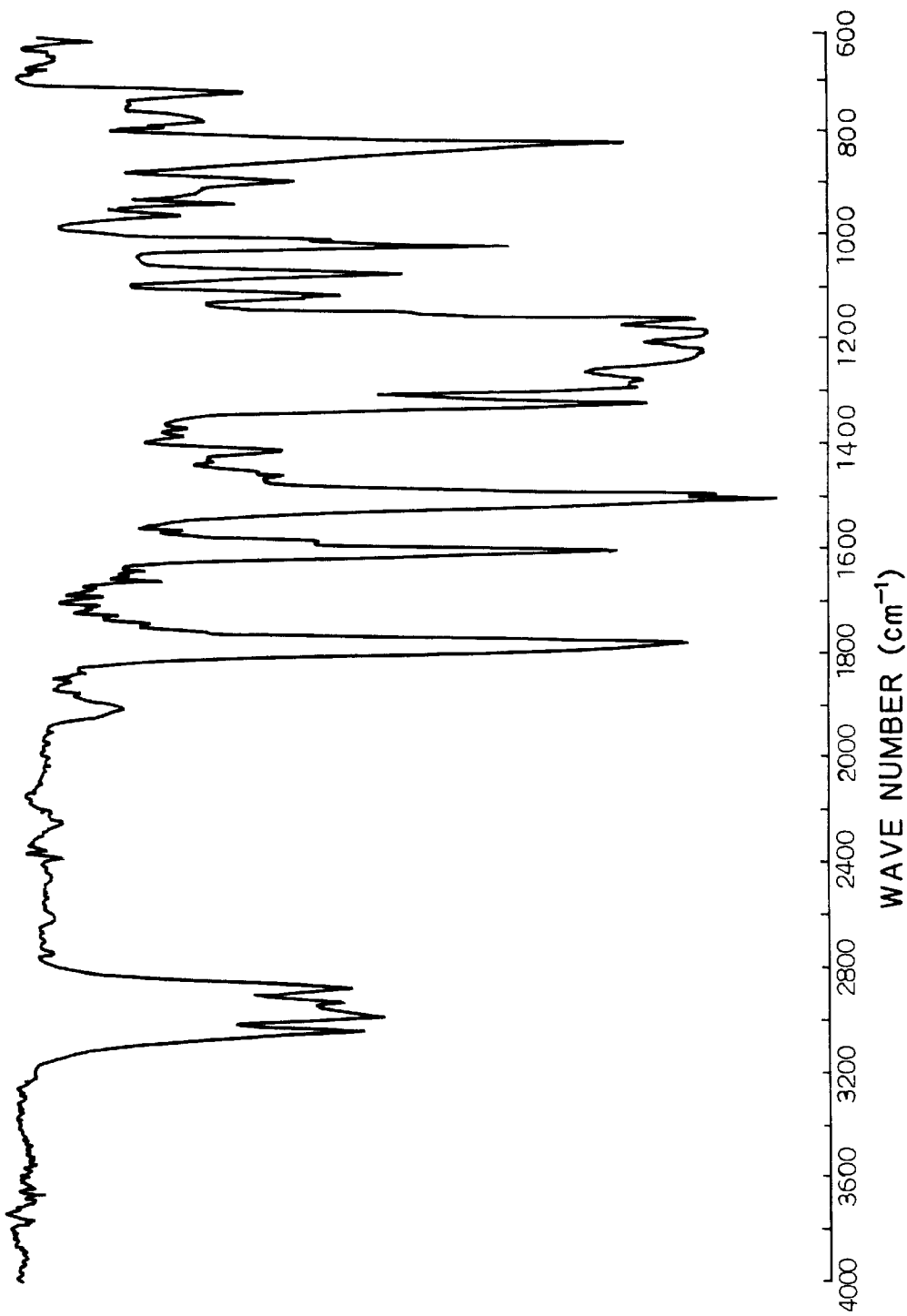

Number average molecular weight: 26,100
Weight average molecular weight: 56,100
IR spectrum: shown in FIG. 82
Glass transition point: not measured

| | Elemental Analysis (%): | | |
|---|---|---|---|
| | C | H | N |
| Measured Value | 84.02 | 5.35 | 2.35 |
| Calculated Value | 84.07 | 5.35 | 2.39 |

Application Example 1

A solution, prepared by dissolving a polyamide resin (CM-8,000 manufactured by Toray Corp.) in a mixed solvent composed of methanol and butanol, was coated onto an aluminum substrate by using a doctor blade and dried to form an intermediate layer having a thickness of 0.3 µm. Separately, a bisazo compound (as a charge-generating material) similar to that used in Reference Example 2 was placed in a ball mill and pulverized in a mixed solvent composed of cyclohexanone and 2-butanone to obtain a dispersion. The thus-obtained dispersion was coated on the intermediate layer formed on the aluminum substrate and dried to form a charge-generating layer having a thickness of about 0.5 µm. In addition, 0.9 part by weight of the aromatic polycarbonate No. 1 as a charge-transporting material obtained in Example 1 above was dissolved in 5.1 parts by weight of dichloromethane. The solution thus obtained was coated by using a doctor blade onto the charge-generating layer formed on the substrate and dried at room temperature and then completely dried at 120° C. for 20 minutes to form a charge-transporting layer having a thickness of about 20 µm on the charge generating layer, thereby obtaining a photosensitive medium No. 1.

The thus-obtained photosensitive medium No. 1 was tested for the sensitivity to a visible ray by using an electrostatic copying paper tester (SP428 model manufactured by Kawaguchi Electric Machinery Co., Ltd.). Thus, the photosensitive medium was placed in a dark chamber and subjected to a corona-discharge treatment at −6 KV for 20 seconds. The resulting charged photosensitive medium was measured for the surface potential $V_m$ (V). After being allowed to stand in the dark chamber for 20 seconds, the surface potential $V_0$ (V) was measured. Thereafter, a surface of the photosensitive medium was irradiated with light of a tungsten lamp at an illumination intensity of 4.5 lux while measuring the exposure amount $E_{1/2}$ (lux.second) required to decrease the surface potential to one half of $V_0$. The results are shown in Table 2.

Application Examples 2 to 31

Application Example 1 was repeated in the same manner as described except that the aromatic polycarbonate No. 2-31 obtained in Examples 2–31 were used in place of the aromatic polycarbonate No. 1. The results are also show in Table 2.

TABLE 2

| Application Example No. | Aromatic Polycarbonate No. | $-V_m$ (V) | $-V_0$ (V) | $E_{1/2}$ (lux · sec) |
|---|---|---|---|---|
| 1 | 1 | 1553 | 1239 | 1.12 |
| 2 | 2 | 1603 | 1308 | 1.12 |
| 3 | 3 | 1475 | 979 | 1.12 |
| 4 | 4 | 1327 | 795 | 0.81 |
| 5 | 5 | 1575 | 1409 | 1.44 |
| 6 | 6 | 1635 | 1418 | 1.83 |
| 7 | 7 | 1509 | 1247 | 0.87 |
| 8 | 8 | 1486 | 1116 | 0.90 |
| 9 | 9 | 1596 | 1351 | 1.03 |
| 10 | 10 | 1518 | 1226 | 1.04 |
| 11 | 11 | 1286 | 892 | 0.82 |
| 12 | 12 | 1473 | 1193 | 1.03 |
| 13 | 13 | 1451 | 1230 | 1.01 |
| 14 | 14 | 1378 | 956 | 0.81 |
| 15 | 15 | 1518 | 1197 | 0.86 |
| 16 | 16 | 1542 | 1250 | 0.93 |
| 17 | 17 | 1355 | 1020 | 0.95 |
| 18 | 18 | 1547 | 1308 | 1.00 |
| 19 | 19 | 1335 | 1024 | 0.80 |
| 20 | 20 | 1533 | 1247 | 0.86 |
| 21 | 21 | 1597 | 1364 | 1.00 |
| 22 | 22 | 1447 | 1208 | 1.05 |
| 23 | 23 | 1416 | 1135 | 0.98 |
| 24 | 24 | 1335 | 1110 | 1.02 |
| 25 | 25 | 1455 | 1103 | 0.99 |
| 26 | 26 | 1684 | 1529 | 1.56 |
| 27 | 27 | 1479 | 1212 | 1.22 |
| 28 | 28 | 1613 | 1366 | 1.36 |
| 29 | 29 | 1578 | 1308 | 1.15 |
| 30 | 30 | 1514 | 1228 | 0.84 |
| 31 | 31 | 1602 | 1371 | 1.20 |

Application Examples 32–47

Application Example 1 was repeated in the same manner as described except that the aromatic polycarbonate No. 7–9, 11, 12 and 14–24 obtained in Examples 7–9, 11, 12 and 14–24 were used in place of the aromatic polycarbonate No. 1 and that a trisazo compound similar to that used in Reference Example 1 was used in place of the bisazo compound as a charge generating substance. The results are show in Table 3.

TABLE 3

| Application Example No. | Aromatic Polycarbonate No. | $-V_m$ (V) | $-V_0$ (V) | $E_{1/2}$ (lux · sec) |
|---|---|---|---|---|
| 32 | 7 | 1420 | 985 | 0.64 |
| 33 | 8 | 1649 | 1297 | 0.69 |
| 34 | 9 | 1538 | 1140 | 0.70 |
| 35 | 11 | 1438 | 1006 | 0.55 |
| 36 | 12 | 1470 | 1078 | 0.62 |
| 37 | 14 | 1293 | 741 | 0.52 |
| 38 | 15 | 1257 | 672 | 0.49 |
| 39 | 16 | 1411 | 859 | 0.57 |
| 40 | 17 | 979 | 233 | 0.45 |
| 41 | 18 | 1309 | 821 | 0.48 |
| 42 | 19 | 1403 | 1054 | 0.72 |
| 43 | 20 | 1450 | 1094 | 0.80 |
| 44 | 21 | 1102 | 915 | 0.65 |
| 45 | 22 | 1409 | 993 | 0.78 |
| 46 | 23 | 1341 | 931 | 0.64 |
| 47 | 24 | 1274 | 852 | 0.58 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. An electrophotographic photosensitive medium comprising a conductive substrate, and a photosensitive layer formed on said conductive substrate, said photosensitive layer comprising an aromatic polycarbonate having a charge transport property comprising the following structural unit (I):

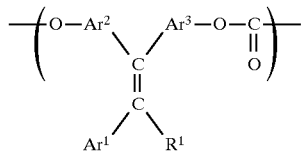

wherein $R^1$ is selected from the group consisting of a hydrogen atom, substituted and unsubstituted alkyl groups and substituted and unsubstituted aryl groups; $Ar^1$ is selected from the group consisting of substituted and unsubstituted nitrogen-containing aryl group or a monovalent heterocyclic group having an amine structure and $Ar^2$ and $Ar^3$ are independently selected from the group consisting of substituted and unsubstituted arylene groups.

2. An electrophotographic photosensitive medium as claimed in claim 1, wherein said polycarbonate further comprises the following structural unit (II):

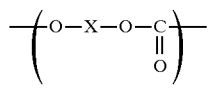

wherein X is an organic divalent group.

3. An electrophotographic photosensitive medium as claimed in claim 2, wherein said organic divalent group X is selected from the group consisting of (a) a divalent aliphatic group, (b) a divalent alicyclic group, (c) a divalent aromatic group, (d) a divalent group of the formula:

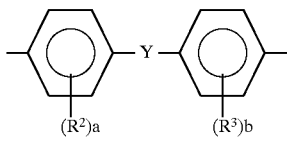

where $R^2$ and $R^3$ are independently selected from substituted and unsubstituted alkyl groups, substituted and unsubstituted aryl groups and a halogen atom, a and b are each an integer of 0 to 4 and Y is selected from the group consisting of a linear alkylene group having 2 to 12 carbon atoms, —O—, —S—, —SO—, —SO$_2$—, —CO—, —CO—O—Z$^1$—O—CO— where Z$^1$ is selected from the group consisting of substituted and unsubstituted divalent aliphatic groups and substituted and unsubstituted divalent arylene groups, —CO—Z$^2$—CO— where Z$^2$ is selected from the group consisting of substituted and unsubstituted divalent aliphatic groups and substituted and unsubstituted divalent arylene groups,

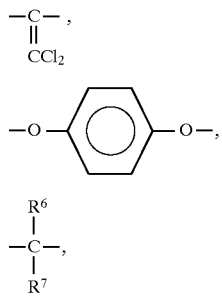

where $R^6$ and $R^7$ are independently selected from the group consisting of a hydrogen atom, a halogen atom, substituted and unsubstituted alkyl groups having 1–5 carbon atoms, substituted and unsubstituted alkoxy groups having 1–5 carbon atoms, substituted and unsubstituted aryl groups and a group coupled with at least one of $R^2$ and $R^3$ to form a cyclic or heterocyclic structure and may link with each other to form a cyclic or heterocyclic structure,

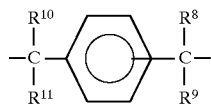

where $R^8$, $R^9$, $R^{10}$ and $R^{11}$ are independently selected from the group consisting of a hydrogen atom, a halogen atom, substituted and unsubstituted alkyl groups having 1–5 carbon atoms, substituted and unsubstituted alkoxy groups having 1–5 carbon atoms and substituted and unsubstituted aryl groups,

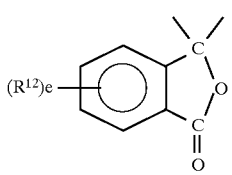

where $R^{12}$ is selected from the group consisting of a hydrogen atom, a halogen atom, substituted and unsubstituted alkyl groups having 1–5 carbon atoms, substituted and unsubstituted alkoxy groups having 1–5 carbon atoms and substituted and unsubstituted aryl groups and e is an integer of 0–4,

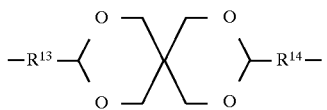

where $R^{13}$ and $R^{14}$ are independently selected from the group consisting of a direct bond and an alkylene group having 1–4 carbon atoms and

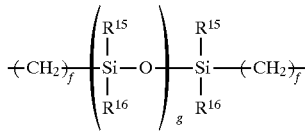

where $R^{15}$ and $R^{16}$ are independently selected from the group consisting of substituted and unsubstituted alkyl groups having 1–5 carbon atoms and substituted and unsubstituted aryl groups, f is an integer of 0–20 and g is an integer of 0–2,000, and (e) a divalent group of the formula:

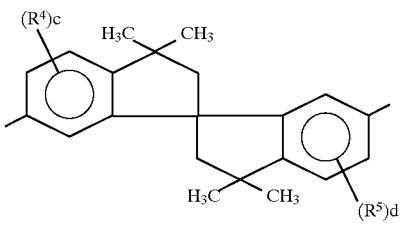

where $R^4$ and $R^5$ are independently selected from substituted and unsubstituted alkyl groups, substituted and unsubstituted aryl groups and a halogen atom, c and d are each an integer of 0 to 3.

4. An electrophotographic photosensitive medium as claimed in claim 2, wherein said polycarbonate comprises a recurring unit of the following formula (III):

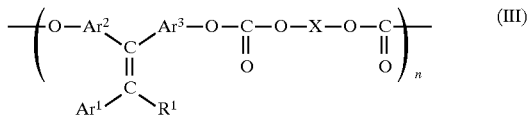

wherein $R^1$, $Ar^1$, $Ar^2$, $Ar^3$ and X are as defined above and n is an integer of 2–5,000.

5. An electrophotographic photosensitive medium as claimed in claim 1, wherein $R^1$ is a hydrogen atom and $Ar^1$ is —$Ar^4$—$NR^{17}R^{18}$ where $Ar^4$ is selected from the group consisting of substituted and unsubstituted arylene groups and $R^{17}$ and $R^{18}$ are independently selected from the group consisting of an acyl group, substituted and unsubstituted alkyl groups and substituted and unsubstituted aryl groups.

6. An electrophotographic photosensitive medium as claimed in claim 5, wherein $Ar^2$, $Ar^3$ and $Ar^4$ are each a phenylene group.

7. An electrophotographic photosensitive medium as claimed in claim 2, wherein $R^1$ is a hydrogen atom and $Ar^1$ is —$Ar^4$—$NR^{17}R^{18}$ where $Ar^4$ is selected from the group consisting of substituted and unsubstituted arylene groups and $R^{17}$ and $R^{18}$ are independently selected from the group consisting of an acyl group, substituted and unsubstituted alkyl groups and substituted and unsubstituted aryl groups.

8. An electrophotographic photosensitive medium as claimed in claim 7, wherein $Ar^2$, $Ar^3$ and $Ar^4$ are each a phenylene group.

9. An electrophotographic photosensitive medium as claimed in claim 3, wherein $R^1$ is a hydrogen atom and $Ar^1$ is —$Ar^4$—$NR^{17}R^{18}$ where $Ar^4$ is selected from the group consisting of substituted and unsubstituted arylene groups and $R^{17}$ and $R^{18}$ are independently selected from the group consisting of an acyl group, substituted and unsubstituted alkyl groups and substituted and unsubstituted aryl groups.

10. An electrophotographic photosensitive medium as claimed in claim 9, wherein $Ar^2$, $Ar^3$ and $Ar^4$ are each a phenylene group.

11. An electrophotographic photosensitive medium as claimed in claim 4, wherein $R^1$ is a hydrogen atom and $Ar^1$ is —$Ar^4$—$NR^{17}R^{18}$ where $Ar^4$ is selected from the group consisting of substituted and unsubstituted arylene groups and $R^{17}$ and $R^{18}$ are independently selected from the group consisting of an acyl group, substituted and unsubstituted alkyl groups and substituted and unsubstituted aryl groups.

12. An electrophotographic photosensitive medium as claimed in claim 11, wherein $Ar^2$, $Ar^3$ and $Ar^4$ are each a phenylene group.

13. The electrophotographic photosensitive medium of claim 1, wherein $Ar^1$ is of the formula —$Ar^4$—$(N(R^{17})(R^{18}))_h$, wherein $R^{17}$ and $R^{18}$ are each independently selected from the group consisting of an acyl group, a substituted or unsubstituted alkyl group, or a substituted and unsubstituted aryl group, $Ar^4$ is selected from the group consisting of a substituted or unsubstituted arylene group and h is an integer of 1–3.

14. The electrophotographic photosensitive medium of claim 1, wherein said structural unit (I) is of the formula (IX)

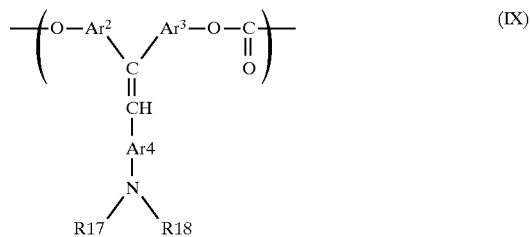

wherein $R^{17}$ and $R^{18}$ are each independently selected from the group consisting of an acyl group, a substituted or unsubstituted alkyl group, or a substituted and unsubstituted aryl group $Ar^4$ is selected from the group consisting of a substituted or unsubstituted arylene group, and $Ar^2$ and $Ar^3$ are independently selected from the group consisting of substituted and unsubstituted arylene groups.

15. The electrophotographic photosensitive medium of claim 1, wherein said structural unit (I) is of the formula (X)

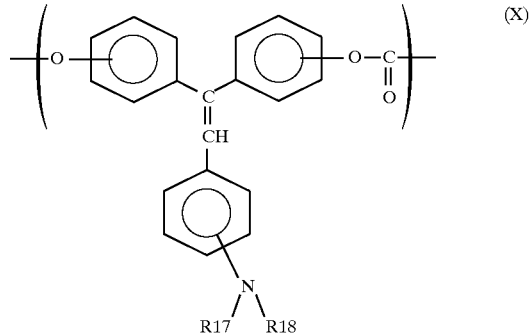

wherein $R^{17}$ and $R^{18}$ are each independently selected from the group consisting of an acyl group, a substituted or unsubstituted alkyl group, or a substituted and unsubstituted aryl group.

* * * * *

UNITED STATES PATENT AND TRADEMARK OFFICE
CERTIFICATE OF CORRECTION

PATENT NO.   : 5,840,454
DATED        : November 24, 1998
INVENTOR(S)  : Kazukiyo NAGAI et al It is certified that error appears in the above-identified patent and that said Letters Patent is hereby corrected as shown below:

Column 102, line 32, "The results are also show in" should read --The results are also shown in--.

Column 103, line 6, "show in Table 3" should read --shown in Table 3--.

Signed and Sealed this

Seventeenth Day of October, 2000

Attest:

Q. TODD DICKINSON

Attesting Officer                    Director of Patents and Trademarks